[19] United States Patent
Pester, III

[11] Patent Number: 5,563,930
[45] Date of Patent: *Oct. 8, 1996

[54] COMMON CHANNELING SIGNALING NETWORK MAINTENANCE AND TESTING

[75] Inventor: Eugene M. Pester, III, Wyndmoor, Pa.

[73] Assignee: C & P of Virginia, Richmond, Va.

[*] Notice: The term of this patent shall not extend beyond the expiration date of Pat. No. 5,475,732.

[21] Appl. No.: 470,568

[22] Filed: Jun. 6, 1995

Related U.S. Application Data

[63] Continuation of Ser. No. 18,457, Feb. 16, 1993, Pat. No. 5,475,732.

[51] Int. Cl.$^6$ .............................. H04B 1/24; H04B 3/04; H04B 3/22; H04J 1/00
[52] U.S. Cl. .................. 379/34; 379/1; 379/22; 379/32; 379/229; 379/230; 370/58.1; 370/68.1; 370/110.1
[58] Field of Search .................. 379/1, 5, 2, 22, 379/27, 29, 32, 34, 111, 112, 230, 231, 232; 370/131.5, 111, 85.1, 58.1, 68.1, 110.1

[56] References Cited

U.S. PATENT DOCUMENTS

| 4,885,739 | 12/1989 | Reed et al. | 370/58.1 |
| 5,291,489 | 3/1994 | Morgan et al. | 370/85.1 |
| 5,375,159 | 12/1994 | Williams | 379/22 X |

OTHER PUBLICATIONS

"Common Channel Signaling Switching System Requirements" Module of TR-TSY-000064, Section 6.5, LSSGR Issue 2, Jul. 1987.

Primary Examiner—Wellington Chin
Assistant Examiner—Paul Loomis
Attorney, Agent, or Firm—Lowe, Price, LeBlanc & Becker

[57] ABSTRACT

An SS7 Network Preventative Maintenance System for detecting potential SS7 and switched network troubles, automatically analyzing the troubles, providing alarm and corrective action to avoid major network events. Real time monitors on SS7 links at the STP provide information on exceeded link load, exceeded Message Signaling Unit (MSU) frequency and network management status/error conditions in a Stage 1 Process. The Stage 1 Process provides alarm information to a Stage 2 Process which controls all Stage 1 associated monitors for an STP pair. Stage 2 reacts to Stage 1 signals to generate alarm and corrective action information which is passed on to a Stage 3 Process. The Stage 3 Process controls all Stage 2 Processes in the operating company. Stage 3 reacts to Stage 2 output to detect potential or real accompanying network trouble and generates alarm and corrective action information and displays in response thereto. Stage 3 also alerts a Stage 4 process which is connected to all Stage 3 Processes in a region. Stage 4 analyzes data from Stage 3 to determine if similar trouble could happen in another network where upon Stage 4 informs affected Stage 3 Processes regarding the same. Corrective action/trouble verification information is generated and passed on. An Interface to the network's surveillant system is provided.

4 Claims, 109 Drawing Sheets

CALLED PARTY NUMBER DECODE

| | LENGTH | OCTET | ID |
|---|---|---|---|
| NATURE OF CONNECTION | 1 | 16 | |
| FORWARD CALL INDICATORS | 2 | 17 & 18 | |
| CALLING PARTY'S CAT | 1 | 19 | |
| POINTER TO USER SERVICE INFORMATION | 1 | 20 | A |
| LENGTH OF USER SERVICE INFORMATION | 1 | 20 + A OR A | C |
| USER SERVICE INFO | C | 20 + A + 1 TO 20 + A + 1 + C | |
| POINTER TO CALLED PARTY NUMBER | 1 | 21 | D |
| LENGTH INDICATOR FOR CALLED PARTY NUMBER | 1 | 21 + D OR D | E |
| CALLED PARTY NUM | D | 21 + D + 1 TO 21 + D + 1 + E | |
| POINTER TO START OF OPTIONAL PART | 1 | 22 | |

FIG. 4

HEX CONVERSION

| BIN | H | D |
|---|---|---|
| 0000 | 0 | 0 |
| 0001 | 1 | 1 |
| 0010 | 2 | 2 |
| 0011 | 3 | 3 |
| 0100 | 4 | 4 |
| 0101 | 5 | 5 |
| 0110 | 6 | 6 |
| 0111 | 7 | 7 |
| 1000 | 8 | 8 |
| 1001 | 9 | 9 |
| 1010 | A | 10 |
| 1011 | B | 11 |
| 1100 | C | 12 |
| 1101 | D | 13 |
| 1110 | E | 14 |
| 1111 | F | 15 |

BIN POSITION VALUE msb                                                                                        lsb 2048  1024  512  256  128  64  32  16  8  4  2  1

HEX POSITION VALUE msb               lsb 4096  256  16  1

FIG. 5

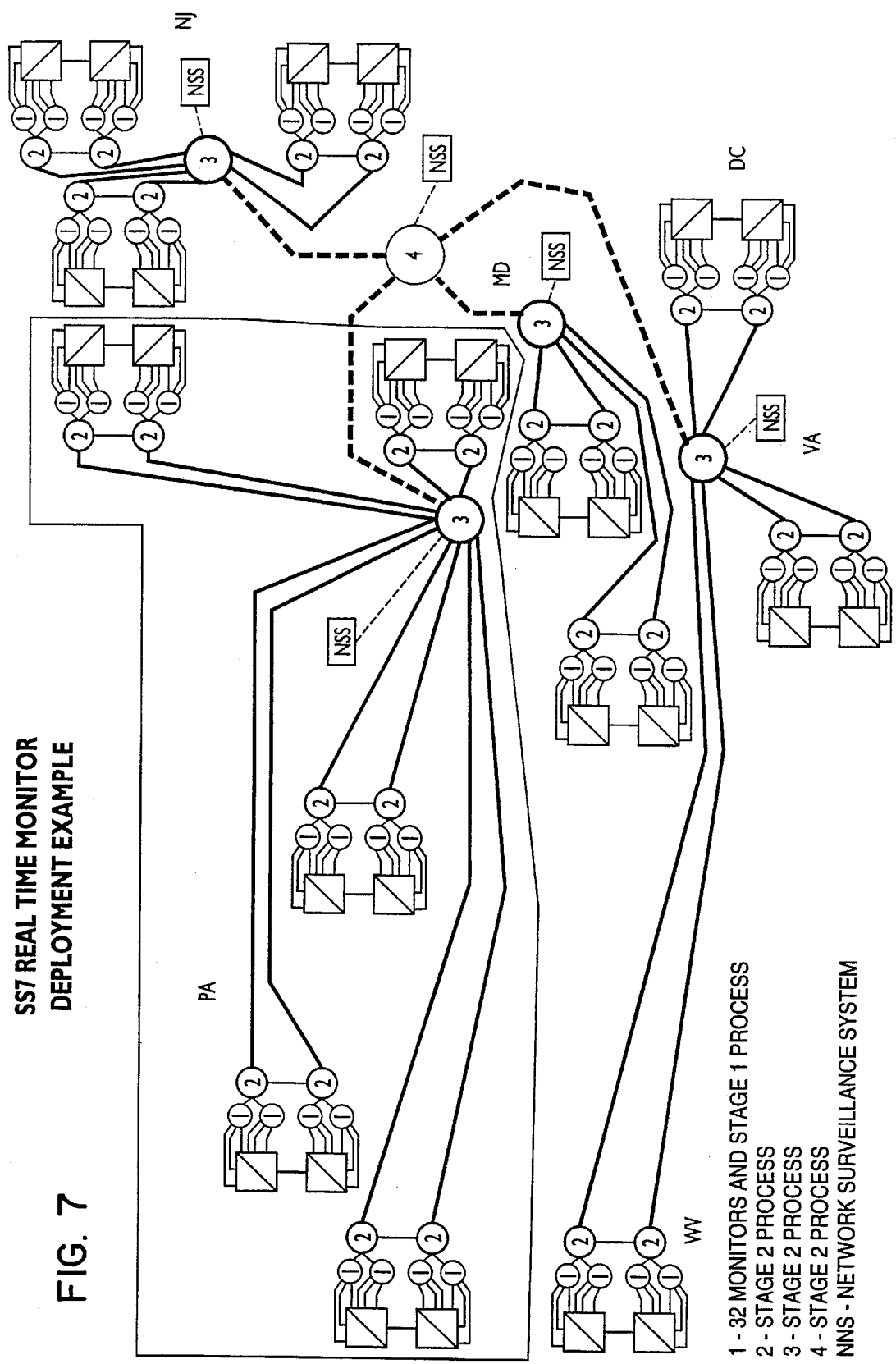
FIG. 7 SS7 REAL TIME MONITOR DEPLOYMENT EXAMPLE
1 - 32 MONITORS AND STAGE 1 PROCESS
2 - STAGE 2 PROCESS
3 - STAGE 2 PROCESS
4 - STAGE 2 PROCESS
NNS - NETWORK SURVEILLANCE SYSTEM

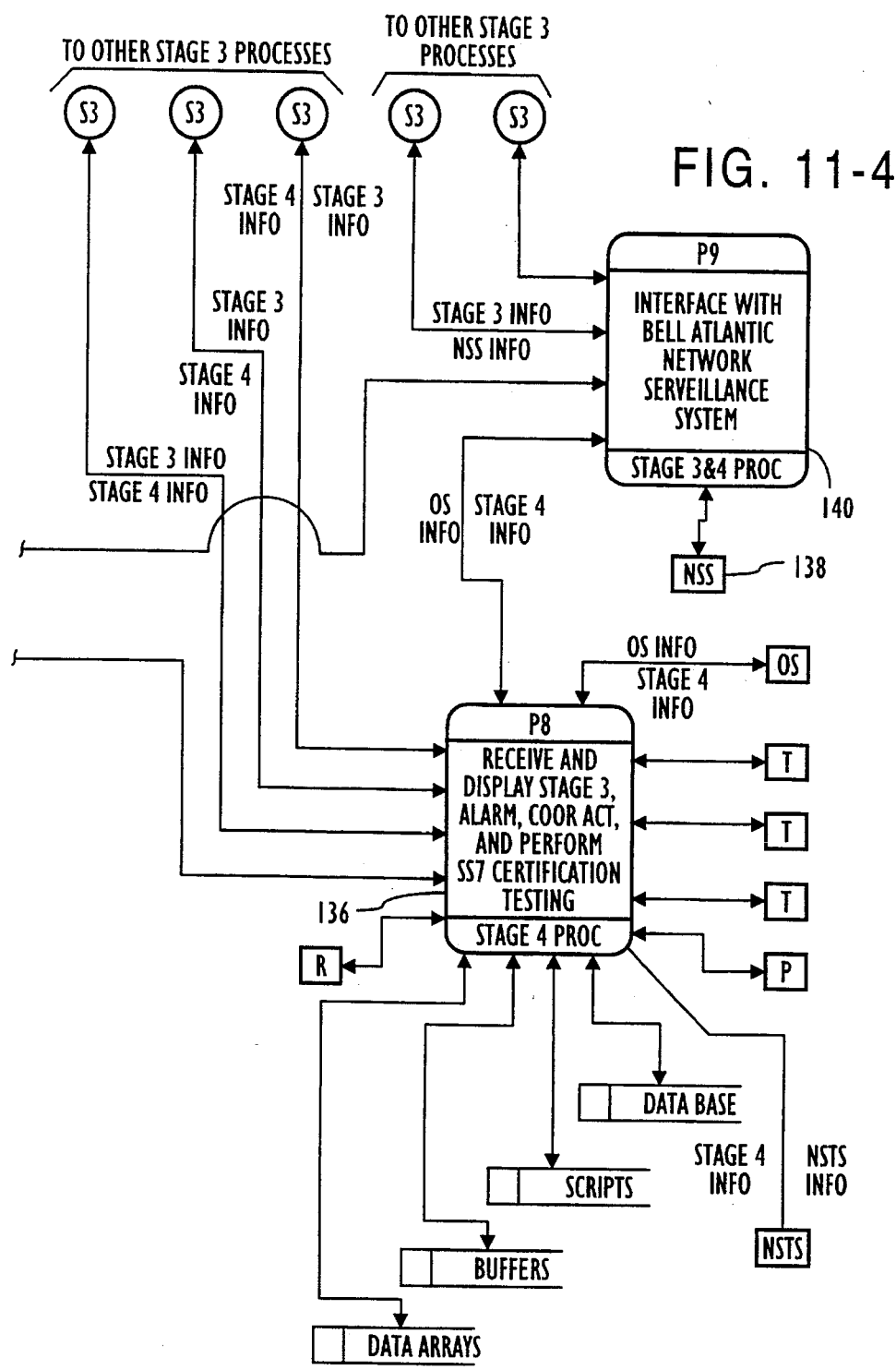

REAL TIME MONITOR ARCHITECTURE
USING TWO STAGE 2 CONTROLLERS

COMMON CHANNELING SIGNALING NETWORK MAINTENANCE AND TESTING

This application is a continuation of application Ser. No. 08/018,457 filed Feb. 16, 1993 now U.S. Pat. No. 5,475,732.

TECHNICAL FIELD

The present invention relates generally to switched communications networks using Common Channel Signaling (CCS) and more particularly relates to a system, method and apparatus for monitoring and testing the operation of the CCS network.

BACKGROUND

One system for providing a Common Channel Signaling Network (CCSN) utilizes Signaling System 7 (SS7) protocol in a Packet Switched Data Network (PSDN) connecting Network Elements (NE) via packet switched 56 KB digital data circuits. In addition to providing call set signaling functions, the SS7 network also provides access to switching control points (SCP) used to permit line identification database (LIDB) queries for credit card verification and 800 database look-up for 800 services. Class services also use the SS7 network to provide custom call features. The latest services using the SS7 network comprise Advanced Intelligent Network (AIN) services. AIN services use the SS7 network to access an Integrated Switching Control Point (ISCP) where AIN service functions are performed.

This network currently employs various Network Traffic Management (NTM) and NE test and provisioning systems to maintain the NEs in the Public Switched Network. However, these systems can only report troubles and provide manual NE trouble resolution tools. The Bellcore SS7 Engineering and Administration System (SEAS) was developed to provide Network Management functions for the SS7 network, but lacks the ability to anticipate troubles and provide corrective action instructions to NE operations personnel. Also, both NTMs and SEAS use information supplied from the NEs or the SS7 switching transfer point (STP) hardware which, when in trouble, can often cannot provide timely status information to maintenance personnel because of excessive NE and STP processor demands. SS7 STPs are especially susceptible to processor delays due to the extremely high volume of SS7 Message Signaling Units (MSUs) generated and processed during a major trouble condition. For these reasons an SS7 Real Time Monitoring System (RTMS) which is outside of the STP environment is needed to maintain the SS7 network and to ensure SS7 network reliability.

Current telecommunications and data networks using CCS generally utilize the protocol of Specification of Signaling System 7 (SS7) which is described in Section 6.5, LSSGR, Issue 2, July 1987, TR-TSY-000506, a module of TR-TSY-000064. Various methods and techniques for testing and analyzing the operation of such networks have been proposed including, by way of example, in copending application Ser. No. 07/953,173, filed Sep. 29, 1992, and commonly assigned with the present invention. Generally speaking, such prior arrangements for testing of SS7 networks have been responsive to malfunctions or else conducted on a routine basis at periodic intervals. Such techniques, while effective for their intended purposes, offer little, if any, assistance in detecting incipient developing problems so rapidly as to permit and provide prevention of network failure before the development of the problem is complete.

Accordingly it is an object of the present invention to provide a communications network preventative maintenance tool that detects potential CCS and switched network troubles, automatically analyzes such troubles and provides corrective action or instructions in time to avoid major breakdown.

It is another object of the invention to provide an SS7 Real Time Monitoring System (RTMS) which is outside of the STP environment and has the ability to anticipate troubles and provide corrective action instructions on a sufficiently rapid basis to detect incipient problems and provide corrective action before a serious network problem develops.

SUMMARY OF THE INVENTION

The SS7 Real Time Monitor System of the invention is a multi stage SS7 network preventative maintenance tool that detects potential SS7 and switched network troubles, automatically analyzes these troubles, and provides alarm and corrective action instructions to maintenance personnel in time to avoid a major network event. This is accomplished by placing real time SS7 monitors on links at the Signal Transfer Points (STPs). Information on exceeded Link Load, exceeded Message Signaling Unit (MSU) frequency and Network Management status/error conditions is passed to a Stage 1 controller or process. The Stage 1 process controls link monitors capable of monitoring upwards of 32 link monitors at a single STP. The monitors perform preliminary link analysis on error conditions. If the monitors identify trouble on any of the links, alarm information is sent to a Stage 2 controller or process via the Stage 1 process. The Stage 2 process controls all Stage 1 and associated monitors from an STP pair. If Stage 2 determines that there is an STP pair network trouble, it generates alarm and corrective action information and passes it to the Stage 3 controller or process. The Stage 3 process controls all Stage 2 controllers or processes in the operating company. If Stage 3 determines that there is potential or real company network trouble, it generates alarm and corrective action information and display signals on maintenance terminals in the company's SS7 control center (SEAC, SCC, etc.). Stage 3 also alerts the Stage 4 controller process.

The Stage 4 process is connected to all Stage 3 processes in the Region. It receives alarm/alert and corrective action information from the Stage 3 processes. It analyzes this data and determines if a similar trouble could happen in another company's network. The Stage 4 process informs the affected company's Stage 3 processes that a potential trouble condition may exist in their network. It will also pass along or generate corrective action/trouble verification information relevant to their network configuration.

These four controllers and processes provide a means to achieve a real time SS7 network maintenance/management system capable of preventing major company and Regional SS7 failures. The Stage 5 process is an interface to the Company's Network Surveillance System (NSS). This interface allows the Stage 3 and Stage 4 processes to get STP status information needed to assist trouble analysis. Also, since the SS7 Real Time Monitor System is capable of identifying troubles in seconds, it can pass alarm and status messages to the NSS system. The NSS system can use this information to anticipate Central Office (CO) alarms and ignore those alarms that it already knows will be generated. This allows the NSS system to concentrate its efforts on fixing the troubles at the CO and working interactively with the SS7 Real Time Monitor System to correct any remaining troubles.

BEST MODE FOR CARRYING OUT THE INVENTION

Figure 1:
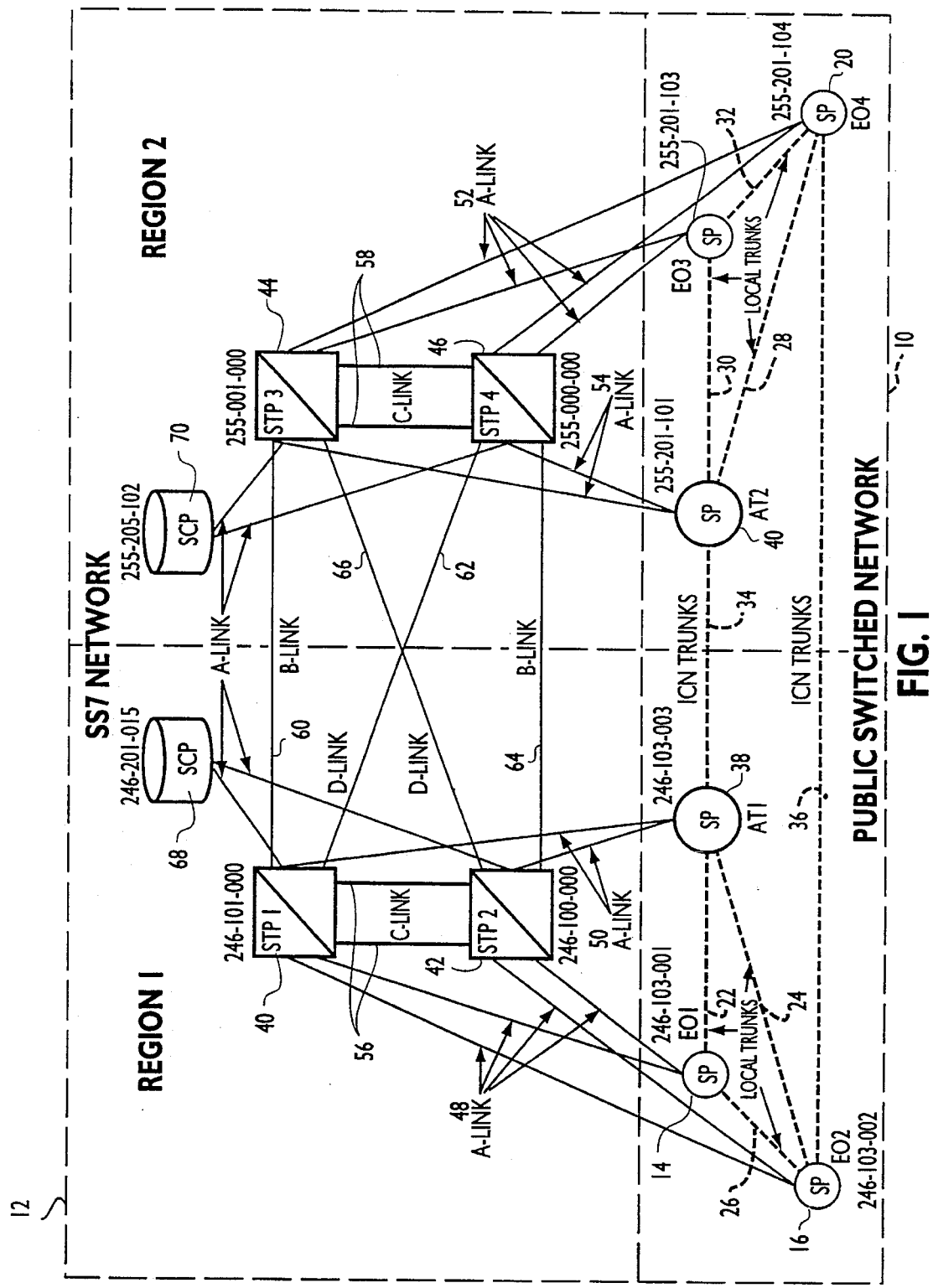
FIG. 1 is a block diagram of a Public Switched Telephone Network and its SS7 signal control network.

Referring to FIG. 1 there is shown a block diagram of a public switched telephone network and the SS7 network that is used to control the signaling for the switched network. Thus an analog switched telephone network is generally indicated at 10 having a common channel signaling network in the form of an SS7 network illustrated generally at 12. The switched telephone network consists of a series of central offices which are conventionally referred to as signaling points (SPs) in reference to the SS7 network. Certain of these SPs comprise end offices (EOs) illustrated at 14, 16, 18 and 20 as EOs 1–4 in FIG. 1. Each signaling point has a point code comprising a 9-digit code assigned to every node in the network. In FIG. 1 EO1 has a point code of 246-103-001, EO2 has a point code of 246-103-002, EO3 has a point code of 255-201-103, and EO4 has a point code of 255-201-104.

The end offices EO1 and EO2 represent end offices in the region of one regional operating company while end offices EO3 and EO4 represent end offices of the region of a different operating company. Each operating company has its own network ID, shown here as 246 for the left region and 255 for the right region in FIG. 1. The number 103 in the designation 246-103-001, is the number of the cluster. A cluster can hold 32 SPs or members, the member being designated by the final 3 numbers. Thus 246 may represent C & P of Virginia Regional Operating Company, cluster 103, member EO2 for EO2 when viewed from an SS7 standpoint.

The broken lines connecting the SPs together may be analog trunks or voice or similar circuits. The SPs in a given region are connected together by local trunks 22, 24 and 26 in the left region and 28, 30 and 32 in the right region. The SPs in one region are connected to the SPs in other regions via interexchange carrier network trunks or ICN trunks 34 and 36 in FIG. 1 connected to Access Tandems (ATs) 38 and 40 (AT1 and AT2). These SPs or ATs are shown as having point codes 246-103-003 and 255-201-101 respectively.

Referring to FIG. 1, the SS7 network 12 comprises a series of Signal Transfer Points (STPs) shown here at 40, 42, 44 and 46 designated STP1, STP2, STP3 and STP4. Each STP in a network is connected to the SPs in the network by A links indicated at 48, 50, 52 and 54. STP1 and STP2 constitute a mated pair of STPs connected by C links 56 while STP3 and STP4 constitute a mated pair connected by C links 58, each mated pair serving its respective transport area. It will be understood that there may be multiple mated pairs per region, one for each designated transport area. STP1 is connected to STP3 by B link 60 and to STP4 by D link 62. STP2 is connected to STP4 by B link 64 and to STP3 by D link 66.

As will be understood, the A, B, C and D links are physically identical with the designation relating to cost in terms of ease of access. The A links represent the lowest cost. B and D links have the same route cost with respect to SS7 so that the D designation is used only because it extends diagonally in the drawing. The C links are used to communicate between the two paired STPs for network management information and also constitute another route. The STPs in mated pairs have the same translations. Thus the translations in STP1 are the same as the translations in STP2, and the translations in STP3 are the same as the translations in STP4. The C links communicate between the paired STPs for network management information and SS7 message routing. The STP pair cannot function without the C links. Therefore, unnecessary utilization of the C links causes congestion and prevents the paired STPs from performing their intended function.

The STPs are connected to Signal Control Points (SCPs) indicated in FIG. 1 as an SCP 68 and an ISCP 70. The ISCP is an Integrated Signaling Control Point, which is basically the same as an SCP but comprises a larger and more powerful computer. AIN may also be regarded as another ISCP. SCPs are usually used for 800 and credit card services with ISCPs being used for AIN. However, this is optional. The ISCP may hold application information as well as routing information whereas an SCP contains routing information, i.e., routing tables.

The SS7 network constitutes a highly redundant data network, generally a 56K switched data circuit. By way of example, an SS7 message from EO2 to EO4 might travel any one of 8 possible routes. It could go from EO2 to STP1, from STP1 to STP3, STP3 to EO4. One variation on that route would be from STP1 down the D link 62 to STP4 to EO4, and so forth. In the event that a link between STP3 and EO4 was lost, an SS7 route could be established from EO2 to EO4 via STP1 to STP3 and then via C link 58 to STP4 to EO4. However, that would be an undesirable route in unnecessarily using the C link. A links provide direct connectivity while C links provide circuitous routes using extra switches, a situation to be avoided. An alternate route would be from STP1 via D link 62 to STP4 to EO4. Another reason for not using the C link is to avoid tying up the entire STP3-STP4 pair.

The operation of placing a call from EO2 to EO4 may be described as follows: The user at EO2 picks up his phone and dials the number that resides in EO4. The SP generates an Initial Address Message (IAM). This message would have the destination point code of EO4, namely, point code 255-201-104. It would have an originating point code of EO2, namely, 246-103-002, in addition to miscellaneous other information needed for call set-up. That message would then be sent to either STP1 or STP2. Assuming that the message goes to STP1, STP1 would look at the message and determine that the message was not for it as an STP but rather is for EO4. STP1 would then investigate possible routings to get to 255 or EO4. B and D links are available and STP1 would choose one of the two. Assuming that it chooses the B link to STP3, STP3 repeats the same procedure. It determines that the message is for 255 or EO4 and puts that message on the A link to EO4.

EO4 gets the IAM which has the called telephone number in it and determines whether or not the line is busy. If the line is not busy, EO4 generates an Address Complete Message (ACM) to indicate that it received the request for a call and that the number is not busy. That message is sent back by simply reversing the point codes. Now the destination point code is EO2 and the originating point code is EO4. The message goes back to EO2 to indicate that the IAM was received and processed. As soon as the phone is answered at EO4, EO4 sends an Answer Message (ANS) back to EO2 indicating that the phone at EO4 was picked up, and at that time the trunks are connected together. EO2 connects its user to that trunk and EO4 connects its user to that trunk so that communication is established. All such messaging may occur in about 600 milliseconds which would be average but not necessarily fast.

The foregoing constitutes the function of the STPs insofar as routing is concerned. The STPs look at a point code and if it is not for them they just pass it on via a route determined from translations and routing tables. The C link is the last route permitted and is not utilized unless no other route is available.

As opposed to the foregoing, where the point code was for EO4 and not STP1, the point code may be for STP1. One example of such a situation would be the case of an 800 call. The 800 number is a fictitious number which is associated with a POTS number in a database in the SCP. Thus if EO2 makes an 800 call to EO4 it is necessary to determine the real telephone number. EO2 launches a Switching Connection Control Park (SCCP) message, which is a database request. This point code has a destination point code of an alias which is the point code of STP1 and STP2. STP1 and STP2 have various point codes indicated in FIG. 1 as 246-100-000 and 246-101-000. They also have alias point codes that indicate that they have a function to perform. Upon recognizing such a point code the STP does a data search and generates another SCP message to perform a database dip. This returns the real telephone number and the STP now has the destination point code of the real telephone number message. This is sent back to EO2. STP1 determines that this message is not for me but for EO2. The message is sent back down to EO2. EO2 now has a real telephone number and the system performs the IAM and ACM procedure all over again to set up the call. The only difference between a regular direct call and an 800 call is the necessity to perform the dip to obtain the real number first. This procedure takes about 1.3 seconds because of the additional operation. The STPs have various databases, such as the 800 database and the credit card database, and there is still a further database for AIN.

The SS7 protocol describes how the signal messages are built and routed and provides for network management of the SS7 network itself. Thus if a link between EO4 and STP3 were to be lost, STP3 generates a transfer restricted message (TFR) to all nodes, i.e., all SPs connected to STP3, indicating that traffic is not to be sent to STP3 for EO4 because no route from STP3 to EO4 exists. If both A links to EO4 were down, EO4 would essentially be isolated and the STP pair STP3 STP4 would broadcast a transfer prohibited (TFP) message indicating that nothing should be sent to the pair for EO4.

In the transfer restricted situation it would be possible for STP3 to reach EO4 via the C link to STP4. This is a non-favored route but would be used in necessity. Handling such situations is the purpose of network managing messages. Congestion control or TFC accomplishes basically the same thing except that it constitutes a more sophisticated message limiting use of a circuit by stopping messages below a certain priority. Each message has a different priority. IAMs have a priority of 1 where ANS messages have a priority of 2.

Upon congestion occurring in the STP node for EO4 a new call could not be sent to EO4 because it constitutes a priority 1 message which is restricted because the congestion level is 2. Only priority 2 messages and higher would be permitted. If a call is already existing it could be answered or released. Releases have a priority of 2 to permit call completion. New calls could not be initiated until the congestion had been removed or lowered to congestion status 1 or 0.

The SS7 network constitutes a sophisticated network having a high predictability which is spelled out in the predetermined protocol. If all facts regarding the network are known it is possible to predict what will (or should) occur next. The system and method of the present invention is predicated upon recognition of that fact.

The SS7 messages traverse the network at all times. The messages themselves comprise digital serial messages that come into the STP. The start of the message is identified by a flag which is a zero followed by 6 ones and another 0. This constitutes a unique bit pattern in the SS7 protocol. The protocol ensures that this particular pattern is not repeated until the next message. This provides a flag at the beginning of a new message. A flag at the end of a message is also provided usually in the form of the flag at the beginning of the next message, i.e., a message usually contains only one flag. The message is arranged in 8 bits or in octets. These octets represent the information carried by the message. The message contains both fixed and variable parameters. The Message Transport Part (MTP) of the SS7 message is always in the same place. The values change but the MTP is always in the same place.

Figure 3:
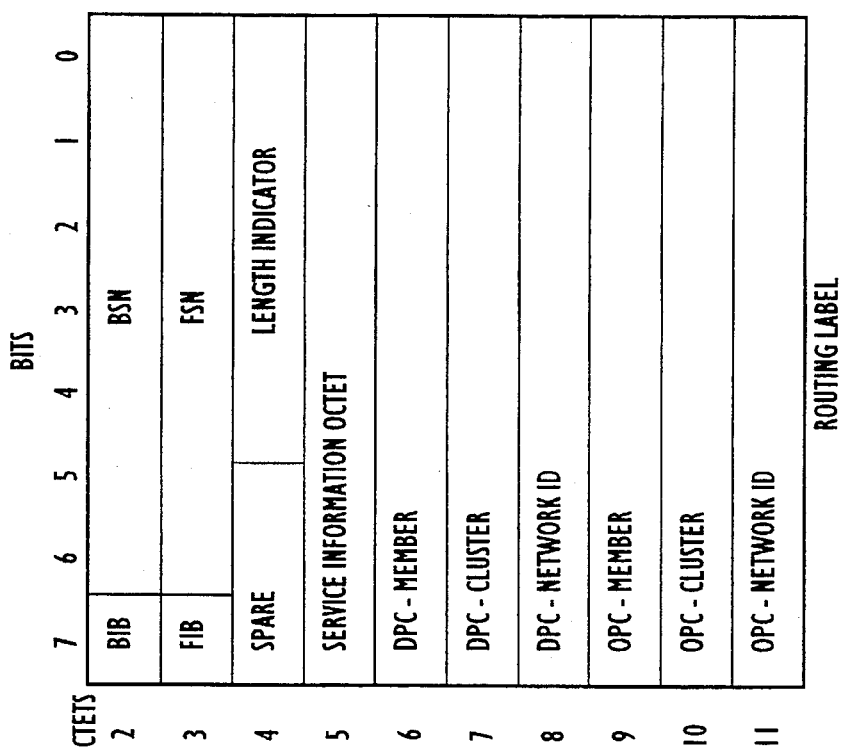
FIGS. 2 and 3 illustrate in graphic and tabular form respectively the protocol of an SS7 data signal.
Figure 2:
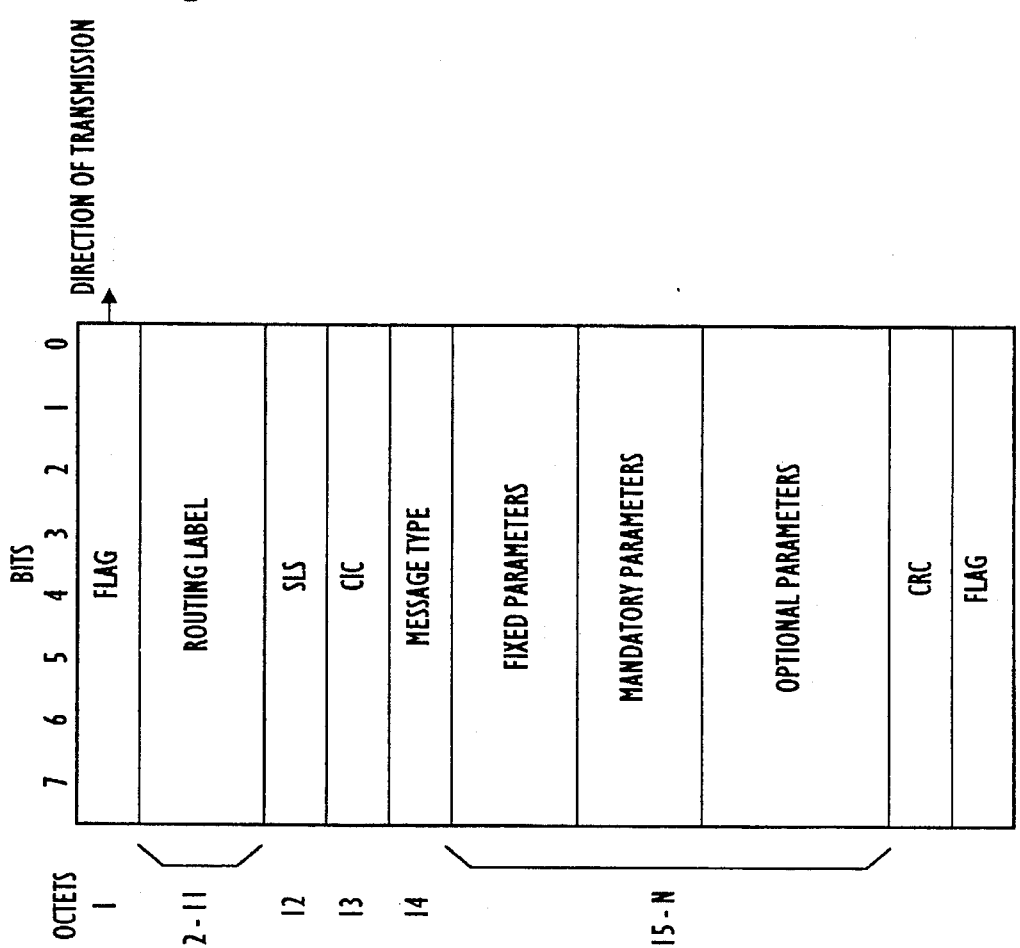

Referring to FIGS. 2 and 3, the start of a message is indicated at 72 with the commencement of the flag 74. The first 7 bits following the flag constitute the Backward Sequence Number (BSN). The eighth bit is the backward indicator bit which is used to track whether messages have been received correctly. The backward sequence number was the forward sequence of the other node's message when it was sent. Referring to FIG. 1, if EO2 sends a message to EO4, EO2s include a Forward Sequence Number (FSN) in the 3rd octet of its message. Upon receiving this message, EO4 will include a Backward Sequence Number (BSN) equal to the FSN sent in the previous message in its next message to EO2. This indicated to EO2 that EO4 received the first message. This constitutes a positive acknowledgment of receipt of a message. If the eighth bit of the second octet or Backward Indicator Bit (BIB) is inverted, it indicates a failure to receive the identified message. If the 8th bit in the 2nd octet, Backward Indicator Bit (BIB), is inverted, it tells the receiving node that the identified message was not received. The accompanying BSN represents the last message that was received. The receiving node will then invert its Forward Indicating Bit (FIB), 8th bit of the 3rd octet, acknowledging a retransmission remission request, and will begin to send the missing messages until the transmitting end successfully acknowledges all remaining messages, i.e.:

EO2 sends a message with a FSN of 5 to EO4;

EO4 transmits a message back to EO2 with an inverted BIB and a BSN of 2, indicating that was the last message it received;

EO2 then inverts its FIB and retransmits message 3;

If EO4 acknowledges this message correctly (BSN of 3) EO2 will retransmit message 4 and then 5.

Thus between the BIB and FIB and BSN and FSN, the STP keeps track of all of the messages sent between the two nodes at each end of a link. This provides predictability. If a node fails to receive an acknowledgment within a predetermined period of time it will take the link out of service because it is receiving no acknowledgments. This is usually a short period of time such as 1.6 seconds.

Every 8 bits represents another part of the message until the end of the message. At about the fourth octet there is a length indicator to indicate the length of the message. In this case the message is bad in that it indicates six which is not a complete message. Assuming a complete message where the length indicator indicates 23 octets, this provides another means for error detection. Thus if the recipient counts to 28 this indicates that something is wrong and the message is sent again.

Octet 5 is the Service Information Octet (SIO). This indicates whether it is a Fill In Signal Unit (FISU), Link Service Signaling Unit (LSSU) or Message Signaling Unit (MSU). MSUs are the only ones used for setting up calls or 800, LSSUs are used for alignment, and FISUs are fill in signals. Thus an LSSU is seen only if the link is out of service and going back into service or going out of service.

Octets 6–11 contain the point codes. Thus the point code 235-81-8198 is the point code which would be read in FIG. 3. This is backwards as it comes from the message which arrives number, cluster, network ID in the order of bits received. That constitutes the routing label telling the STP and the nodes where the message came from and where it is going. Other parameters are involved depending upon the kind of message. If this were a FISU, that would be it. There would be 16 other bits that have Cyclic Redundancy Codes (CRCs) in them and another flag which would constitute the end. CRCs constitute a further error detection code which is a legal 1 function in the protocol. From the foregoing it will be seen that the messages contain various fields.

Figures 1, 8:
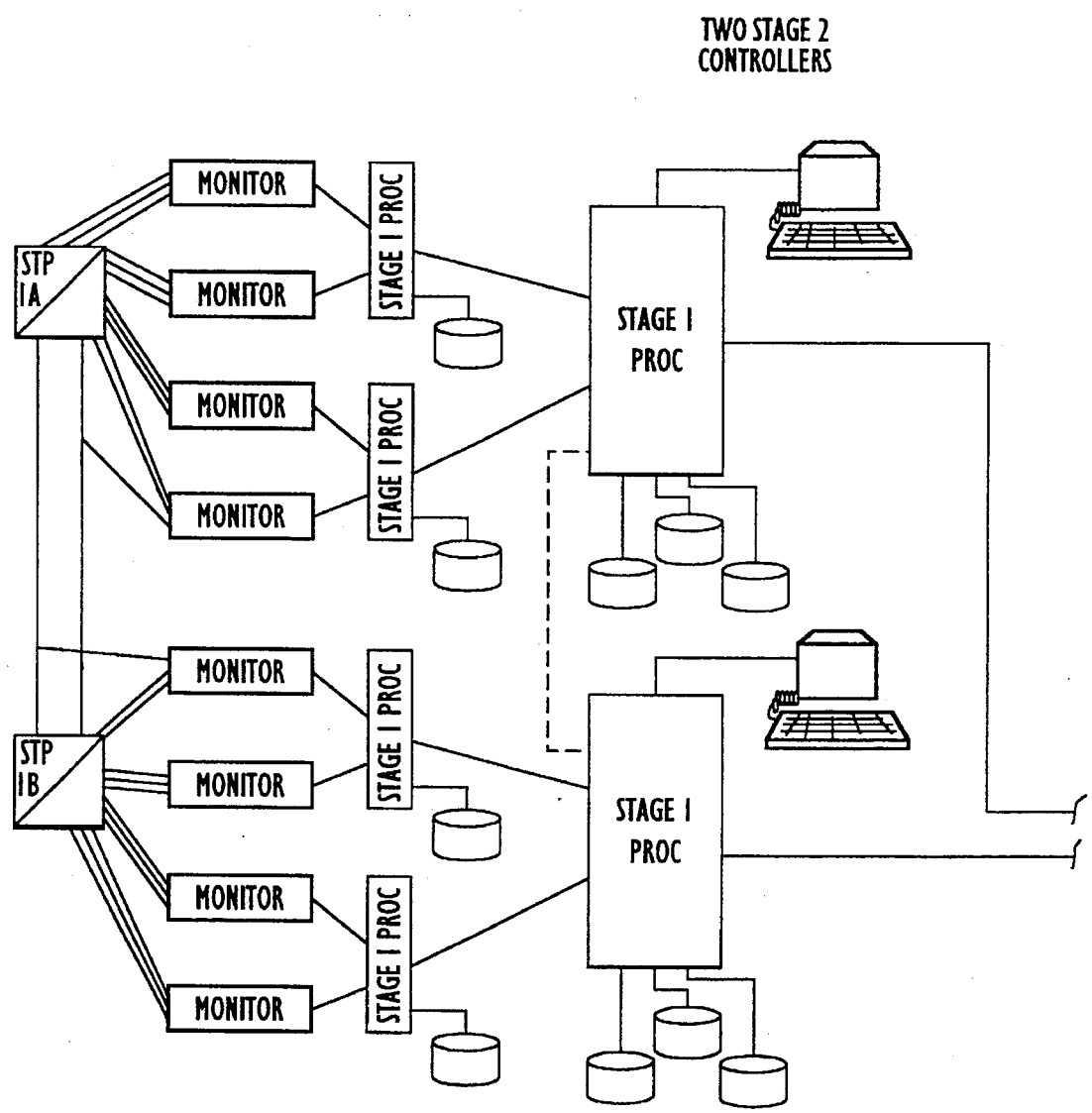
FIGS. 7 and 8 show further detail of the system of the invention on a regional network basis.
Figures 2, 8:
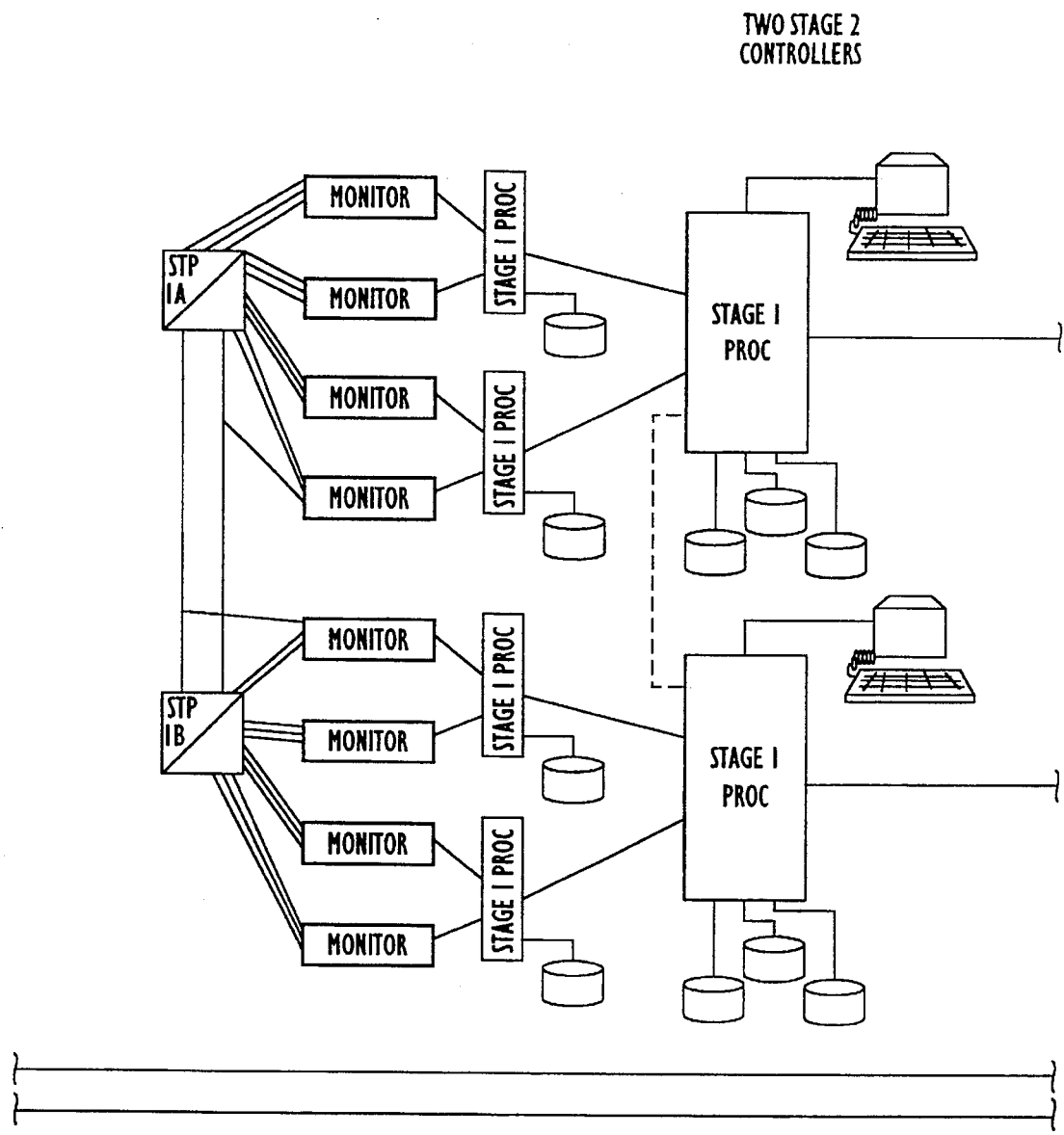
Figures 3, 8:
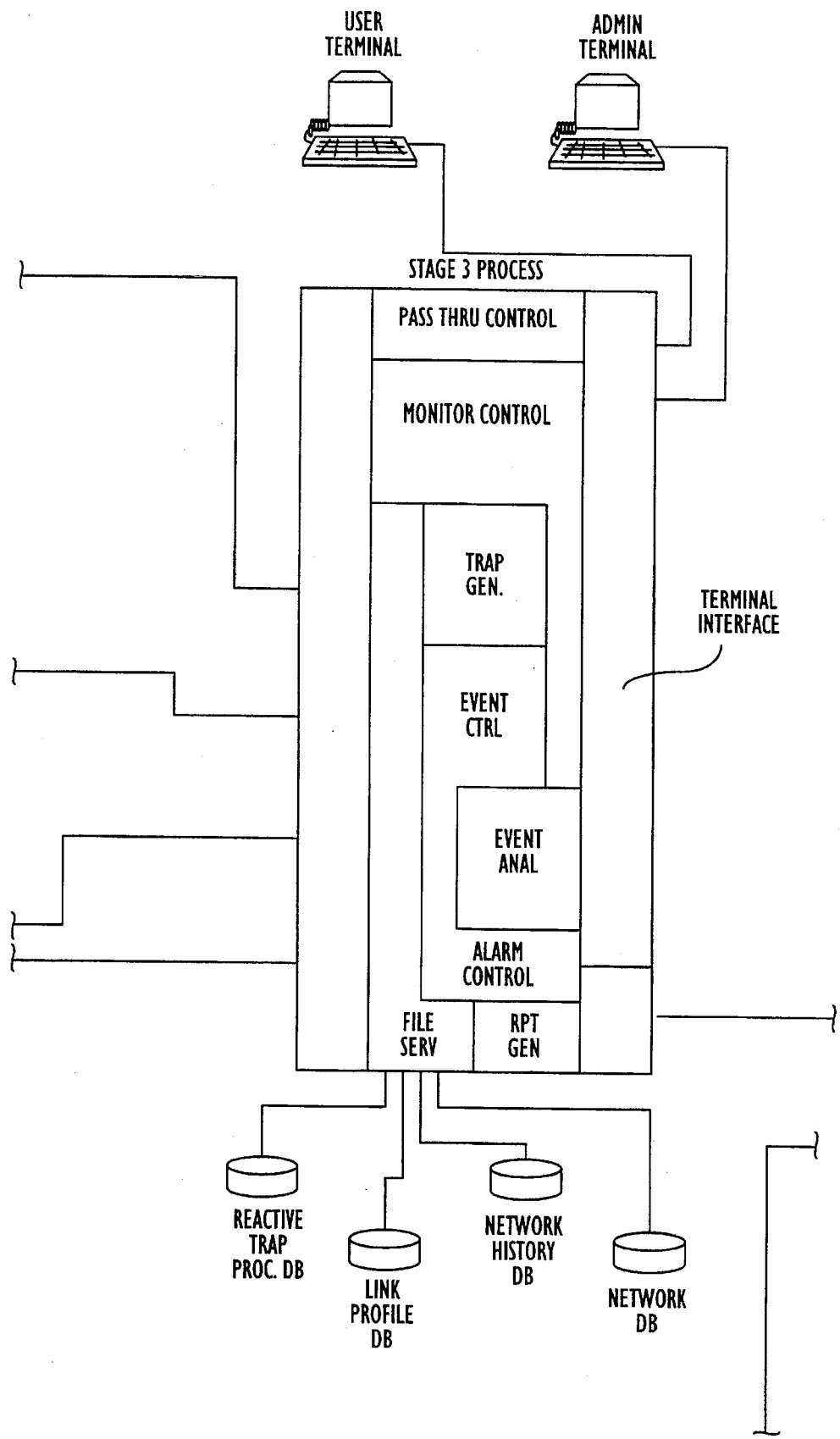
Figures 4, 8:
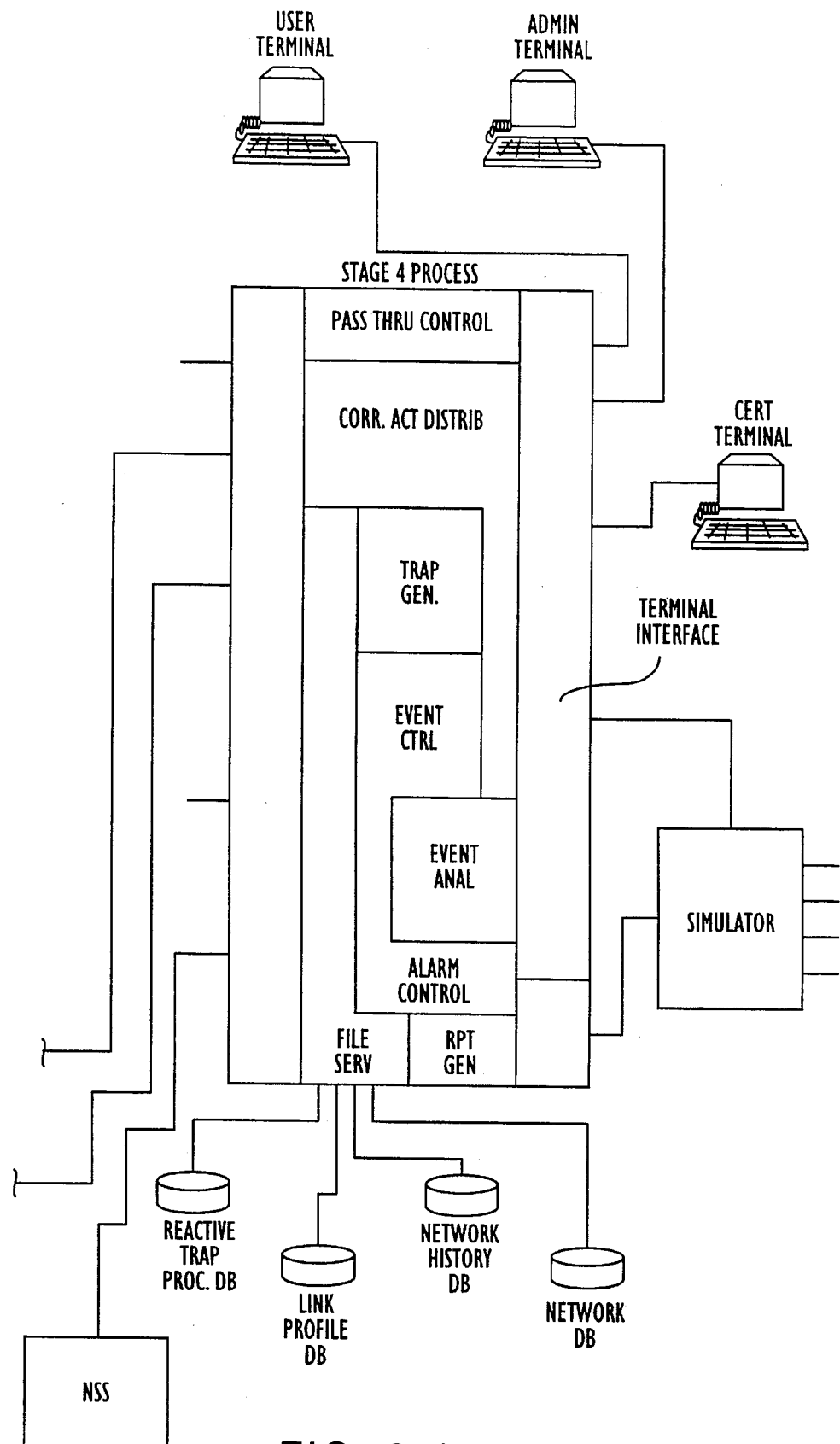
FIGS. 4 and 5 provide an illustrative breakdown of an IAM.
Figures 5, 8:
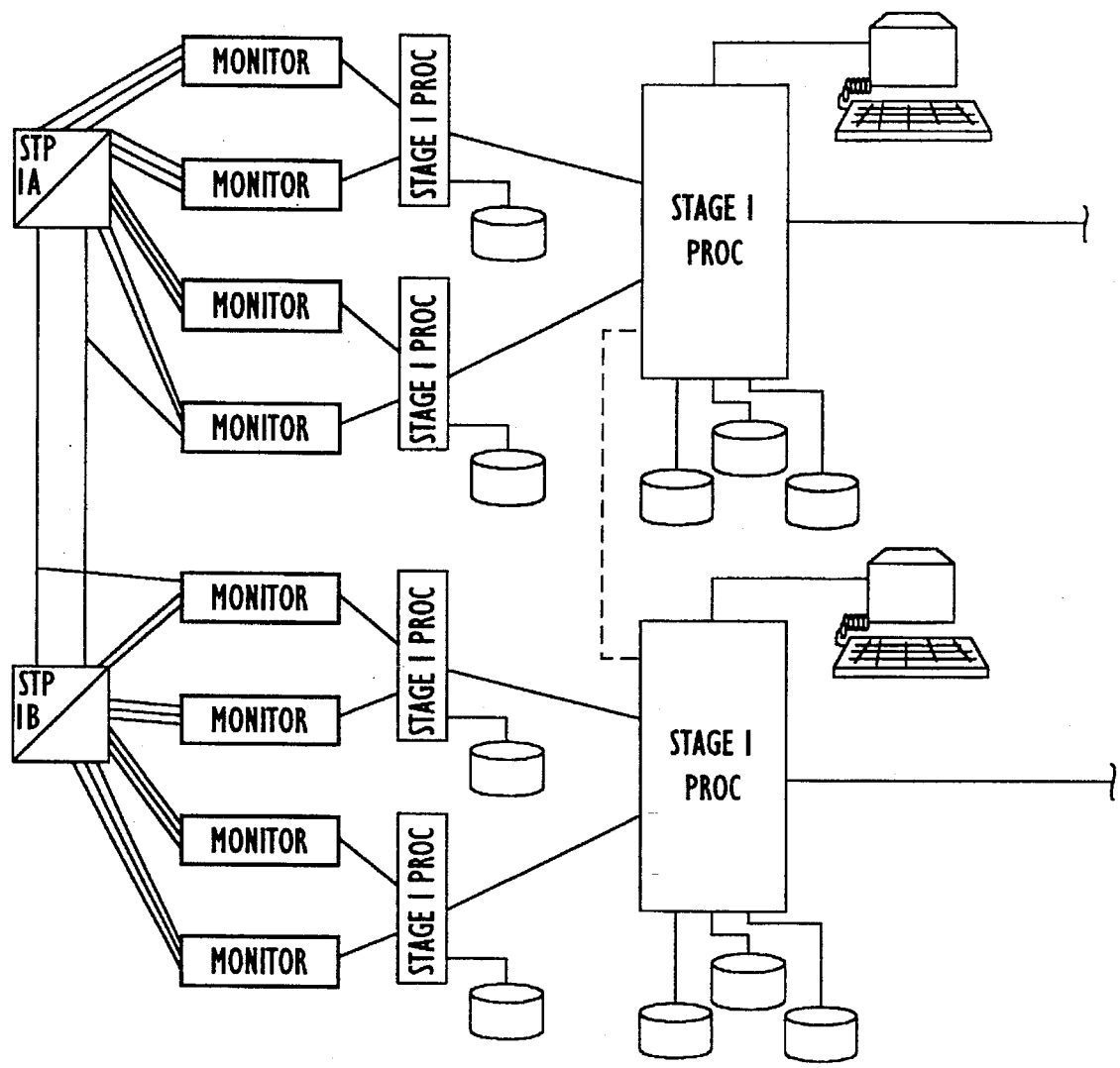
Figures 6, 8:
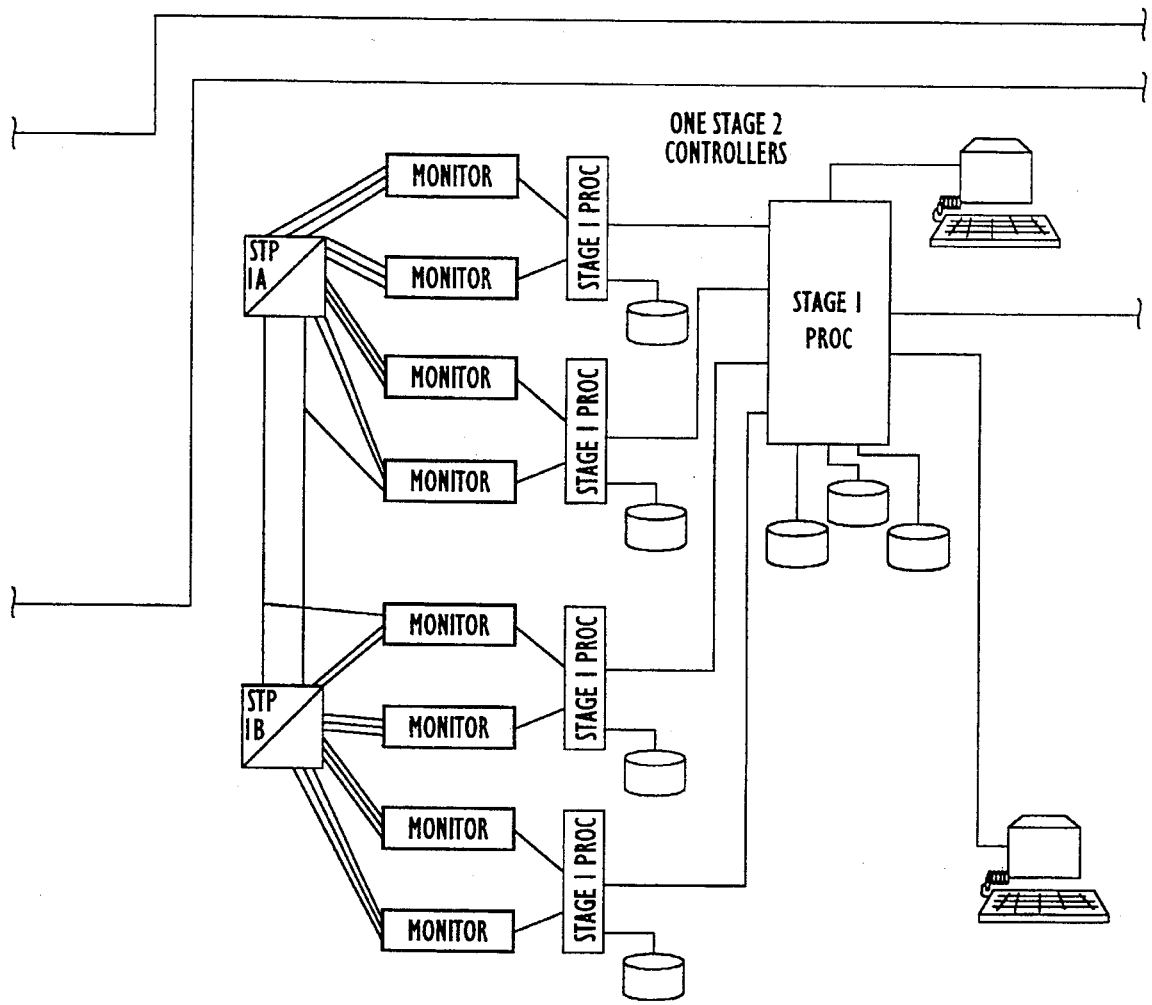

This describes the basic format of an SS7 message which is the same for all messages. FIGS. 4 and 5 provide an illustrative breakdown of an IAM. FIG. 4 indicates the various fields that may exist, such as nature of connection, forward indicators, calling party category, etc. Following this are variable parameters such as pointers to another part of the message where other data is located.

According to the present invention relatively low cost monitors are provided in all or substantially all SS7 network links. The monitors are custom controllable from remote stations to set traps which are customized to cope with widely varying system conditions on a real time basis. According to the invention the monitors are programmed to trap selectable fields and/or field contents on a real time basis to permit extremely rapid response to developing system malfunctions of a virtually unlimited variety. It is a feature of the invention that the system and method are applicable to not only a localized or regional communications network but also to monitor and control a virtually unlimited interconnection of such networks. The application of the system of the invention to a telecommunications network on a Bell Operating Company Regional scale is diagrammatically illustrated in FIG. 6 and in more detailed functional form in FIGS. 12A and 12B.

Figure 6:
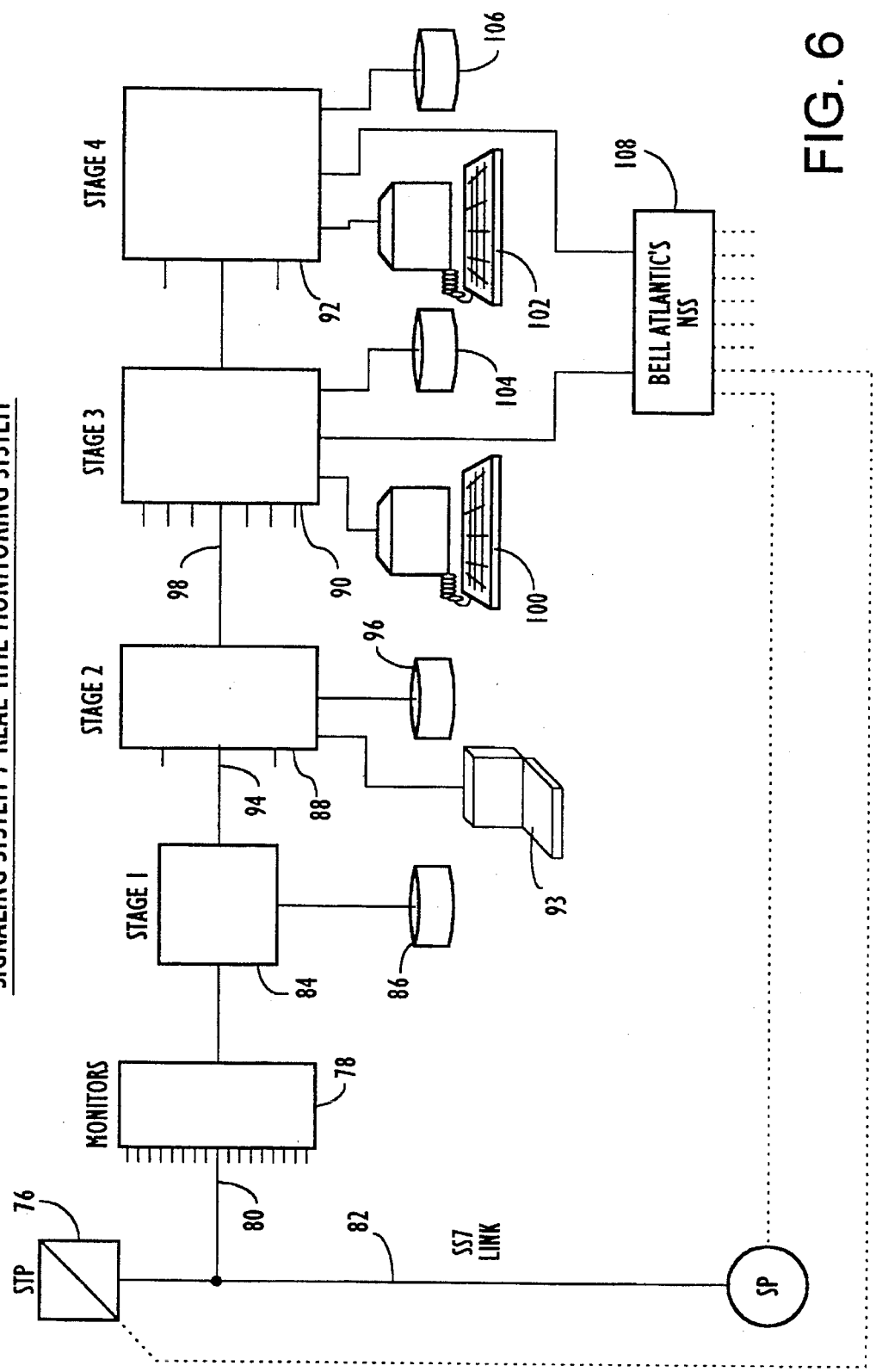
FIG. 6 shows a diagrammatic illustration of an application of the system of the invention to a telecommunications network on a regional public telephone operational scale.

Referring to FIG. 6 each STP 76 is provided with a series of monitors 78 with one monitor bridged on to each STP link, each monitor having receive and transmit ports. The monitors 78 are illustrated with only a single connection 80 to SS7 link 82 but it will be understood that a monitor is provided in each link. Assuming 32 links, these monitors may comprise a monitor circuit card physically mounted at a Stage 1 housing 84 that holds all monitor cards and includes a 386 or the like type controller and memory or storage 86 that keeps track of all 32 monitors and handles any messages. The controller also tracks every message coming from a monitor to successive Stages 2, 3 and 4 illustrated at 88, 90 and 92, presently to be described.

The Stage 1 controller and its monitors 78 may be regarded as an interface with the SS7 network. This equipment may be conveniently mounted at or adjacent to the STP with which the monitors are associated. While only a single Stage 1 has been illustrated, many such Stage 1s may be associated with any given STP. According to the invention each STP is provided with a minimum of four Stage 1s so that a paired set of STPs would include two sets of four or eight Stage 1s. Another function performed by the Stage 1 is recording all of the data that the monitors have received. The non-FISU data is thus stored in the memory 86, which may comprise one or more disks, where the information is stored temporarily, i.e., such as a 20 minute accumulation of messages. All of the data that came over all 32 links is on that disk. Thus if there was a trapped trigger and it was desirable to determine the cause, it would be possible to ascertain whether all of the messages were there, including in other links wherein a trap had not been set. All non-FISU messages would be recorded to permit analyzation following the trigger.

Turning to Stage 2, an STP pair may be regarded as a network with another STP pair constituting another network. The STP pairs are typically within the LATA. STP pairs can be connected to each other to handle traffic in an operating Local Exchange Carrier (LEC) company only via an interexchange carrier (IC). According to the invention, Stage 2 handles the STP pair and monitors its functioning. Where Stage 1 is monitoring primarily 32 links individually and the multiple Stage 1s are looking at other sets of 32, one or more Stage 2s put all of these together in the form of an STP pair to monitor what is occurring within the STP pair itself rather than the individual links.

Stage 2 may be physically located at another site connected by a LAN such as an ethernet or 56 KB dedicated circuit 94. Alternatively, stage 2 may be located at the site of one of the STPs in the pair. Stage 2 includes its own controller and storage 92 and is provided with an optional input terminal 93. Stage 1 is responsive to the individual links in the single STP with which it is associated. Stage 2 is responsive to threshold exceeded, reactive and response MSU signals that are generating a response to the appearance of the STP pair. It does this by monitoring the threshold exceeded, reactive and response MSUs alarm messages that are being sent from the monitors. Looking at the one sent from the one STP and looking at one sent from the other STP, and comparing them, Stage 2 may determine that a TFP was sent down its STP on one of the links that is going to an IC. This could be a problem for Stage 2, particularly if the IC contained 400–500 trunks and the TFP occurred during busy hours. The detection of such a condition at Stage 2 would indicate a desirability to check traffic and both end offices to avoid a network overload because the messages cannot get out and are backing up in the STP.

As another example, if two links were lost and there were still alternate routes available the network is not out of service as far as the STP pair is concerned. The network is intact and still working but has a problem, although not a major problem. This type decision may be made at Stage 2 and passed on to Stage 3. Thus Stage 2 acts as a screen for troubles from the individual STP pairs.

Stage 2 is connected to Stage 3 via a LAN or 56 KB dedicated circuit 98. At Stage 3 the alarms that are being generated by Stage 2 are presented to the user in the order of their importance. Major alarms obviously supercede minor alarms or alerts. Stage 3 or Stage 2 before it may generate corrective action instructions to remedy the problem according to a predetermined script programmed into the controllers. Alternatively a script may be manually supplied via the terminals 93 and 100. Either stage may also initiate traps responsive to the trouble to confirm the success of remedial action. Such confirmance of a successful remedy is an important feature of the invention because SS7 protocol is quite forgiving. Thus in ordinary circumstances the network could appear to be operating satisfactorily when, in fact, a serious breakdown was building. Using the system of the invention it is possible to prepare a script for the monitors to set traps or threshold levels designed to confirm proper operation in specific individual or multiple links. Stage 3 assists in performing this function.

Figures 7, 8:
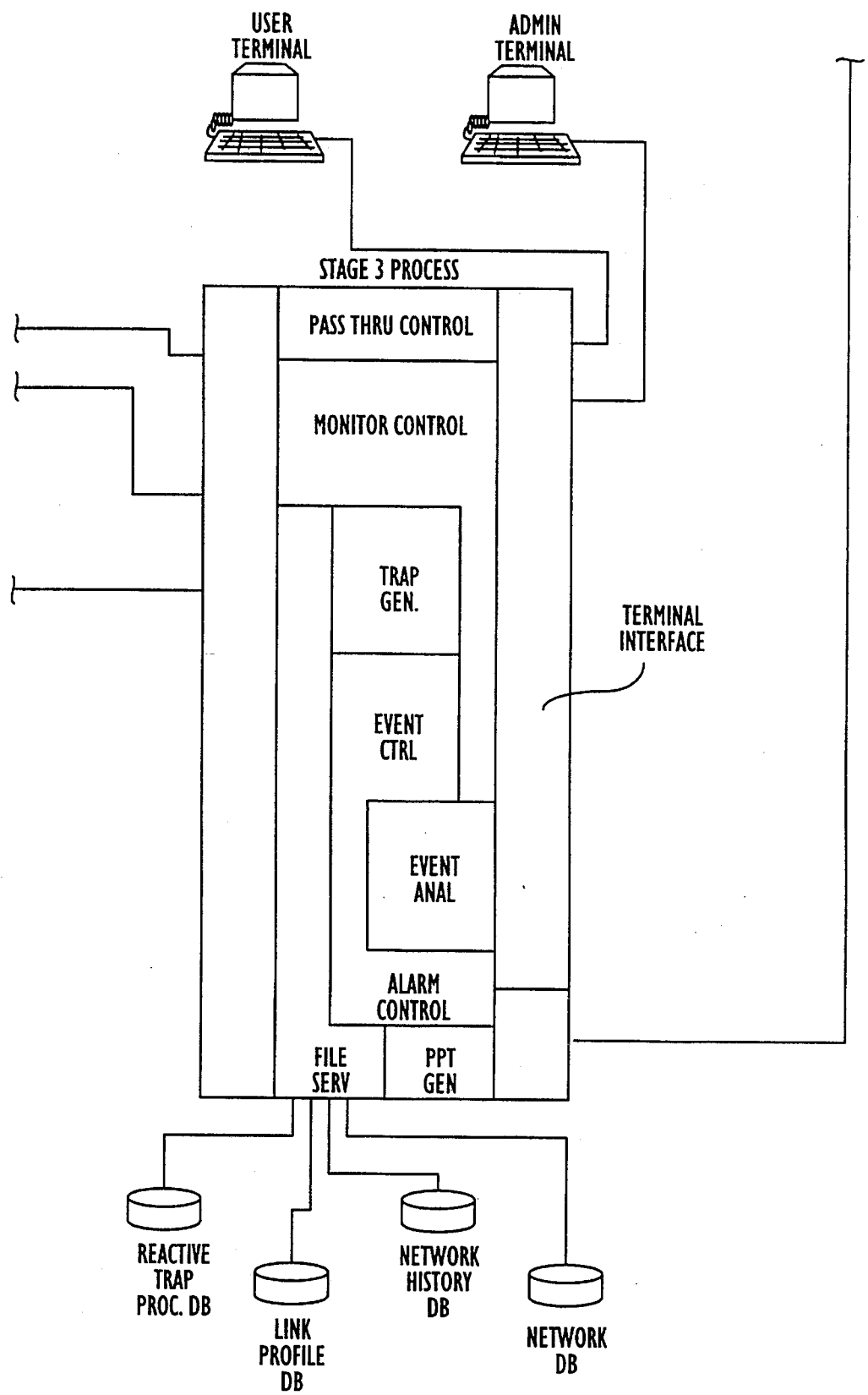

Stage 4 in essence is an additional Stage 3 with a view of the entire region. By way of example, in the Bell Atlantic Region, Stage 3s may be Bell of Pennsylvania, New Jersey Bell, C&P of Maryland and Virginia, etc. Such a deployment is illustrated in FIGS. 7 and 8. Each company controls its own network but Stage 4 provides regional focus because a problem occurring in Pennsylvania may ultimately affect one in Virginia, particularly on an inter-connect basis, because it may be coming through an IC down to Virginia and be on its way there. Migrating failures can occur in that manner. At any time that Stage 3 identifies a major problem it sends a message to Stage 4. Stage 4 then looks up the problem and surveys all of the other networks to determine whether or not there is a similar configuration within all of Bell Atlantic like this one. If such a problem is found, Stage 4 alerts the Stage 3 controller to the happening. Stage 4 simultaneously advises Stage 3 as to what it is doing to remedy the problem and advises Stage 3 as to setting suggested traps and/or manual monitoring of specified links. This alerts Stage 3 to a problem which may be migrating in its direction and yet be undetected at Stage 3. Thus Stage 4 keeps track of the whole regional network from a technical support standpoint. Control is supplied through Stage 3 but Stage 4 performs a technical assistance group function and constitutes a regional vehicle of the network. The traps are set from Stages 3 and 4 back through Stages 2 and 1 to the monitors.

From the foregoing it will be appreciated that the monitor system provides a hierarchial system of attacking an SS7 problem. It first looks at each link individually to detect a link problem. Then via Stage 1 it monitors all of the messages from all of the monitors which makes it possible to determine whether or not a large number of alarms from most or all 32 monitors occurred within a short period of time. In such a situation the problem may not be predicated on the nature of the particular alarm but in the fact that there are so many such alarms in a short time period. This may constitute a major event indicating that all links went out of service at the same time for some reason. Stage 2 would then detect this condition and issue an immediate major event alarm to Stage 3. The alarm condition would proceed immediately from the monitors through Stages 1 and 2 to Stage 3. Stage 3 would put the facts together and conclude that the system had lost an entire STP. Stage 3 reacts by allowing all of the storage of the link data to maximize itself, i.e., dump anything else on the disk drive in Stage 1 and commence saving as much data as possible to analyze the trouble later because it has progressed beyond the point of preventing. The problem now is to get the STP back. Following remedying the problem, Stages 3 and 2 then interact to verify that the system is back before a potential major event occurs. Stages 3 and 4 are essentially identical and include computers 100 and 102 and storage devices 104 and 106. The computers 100 and 102 are provided with input keyboards and monitors to permit operators to manually set traps and thresholds and control the system from these positions.

The monitors may physically constitute a back plane capable of handling multiple cards. The monitor cards themselves include multiple monitors such as four monitors per card. While the communication between Stage 1 and Stage 2 has been described as constituting an ethernet or dedicated circuit, it may be most convenient to have Stage 1 and the monitors and Stage 2 at the STP site. In that instance there may still be an ethernet or dedicated circuit between Stage 1 and Stage 2.

Stage 3 and Stage 4 are connected to the NSS system 108 by links 110 and 112 which may comprise any suitable links such as 9.6 private lines or switched lines. The speed may be as high as 56 KB but need not be that fast. On the other hand the speed of connection between the stages themselves is desirably high to permit live protocol analysis in Stage 3. Thus it is necessary that live data be transmittable from the monitors to Stage 3. While the transmittal of a large amount of such data is not anticipated it is desirable that limited amounts be subject to transmission. In addition, the occurrence of a major event would create a large amount of traffic of messages back and forth between the stages which must be within the capacity of the links. The system is designed to handle a major event. In everyday operation the system will have no output other than user defined data, the system of the invention being designed to trigger on the occurrence of abnormalities and to identify trouble before it becomes serious trouble to permit prompt remedial action.

Figure 9:
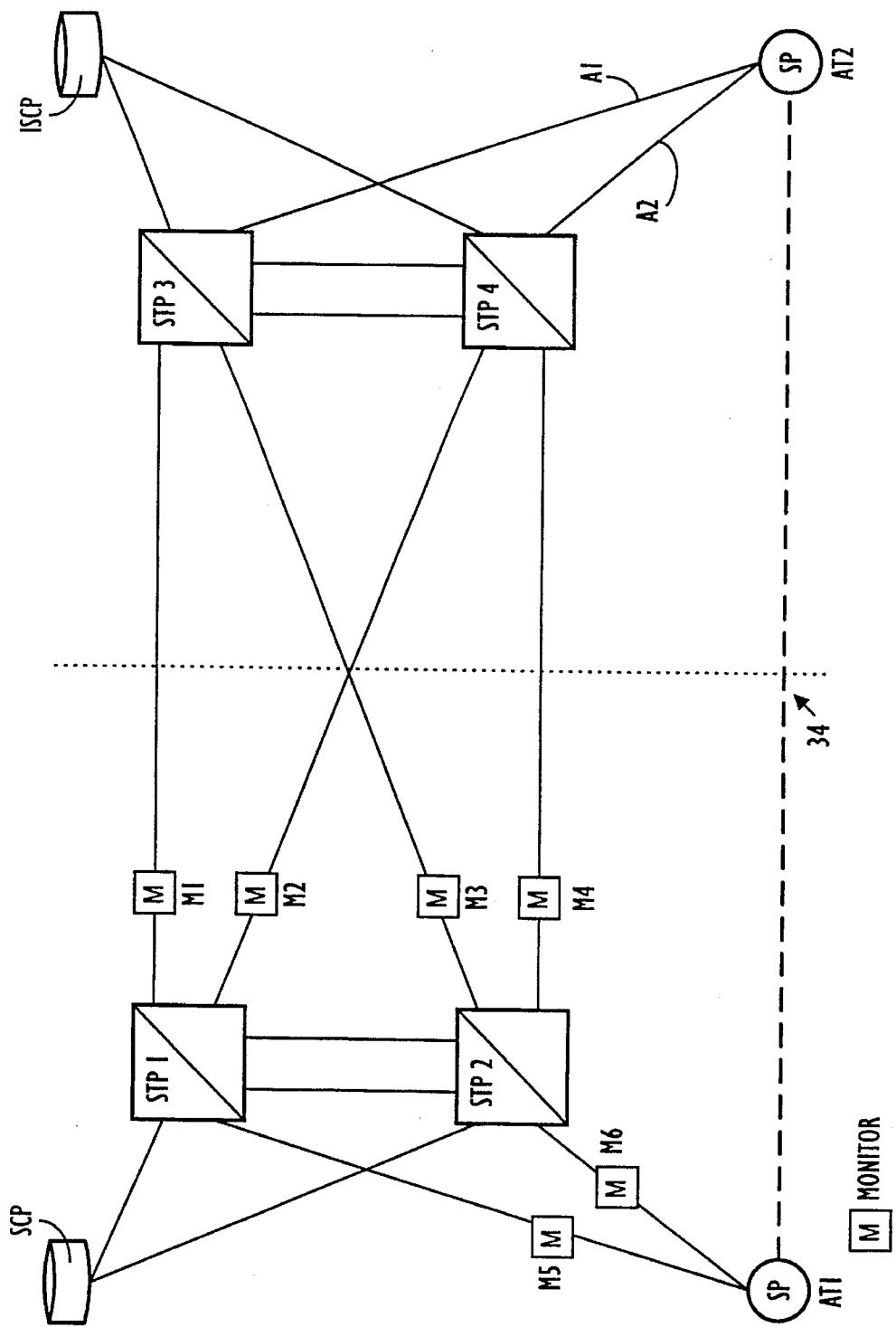
FIG. 9 shows the SS7 network of the prior art illustrated in FIG. 1 with the addition of monitors according to the invention.

Referring now to FIG. 9 a brief illustrative operation of the system is described. FIG. 8 constitutes a simplified version of the network illustrated and described in relation to FIG. 1. The SS7 protocol itself has network management functions. One of these is congestion control. The SPs AT1 and AT2 in FIG. 8 constitute access tandems similar to the SPs AT1 and AT2 in FIG. 1. STP1, STP2, STP3 and STP4 constitute STPs similar to those bearing the same legend in FIG. 1. The trunk connecting the tandems AT1 and AT2 is the same as trunk 34 in FIG. 1.

If one of the A links in FIG. 9, for example, the A1 link is in congestion at STP3 for any of a number of reasons, the IC tandem AT2 will be slow in responding so that messages are backing up. When STP3 determines that link is in some type of congestion, it will send Transfer Congestion Control (TFC) messages to all affected nodes, in this case AT1. The TFC message will have a destination point code of AT1 will have an originating point code of STP3. It will also contain an effective point code of the congested node of the IC tandem and a congestion status equal to 3, which is the highest congestion that can occur. Congestion status 3 indicates that no message below priority 3 should be sent. Since priority 3 is the highest priority, only network management messages should be sent so that basically all call set-up traffic stops on the A1 link.

The A2 link from STP4 to the IC tandem AT2 is not congested. It can handle any traffic that it gets. However, based on the SS7 protocol AT1 assumes that AT2 is congested and no links to AT2 are available. This constitutes a serious situation because the access tandem will suddenly stop sending traffic to the inter-exchange carrier or IC despite the fact that there are multiple available routes to the IC, the access tandem reacts to the TFC to stop all traffic in that LATA to the IC. This situation is the action which occurs and persists in the present network without the benefit of the present invention.

AT1 sends the TCT message to test for the congestion status of AT2. If it reaches STP3, a TFC will be sent back to AT1 indicating the congestion status. If, however, the RTC reaches STP4, which is not experiencing congestion, the RCT will not be acknowledged by a TFC. AT1 assumes the congestion has been abated and will initiate transmittal of messages. If one of these new messages reaches STP3, a TFC will be generated, AT1 will stop sending traffic again and the previous procedure will repeat. This is despite the fact that if it were to go to STP2 and STP4 there would be no congestion. The effect is that as soon as you get the TFC message all traffic to the IC AT2 has been stopped.

Turning now to the handling of the situation using the system of the present invention, reference is still directed to FIG. 9. Monitors M1–4 on the B and D links between STP1, 2 and STP3, 4, and monitors M5 and M6 on the A links from the access tandem AT1 to STP1 and STP2 would have detected this TFC. The monitors are so constructed that every time a monitor sees a TFC it is designated a reactive MSU and a reactive MSU alarm including the TFC is sent to Stage 2. (See. FIG. 6). Stage 2 receives the TFC reactive MSU alarm via Stage 1 and decodes it. The system knows that it should see RCT messages coming out of the access tandem. It thus designates or sets RCT traps in the monitors M5 and M6 in the A links to the tandem AT1 so that every time an RCT is sent Stage 2 is aware of it. It looks to determine if the access tandem is responding to the TFC, i.e., did it stop sending traffic. It next generates an MSU trap looking for a destination point code equal to the affected point code of the TFC message, which in this case is the tandem AT2. That is also put on monitors M5 and M6. These monitors thus look for two things, namely, did the access tandem stop sending traffic to the affected point code, which is the IC tandem and, secondly, is it sending RCTs to check for the verification to see if the congestion has terminated. This is going to be set for the monitors in every link connected to STP1 and STP2. Stage 2 also monitors the duration of the congestion and determines if call setup traffic between AT1 and AT2 is being affected. If traffic is affected, Stage 2 will generate a Major Event Alarm to Stage 3 informing the user of the problem and recommending corrective action.

This function does not exist in the current network system. When that function is not performed it results in a major problem. Because traffic will be routed to STP3 it may cease functioning. Also, in the absence of sending RCTs the access tandem will not reinitiate traffic, causing an even larger problem. There is something wrong with the switch. Because it stopped sending traffic but did not send RCTs, STP3 may have ceased functioning. In the absence of an RCT response the congestion will not be eliminated nor will traffic be sent to the IC. Corrective action is necessary.

If RCTs are not sent a corrective action in this situation is to go to the access tandem, query the IC common block for that particular office, and ascertain why network management messages are not being transmitted. This would result in ascertaining the identity of the involved office, going to the NSS system to bring up that office and that mask where the problem could be identified and rectified. Upon rectification, RCTs would be generated and the system would then verify that it is in fact sending RCTs.

Alternatively, the problem may be rectified even sooner. TFCs that are only coming out on the two B and D links from STP3 is abnormal. If AT2 was in true congestion both A links would be congested. TFCs would go back out on all four links. The situation where only a single link is congested is an abnormality. When Stage 2 gets the two TFCs from STP3 and fails to get the other two from STP4, Stage 2 decides that it has a single link congestion. It knows that since an IC is involved that now all of the traffic is going to be stopped and create an oscillating traffic scenario. This is a serious situation because it generates more network management messages.

Figures 1, 10:
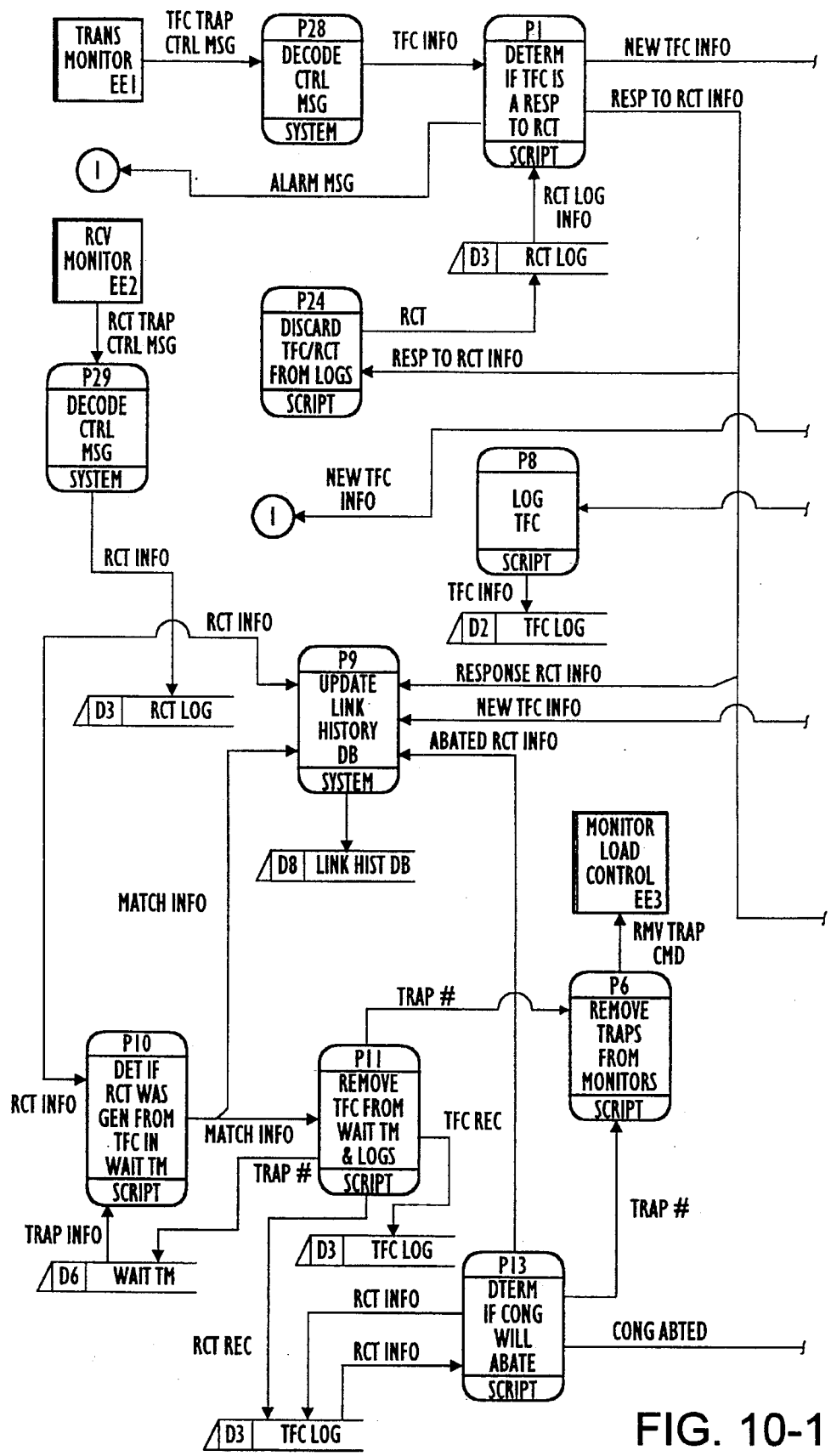
FIG. 10 illustrates in flow form a script for the reactive action provided in the case of congestion according to the invention.
Figures 2, 10:
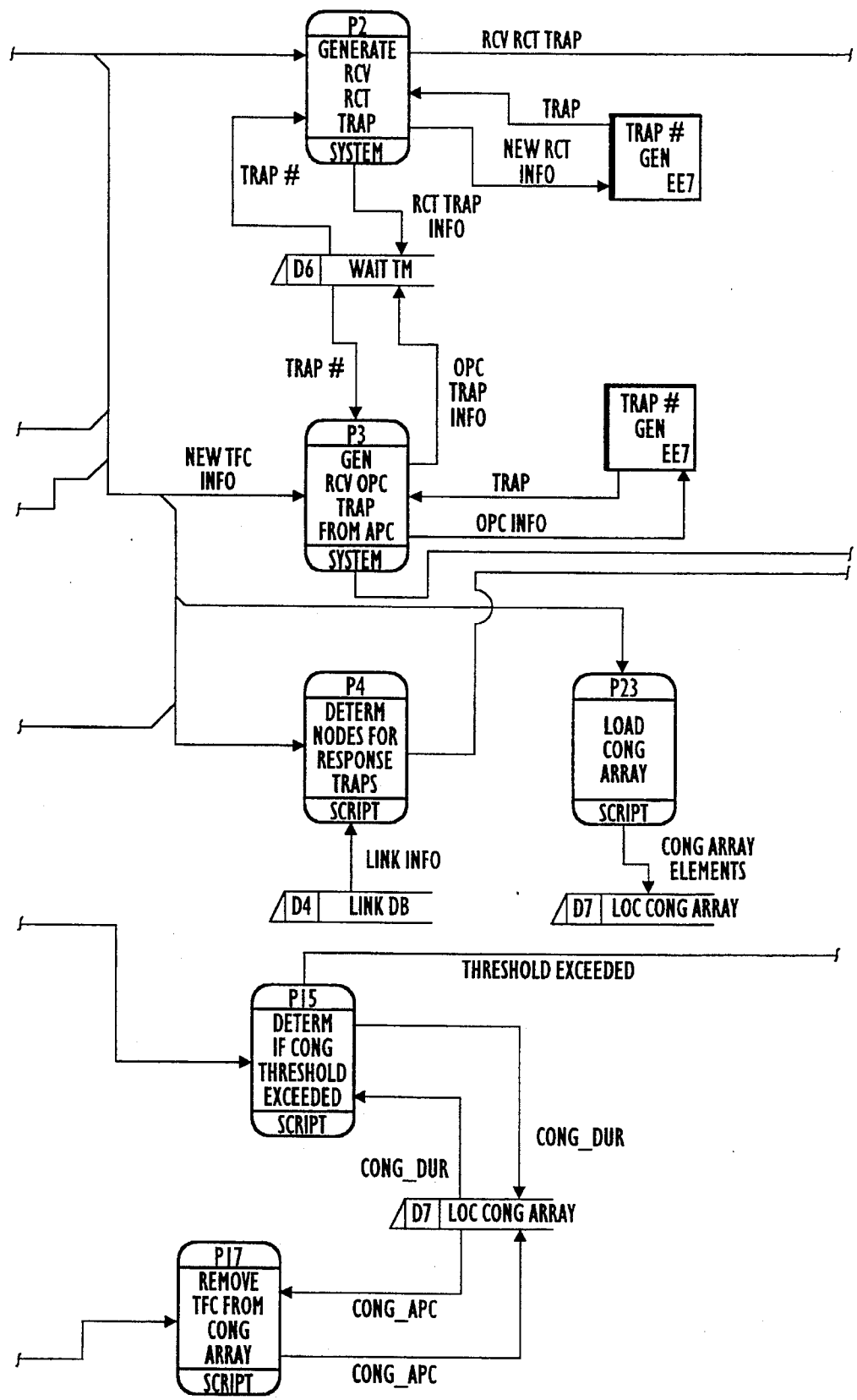
Figures 3, 10:
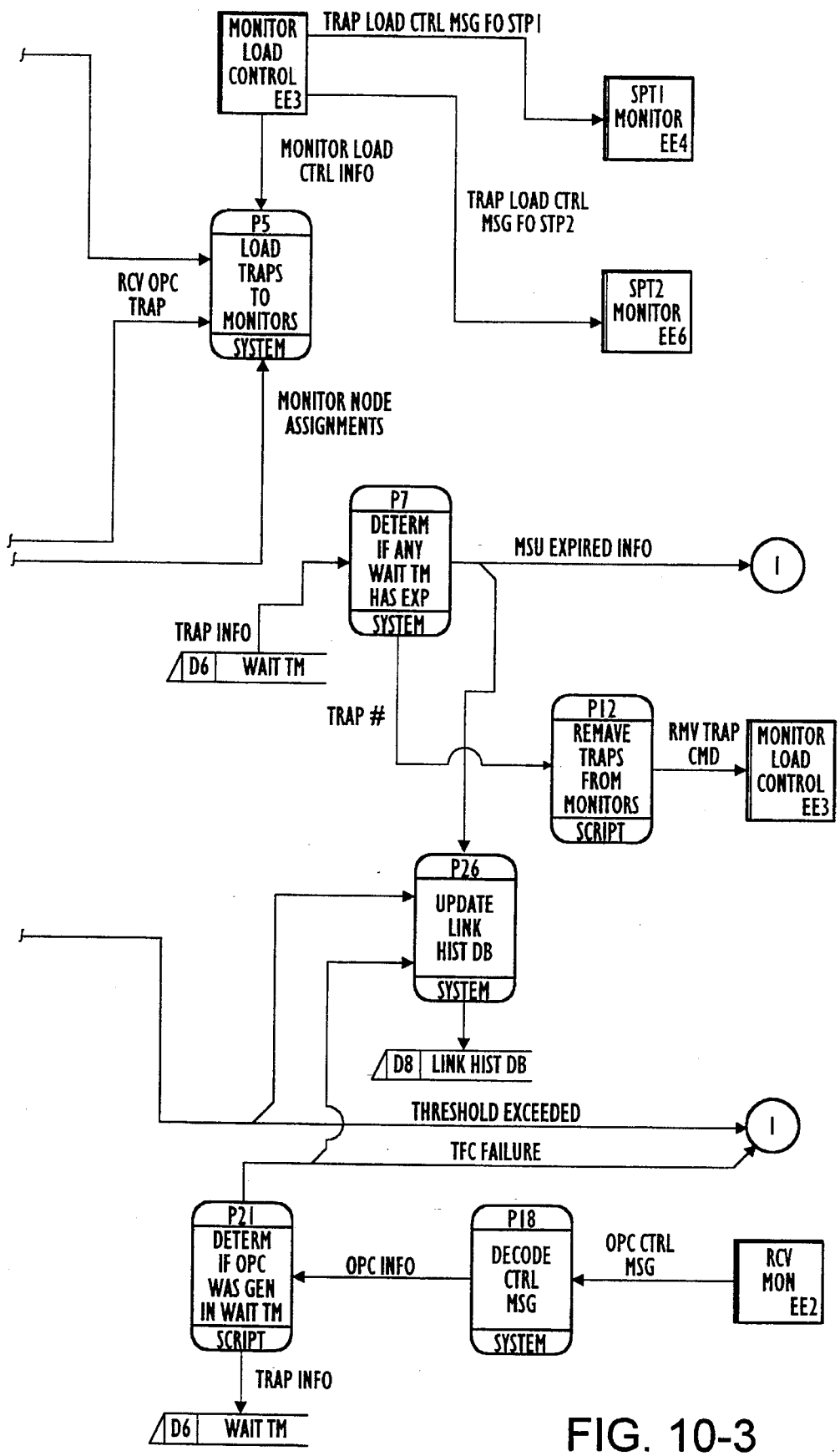
Figures 1, 11:
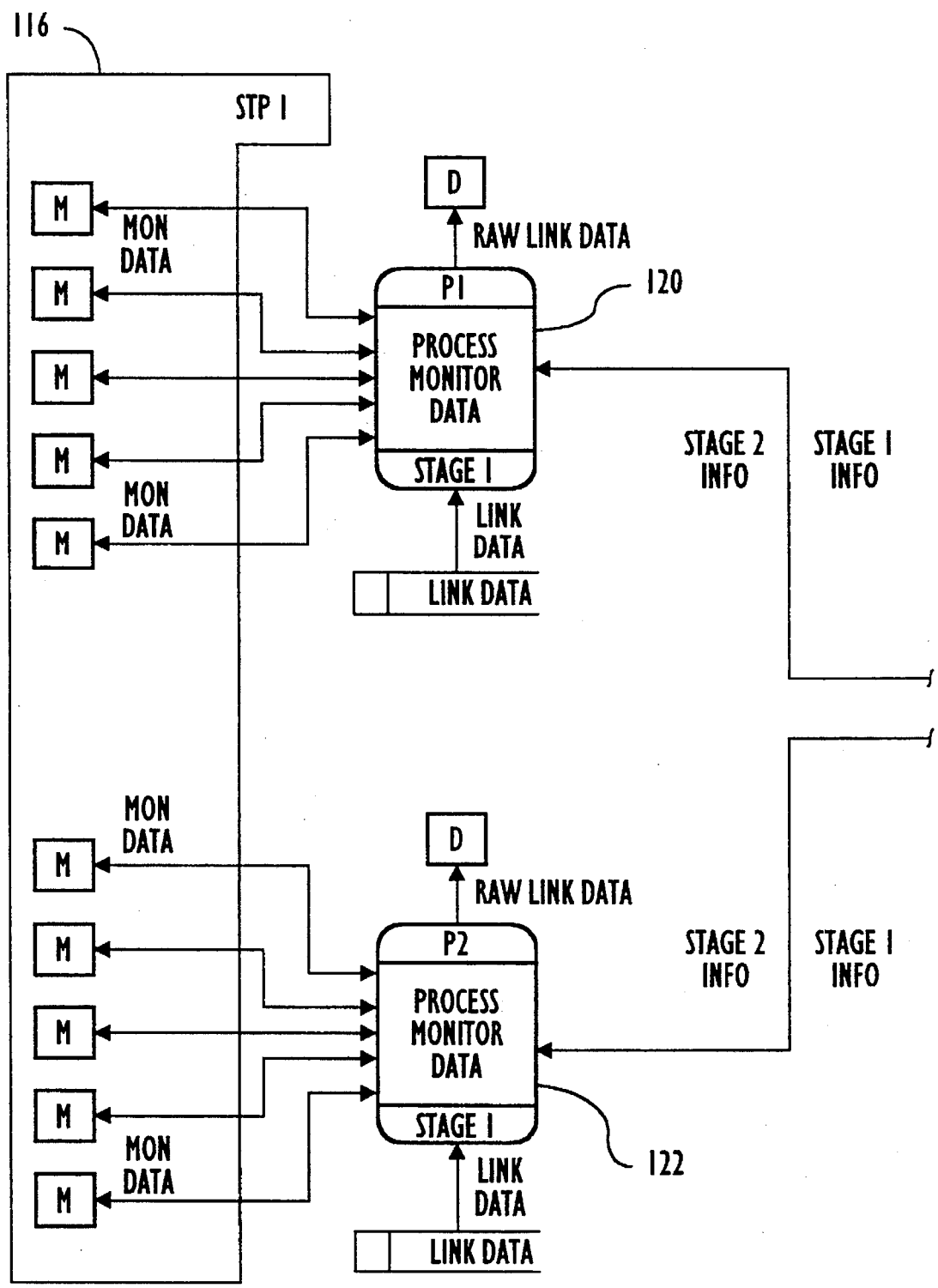
FIGS. 11 and 12A and 12B show a more detailed illustration of the four network stages previously described in connection with FIG. 6.
Figures 2, 11:
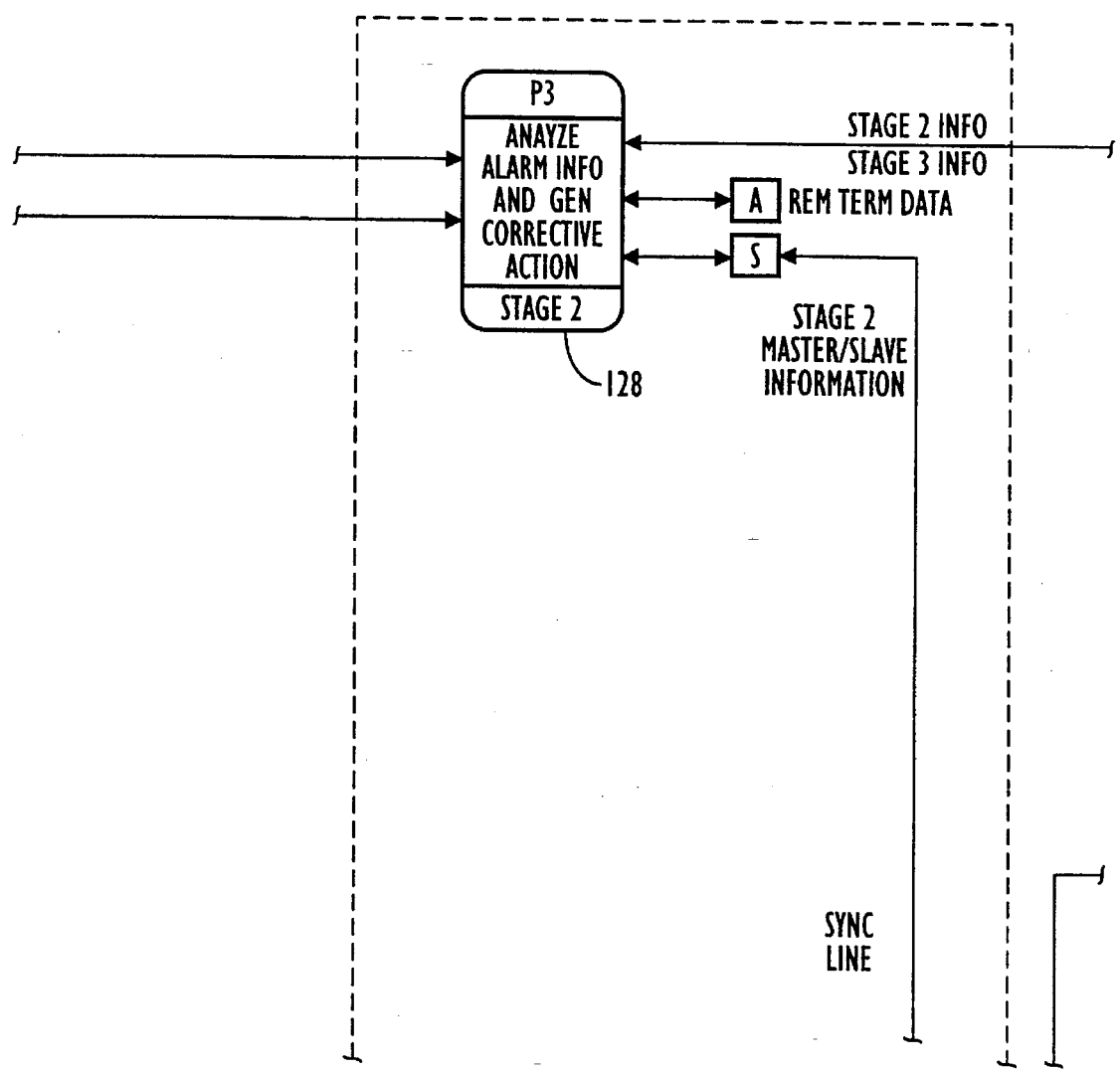
Figures 3, 11:
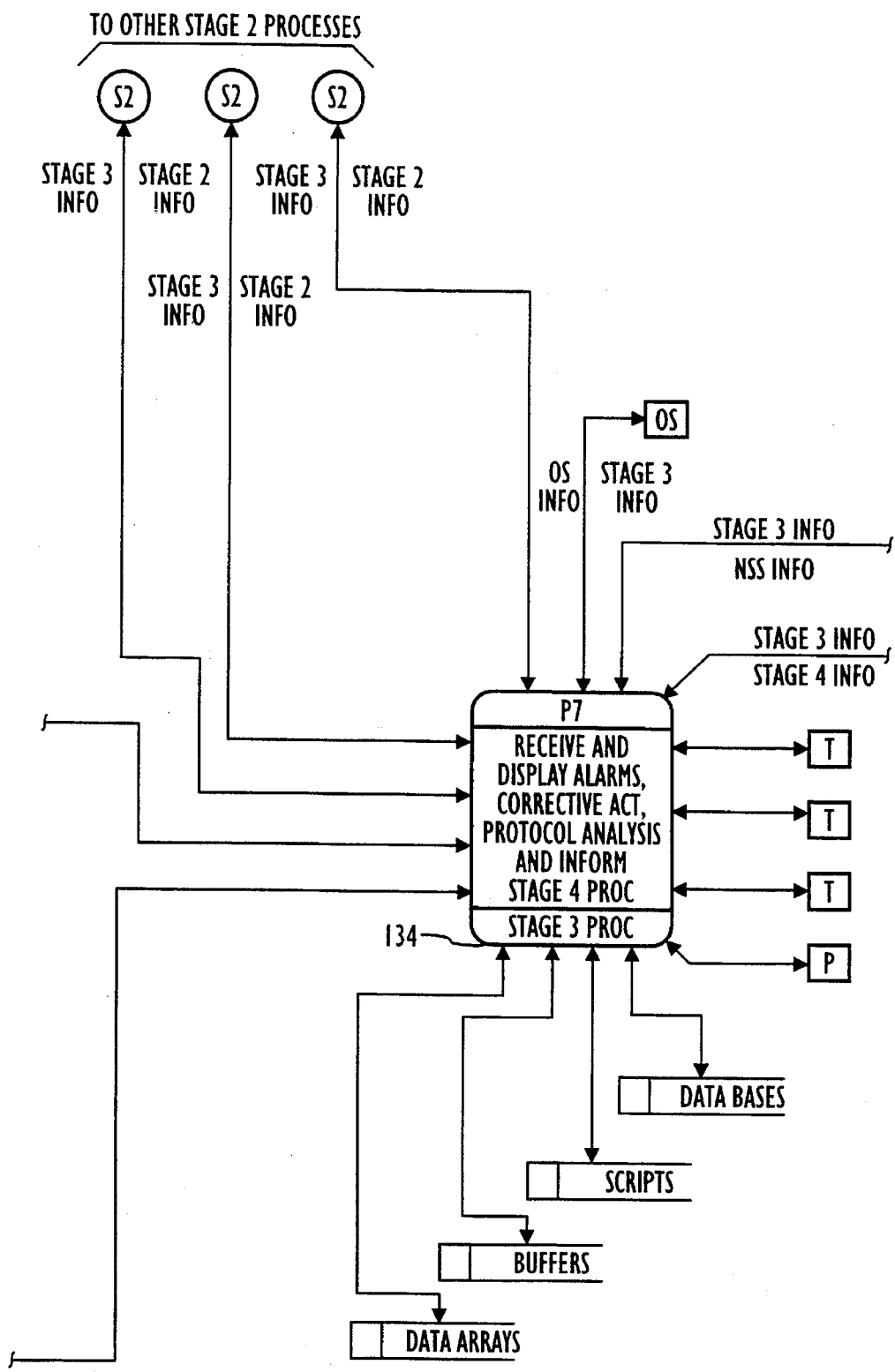
Figures 5, 11:
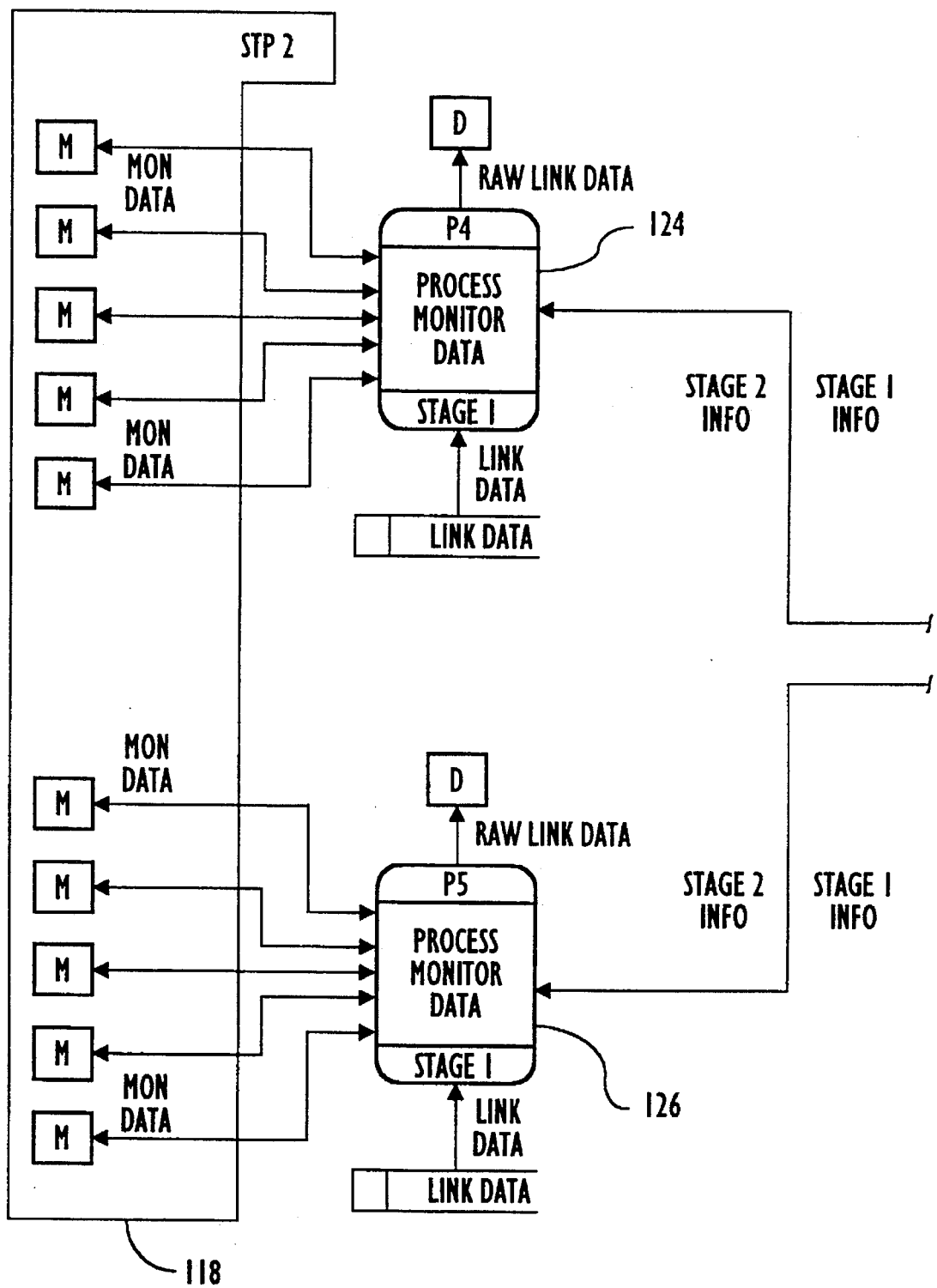
Figures 6, 11:
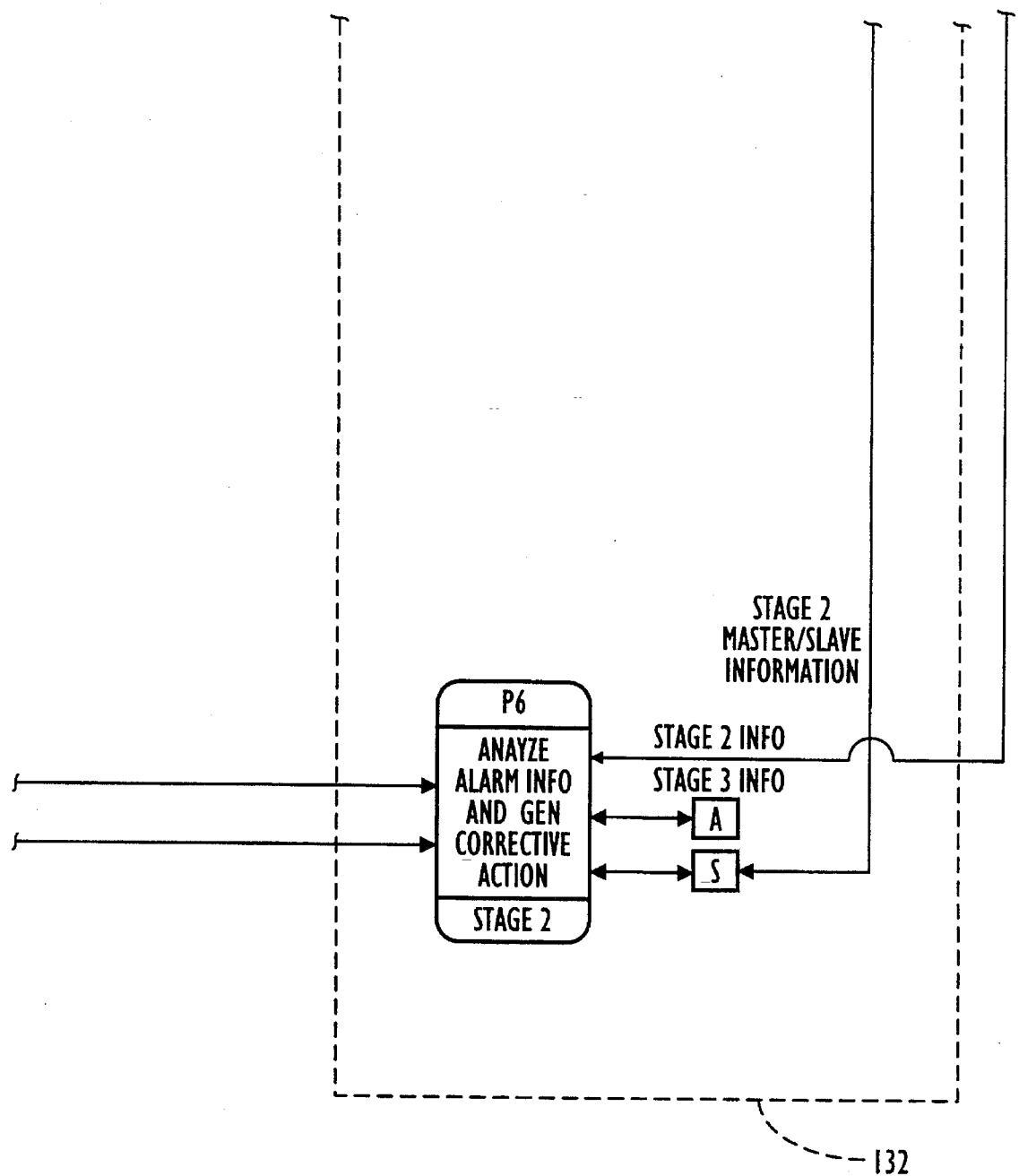

Under the circumstances, Stage 2 reacts to achieve the primary goal of re-establishing traffic between the access tandem and the IC tandem. It directs disabling of the link between STP1 and STP3 and disabling the link between STP2 and STP3 by taking them out of service. This forces traffic over STP4 to the good link. The customers are back in service until the problem in the congested A1 link is fixed. Thus an important feature of the invention is to not only determine what is happening in the network but also to prescribe reactive action. A script for the reactive action just described is set out in FIG. 10. FIG. 10 constitutes a self-explanatory data flow diagram of the script performed in Stage 2 under circumstances of the type just related.

Figures 1, 12A:
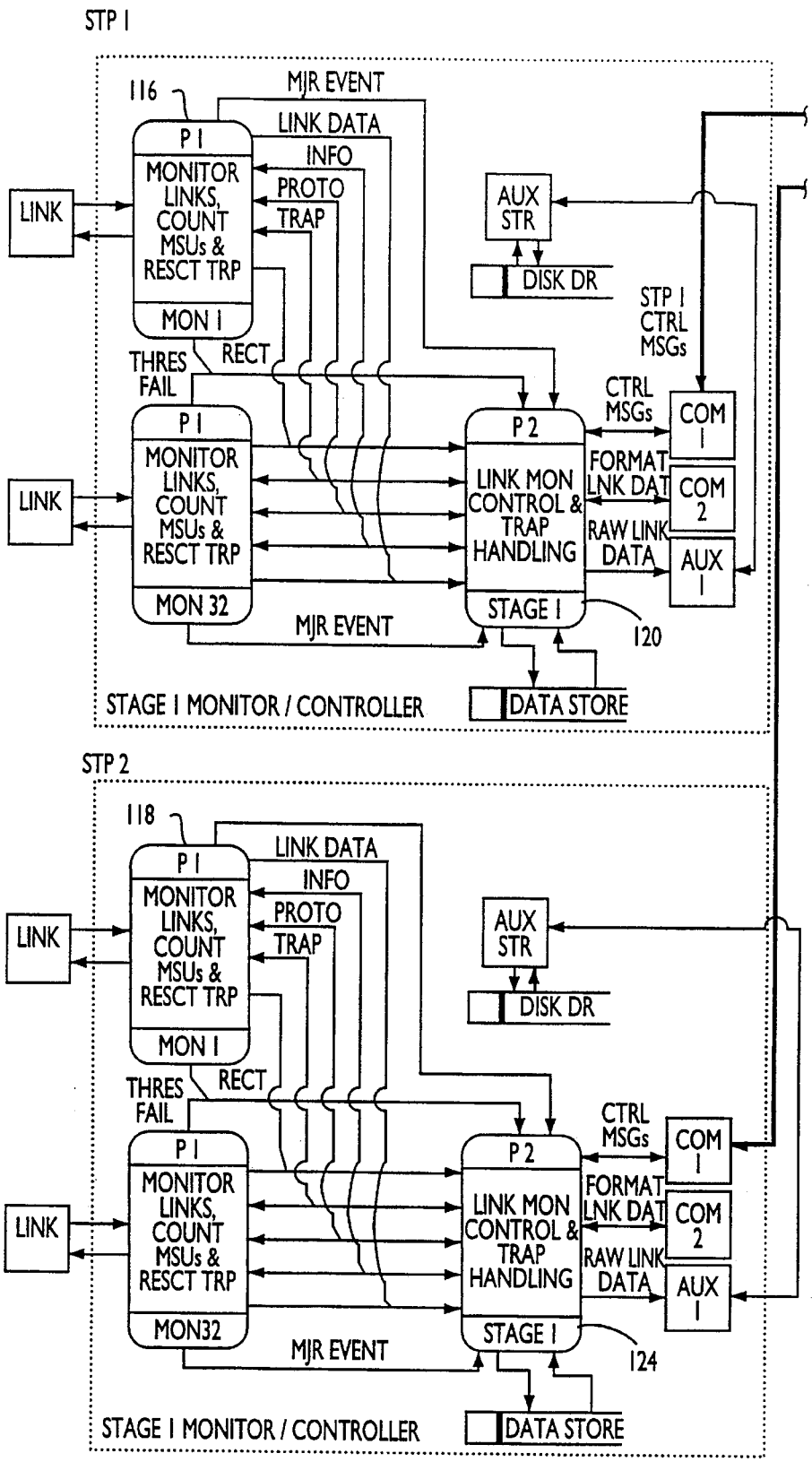
Figures 2, 12A:
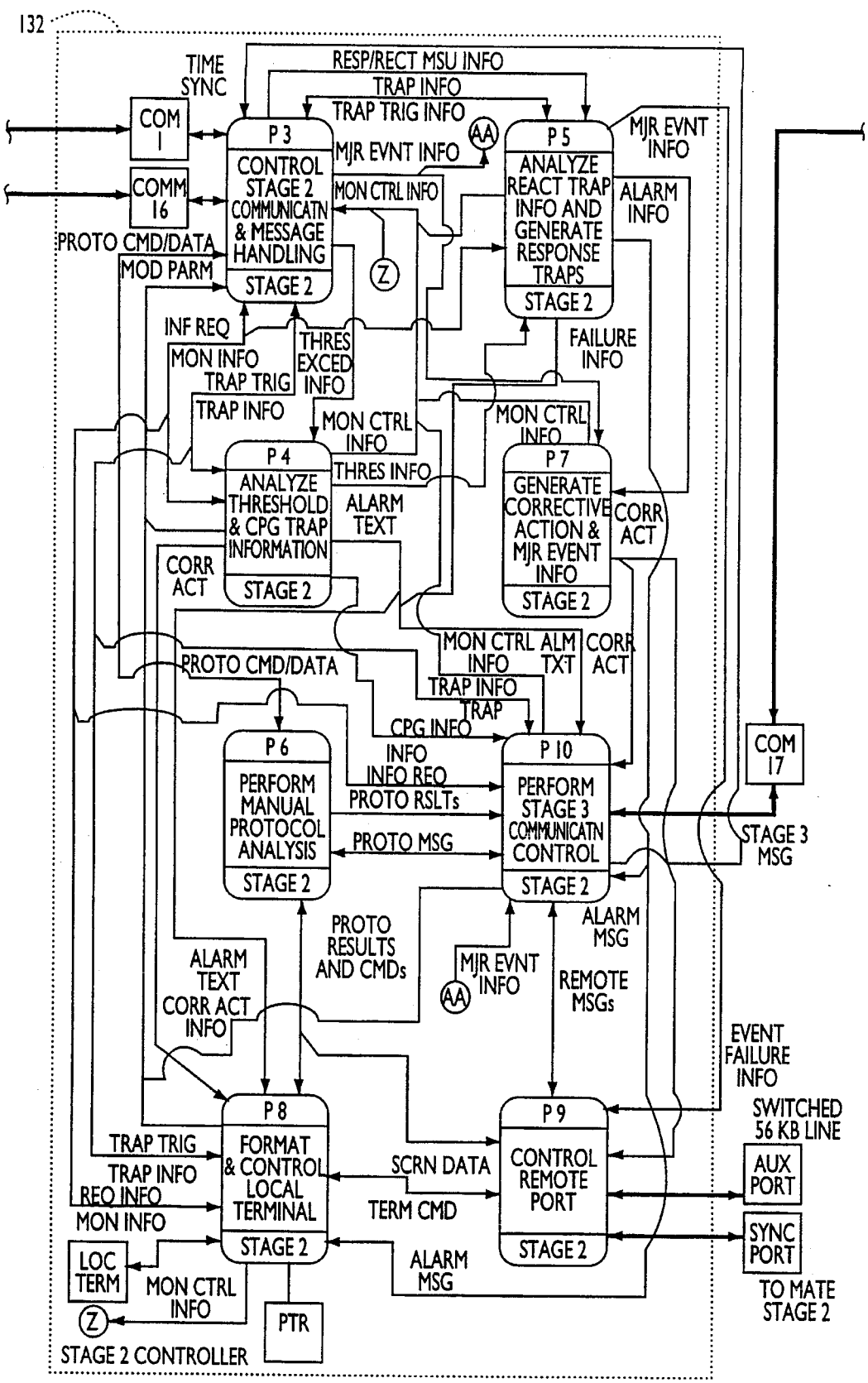
Figures 3, 12A:
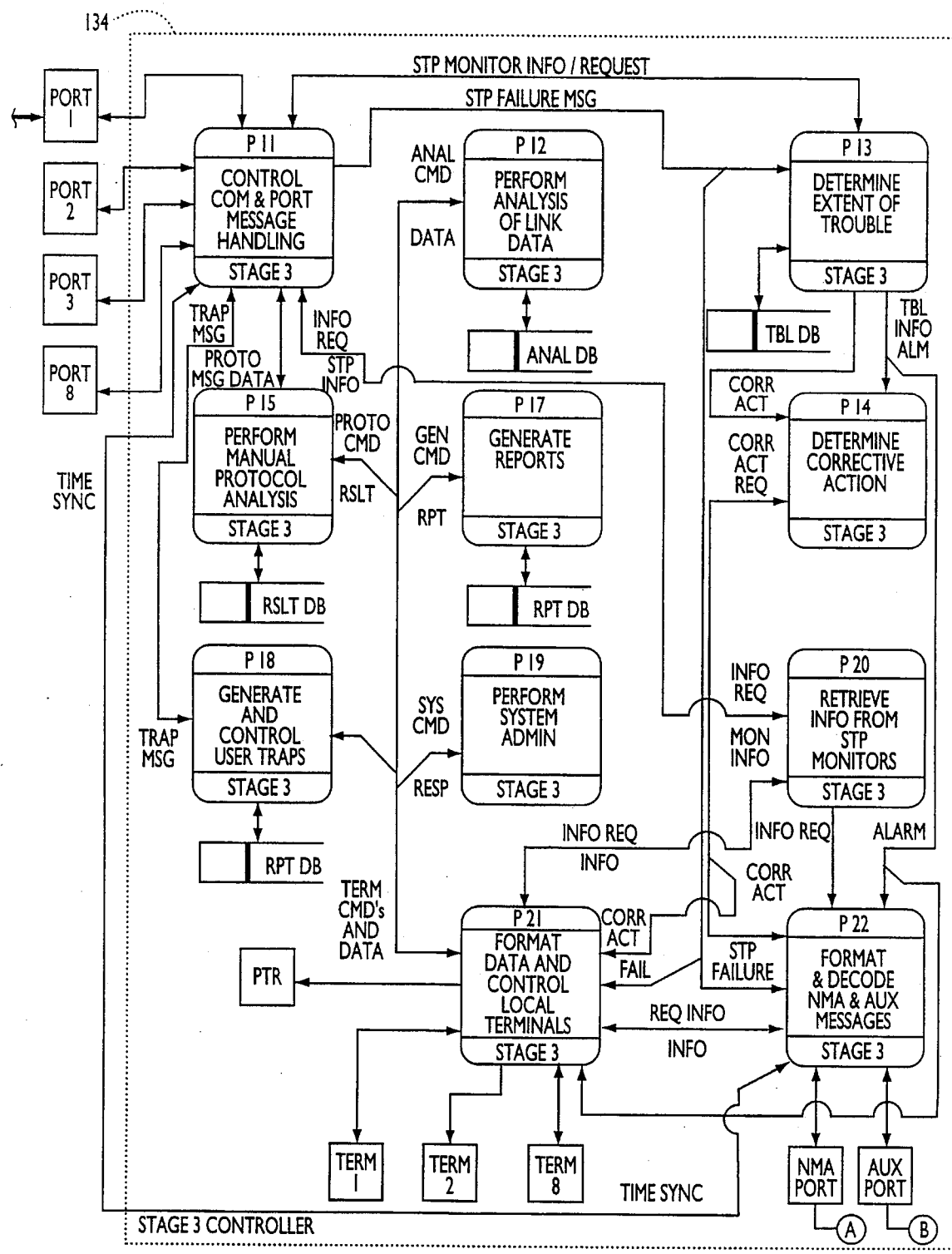
Figures 1, 12B:
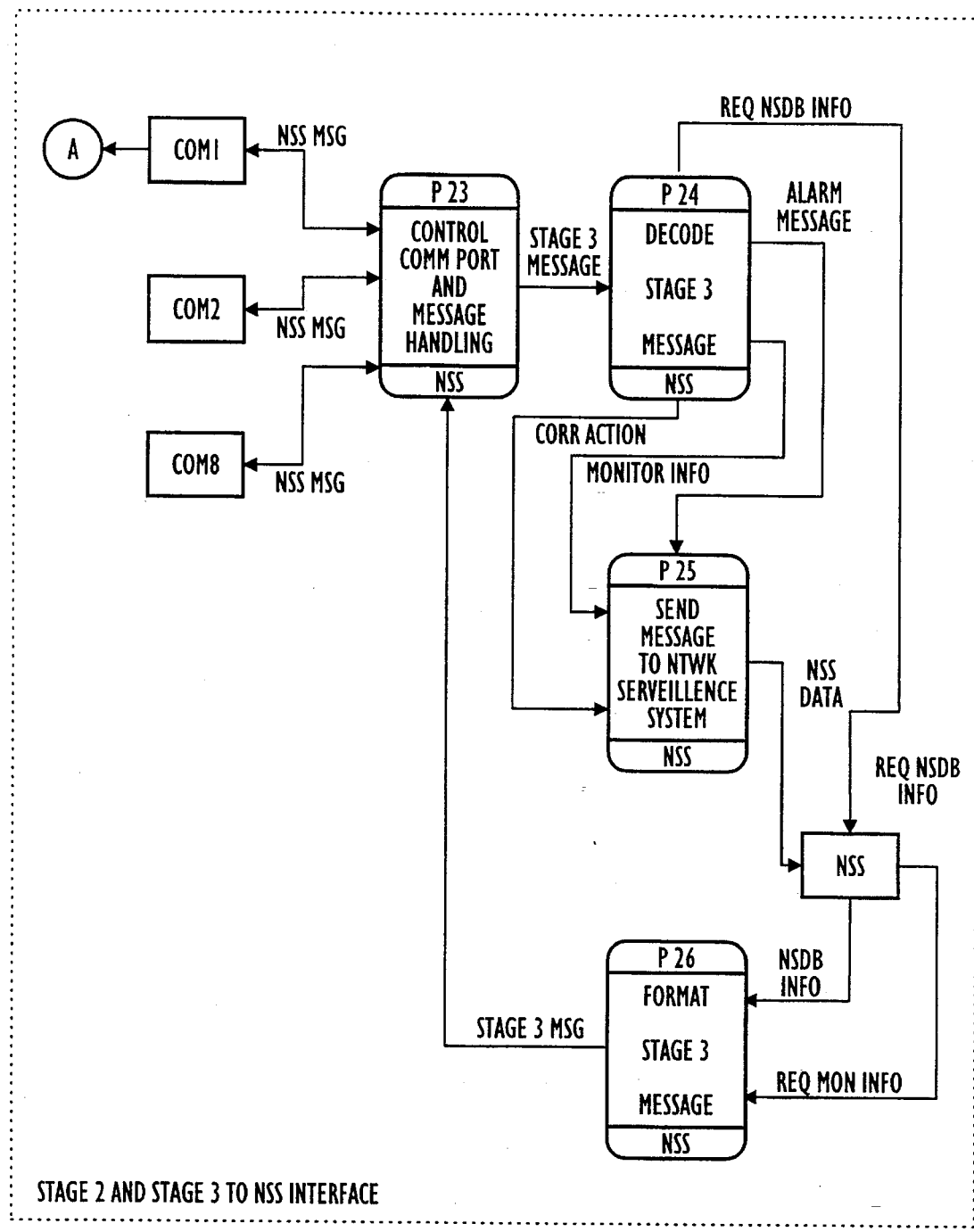
Figures 2, 12B:
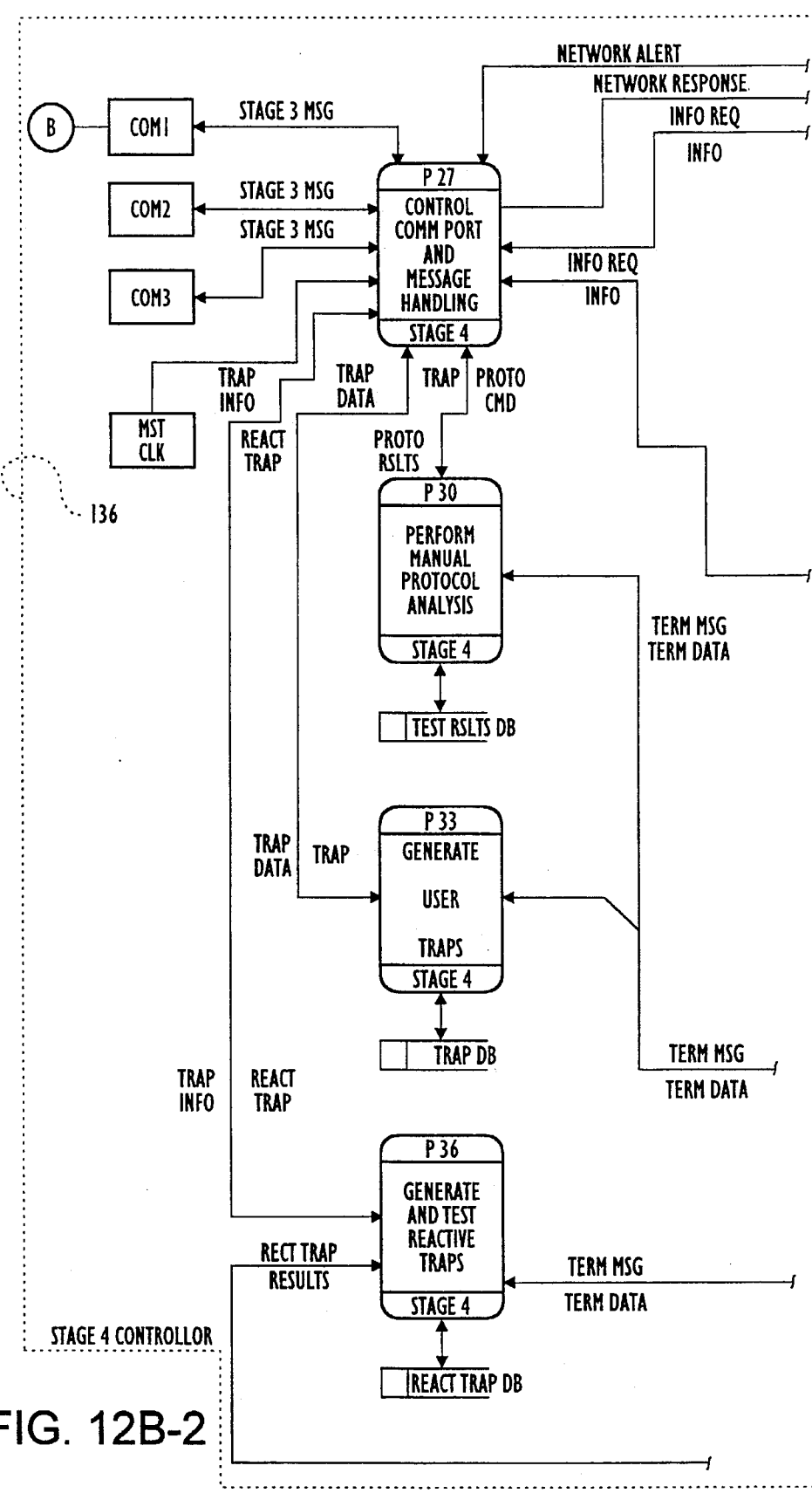
Figures 3, 12B:
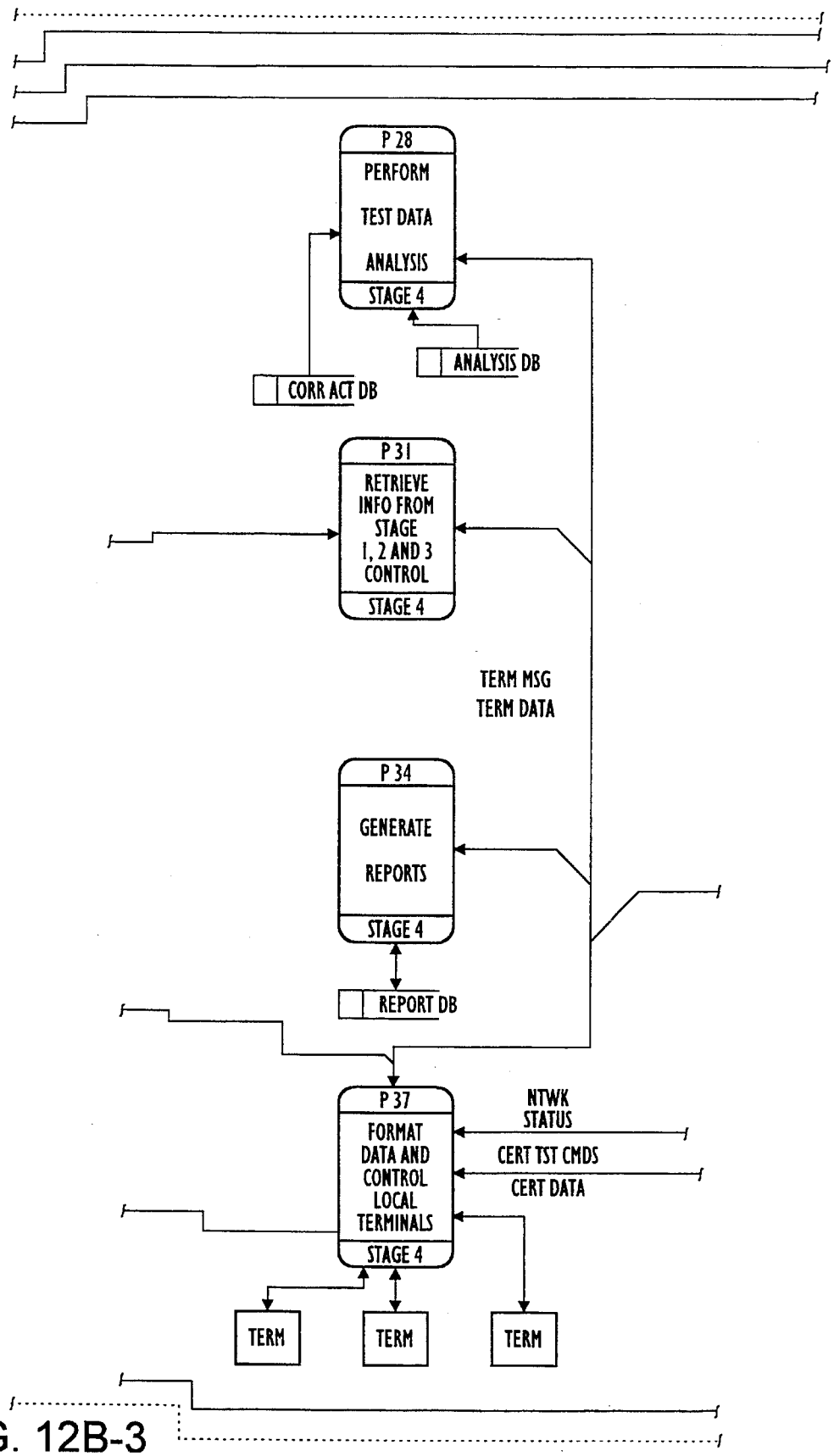
Figures 4, 12B:
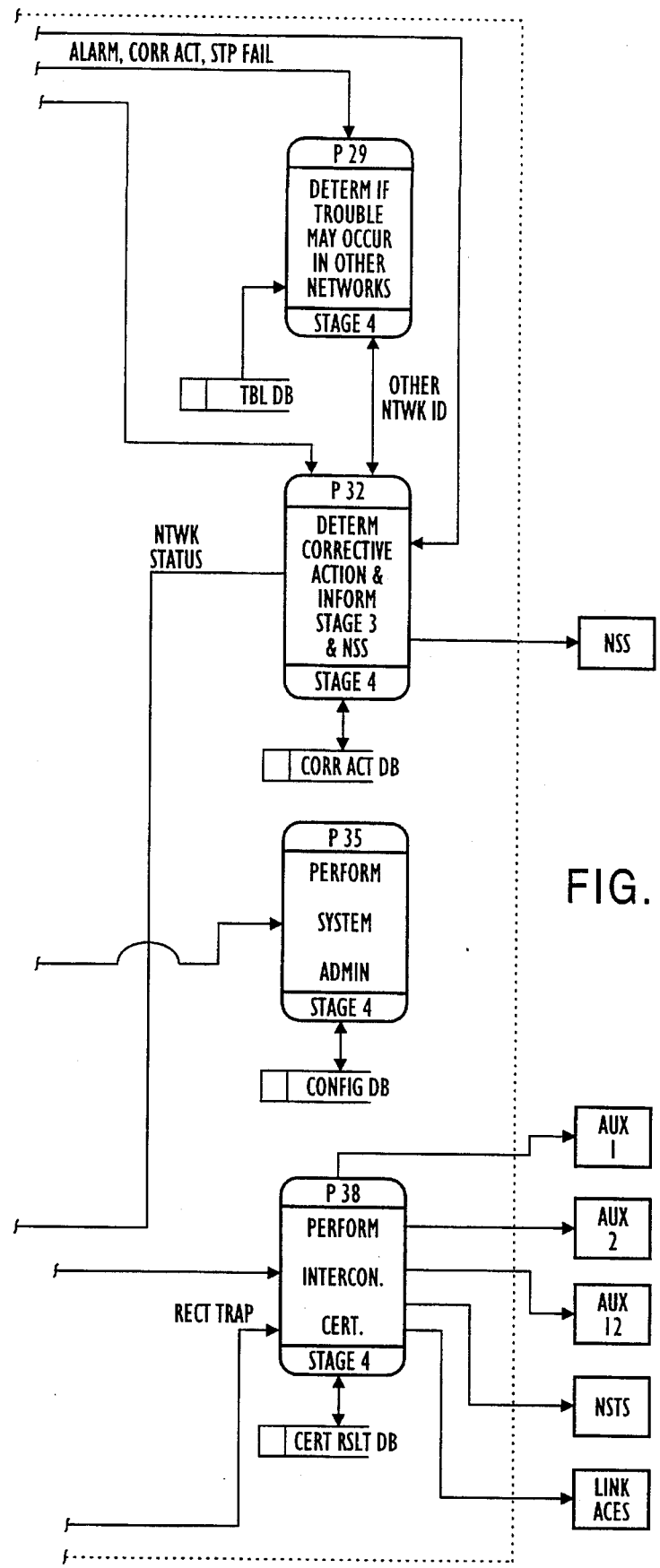
Figure 13:
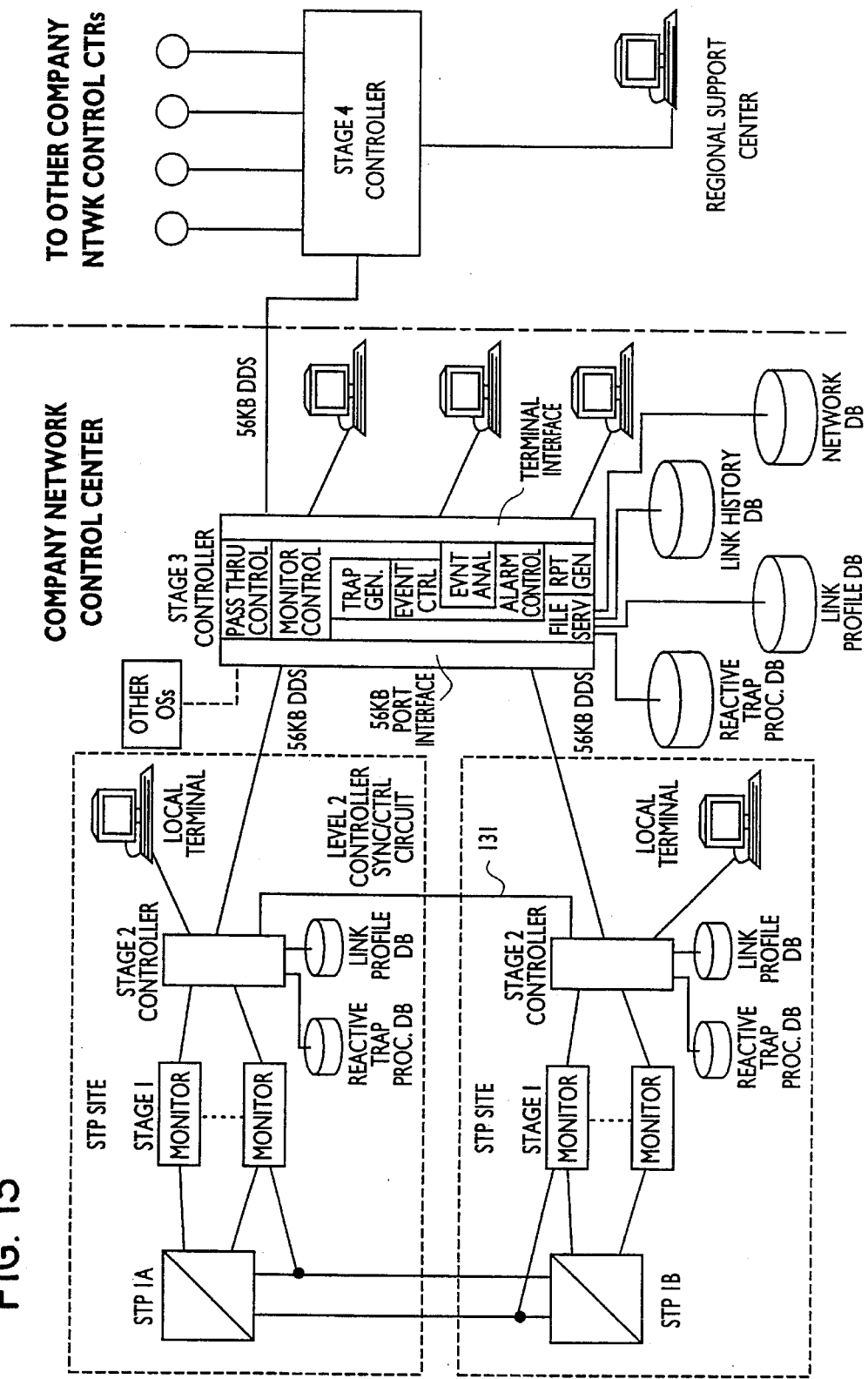
FIGS. 13 and 14 provide additional diagrammatic illustration of the four stage controller and real time network analyzer of the invention.
Figures 1, 14:
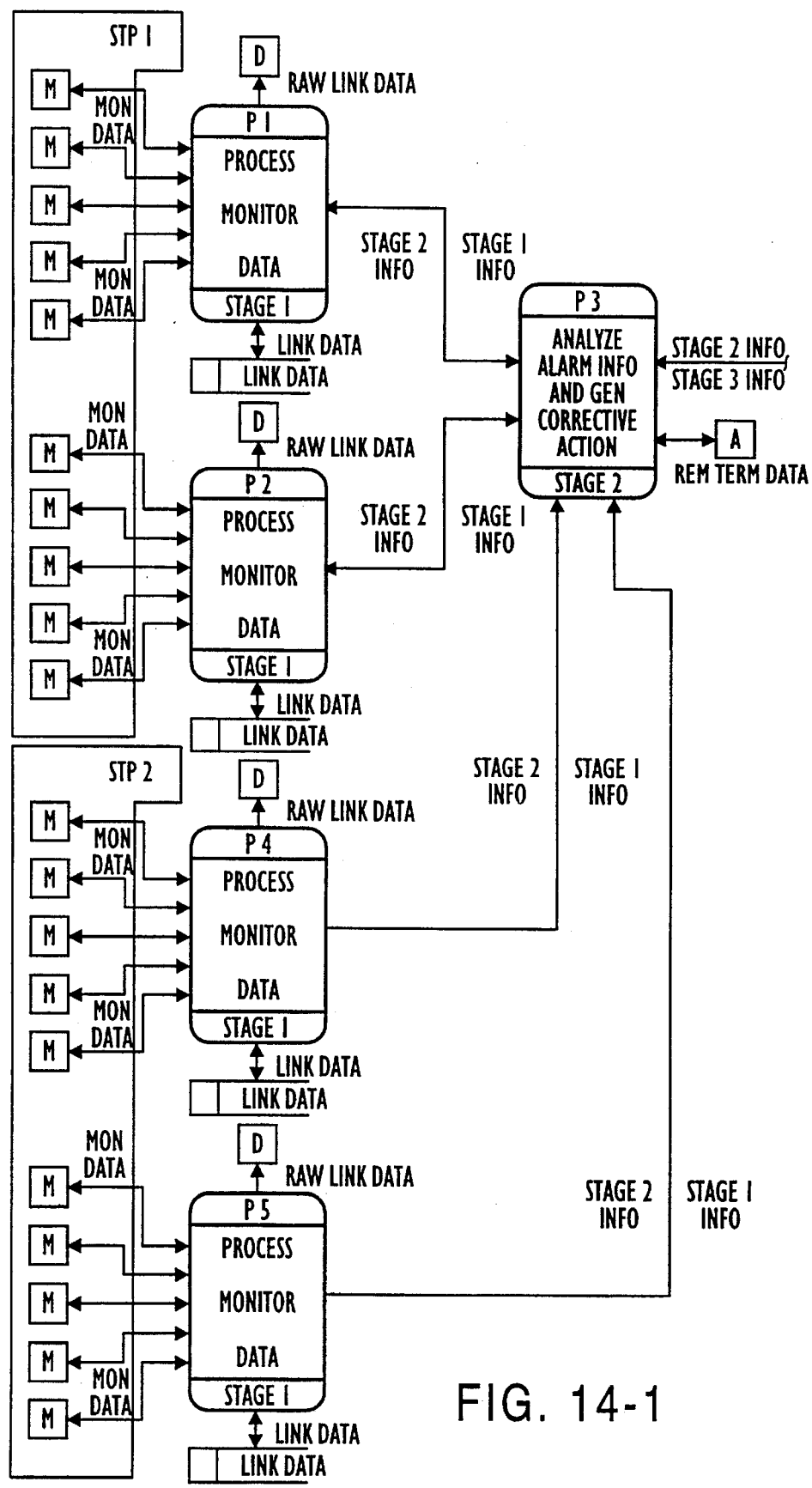
Figures 2, 14:
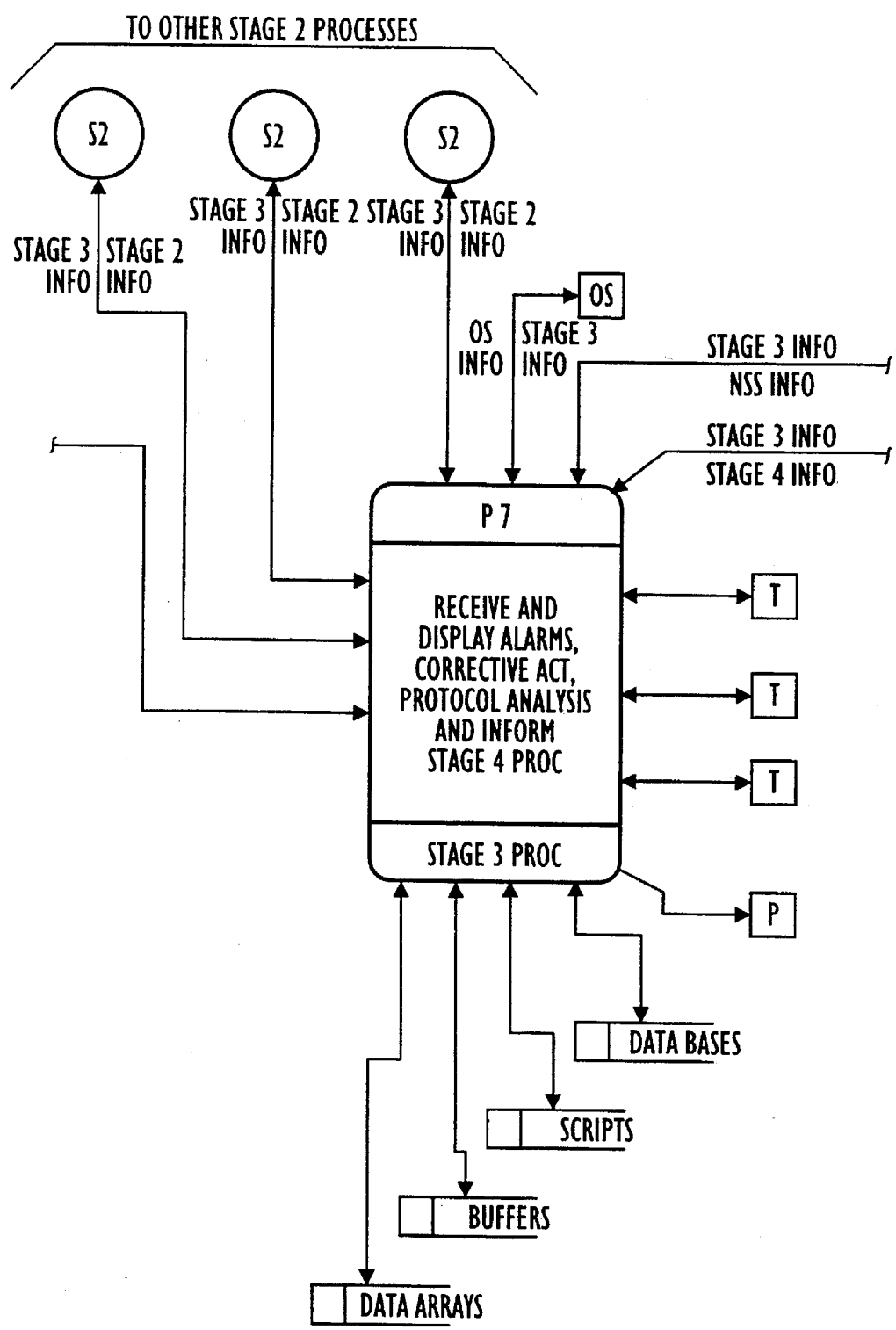
Figures 3, 14:
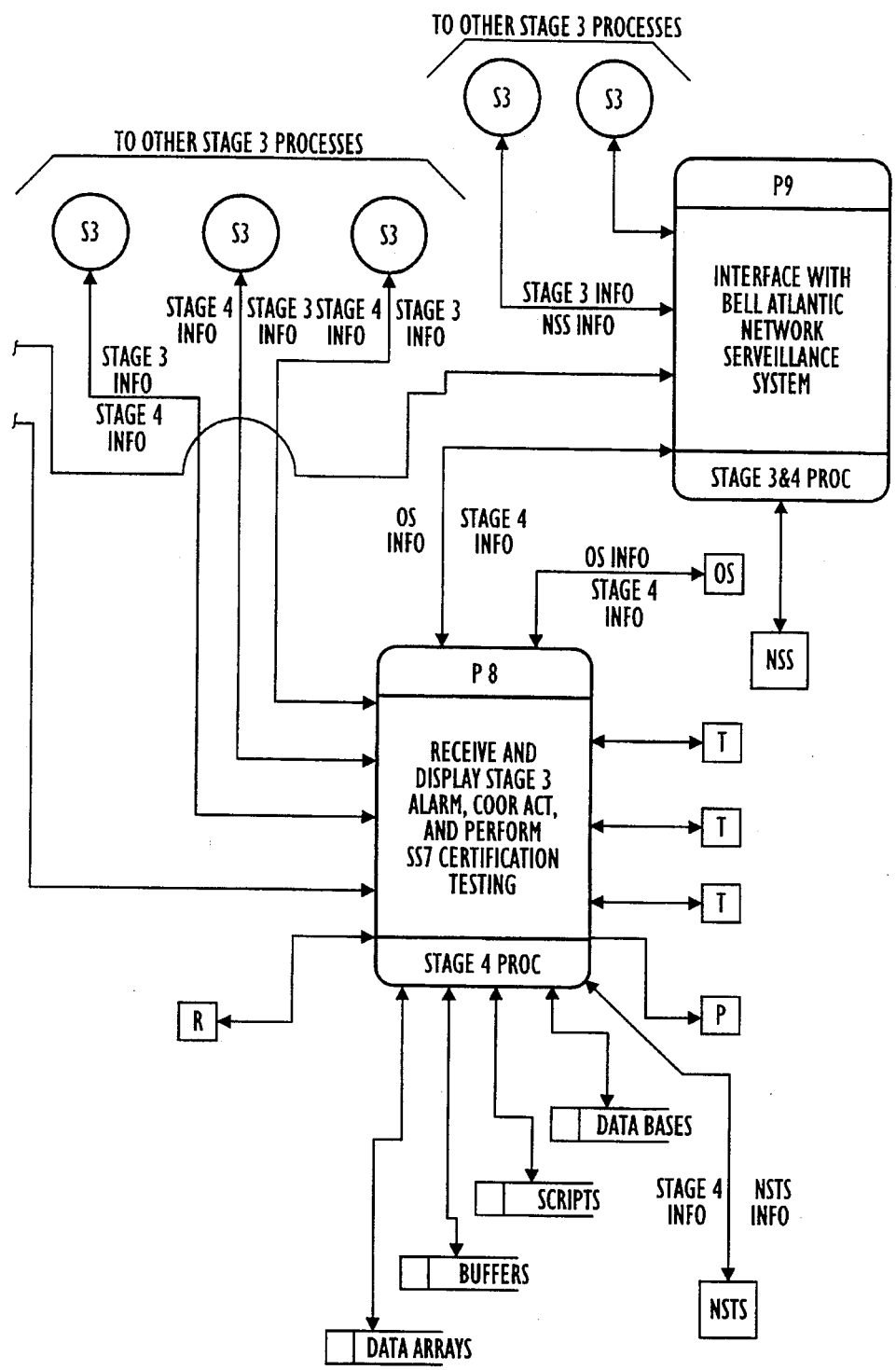

Referring to FIGS. 11 and 12A and 12B through 14 there is seen a more detailed illustration of the four network stages previously described in connection with FIG. 6. The STP1 and STP2 monitors M are shown enclosed in outlined blocks 116 and 118. The monitors M are respectively connected to the Stage 1 processors 120, 122, 124 and 126. These processors are in turn connected to the Stage 2 processors 128 and 130 shown in the Stage 2 block 132. According to this embodiment using a pair of Stage 2 controllers a sync line 131 connects the pair to enable an event to be handled by either controller. Further illustration of this embodiment is presented in FIG. 14. As an alternative to this arrangement, a single Stage 2 may be used as is illustrated in FIG. 13. The Stage 2 processors are connected to the Stage 3 processor 134 which are in turn connected to Stage 4 processor 136. The Stage 3 and Stage 4 processors are connected to the Network Surveillance System (NSS) 138 via the NSS interface 140.

DETAILED DESCRIPTION

Monitors

P1 Monitor Links, Count MSUs and Handle Reactive Traps

Figure 15:
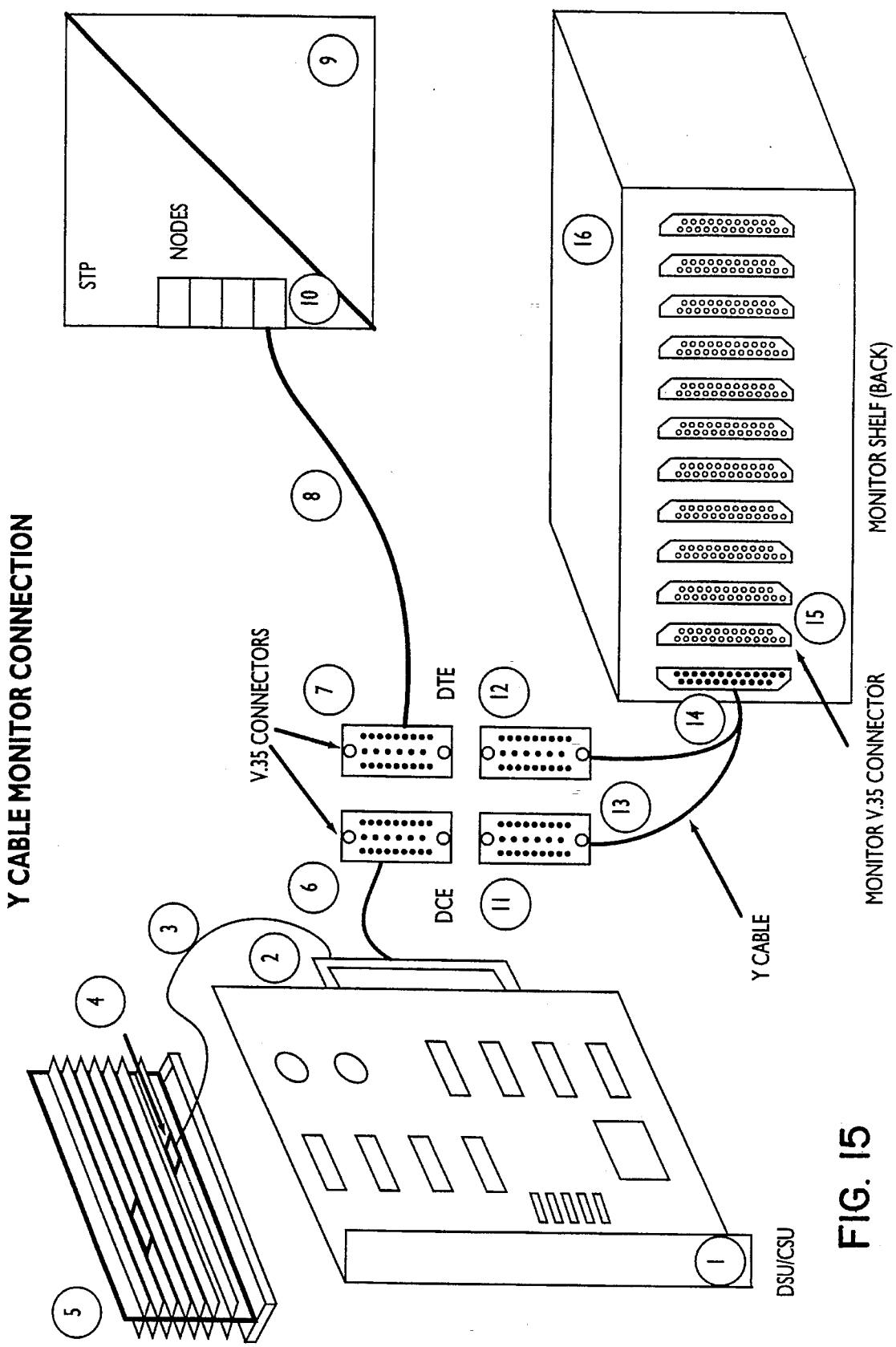
FIGS. 15 and 16 illustrate details of alternate monitor connections to the SS7 links.
Figure 16:
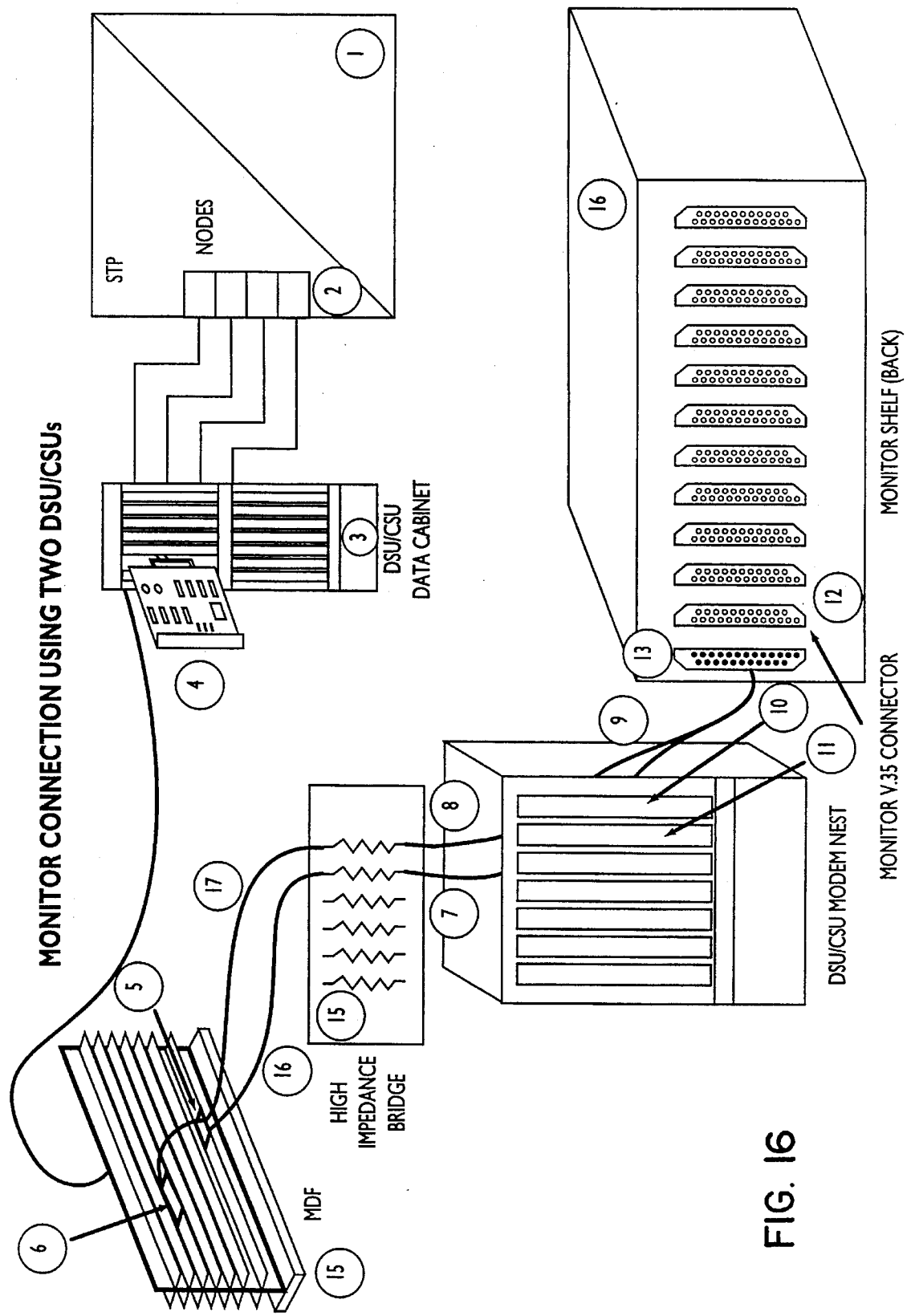

Each monitor is connected permanently to an SS7 link such as shown in FIG. 1 via a high impedance bridge circuit. V.35 and DSOA interfaces are provided for link connection. Referring to FIGS. 15 and 16 Transmit and Receive Monitor leads are half tapped to the link via the high impedance bridge. Access to DSOA links is provided using 4 wire cross connects on the MDF. Access to V.35 (DSOB) links is provided by either V.35 "Y" cables connected directly to the STP link OCU/DSU or 4 wire connection on the MDF. V.35 links can also be connected to the link by using the receive side of 2 DSU/CSUs. The V.35 side of the DSU/CSUs is connected to input of a Lead Change Adapter that takes the receive data leads of each DSU/CSU and routes it to a single V.35 connector. The monitor's V.35 connector is attached to the Lead Change Adapter's single V.35 connector. The 4 wire side of the two DSU/CSUs is connected to the input of a High Impedance Bridge Circuit. The output side of the bridge circuit is cabled to the MDF. The link is connected to the monitor by wiring a jumper from the High Impedance Bridge Circuit and half tapping it to the link appearance on the MDF. These connections are illustrated in FIGS. 15 and 16.

Link data and trap data information is passed to the Stage 1 process. The Stage 1 process coordinates data delivery to the other processes and ensures that the monitors are time synchronized to the master clock.

The basic functions of the monitor are the following:

A. Performs real time HEX, Level 2, 3, and 4 and TCAP decode of SS7 MSUs on user selected links.

B. Monitors link load by counting MSUs by MSU type.

C. Provides user defined link load thresholding based on:

MSU occupancy (aggregate percent MSU Link Load);

MSU type occupancy (cumulative MSU count by type per interval);

MSU frequency (cumulative MSU count per 100 ms).

Any threshold that is exceeded is reported to the Stage 2 process via the Stage 1 process.

D. Provides user defined reactive MSU trapping.

Figures 1, 17:
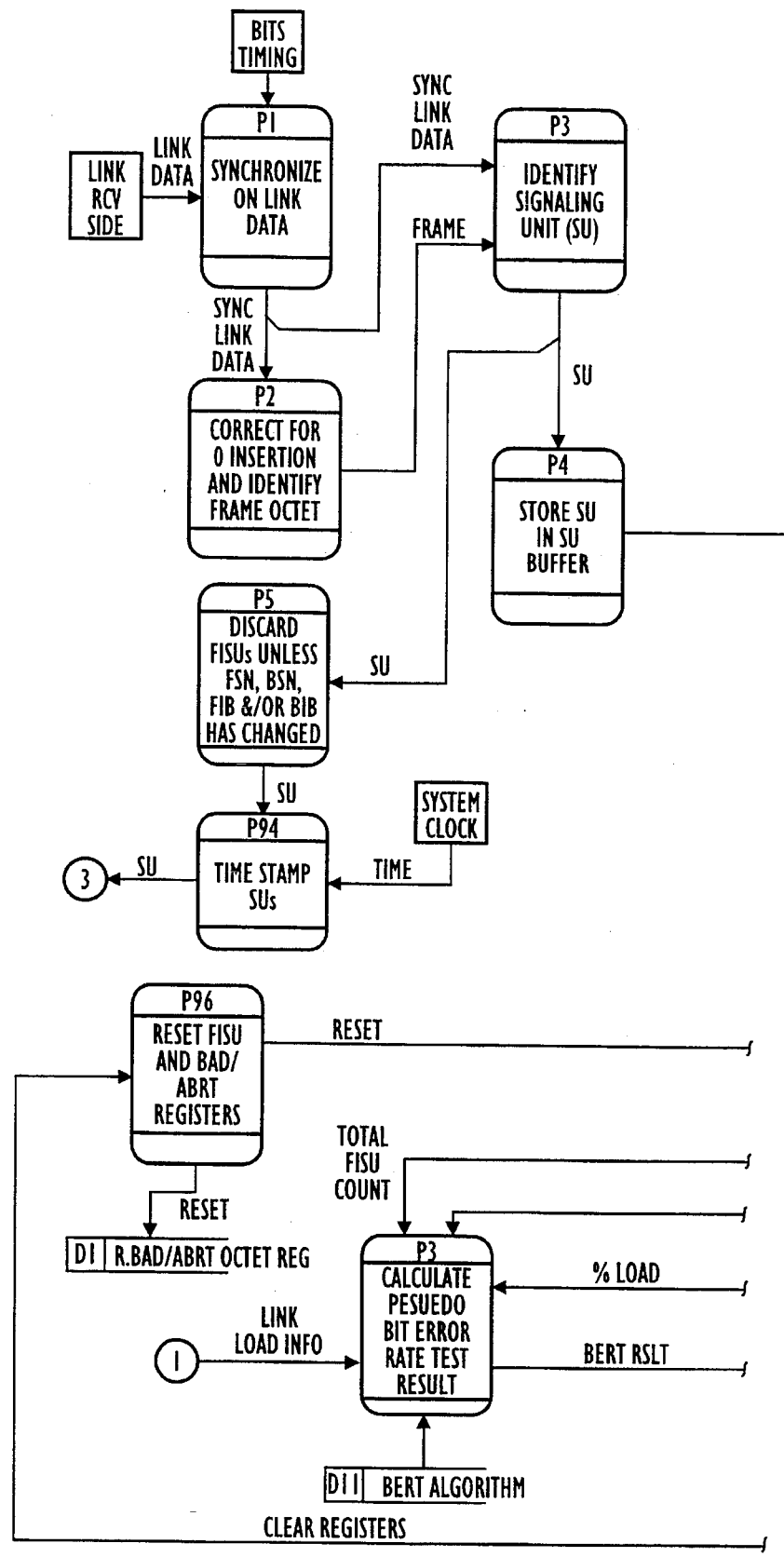
FIGS. 17 and 18 respectively show the receive side of SS7 monitor circuit data flow and the transmit side of SSS7 monitor circuit data flow.
Figures 2, 17:
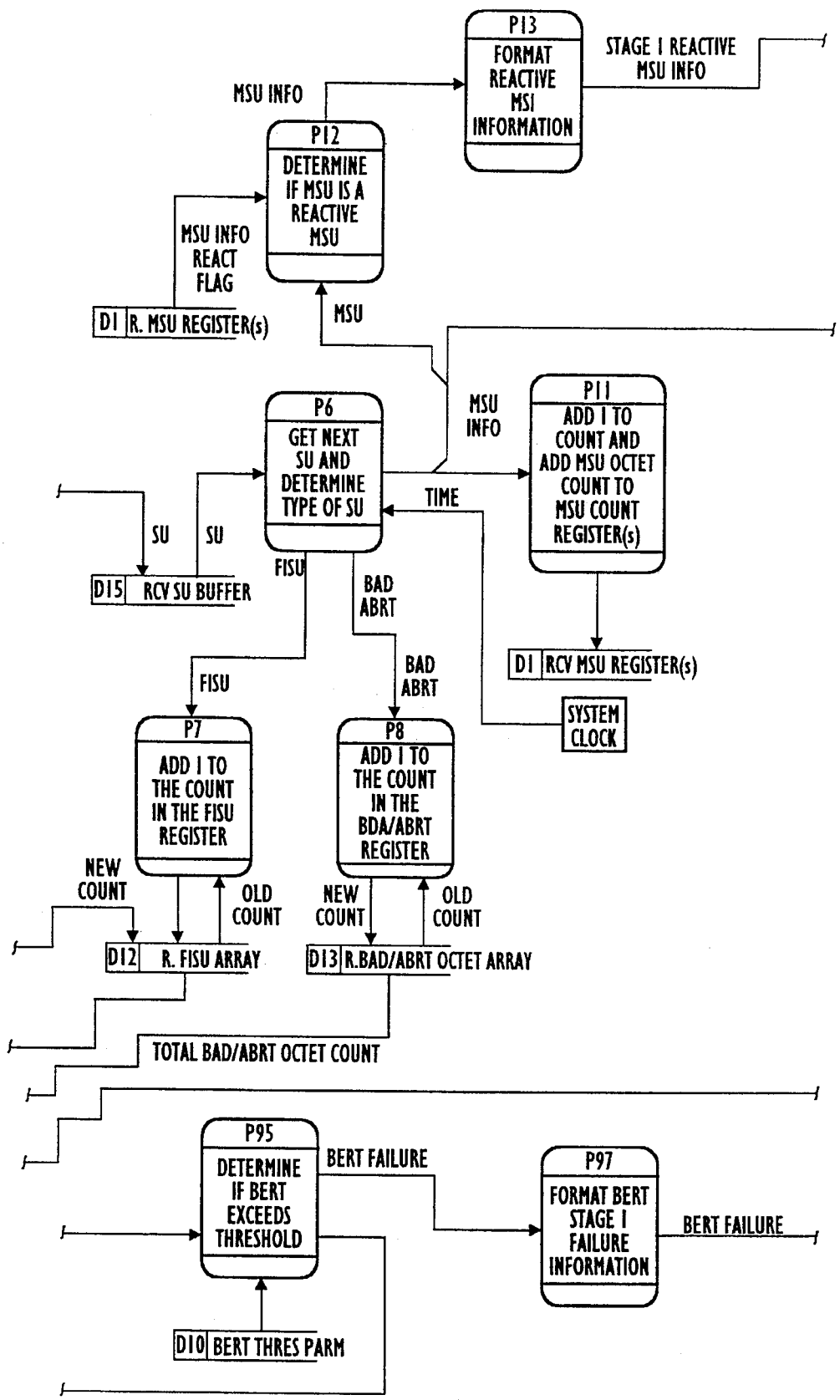
Figures 3, 17:
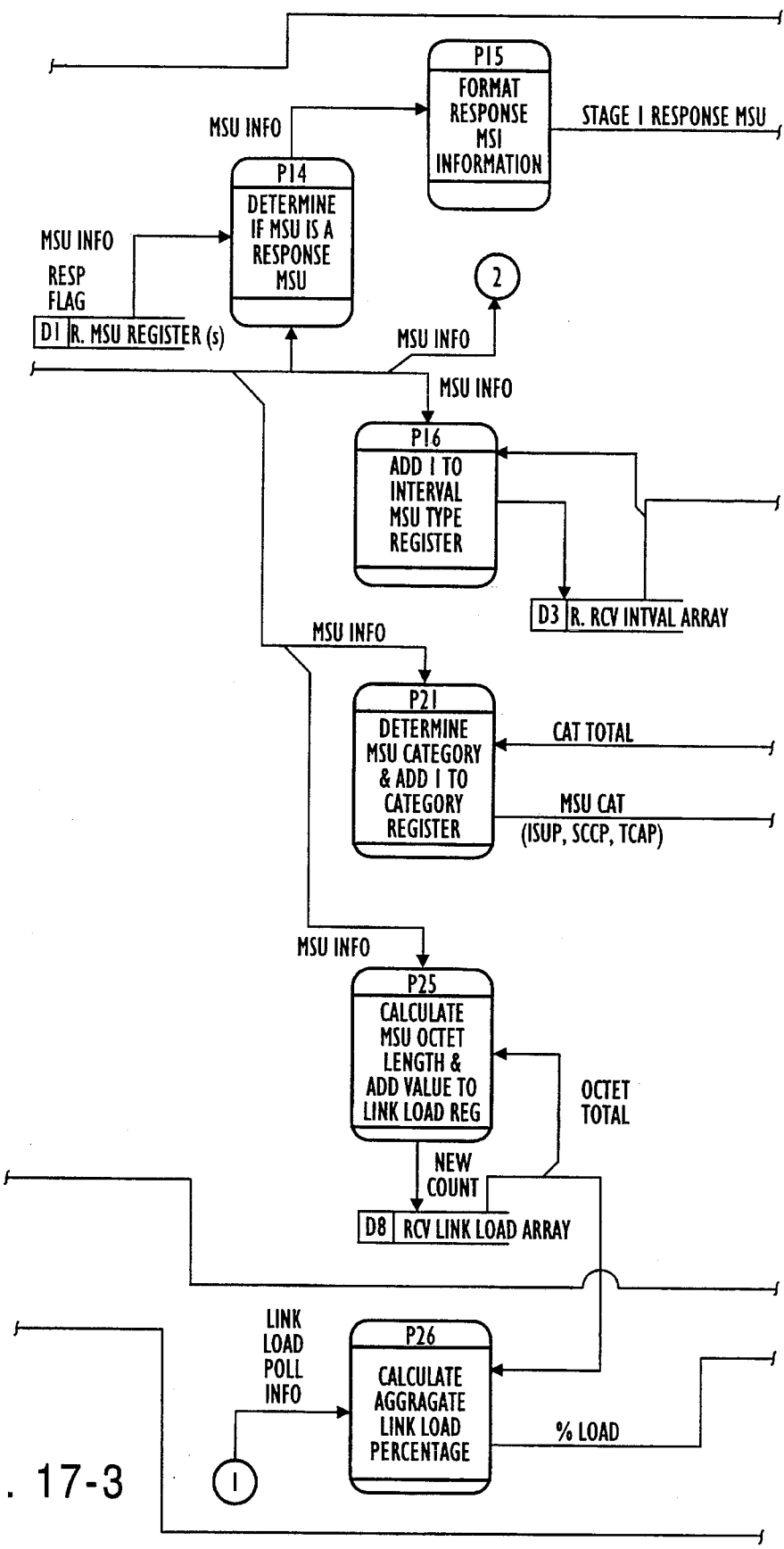
Figures 4, 17:
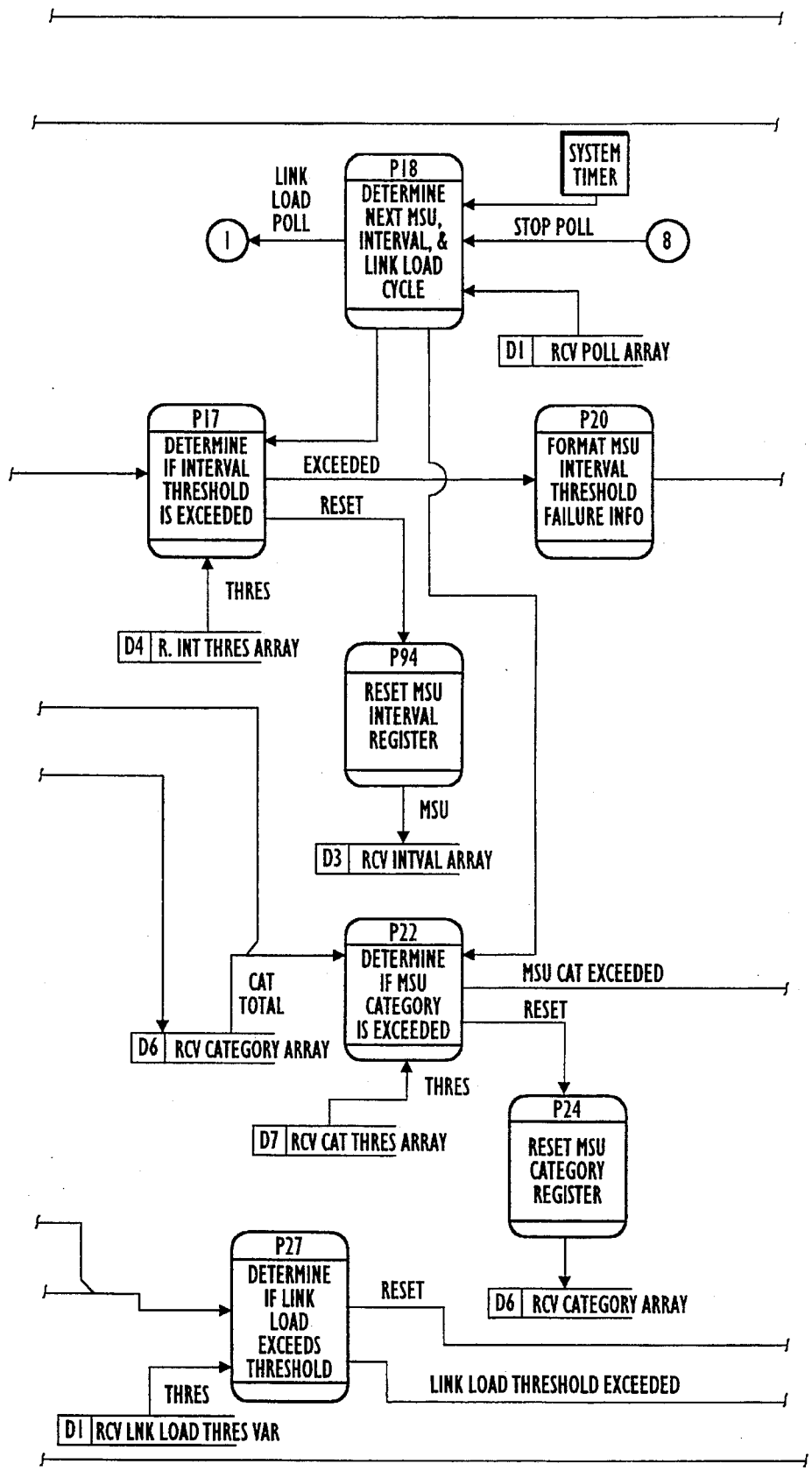
Figures 5, 17:
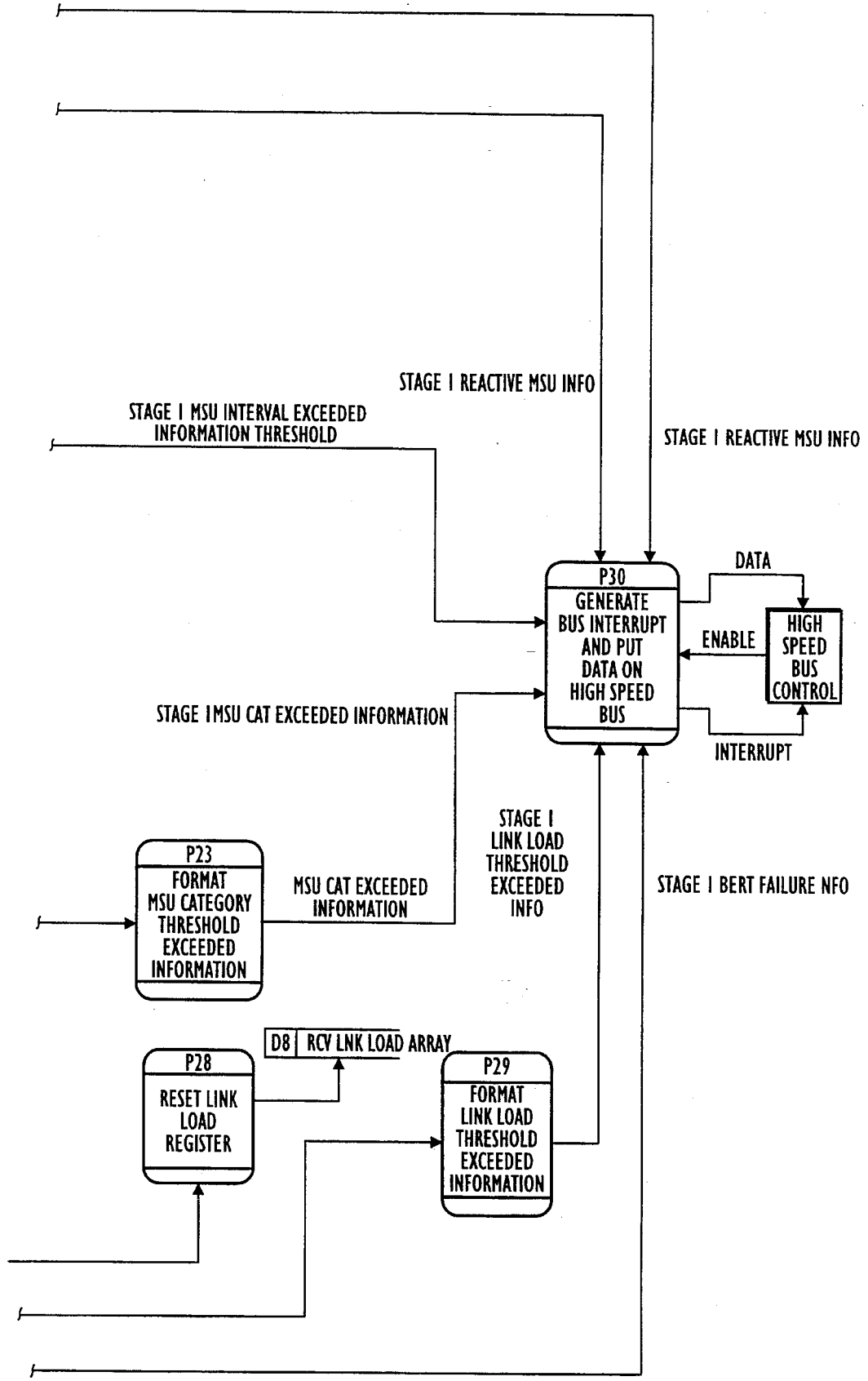
Figures 1, 18:
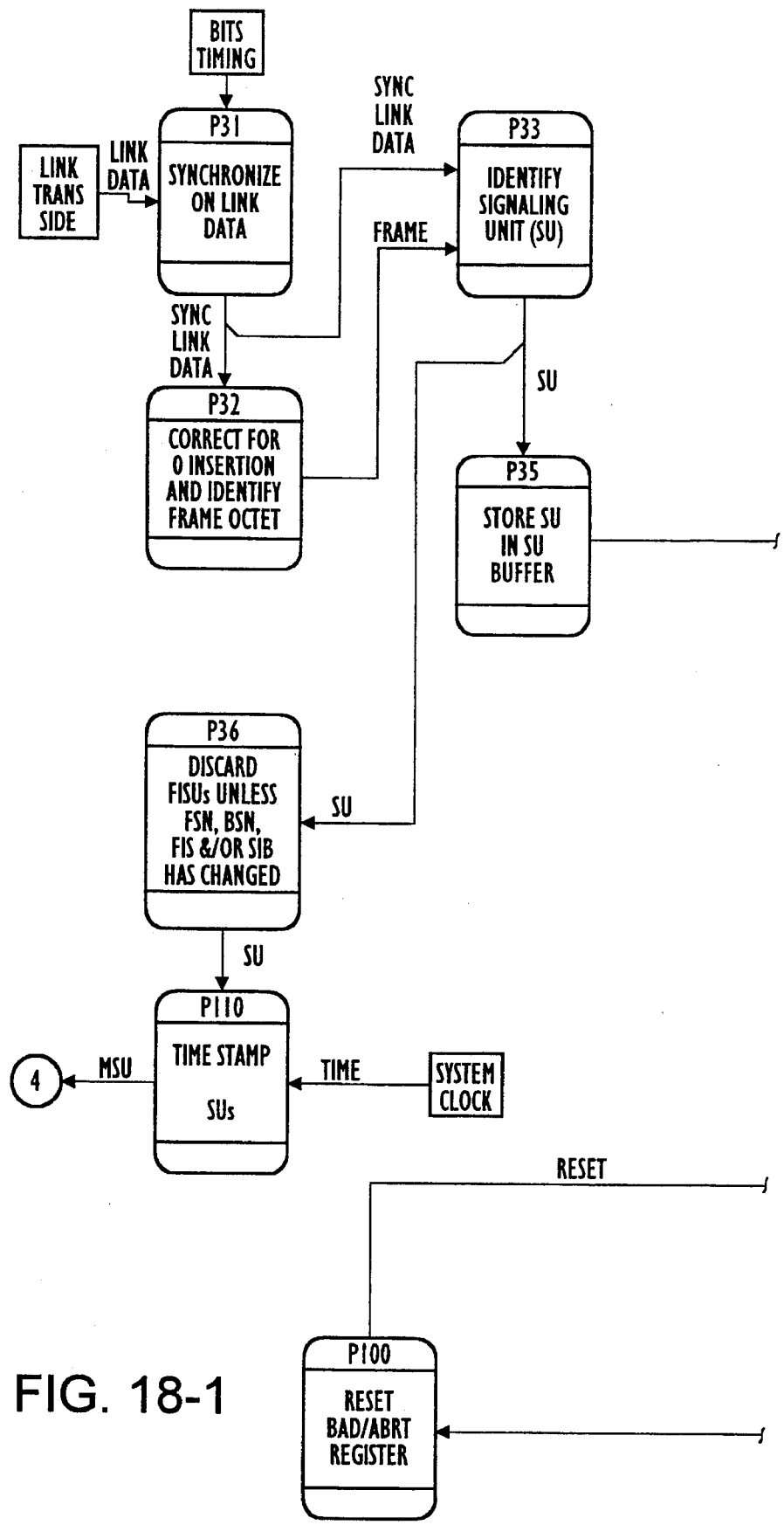
Figures 2, 18:
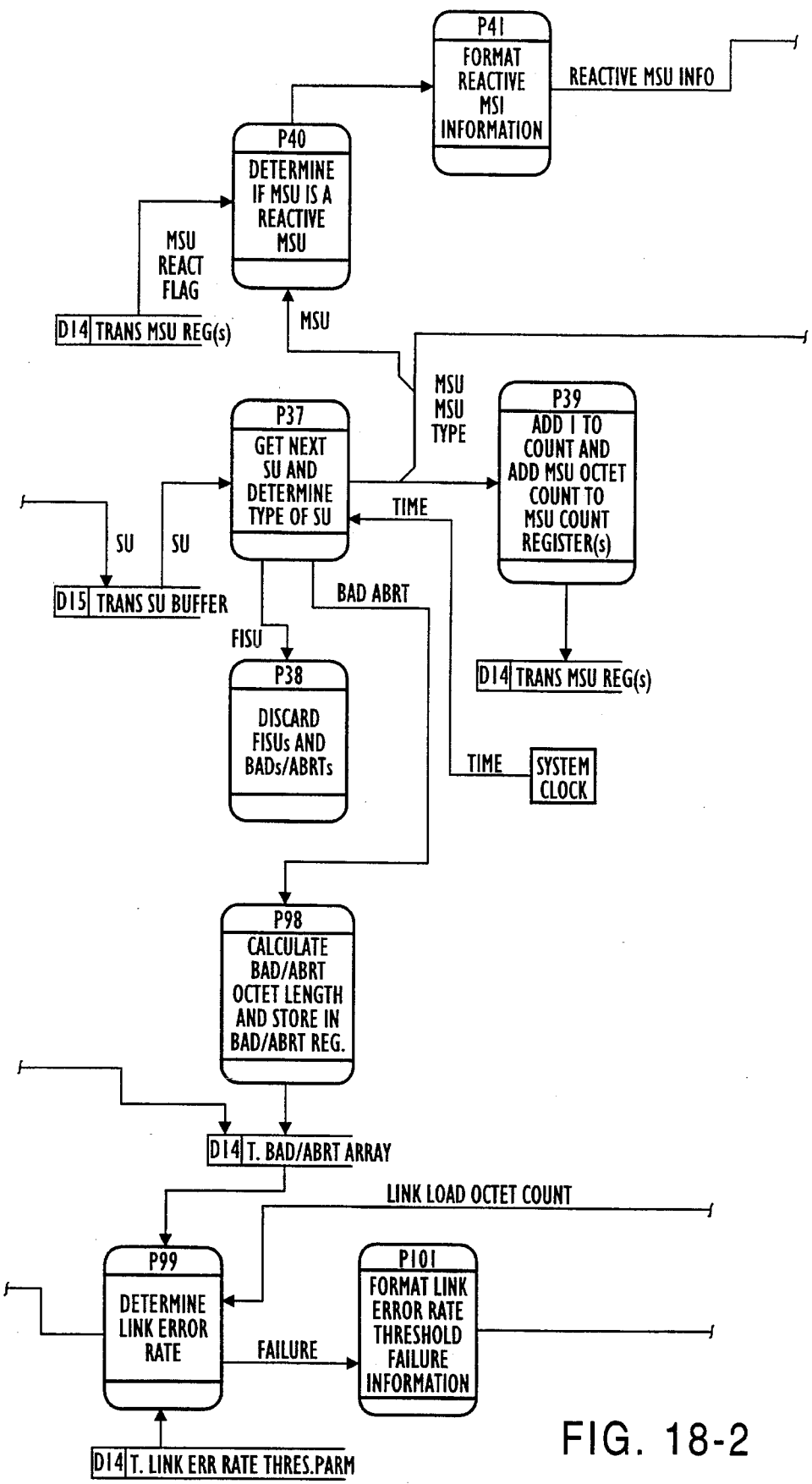
Figures 3, 18:
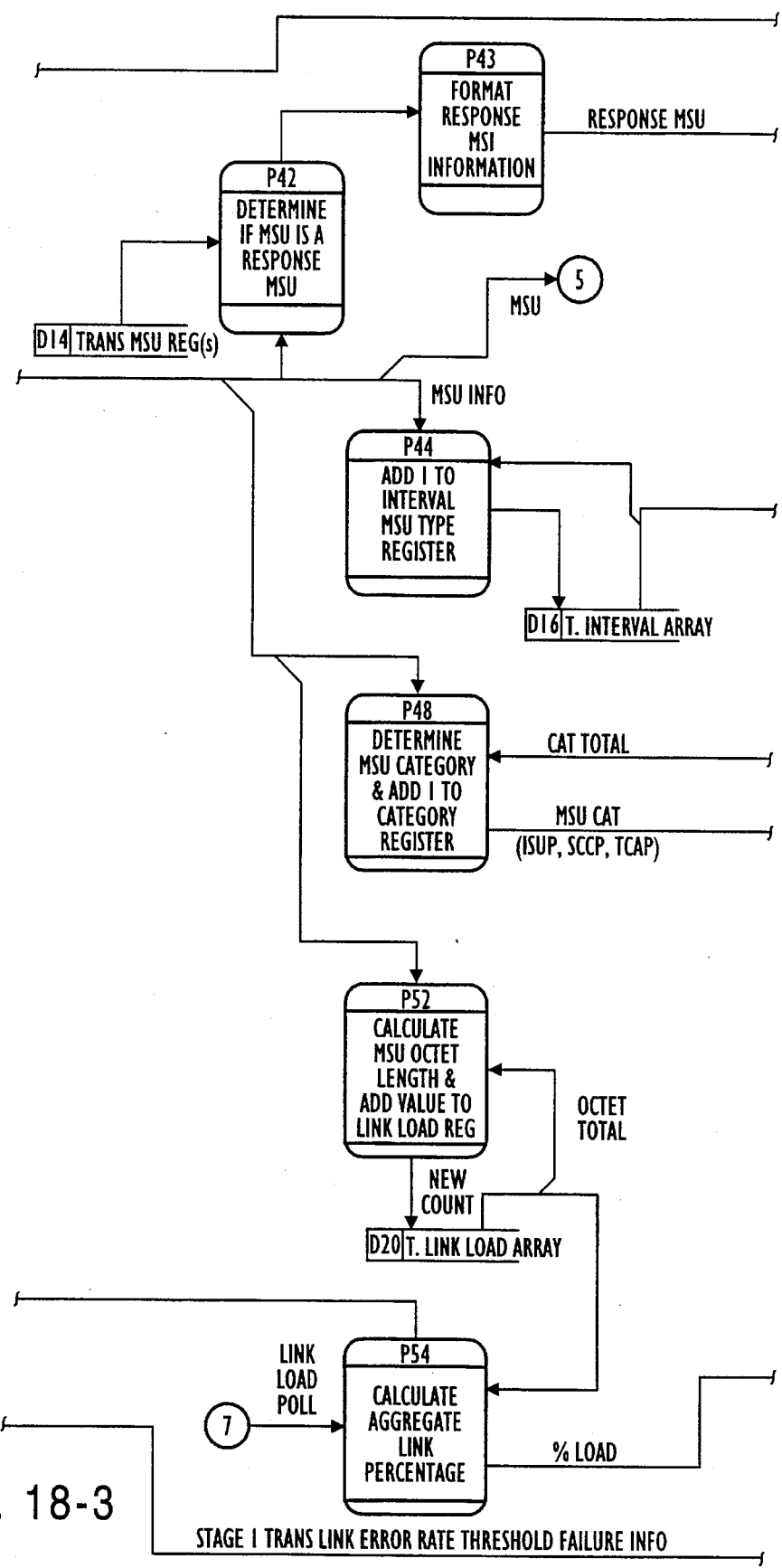
Figures 4, 18:
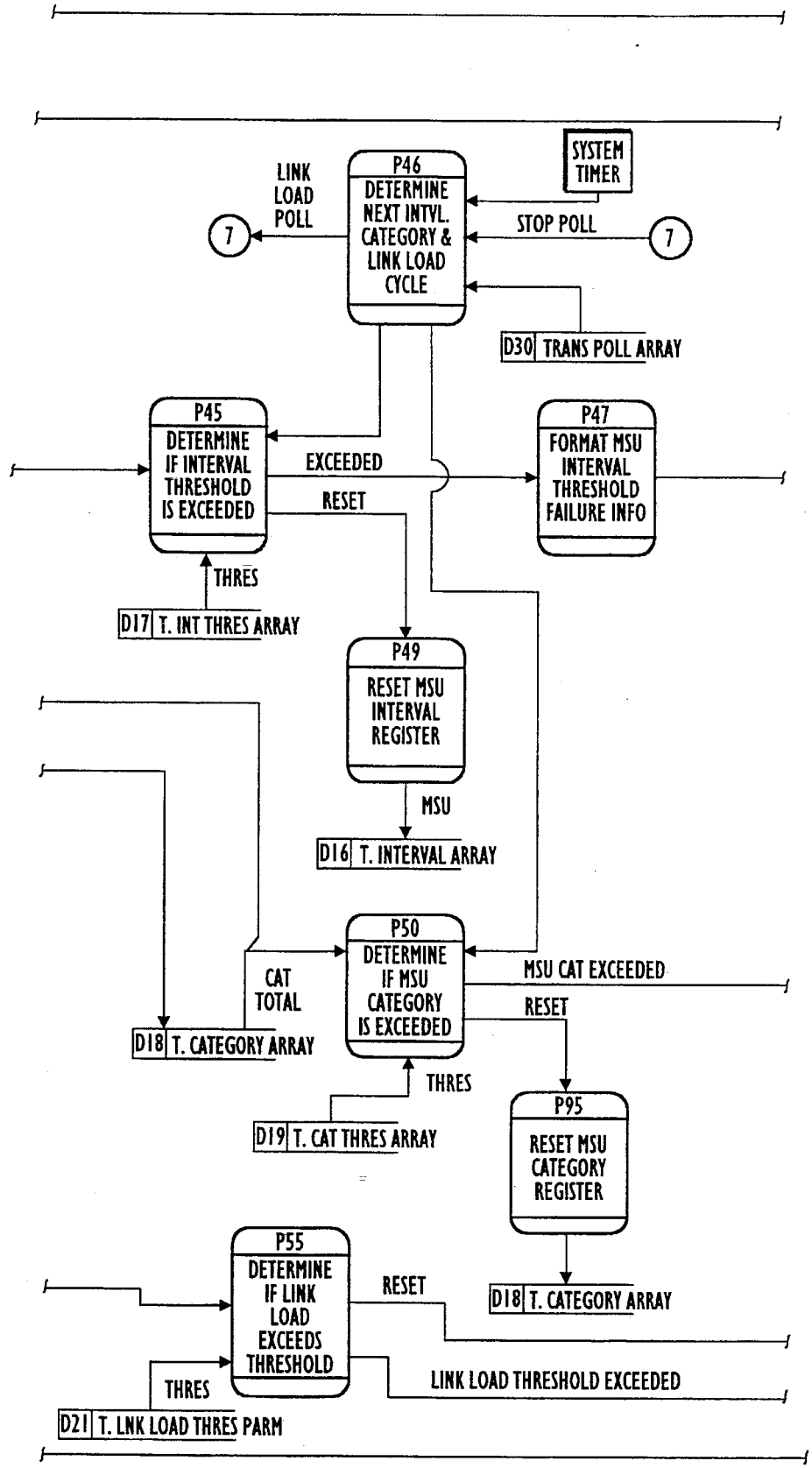
Figures 5, 18:
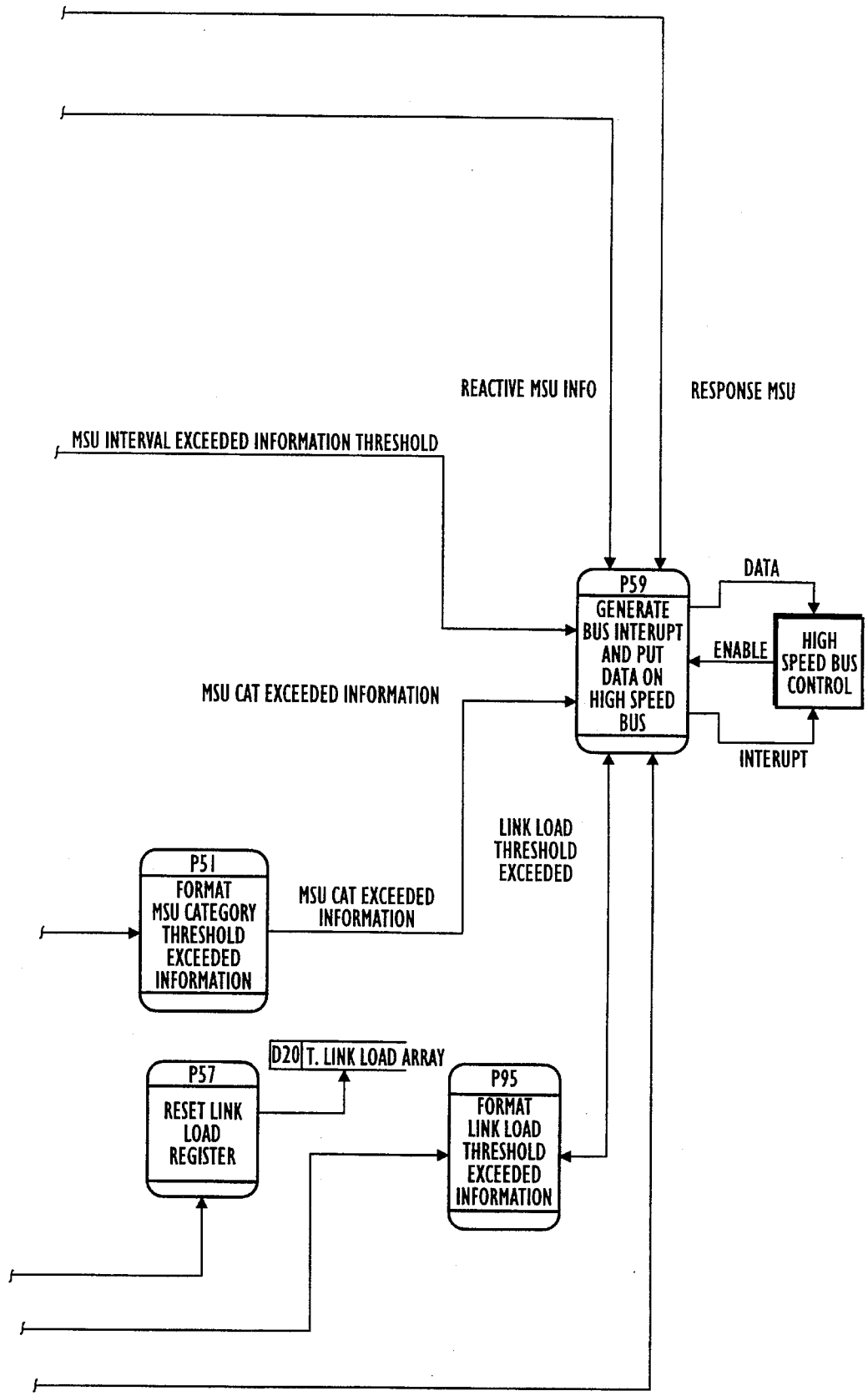
Figure 19:
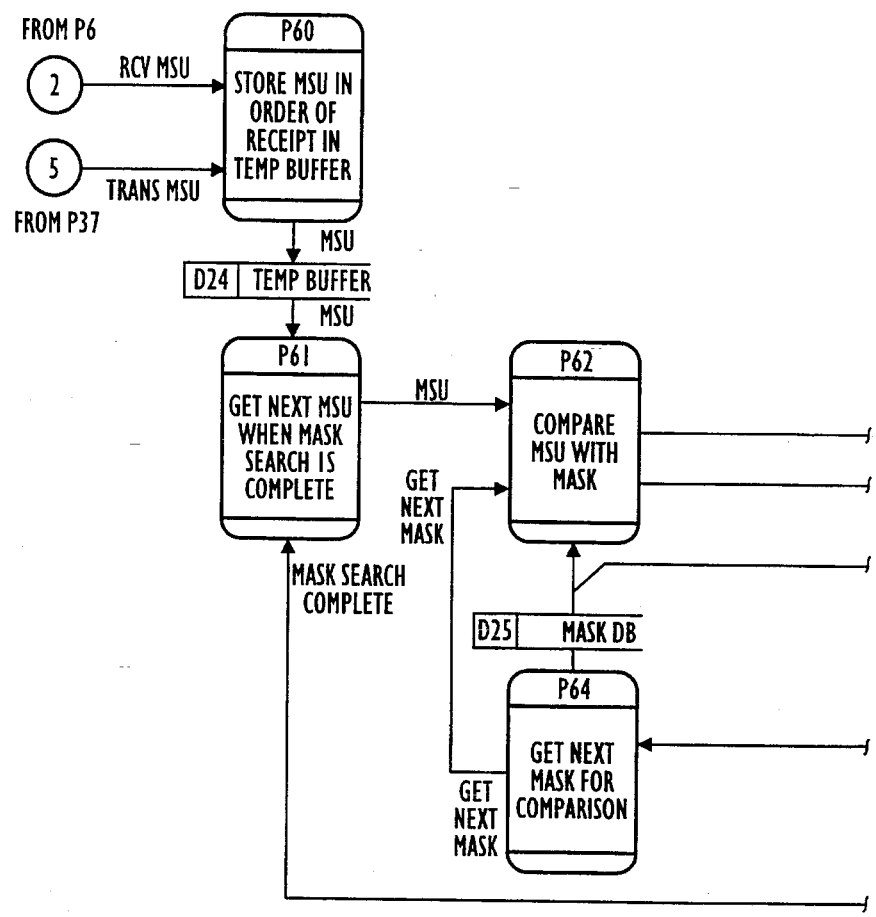
FIG. 19 illustrates the flow in SS7 trap detection and link data storage.
Figure 1:
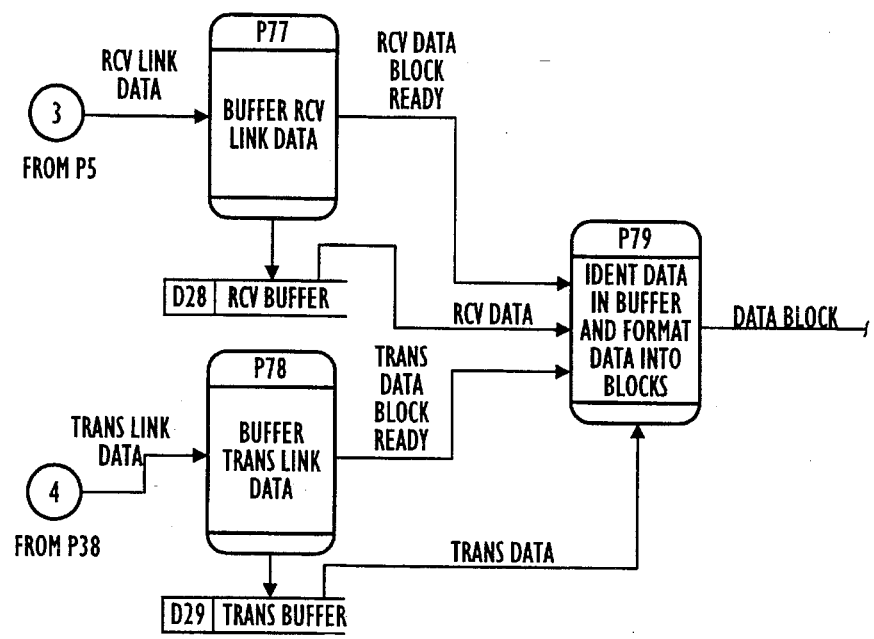
Figure 19:
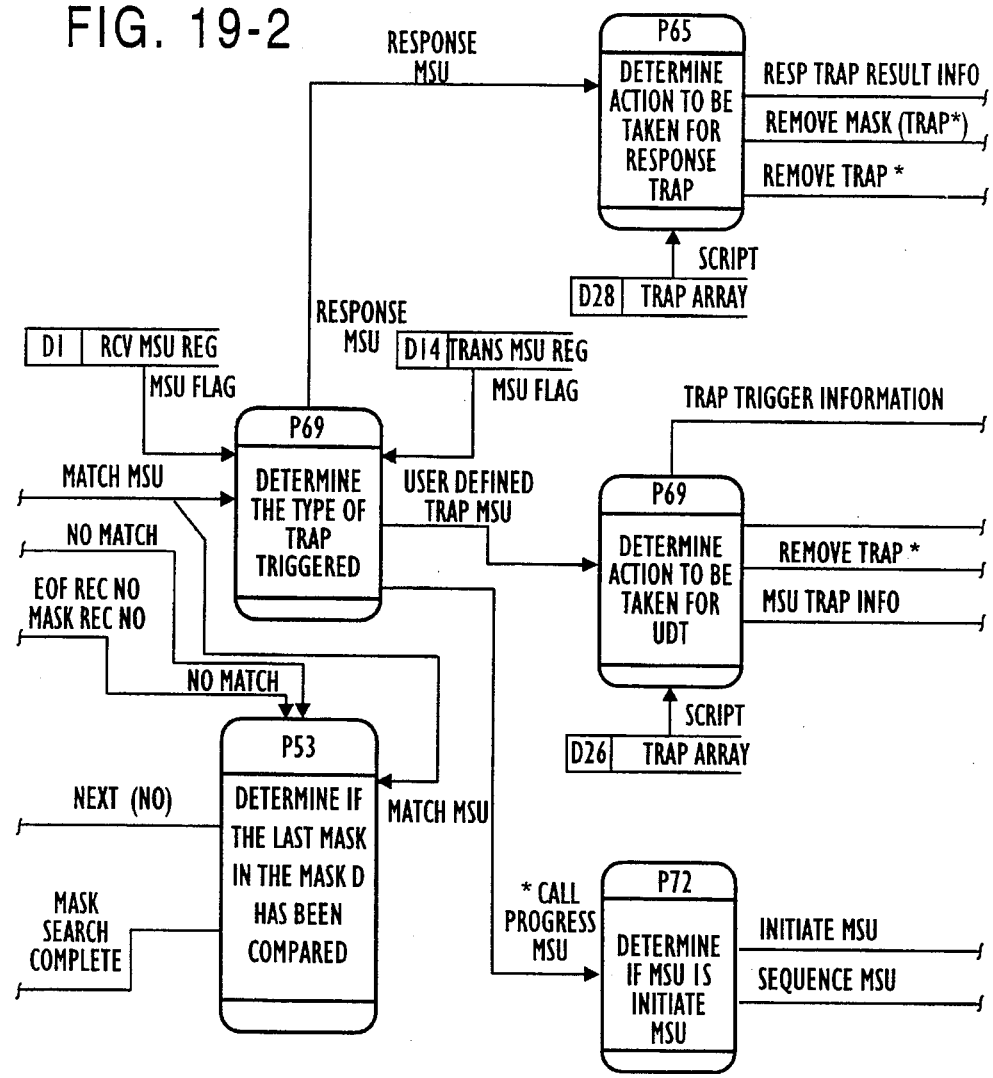
Figure 2:
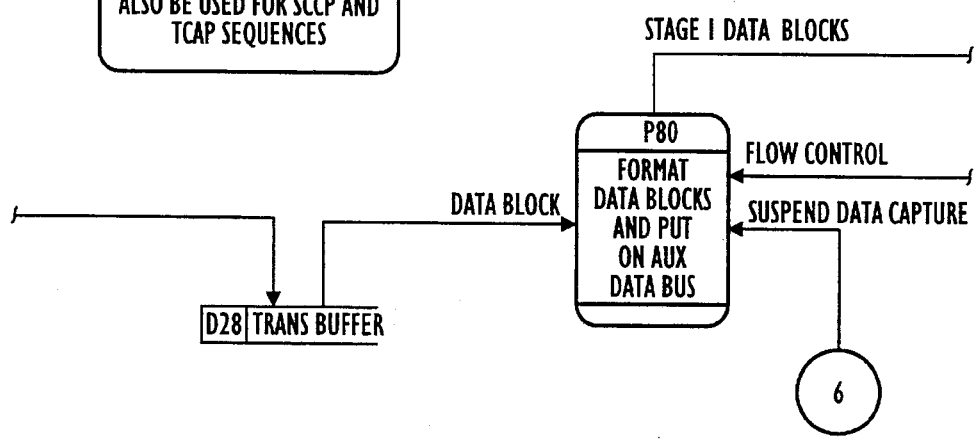
Figures 3, 19:
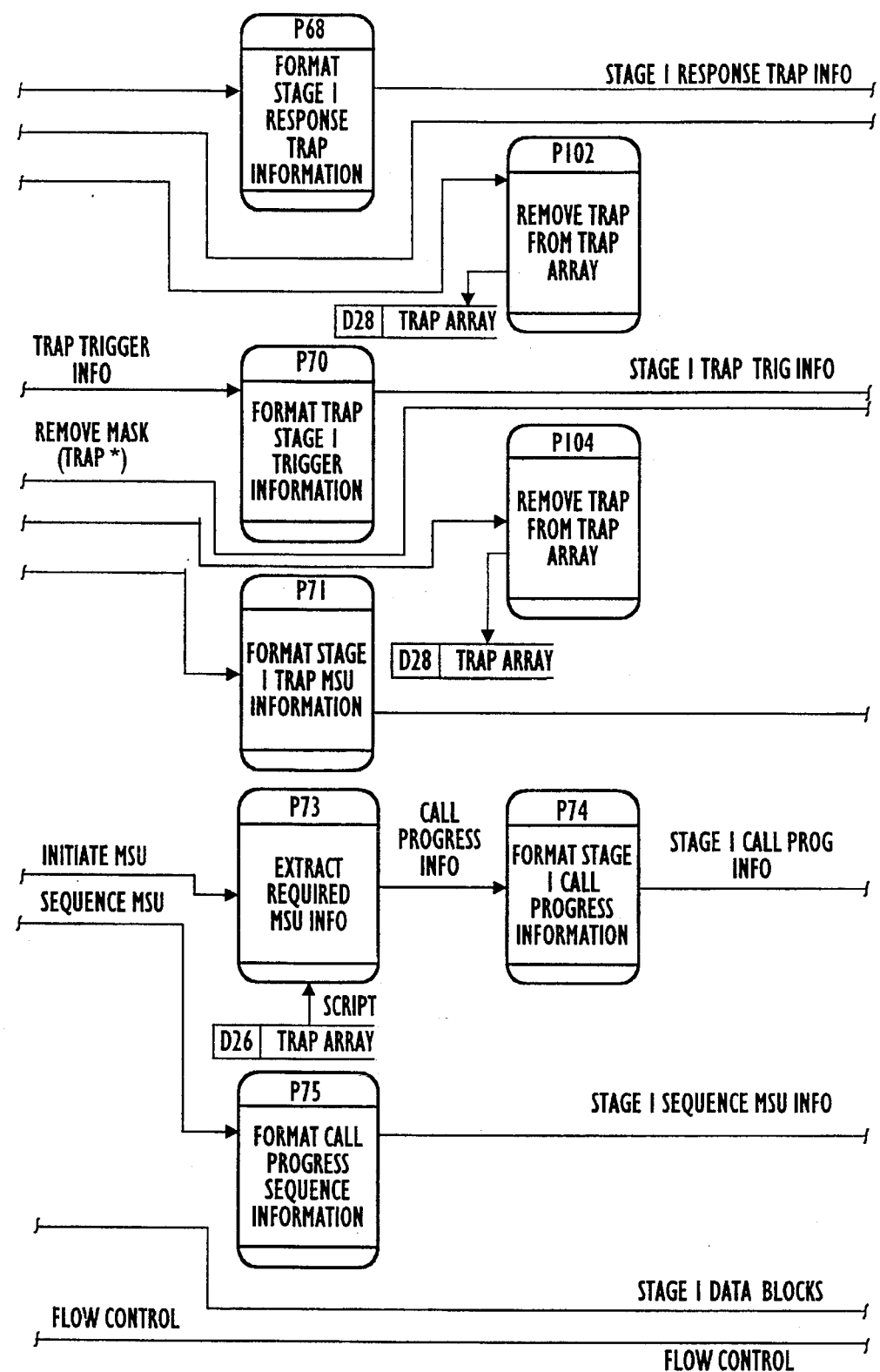
Figures 4, 19:
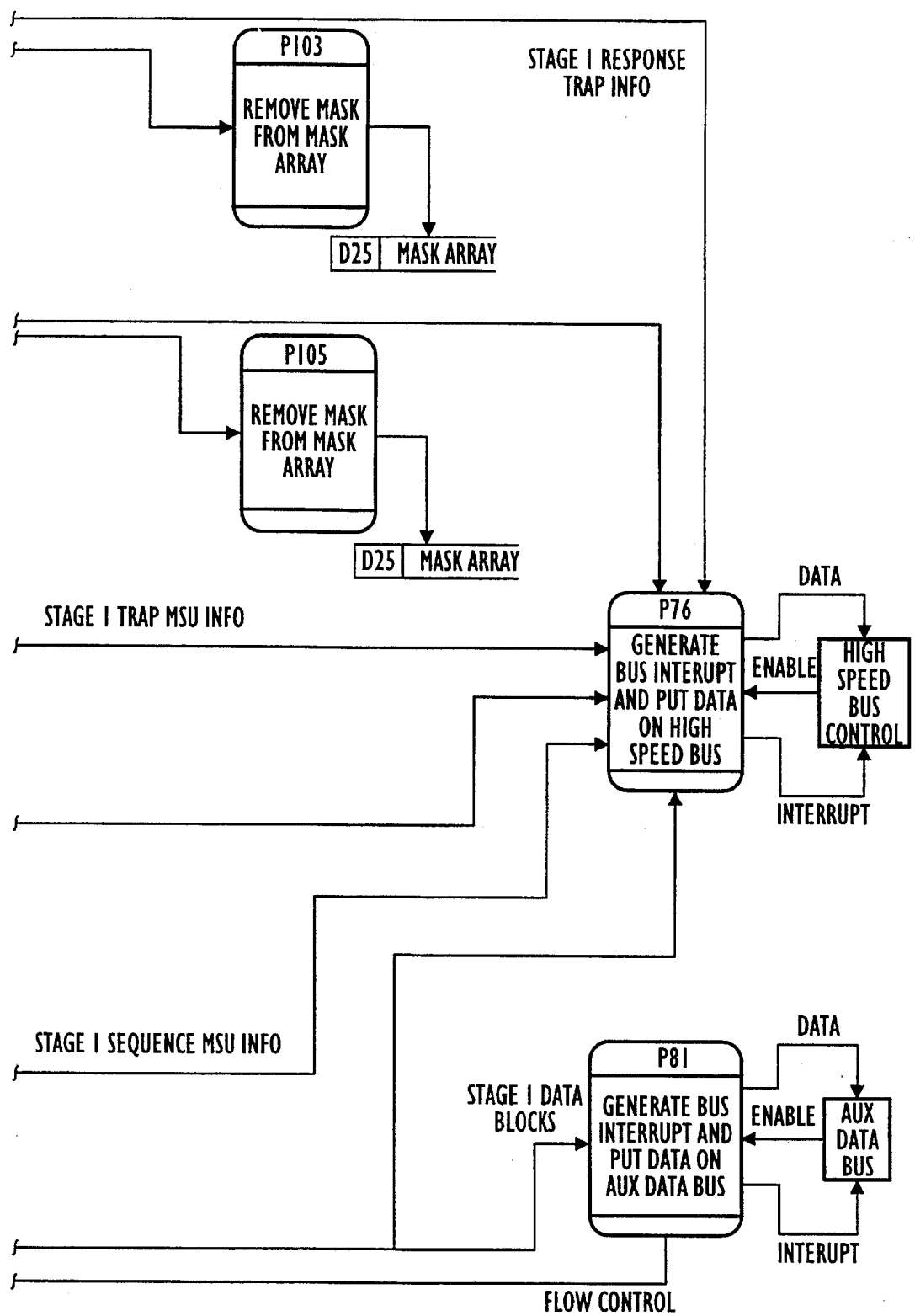
Figures 1, 20:
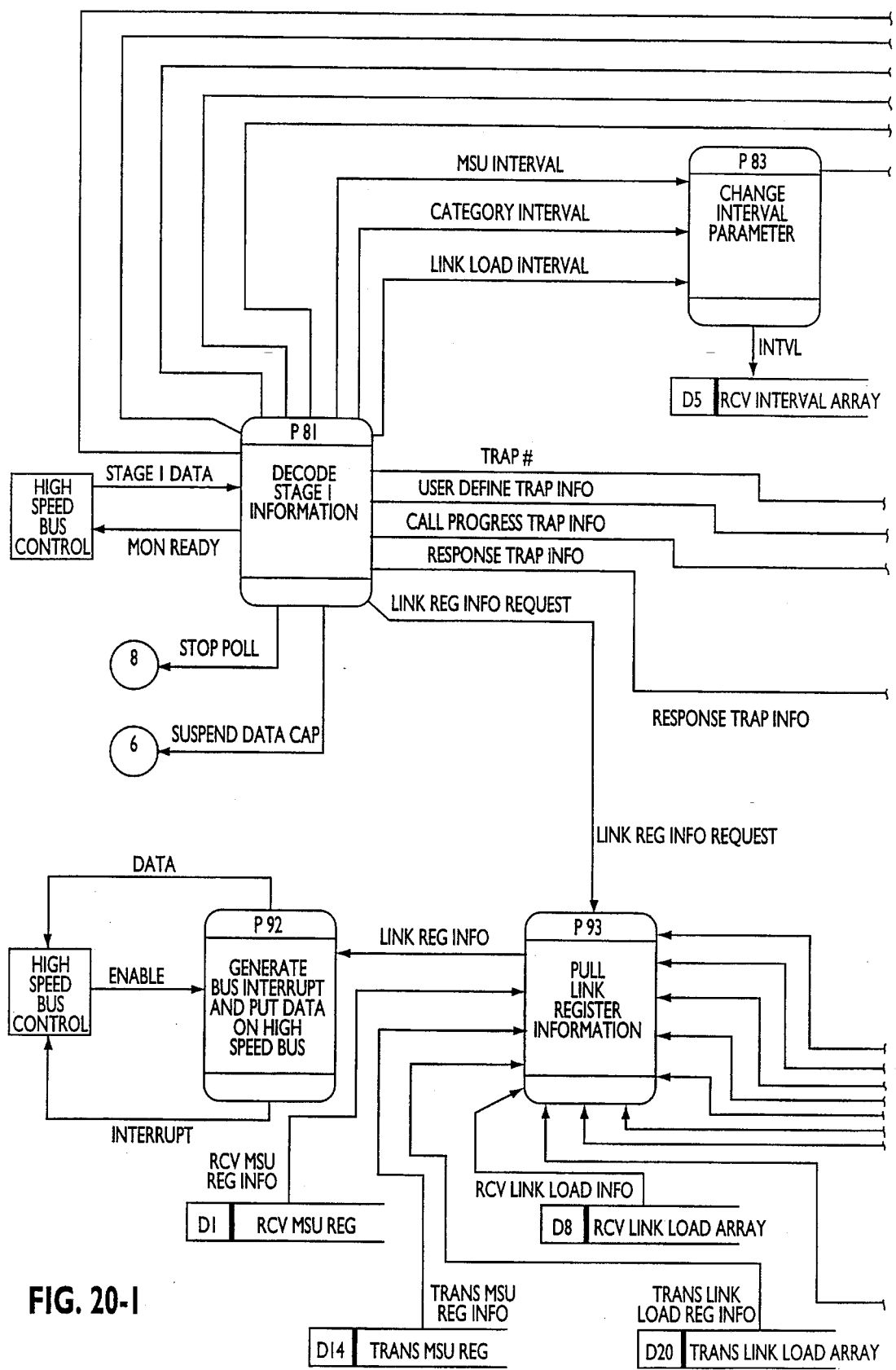
FIG. 20 illustrates the flow in monitor threshold and trap data control.
Figures 2, 20:
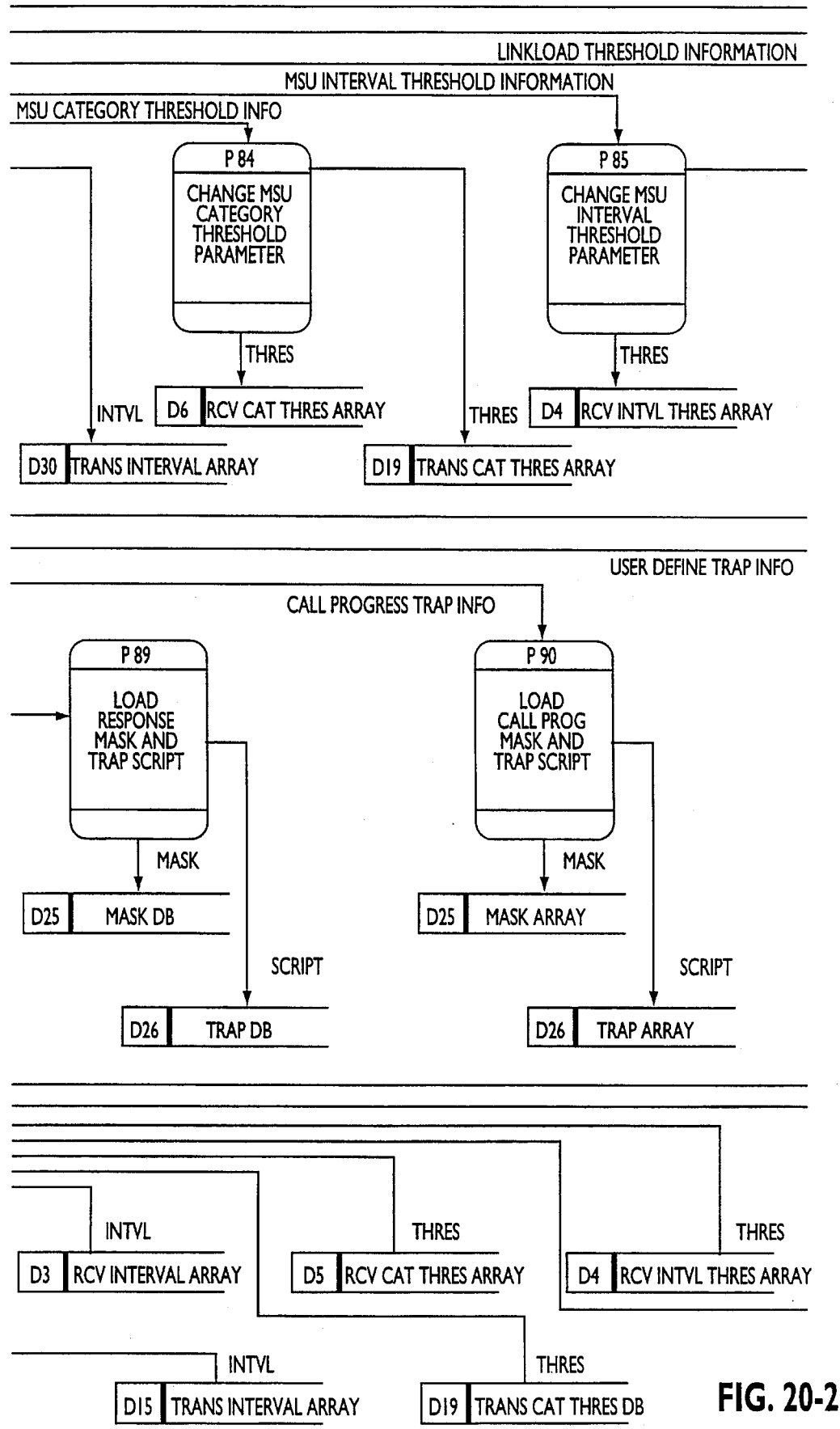
Figures 3, 20:
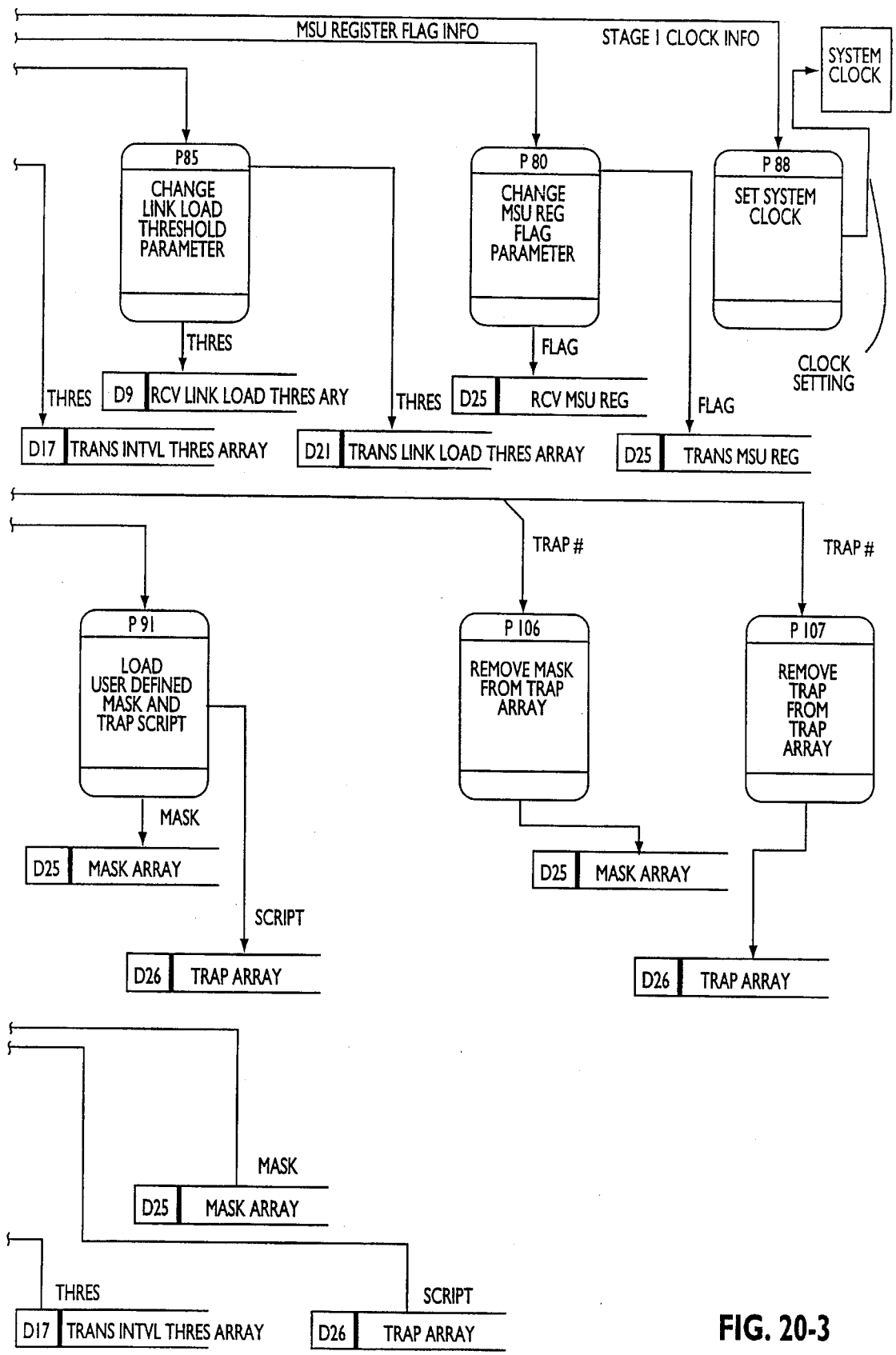
Figures 1, 21:
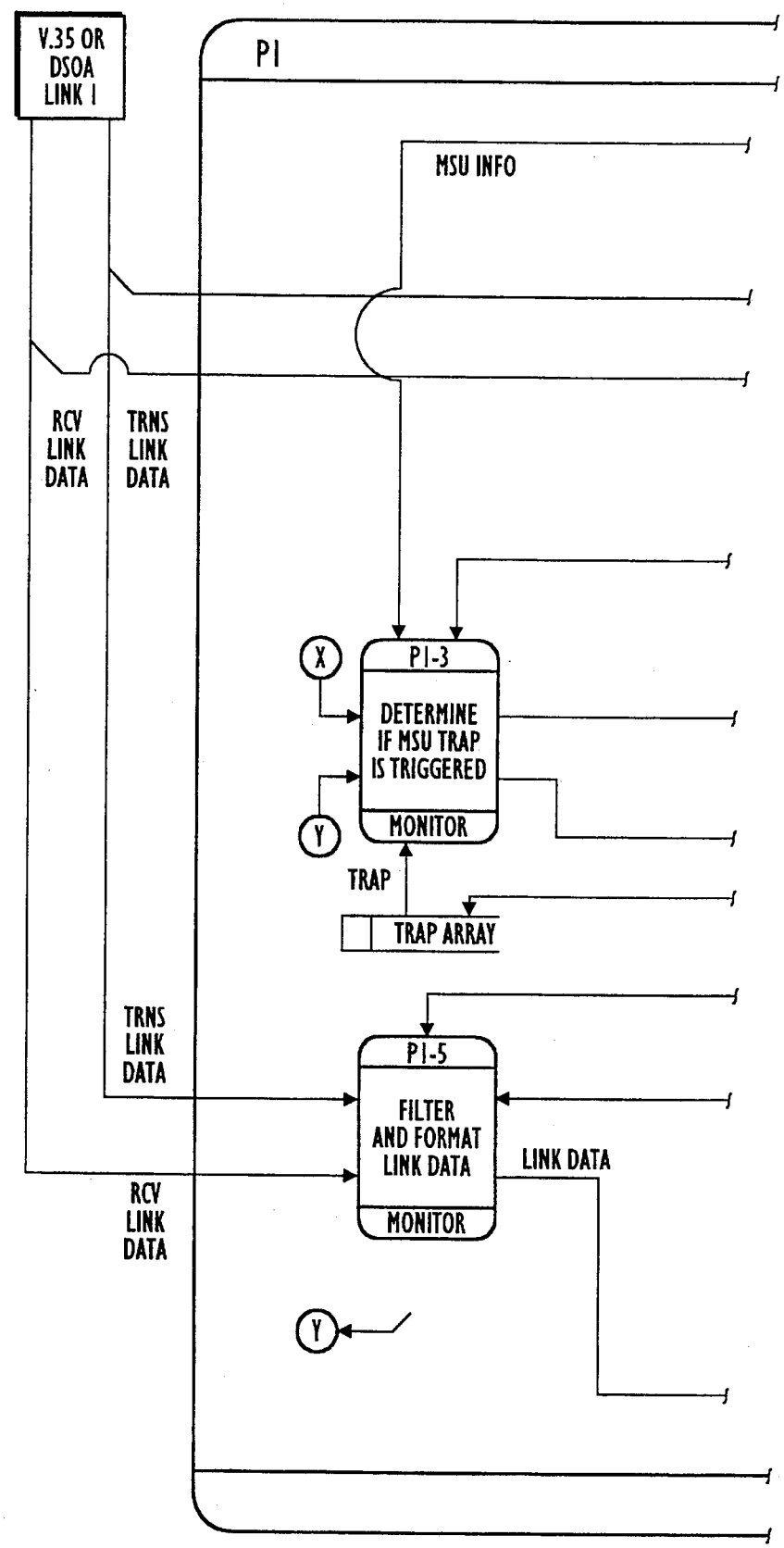
FIG. 21 shows the monitor module flow.
Figures 2, 21:
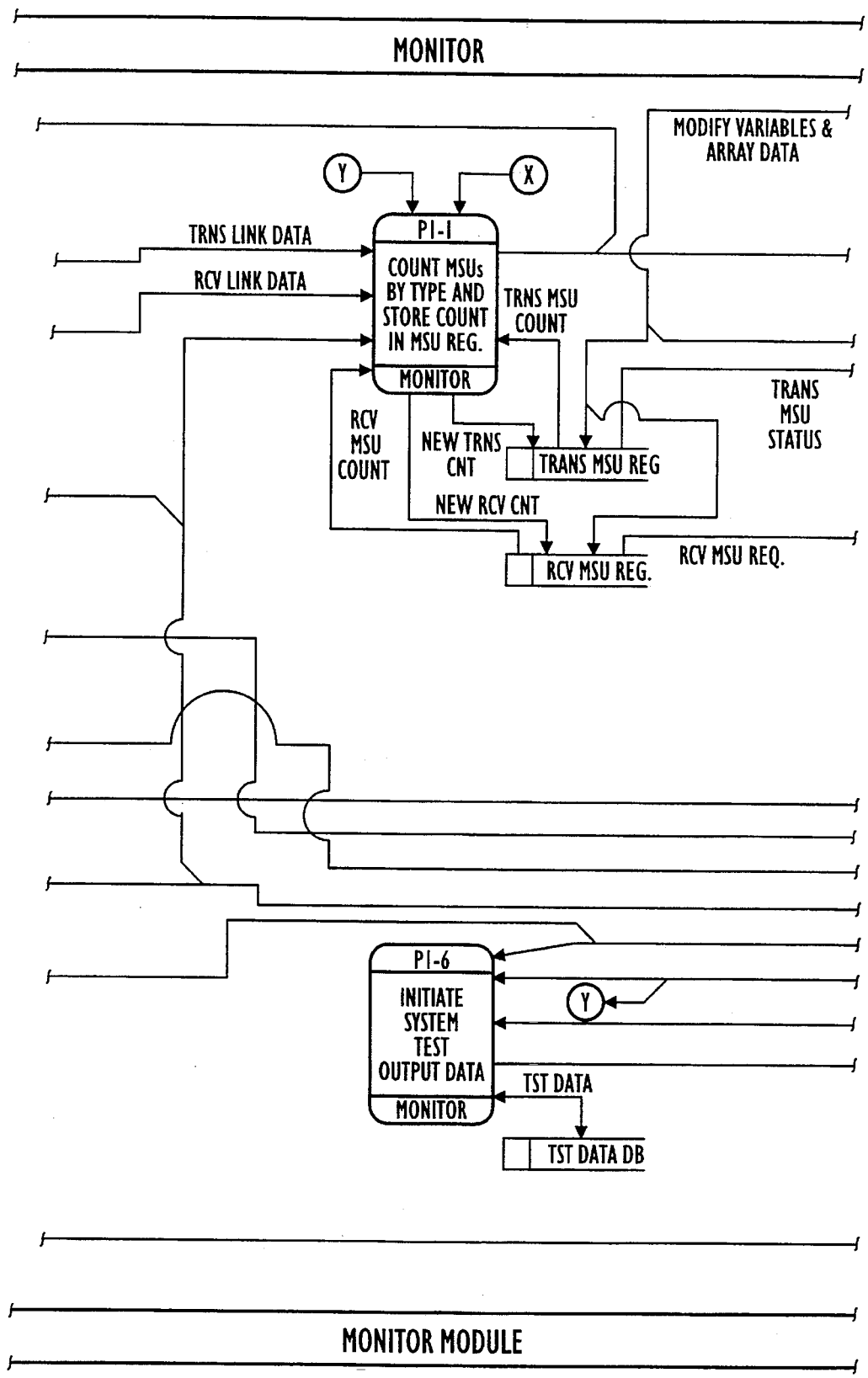
Figures 3, 21:
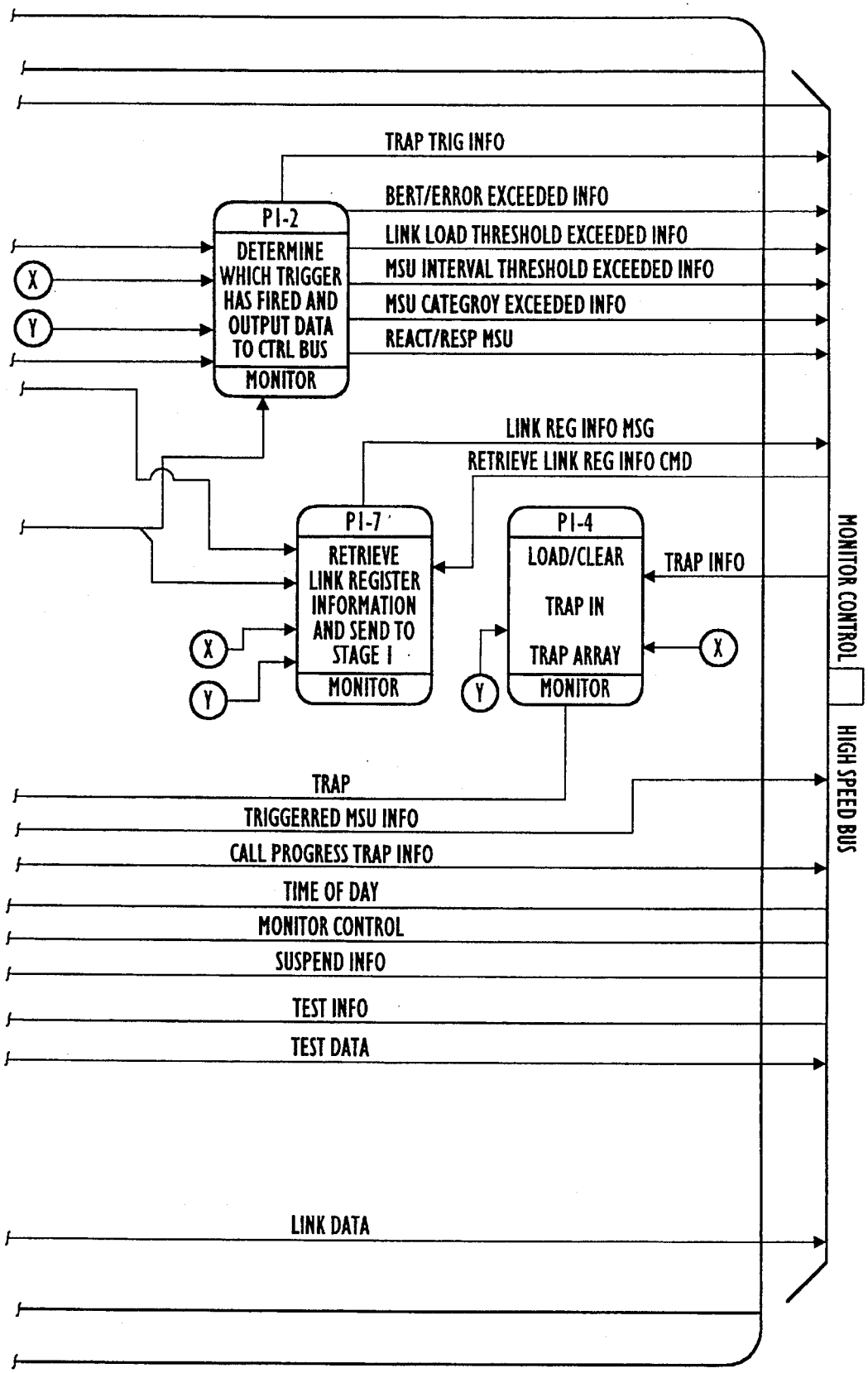
Figures 1, 22:
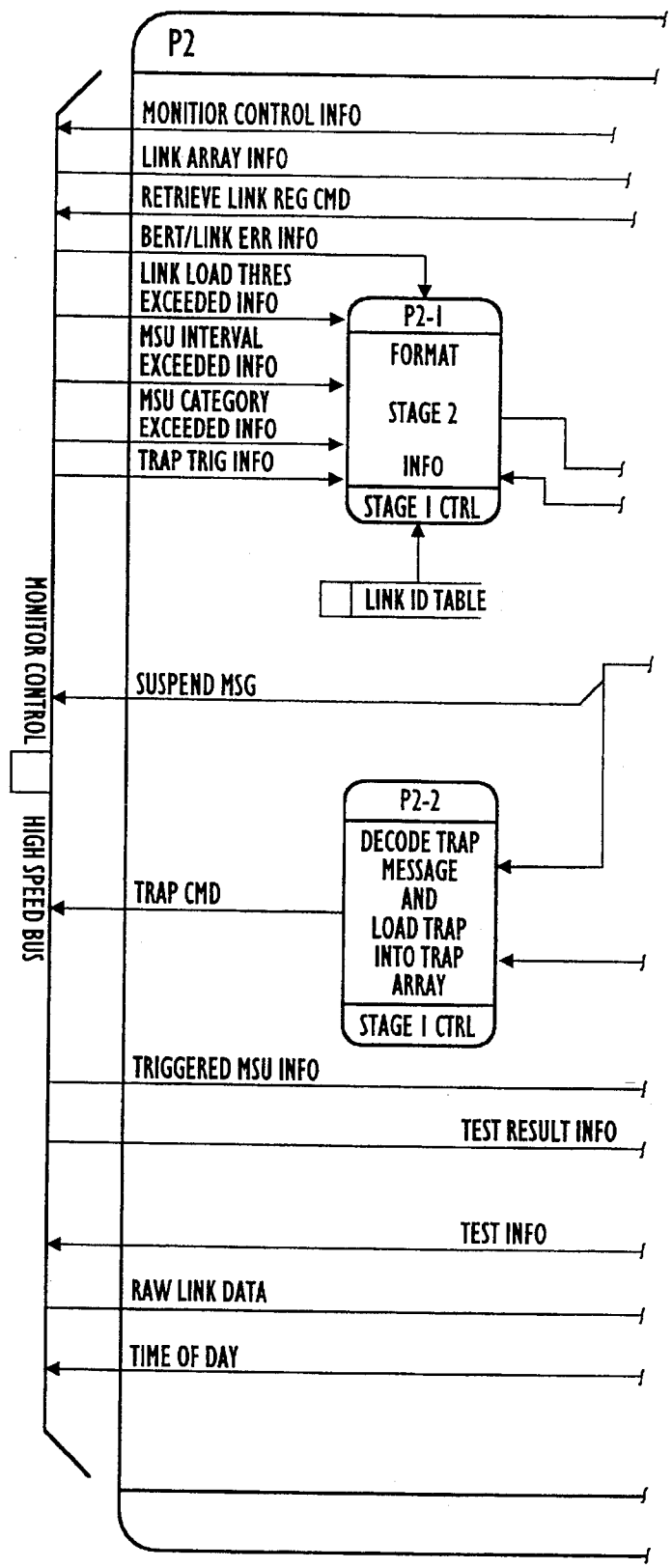
FIGS. 22 and 23 show the Stage 1 Controller flow.
Figures 2, 22:
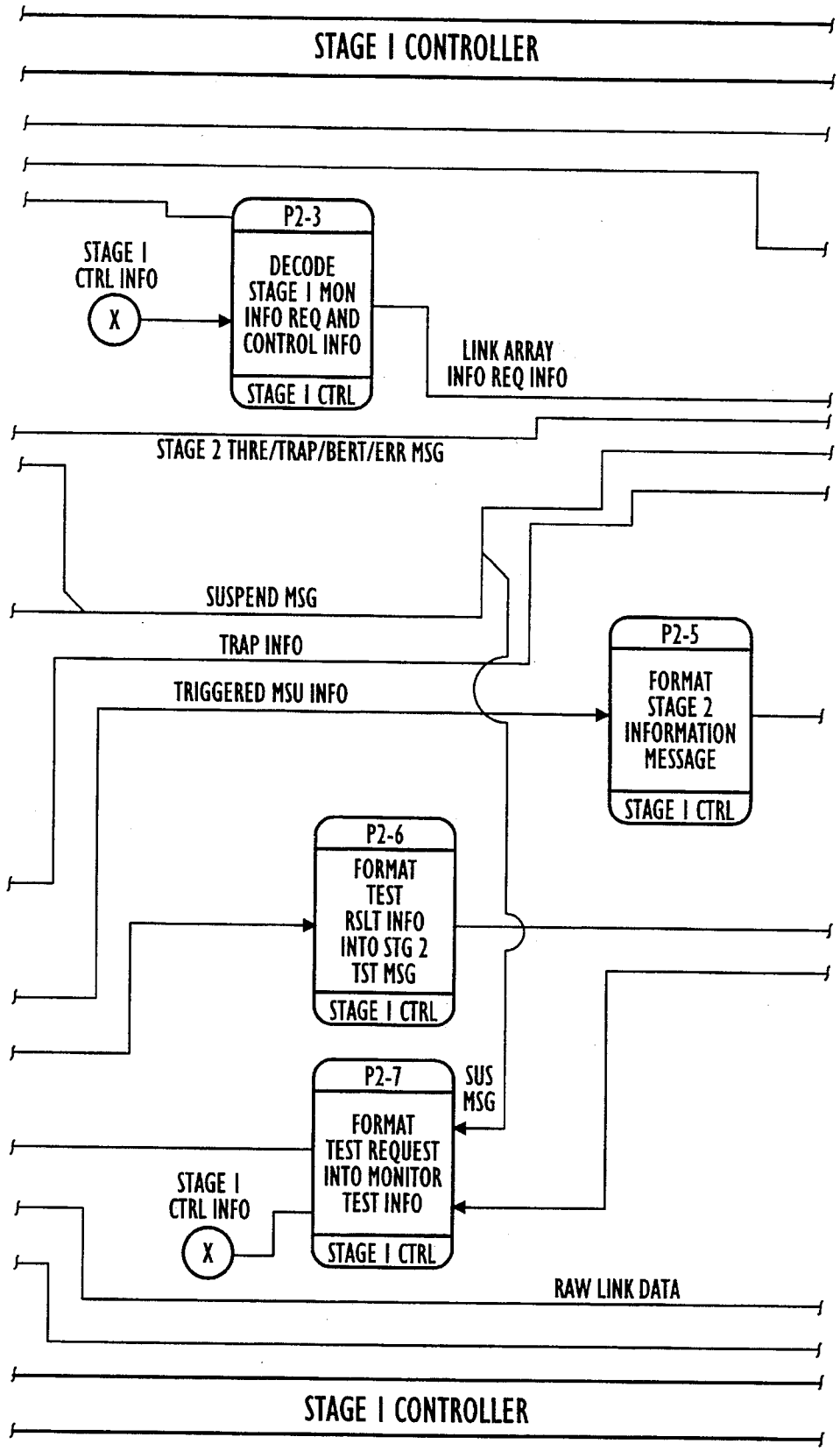
Figures 3, 22:
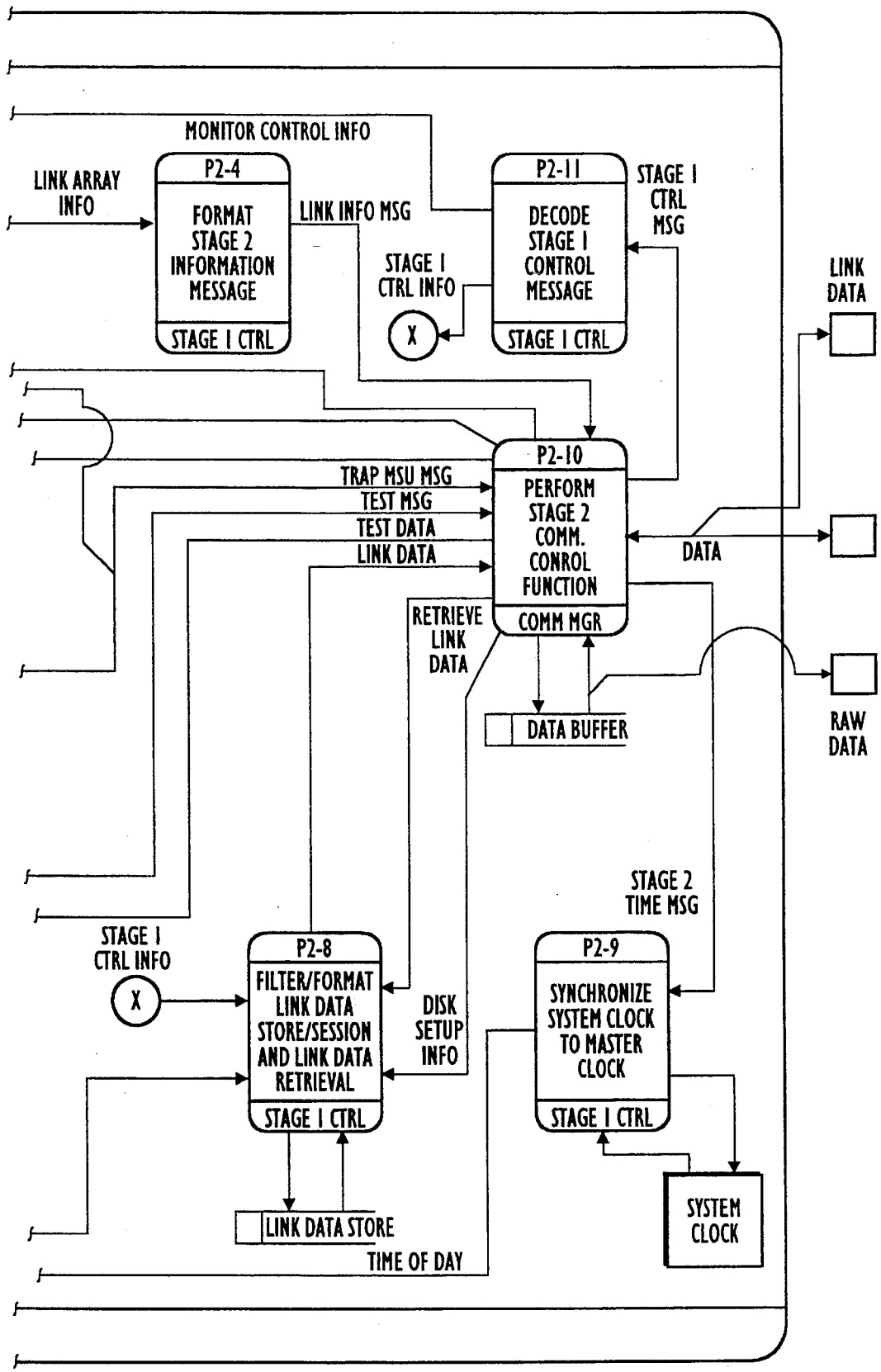
Figures 1, 23:
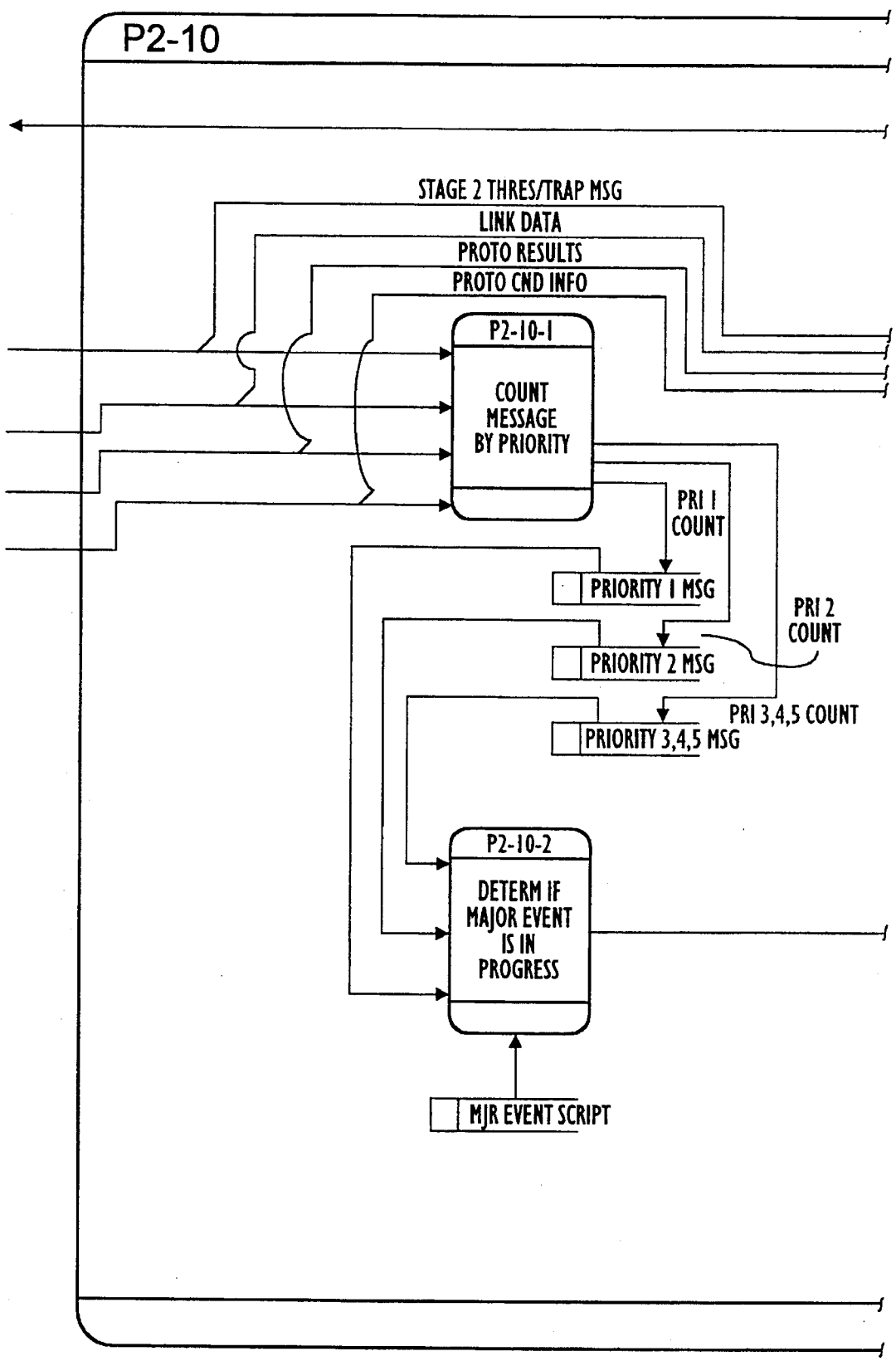
Figures 2, 23:
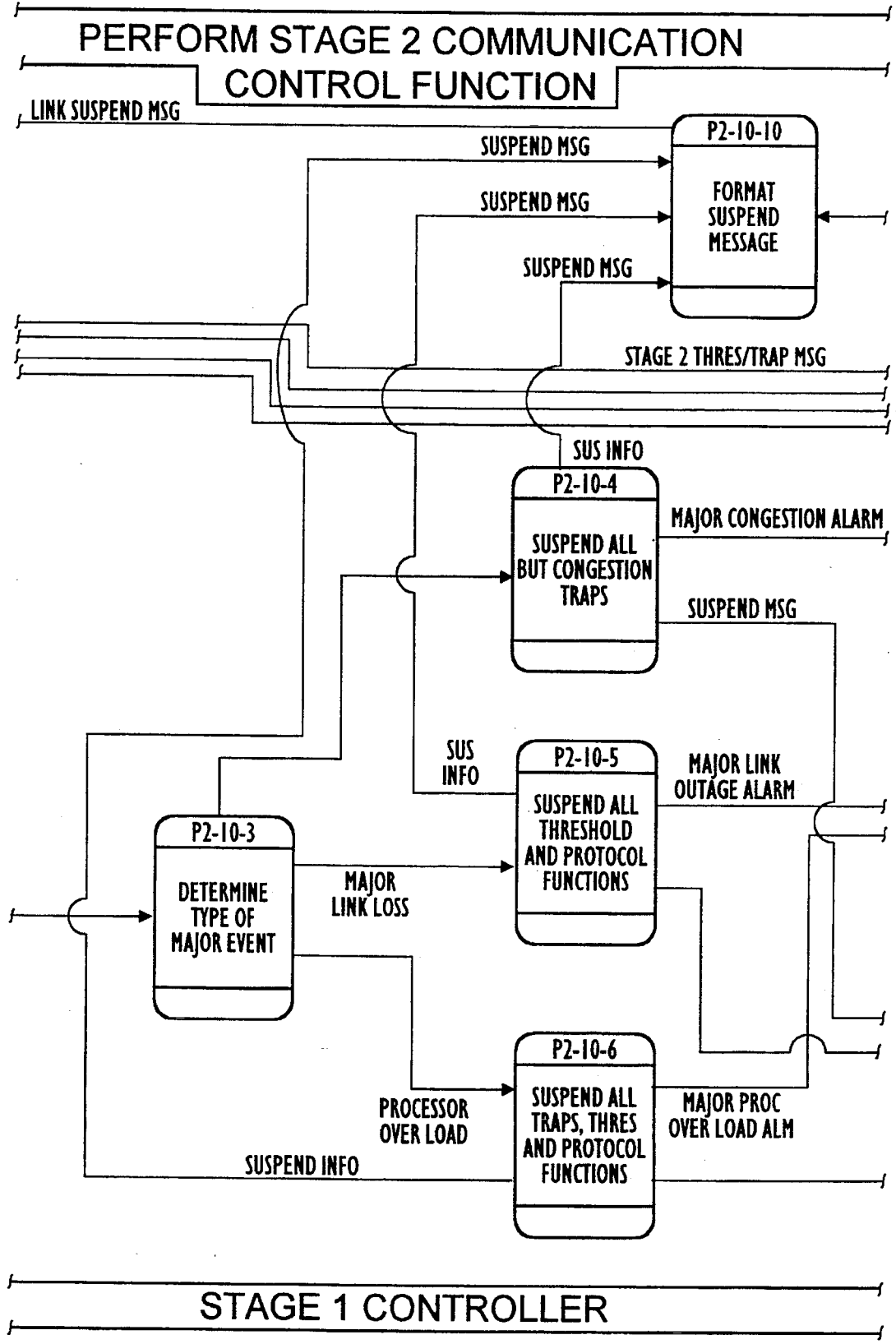
Figures 3, 23:
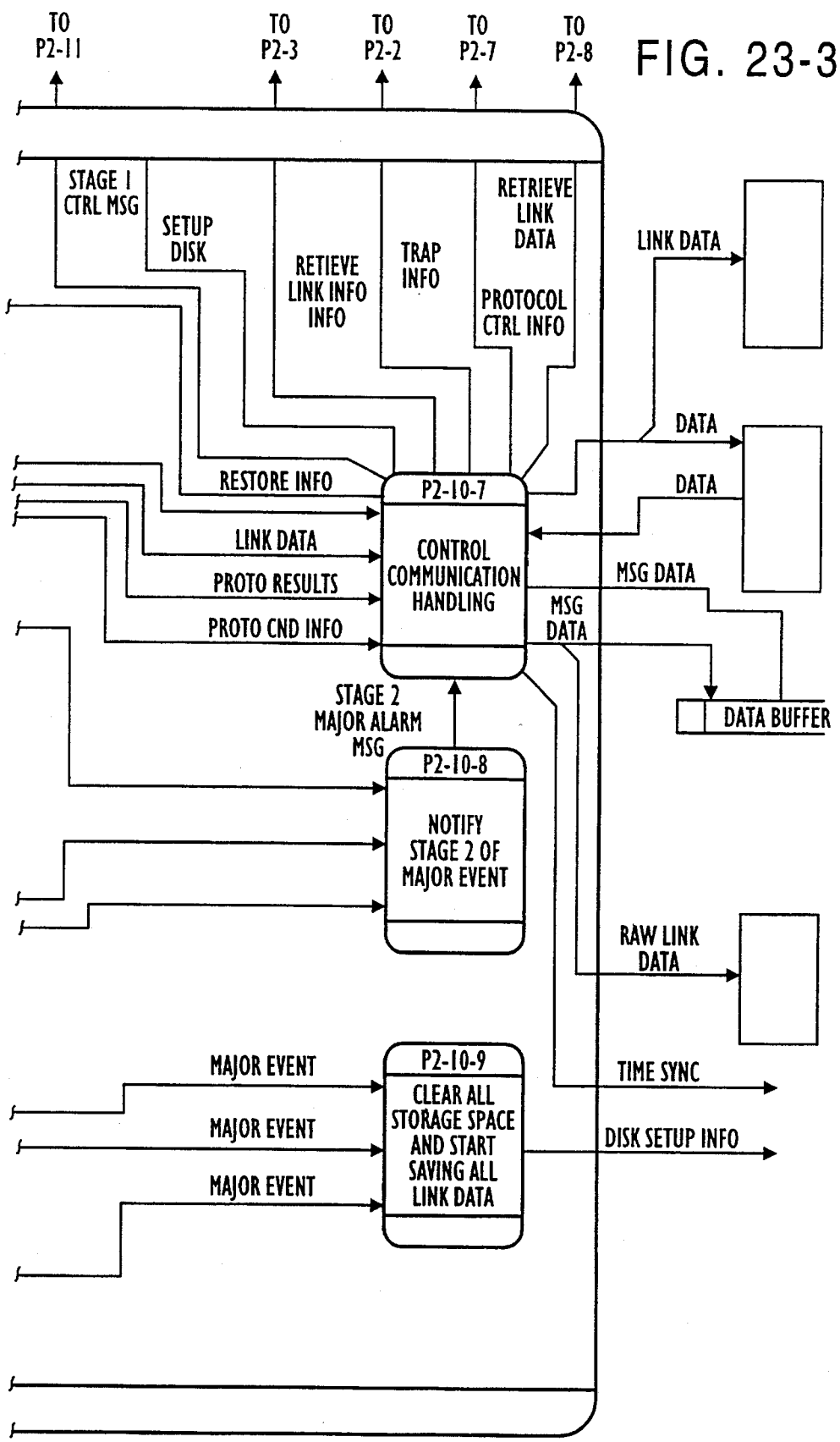

The operation of the monitor is now described and illustrated in flow diagram form in FIGS. 17–23, wherein FIG. 17 shows the receive side of the monitor circuit data flow, FIG. 18 shows the transmit side of the monitor circuit data flow, FIG. 19 shows the SS7 trap detection and link data storage, FIG. 20 shows the monitor threshold and trap data control, FIG. 21 shows the monitor module flow, and FIGS. 22 and 23 show the Stage 1 controller flow.

SS7 link data consists of five basic SS7 Signaling Unit (SU) types:

LSSU - Link Status Signaling Unit
FISU - Fill In Signaling Unit
MSU - Message Signaling Unit
BAD - An errored MSU that failed the Cyclic Redundancy Check (CRC) or message length requirements
ABRT - Eight consecutive ones (11111111)

A FISU arriving at the Receive monitor port is counted. Counts are placed in a "Receive FISU Array" so that pseudo Bit Error Rate Testing (BERT) can be calculated on link receive data. The FISU is then checked to determine if it contains an FSN (Forward Sequence Number), FIB (Forward Indicator Bit), BSN (Backward Sequence Number) and/or BIB (Backward Indicator Bit) change from the previous SU. If a change is indicated, then the FISU is sent to the Stage 1 controller or phase for temporary storage. If there is no difference, it is discarded.

A FISU arriving at the Transmit monitor port is counted. Counts are placed in a "Transmit FISU Array" and then checked to determine if it contains a FSN (Forward Sequence Number), FIB (Forward Indicator Bit), BSN (Backward Sequence Number) and/or BIB (Backward Indicator Bit) change from the previous SU. If a change is indicated, then the FISU is sent to the Stage 1 controller or process for temporary storage. If it is not different, it is discarded.

The Octet length of non-FISU Errored MSUs (BADs and ABRTs) arriving at the Receive monitor port is determined. The resulting Octet Count is added to the contents of the "Receive Error Array".

The Octet length of non-FISU Errored MSUs (BADs and ABRTs) arriving at the Transmit Monitor port is determined. The resulting Octet Count is added to the contents of the "Transmit Error Array".

Legitimate MSUs arriving at both the Receive and Transmit Monitor ports are counted by message type using Message Transport Part (MTP) message information (H0 and H1). Counts are placed in the respective "Receive MSU Registers" and "Transmit MSU Registers" so that total MSU usage can be determined.

The Octet length of legitimate Receive MSUs is added to the contents of the appropriate "Receive Link Load Array". Each record is assigned a user defined link load threshold ("Receive Link Load Threshold Variable"). This threshold can be adjusted at any time by the user or the Monitor's "Poll Array". New thresholds take effect after the next "Check Interval". The count in the record is compared to the "Threshold Variable" at user defined intervals (Check Interval). "Check Intervals" can be changed at any time by either the user or the Monitor's "Poll Array". If a threshold is exceeded, "Receive Link Load Threshold Exceeded" alarm information (Priority 1) is sent to the Stage 1 process. The threshold exceeded information contains the following:

Threshold Type - Link Load
Count - The Octet count of the "Receive Link Load Array" record
Orig - Side of the link that the threshold was exceeded - "Receive"
Time - The time the threshold was exceeded
User ID - Used to determine where the threshold information is to be sent. The default value would be the Stage 2 Controller ID.
Priority - Number from 0 to 5 that identifies the interrupt priority of the information - 1.

When the "Receive Link Load Array" is polled, pseudo BERT calculations are performed. The Octet Counts of the "Receive Error Array" and "Receive Link Load Array" and the "FISU Array" count information is used to calculate BERT performance. The algorithm used to calculate the BERT parameter yields a value that can be related to link level 1 performance. The BERT parameter is compared to a "Link BERT Threshold Variable". If the threshold is exceeded, "Link BERT Threshold Exceeded" information is sent to the Stage 1 process. The threshold exceeded information contains the following:

Threshold Type - Link BERT
Array - Name of Array record
Element - Element number whose threshold was exceeded
Count - The Octet count of the "Receive Error Register" record Orig - Side of the link that the threshold was exceeded - "Receive"

Time - The time the threshold was exceeded

User ID - Used to determine where the threshold information is to be sent. The default value would be the Stage 2 Controller ID.

Priority - Number from 0 to 5 that identifies the interrupt priority of the information - 1.

The Octet length of legitimate Transmit MSU is added to the contents of the appropriate "Transmit Link Load Array" record. Each record is assigned a user defined link load threshold ("Transmit Link Load Threshold Variable"). This threshold can be adjusted at any time by the user or the Monitor's "Poll Array". New thresholds take effect after the next "Check Interval". The count in the record is compared to the "Threshold Variable" at user defined intervals (Check Interval). "Check Intervals" can be changed at any time by either the user or the Monitor's "Poll Array". If a threshold is exceeded, "Transmit Link Load Threshold Exceeded" alarm information (Priority 1) is sent to the Stage 1 Process. The threshold exceeded information contains the following:

Threshold Type - Link Load

Array - Monitor Array whose threshold was exceeded

Element - Element number whose threshold was exceeded

Count - The Octet count of the "Transmit Link Load Array" record

Orig - Side of the link that the threshold was exceeded - "Transmit"

Time - The time the threshold was exceeded

User ID - Used to determine where the threshold information is to be sent. The default value would be the Stage 2 Controller ID.

Priority - Number from 0 to 5 that identifies the interrupt priority of the information - 1.

When the "Transmit Link Load Array" is polled, the "Transmit Error Array" Octet count is compared to the "Error Threshold Variable". If the threshold is exceeded, "Link Error Threshold Exceeded" information is sent to the Stage 1 process. The threshold exceeded information contains the following:

Threshold Type - Link Error

Count - The Octet count of the "Transmit Error Register" record

Orig - Side of the link that the threshold was exceeded - "Transmit"

Time - The time the threshold was exceeded

User ID - Used to determine where the threshold information is to be sent. The default value would be the Stage 2 Controller ID.

Priority - Number from 0 to 5 that identifies the interrupt priority of the information - 1.

The legitimate Receive MSU also adds a one (1) to the contents of the appropriate "Receive MSU Type Interval Array" record. Each record is assigned a user defined message type count threshold ("Receive Interval Threshold Variable"). This threshold can be adjusted at any time by the user of the monitor's "Poll Array". New thresholds take effect after the next "Check Interval". The count in the record is compared to the "Threshold Variable" at user defined intervals (Check Interval). "Check Intervals" can be changed at any time by either the user or the monitor's "Poll Array". If a threshold is exceeded, "Receive (MSU type) Interval Threshold Exceeded" alarm information (Priority 1) is sent to the Stage 1 Process. The threshold exceeded information contains the following:

Threshold Type - MSU Interval

Array - Monitor Array whose threshold was exceeded

Element - Element number whose threshold was exceeded

Count - The count of the "Receive MSU interval Array" record

Orig - Side of the link that the threshold was exceeded - "Receive"

Time - The time the threshold was exceeded

User ID - Used to determine where the threshold information is to be sent. The default value would be the Stage 2 Controller ID.

Priority - Number from 0 to 5 that identifies the interrupt priority of the information - 1.

The legitimate Transmit MSU also adds a one (1) to the contents of the appropriate "Transmit MSU Type Interval Array" record. Each record is assigned a user defined message type count threshold ("Receive Interval Threshold Variable"). This threshold can be adjusted at any time by the user or the monitor's "Poll Array". New thresholds take effect after the next "Check Interval". The count in the record is compared to the "Threshold Variable" at user defined intervals (Check Interval). "Check Intervals" can be changed at any time by either the user or the monitor's "Poll Array". If a threshold is exceeded, "Transmit (MSU type) Interval Threshold Exceeded" alarm information (Priority 1) is sent to the Stage 1 Process. The threshold exceeded information contains the following:

Threshold Type - MSU Interval

Array - Monitor Array whose threshold was exceeded

Element - Element number whose threshold was exceeded

Count - The count of the "Transmit MSU Interval Array" record

Orig - Side of the link that the threshold was exceeded - "Transmit"

Time - The time the threshold was exceeded

User ID - Used to determine where the threshold information is to be sent. The default value would be the Stage 2 Controller ID.

Priority - Number from 0 to 5 that identifies the interrupt priority of the information - 1.

The legitimate Receive MSU is identified as belonging to an SS7 Message Category. Once identified, a one (1) is added to the contents of the appropriate "Receive MSU Category Array" record. Each record is assigned a user defined MSU Category count threshold ("Receive Category Threshold Variable"). This threshold can be adjusted at any time by the user or the monitor's "Poll Array". New thresholds take effect after the next "Check Interval". The count in the record is compared to the "Threshold Variable" at user defined intervals (Check Interval). "Check Intervals" can be changed at any time by either the user or the monitor's "Poll Array". If a threshold is exceeded, "Receive MSU Category Interval Threshold Exceeded" alarm information (Priority 1) is sent to the Stage 1 Process. The threshold exceeded information contains the following:

Threshold Type - MSU Category

Array - Monitor Array whose threshold was exceeded

Element - Element number whose threshold was exceeded

Count - The count of the "Receive MSU Category Array" record

Orig - Side of the link that the threshold was exceeded - "Receive"

Time - The time the threshold was exceeded

User ID - Used to determine where the threshold information is to be sent. The default value would be the Stage 2 Controller ID.

Priority - Number from 0 to 5 that identifies the interrupt priority of the information - 1.

The MSU Categories contain the following:

Link Signaling MSUs (LSSU)
Network Management MSUs (NMSU)
Integrated Services User Part (ISUP)
Signaling Connection Control Part (SCCP)
Transaction Capabilities Application Part (TCAP)

The legitimate Transmit MSU is identified as belonging to an SS7 Message Category. Once identified, a one (1) is added to the contents of a "Transmit MSU Category Array". An array record is designated for each SS7 MSU Category. Each array record is assigned a user defined MSU Category count threshold ("Transmit Category Threshold Variable"). This threshold can be adjusted at any time by the user or the monitor's "Poll Array". New thresholds take effect after the next "Check Interval". The count in the record is compared to the "Threshold Variable" at user defined intervals (Check Interval). "Check Intervals" can be changed at any time by either the user or the monitor's "Poll Array". If a threshold is exceeded, "Transmit MSU Category Interval Threshold Exceeded" alarm information (Priority 1) is sent to the Stage 1 Process. The threshold exceeded information contains the following:

Threshold Type - MSU category
Array - Monitor Array whose threshold was exceeded
Element - Element number whose threshold was exceeded
Count - The count of the "Transmit MSU Category Array" record
Orig - Side of the link that the threshold was exceeded - "Transmit"
Time - The time the threshold was exceeded
User ID - Used to determine where the threshold information is to be sent. The default value would be the Stage 2 Controller ID.
Priority - Number from 0 to 5 that identifies the interrupt priority of the information - 1.

MSU Categories contain the following:
Link Signaling MSUs (LSSU)
Network Management MSUs (NMSU)
Integrated Services User Part (ISUP)
Signaling Connection Control Part (SCCP)
Transaction Capabilities Application Part (TCAP)

Polling of the Link Load, MSU Interval and MSU Category Arrays is performed by scanning the Poll Array. A record in the Poll Array holds polling and interval information for one of the other Arrays. There can be multiple records for each of the other Arrays to facilitate the change of interval values at different times of the day. The Polling Array is loaded using "Poll Array Modify Information" from the Stage 1 process. The "Poll Array Modify Information" contains the following:

Array ID - Array that the poll information is for
RECNO - Record number in the Array that the poll information is for
Start Time - Time the Poll Interval is valid
End Time - The latest time the Poll Interval value is valid
Poll Interval - Time, in milliseconds, of the interval "MSU Interval Threshold Variables" can be changed using "Modify MSU Interval Variable Information" sent from the Stage 1 process. There are two types of thresholds, High and Low. Both thresholds are verified when the "MSU Interval Array" is polled. The "MSU Interval Threshold Variables" contains the following:

VAR ID - The number or name assigned to the Variable
VAR Type - High threshold or Low Threshold
VAR Data - The threshold's value "MSU Category Threshold Variables" can be changed using "Modify MSU Category Threshold Variable Information" sent from the Stage 1 process. There are two types of thresholds, High and Low. Both thresholds are verified when the "MSU Category Array" is polled.

The "MSU Category Threshold Variables" contain the following:
VAR ID - The number or name assigned to the Variable
VAR Type - High threshold or Low Threshold
VAR Data - The threshold's value "Link Load Threshold Variables" can be changed using "Modify Link Load Threshold Variable Information" sent from the Stage 1 process. There are two types of thresholds, High and Low. Both thresholds are verified when the "Link Load Array" is polled. The "Link Load Threshold Variables" contains the following:

VAR ID - The number or name assigned to the Variable
VAR Type - High threshold or Low Threshold
VAR Data - The threshold's value "BERT Threshold Variables" can be changed using "Modify BERT Threshold Variable Information" sent from the Stage 1 process. There is only a High Threshold provided for this threshold. The threshold is verified when the "Receive Errored MSU Array" is polled. The "BERT Threshold Variable" contains the following:

VAR ID - The number or name assigned to the Variable
VAR Type - High threshold
VAR Data - The threshold's value "Link Error Threshold Variables" can be changed using "Modify Link Error Threshold Variable Information" sent from the Stage 1 process. There is only a High Threshold provided for this threshold. The threshold is verified when the "Link Error Array" is polled. The "Link Error Threshold Variable" contains the following:

VAR ID - The number or name assigned to the Variable
VAR Type - High threshold
VAR Data - The threshold's value MSUs specified by the user will be designated as Reactive MSUs. When an MSU arrives at either the transmit or receive monitor leads, it is counted and the "Reactive MSU Information" (Priority 1) is sent to the Stage 1 process for processing. The Reactive MSU Information contains the following:

MSU - Complete MSU including header information. Flags can be removed.
Type - Type of MSU. Either Reactive or Response.
Time - Time the "Reactive MSU" was detected by the monitor
Origin - Side of the link that the MSU was detected - Receive/Transmit
User ID - Used to determine where the threshold information is to be sent. The default value would be the Stage 2 Controller ID.
Priority - Number from 0 to 5 that identifies the interrupt priority of the information - 1.

MSUs specified by the user will be designated as Response MSUs. When an MSU arrives at either the transmit or receive monitor leads, it is counted and the "Response MSU Information" (Priority 1) is sent to the Stage 1 process for processing. The Response MSU Information contains the following:

MSU - Complete MSU including header information. Flags can be removed.
Type - Type of MSU. Either Reactive or Response.
Time - Time the "Reactive MSU" was detected by the monitor
Origin - Side of the link that the MSU was detected - Receive/Transmit
User ID - Used to determine where the threshold information is to be sent. The default value would be the Stage 2 Controller ID.

Priority - Number from 0 to 5 that identifies the interrupt priority of the information - 1.

A minimum of 32 Response Traps can be placed in a monitor. Trapping can be performed on any or all of the fixed or variable fields in the MTP, ISUP, SCCP or TCAP parts of the MSU. Traps that are triggered send either "Response Trap Triggered Information" (Priority 1) or "Response Trap MSU Triggered Information" (Priority 1 or 2) to the Stage 1 Process. The "Response Trap Triggered Information" and "Response Trap MSU Triggered Information" contains the following:

Trap # - Number assigned to the trap when it was generated

MSU - Complete MSU including header information. Flags can be removed.

Type - Type of Trap Triggered. Response, User defined, or Call Progress.

Time - Time the "Reactive MSU" was detected by the monitor

Origin - Side of the link that the MSU was detected - Receive/Transmit

Priority - Number from 0 to 5 that identifies the interrupt priority of the information - 2

User ID - Used to determine where the trap information is to be sent. The default value would be the Stage 2 Controller ID.

OR

Trap # - Number assigned to the trap when it was generated

Trigger Info - Information about the Trap trigger.

Type - Type of Trap Triggered. Response, User defined, or Call Progress.

Time - Time the "Reactive MSU" was detected by the monitor

Origin - Side of the link that the MSU was detected - Receive/Transmit

Priority - Number from 0 to 5 that identifies the interrupt priority of the information - 2

User ID - Used to determine where the trap information is to be sent. The default value would be the Stage 2 Controller ID.

A Response Trap is loaded into the monitor via "Response Trap Information" sent from the Stage 1 Process. "Response Trap Information", contains the following:

Trap # - Number assigned to the trap when it was generated

Mask - A representation of the MSU to be trapped, populated with the MSU field(s) values to be trapped on. If the Mask populated values match the equivalent MSU field values, a trap trigger indication is generated.

Script - A set of instructions used by the monitor to handle the information supplied by the trapped MSU. Note: this function could be handled by the Stage 1, 2, 3 or 4 Process if the MSU is sent to the appropriate Process when triggered.

Type - Type of Trap Triggered. Response, User defined, or Call Progress.

Origin - Side of the link that the MSU is to be trapped on - Receive/Transmit

Priority - Number from 0 to 5 that identifies the interrupt priority of the information - 1.

User ID - Used to determine where the trap information is to be sent. The default value would be the Stage 2 Controller ID.

A minimum of 32 user defined traps can be placed in the monitors. Trapping can be performed on any or all of the fixed or variable fields in the MTP, ISUP, SCCP or TCAP of the MSU. Traps that are triggered send either User Defined Trap Triggered information (Priority 2) or a User Defined MSU Msg (Priority 2) to the Stage 1 Process. The "User Defined Trap Triggered Information" contains the following:

Trap # - Number assigned to the trap when it was generated

MSU - complete MSU including header information. Flags can be removed.

Type - Type of Trap Triggered. Response, User defined, or Call Progress.

Time - Time the "Reactive MSU" was detected by the monitor

Origin - Side of the link that the MSU was detected - Receive/Transmit

Priority - Number from 0 to 5 that identifies the interrupt priority of the information - 2.

User ID - Used to determine where the trap information is to be sent. The default value would be the Stage 2 Controller ID.

OR

Trap # - Number assigned to the trap when it was generated

Trigger Info - Information about the trap trigger

Type - Type of Trap Triggered. Response, User defined, or Call Progress.

Time - Time the "Reactive MSU" was detected by the monitor

Origin - Side of the link that the MSU was detected - Receive/Transmit

Priority - Number from 0 to 5 that identifies the interrupt priority of the information - 2.

User ID - Used to determine where the trap information is to be sent. The default value would be the Stage 2 Controller ID.

A User Defined Trap is loaded into the monitor via "User Defined Trap Information" sent from the Stage 1 Process. "User Defined Trap Information" contains the following:

Trap # - Number assigned to the trap when it was generated

Mask - A representation of the MSU to be trapped, populated with the MSU field(s) values to be trapped on. If the Mask populated values match the equivalent MSU field values, a trap trigger indication is generated.

Script - A set of instructions used by the monitor to handle the information supplied by the trapped MSU. Note: this function could be handled by the Stage 1, 2, 3 or 4 Process if the MSU is sent to the appropriate Process when triggered.

Type - Type of Trap Triggered. Response, User defined, or Call Progress.

Origin - Side of the link that the MSU is be trapped on - Receive/Transmit

Priority - Number from 0 to 5 that identifies the interrupt priority of the information - 1.

User ID - Used to determine where the trap information is to be sent. The default value would be the Stage 2 Controller ID.

A minimum of 8 ISUP Call Progress traps can be placed in the monitor. Call Progress Traps consist of two related traps, an "Initial MSU Trap" and a "Sequence MSU Trap". When the "Initial MSU Trap" is triggered, "Call Progress Initial MSU Trap Triggered Information" is sent to the Stage 1 Process. When the "Sequence MSU Trap" is triggered, "Call Progress Sequence MSU Trap Triggered Information" is sent to the Stage 1 Process. The "Call Progress Initiate and Sequence Trap Triggered Information" contains the following:

Trap # - Number assigned to the trap when it was generated

MSU - Complete MSU including header information. Flags can be removed.

Type - Type of Trap Triggered. Response, User defined, or Call Progress.

Time - Time the "Reactive MSU" was detected by the monitor

Origin - Side of the link that the MSU was detected - Receive/Transmit.

Priority -Number from 0 to 5 that identifies the interrupt priority of the information - 3.

User ID - Used to determine where the trap information is to be sent. The default value would be the Stage 2 Controller ID.

A Call Progress Initiate and Sequence MSU Trap is loaded into the monitor via "Call Progress Trap Information" sent from the Stage 1 Process. "Call Progress Trap Information" contains the following:

Trap # - Number assigned to the trap when it was generated

Mask - A representation of the MSU to be trapped, populated with the MSU field(s) values to be trapped on. If the Mask populated values match the equivalent MSU field values, a trap trigger indication is generated.

Script - Tells the monitor to send the trapped MSU to the user

Type - Type of Trap Triggered. Response, User defined, or Call Progress.

Origin - Side of the link that the MSU is to be trapped on - Receive/Transmit

Priority - Number from 0 to 5 that identifies the interrupt priority of the information - 1.

User ID - Used to determine where the trap information is to be sent. The default value would be the Stage 2 Controller ID.

"Call Progress Initiate MSU Trap Disable Information" is sent from the Stage 1 Process to disable the Initiate MSU Trap. This contains the following:

Trap # - Number assigned to the trap when it was generated

Type - Trap

Action - Action to be taken by the Stage 1 or Monitor Process

Disable Call Progress Initiate Trap

Priority - Number from 0 to 5 that identifies the interrupt priority of the information - 1

User ID - Used to determine where the trap information is to be sent. The default value would be the Stage 2 Controller ID.

"Call Progress Initiate MSU Trap Enable Information" is sent from the Stage 1 Process to enable the "Initiate MSU Trap". This contains the following:

Link ID - Numeric designation for the link monitor that is experiencing the trouble CTRL Unit - The Stage 1 Controller ID that the monitor is controlled from Trap # - Number assigned to the trap when it was generated Type - Trap Action - Action to be taken by the Stage 1 or Monitor Process Enable Call Progress Initiate Trap Priority - Number from 0 to 5 that identifies the interrupt priority of the information - 1.

User ID - Used to determine where the trap information is to be sent. The default value would be the Stage 2 Controller ID.

"Call Progress Sequence MSU Trap Clear Information" is sent from the Stage 1 Process to remove or clear all "Sequence MSU Traps". This contains the following:

Link ID - Numeric designation for the link monitor that is experiencing the trouble CTRL Unit - The Stage 1 Controller ID that the monitor is controlled from Trap # - Number assigned to the trap when it was generated Type - Trap Action - Action to be taken by the Stage 1 or Monitor Process Clear Call Progress Sequence Trap Priority - Number from 0 to 5 that identifies the interrupt priority of the information - 1.

User ID - Used to determine where the trap information is to be sent. The default value would be the Stage 2 Controller ID.

"Call Progress Initiate MSU Trap Clear Information" is sent from the Stage 1 Process to remove or clear "Initiate MSU Trap" and "Sequence MSU Traps". This contains the following:

Link ID - Numeric designation for the link monitor that is experiencing the trouble CTRL Unit - The Stage 1 Controller ID that the monitor is controlled from Trap # - Number assigned to the trap when it was generated Type - Trap Action - Action to be taken by the Stage 1 or Monitor Process Clear Call Progress Initiate Trap Priority - Number from 0 to 5 that identifies the interrupt priority of the information - 1.

User ID - Used to determine where the trap information is to be sent. The default value would be the Stage 2 Controller ID.

"Monitor Control Information" contains the following:

Priority - A number representing the interrupt priority of the message

Command: Instructions that the monitor can interpret describing the action to be taken. Actions to be taken can be:

Stop All Reactive Traps

Stop All Response Traps

Stop Selected Traps

Resume Reactive Traps

Resume Response Traps

Allocate Disk Space

Stop Protocol Analyzer

Stop Call Progress Traps

Connect AUX Storage device

Resume All Traps

Reset Monitor etc.

User ID: A number or Alpha-numeric character string used to allow use of this function and to identify where to send response information to.

"Link Array Information Request Information" is sent from the Stage 1 Process. This information identifies information contained in variable, array and array elements that either a Stage 2, Stage 3 or Stage 4 process has been requested. This information is decoded and used to retrieve the appropriate variable, array(s) and element(s) in (P1-7) and sent to the Stage 1 Process. This request contains the following:

Link ID - Numeric designation for the monitor the link is connected to

Reg # - The number assigned to the Register or Array.

RECNO - Record number in the Register or Array. Leave blank if not needed. If the RECNO is left blank, all elements for all records in the Array will be retrieved.

Element # - Element number within the record. Populated only if a particular element is needed. If the Element # is left blank, then all elements in the record will be retrieved.

VAR ID - A number or name assigned to the Variable. Leave blank if not needed.

Priority - A number representing the interrupt priority of the request

User ID: A number or Alpha-numeric character string used to identify where to send information when the trap is triggered. Default value is the Stage 3 Controller.

There are four arrays that can supply information to other processes.

"Link Load Array"
"MSU Interval Array"
"MSU Category Array"
"Error Array"

"Link Array Information" contains the data requested by "Link Array Information Request Information", and is sent to the Stage 1 Process. This contains the following:

Reg # - The number assigned to the Register or Array
RECNO - Record number in the Register or Array
Element # - Element number within the record
Element Data - The data contained in the array element identified by the RECNO and Element #
VAR ID - The number or name assigned to the Variable. Leave blank if not needed.
VAR Data - Data contained in the variable
Priority - A number representing the interrupt priority of the request
User ID: A number or Alpha-numeric character string used to identify where to send information when the trap is triggered. Default value is the Stage 3 Controller.

Ranges of elements identified by the "Link Array Information Request Information" will be sent to the Stage 1 Process one at a time by record and element order until all elements have been sent.

Transmit and receive link data presented to the monitor will be sent to the Stage 1 Process for temporary storage (Priority 0). All FISUs not containing a change in FSN, FIB, BSN or BIB from a previous SU will be discarded at the monitor.

All SUs sent to the Stage 1 Process will be time stamped (HH:MM:MS).

All Priority 1 trap and threshold exceeded information destined to the Stage 2 Process will arrive at the Stage 1 Process no more then 1 ms from the time the MSU was detected by the monitor.

Monitors will be time synchronized from the Stage 4 Process.

All or selected array and register information can be retrieved from the monitor by the Stage 2, 3 or 4 Process. Access to this information will be User ID restricted.

All traps can be loaded into the monitor from the Stage 2, 3 or 4 processes.

All information sent to a Stage Process will contain a Priority value, indicating the importance of the information. Priority 0 is the highest Priority and Priority 5 is the lowest.

The Octet length of legitimate Transmit MSU is added to the contents of the appropriate "Transmit Link Load Array" record. Each record is assigned a user defined link load threshold ("Transmit Link Load Threshold Variable"). This threshold can be adjusted at any time by the user or the monitor's "Poll Array". New thresholds take effect after the next "Check Interval". The count in the record is compared to the "Threshold Variable" at user defined intervals (Check Interval). "Check Intervals" can be changed at any time by either the user or the monitor's "Poll Array". If a threshold is exceeded, "Transmit Link Load Threshold Exceeded" alarm information (Priority 1) is sent to the Stage 1 Process. The threshold exceeded information contains the following:

Threshold Type - Link Load
Array - Monitor Array whose threshold was exceeded
Element - Element number whose threshold was exceeded
Count - the Octet count of the "Transmit Link Load Array" record
Orig - Side of the link that the threshold was exceeded - "Transmit"
Time - The time the threshold was exceeded
User ID - Used to determine where the threshold information is to be sent. The default value would be the Stage 2 Controller ID.
Priority - Number from 0 to 5 that identifies the interrupt priority of the information - 1.

When the "Transmit Link Load Array" is polled, the "Transmit Error Array" octet count is compared to the "Error Threshold Variable". If the threshold is exceeded, "Link Error Threshold Exceeded" information is sent to the Stage 1 Process. The threshold exceeded information contains the following:

Threshold Type - Link Error
Count - the Octet count of the "Transmit Error Register" record
Orig - Side of the link that the threshold was exceeded - "Transmit"
Time - The time the threshold was exceeded
User ID - Used to determine where the threshold information is to be sent. The default value would be the Stage 2 Controller ID.
Priority - Number from 0 to 5 that identifies the interrupt priority of the information - 1.

The legitimate Receive MSU also adds a one (1) to the contents of the appropriate "Receive MSU Type Interval Array" record. Each record is assigned a user defined message type count threshold ("Receive Interval Threshold Variable"). This threshold can be adjusted at any time by the user or the monitor's "Poll Array". New thresholds take effect after the next "Check Interval". The count in the record is compared to the "Threshold Variable" at user defined intervals (Check Interval). "Check Intervals" can be changed at any time by either the user or the monitor's "Poll Array". If a threshold is exceeded, "Receive (MSU type) Interval Threshold Exceeded" alarm information (Priority 1) is sent to the Stage 1 Process. The threshold exceeded information contains the following:

Threshold Type - MSU Interval
Array - Monitor Array whose threshold was exceeded
Element - Element number whose threshold was exceeded
Count - The count of the "Receive MSU Interval Array" record
Orig - Side of the link that the threshold was exceeded - "Receive"
Time - The time the threshold was exceeded
User ID - Used to determine where the threshold information is to be sent. The default value would be the Stage 2 Controller ID.
Priority - Number from 0 to 5 that identifies the interrupt priority of the information - 1.

The legitimate Transmit MSU also adds a one (1) to the contents of the appropriate "Transmit MSU Type Interval Array" record. Each record is assigned a user defined message type count threshold ("Receive Interval Threshold Variable"). This threshold can be adjusted at any time by the user or the monitor's "Poll Array". New thresholds take effect after the next "Check Interval". The count in the record is compared to the "Threshold Variable" at user defined intervals (Check Interval). "Check Intervals" can be changed at any time by either the user or the monitor's "Poll Array". If a threshold is exceeded, "Transmit (MSU type) Interval Threshold Exceeded" alarm information (Priority 1) is sent to the Stage 1 Process. The threshold exceeded information contains the following:

Threshold Type - MSU Interval
Array - Monitor Array whose threshold was exceeded
Element - Element number whose threshold was exceeded
Count - The count of the "Transmit MSU Interval Array" record
Orig - Side of the link that the threshold was exceeded - "Transmit"
Time - The time the threshold was exceeded
User ID - Used to determine where the threshold information is to be sent. The default value would be the Stage 2 Controller ID.
Priority - Number from 0 to 5 that identifies the interrupt priority of the information - 1.

The legitimate Receive MSU is identified as belonging to a SS7 Message Category. Once identified, a one (1) is added to the contents of the appropriate "Receive MSU Category Array" record. Each record is assigned a user defined MSU Category count threshold ("Receive Category Threshold Variable"). This threshold can be adjusted at any time by the user or the monitor's "Poll Array". New thresholds take effect after the next "Check Interval". The count in the record is compared to the "Threshold Variable" at user defined intervals (Check Interval). "Check Intervals" can be changed at any time by either the user or the monitor's "Poll Array". If a threshold is exceeded, "Receive MSU Category Interval Threshold Exceeded" alarm information (Priority 1) is sent to the Stage 1 Process. The threshold exceeded information contains the following:

Threshold Type - MSU Category
Array - Monitor Array whose threshold was exceeded
Element - Element number whose threshold was exceeded
Count - The count of the "Receive MSU Category Array" record
Orig - Side of the link that the threshold was exceeded - "Receive"
Time - The time the threshold was exceeded
User ID - Used to determine where the threshold information is to be sent. The default value would be the Stage 2 Controller ID.
Priority - Number from 0 to 5 that identifies the interrupt priority of the information - 1.
MSU Category contains the following:
Link Signaling MSUs (LSSU)
Network Management MSUs (NMSU)
Integrated Services User Part (ISUP)
Signaling Connection Control Part (SCCP)
Transaction Capabilities Application Part (TCAP)

The legitimate Transmit MSU is identified as belonging to a SS7 Message Category. Once identified, a one (1) is added to the contents of a "Transmit MSU Category Array". An array record is designated for each SS7 MSU Category. Each array record is assigned a user defined MSU Category count threshold ("Transmit Category Threshold Variable"). This threshold can be adjusted at any time by the user or the monitor's "Poll Array". New thresholds take effect after the next "Check Interval". The count in the record is compared to the "Threshold Variable" at user defined intervals (Check Interval). "Check Intervals" can be changed at any time by either the user or the monitor's "Poll Array". If a threshold is exceeded, "Transmit MSU Category Interval Threshold Exceeded" alarm information (Priority 1) is sent to the Stage 1 Process. The threshold exceeded information contains the following:

Threshold Type - MSU Category
Array - Monitor Array whose threshold was exceeded
Element - Element number whose threshold was exceeded
Count - The count of the "Transmit MSU Category Array" record
Orig - Side of the link that the threshold was exceeded - "Transmit"
Time - The time the threshold was exceeded
User ID - Used to determine where the threshold information is to be sent. The default value would be the Stage 2 Controller ID.
Priority - Number from 0 to 5 that identifies the interrupt priority of the information - 1.
MSU Category contains the following:
Link Signaling MSUs (LSSU)
Network Management MSUs (NMSU)
Integrated Services User Part (ISUP)
Signaling Connection Control Part (SCCP)
Transaction Capabilities Application Part (TCAP)

Polling of the Link Load, MSU Interval and MSU Category Arrays is performed by scanning the Poll Array. A record in the Poll Array holds polling and interval information for one of the other Arrays. There can be multiple records for each of the other Arrays to facilitate the change of interval values at different times of the day. The Polling Array is loaded using "Poll Array Modify Information" from the Stage 1 Process. The "Poll Array Modify Information" contains the following:

Array ID - Array that the poll information is for
RECNO - Record number in the Array that the poll information is for
Start Time - Time the Poll Interval is valid
End Time - The latest time the Poll Interval value is valid
Poll Interval - Time, in milliseconds, of the interval "MSU Interval Threshold Variables" can be changed using "Modify MSU Interval Variable Information" sent from the Stage 1 Process. There are two types of thresholds, High and Low. Both thresholds are verified when the "MSU Interval Array" is polled. The "MSU Interval Threshold Variables" contains the following:

VAR ID - The number or name assigned to the Variable
VAR Type - High threshold or Low Threshold
VAR Data - The threshold's value "MSU Category Threshold Variables" can be changed using "Modify MSU Category Threshold Variable Information" sent from the Stage 1 Process. There are two types of thresholds, High and Low. Both thresholds are verified when the "MSU Category Array" is polled. The "MSU Category Threshold Variables" contains the following:

VAR ID - The number or name assigned to the Variable
VAR Type - High threshold or Low Threshold
VAR Data - The threshold's value "Link Load Threshold Variables" can be changed using "Modify Link Load Threshold Variable Information" sent from the Stage 1 Process. There are two types of thresholds, High and Low. Both thresholds are verified when the "Link Load Array" is polled. The "Link Load Threshold Variables" contains the following:

VAR ID - The number or name assigned to the variable
VAR Type - High threshold or Low Threshold
VAR Data - The threshold's value "BERT Threshold Variables" can be changed using "Modify BERT Threshold Variable Information" sent from the Stage 1 Process. There is only a High Threshold provided for this threshold. The threshold is verified when the "Receive Errored MSU Array" is polled. The "BERT Threshold Variable" contains the following:

VAR ID - The number or name assigned to the Variable
VAR Type - High threshold
VAR Data - The threshold's value "Link Error Threshold Variables" can be changed using "Modify Link Error Threshold Variable Information" sent from the Stage 1 Process. There is only a High Threshold provided for this threshold. The threshold is verified when the "Link Error Array" is polled. The "Link Error Threshold Variable" contains the following:

VAR ID - The number or name assigned to the Variable
VAR Type - High threshold
VAR Data - The threshold's value MSUs specified by the user will be designated as Reactive MSUs. When an MSU arrives at either the transmit or receive monitor leads, it is counted and the "Reactive MSU Information" (Priority 1) is sent to the Stage 1 Process for processing. The Reactive MSU Information contains the following:

MSU - Complete MSU including header information. Flags can be removed.

Type - Type of MSU. Either Reactive or Response.

Time - Time the "Reactive MSU" was detected by the monitor

Origin - Side of the link that the MSU was detected - Receive/Transmit

User ID - Used to determine where the threshold information is to be sent. The default value would be the Stage 2 Controller ID.

Priority - Number from 0 to 5 that identifies the interrupt priority of the information - 1.

MSUs specified by the user will be designated as Response MSUs. When an MSU arrives at either the transmit or receive monitor leads, it is counted and the "Response MSU Information" (Priority 1) is sent to the Stage 1 Process for processing. The Response MSU Information contains the following:

MSU - Complete MSU including header information. Flags can be removed.

Type - Type of MSU. Either Reactive or Response.

Time - Time the "Reactive MSU" was detected by the monitor

Origin - Side of the link that the MSU was detected - Receive/Transmit

User ID - Used to determine where the threshold information is to be sent. The default value would be the Stage 2 Controller ID.

Priority - Number from 0 to 5 that identifies the interrupt priority of the information - 1

A Minimum of 32 Response Traps can be placed in a monitor. Trapping can be performed on any or all of the fixed or variable fields in the MTP, ISUP, SCCP or TCAP parts of the MSU. Traps that are triggered will send either "Response Trap Triggered Information" (Priority 1) or "Response Trap MSU Triggered Information" (Priority 1 or 2) to the Stage 1 Process. The "Response Trap Triggered Information" and "Response Trap MSU Triggered Information" contains the following:

Trap # - Number assigned to the trap when it was generated

MSU - Complete MSU including header information. Flags can be removed.

Type - Type of Trap Triggered. Response, User defined, or Call Progress.

Time - Time the "Reactive MSU" was detected by the monitor

Origin - Side of the link that the MSU was detected - Receive/Transmit

Priority - Number from 0 to 5 that identifies the interrupt priority of the information - 2.

User ID - Used to determine where the trap information is to be sent. The default value would be the Stage 2 Controller ID.

OR

Trap # - Number assigned to the trap when it was generated

Trigger Info - Information about the trap trigger

Type - Type of Trap Triggered. Response, User defined, or Call Progress.

Time - Time the "Reactive MSU" was detected by the monitor

Origin - Side of the link that the MSU was detected - Receive/Transmit

Priority - Number from 0 to 5 that identifies the interrupt priority of the information - 2.

User ID - Used to determine where the trap information is to be sent. The default value would be the Stage 2 Controller ID.

A Response Trap is loaded into the monitor via "Response Trap Information" sent from the Stage 1 Process. "Response Trap Information" contains the following:

Trap # - Number assigned to the trap when it was generated

Mask - A representation of the MSU to be trapped, populated with the MSU field(s) values to be trapped on. If the Mask populated values match the equivalent MSU field values, a trap trigger indication is generated.

Script - A set of instructions used by the monitor to handle the information supplied by the trapped MSU. Note: this function could be handled by the Stage 1, 2, 3 or 4 Process if the MSU is sent to the appropriate process when triggered.

Type - Type of Trap Triggered. Response, User defined, or Call Progress.

Origin - Side of the link that the MSU is to be trapped on - Receive/Transmit

Priority - Number from 0 to 5 that identifies the interrupt priority of the information - 1.

User ID - Used to determine where the trap information is to be sent. The default value would be the Stage 2 Controller ID.

A minimum of 32 user defined traps can be placed in the monitors. Trapping can be performed on any or all of the fixed or variable fields in the MTP, ISUP, SCCP or TCAP of the MSU. Traps that are triggered will send either User Defined Trap Triggered information (Priority 2) or a User Defined MSU Msg (Priority 2) to the Stage 1 Process. The "User Defined Trap Triggered Information" contains the following:

Trap # - Number assigned to the trap when it was generated

MSU - Complete MSU including header information. Flags can be removed.

Type - Type of Trap Triggered. Response, User defined, or Call Progress.

Time - Time the "Reactive MSU" was detected by the monitor

Origin - Side of the link that the MSU was detected - Receive/Transmit

Priority - Number from 0 to 5 that identifies the interrupt priority of the information - 2.

User ID - Used to determine where the trap information is to be sent. The default value would be the Stage 2 Controller ID.

OR

Trap # - Number assigned to the trap when it was generated

Trigger Info - Information about the trap trigger

Type - Type of Trap Triggered. Response, User Defined, or Call Progress.

Time - Time the "Reactive MSU" was detected by the monitor

Origin - Side of the link that the MSU was detected - Receive/Transmit

Priority - Number from 0 to 5 that identifies the interrupt priority of the information - 2.

User ID - Used to determine where the trap information is to be sent. The default value would be the Stage 2 Controller ID.

A User Defined Trap is loaded into the monitor via "User Defined Trap Information" sent from the Stage 1 Process. "User Defined Trap Information" contains the following:

Trap # - Number assigned to the trap when it was generated

Mask - A representation of the MSU to be trapped, populated with the MSU field(s) values to be trapped on. If the Mask populated values match the equivalent MSU field values, a trap trigger indication is generated.

Script - A set of instructions used by the monitor to handle the information supplied by the trapped MSU. Note: this function could be handled by the Stage 1, 2, 3 or 4 Process if the MSU is sent to the appropriate process when triggered.

Type - Type of Trap Triggered. Response, User Defined, or Call Progress.

Origin - Side of the link that the MSU is be trapped on - Receive/Transmit

Priority - Number from 0 to 5 that identifies the interrupt priority of the information - 1

User ID - Used to determine where the trap information is to be sent. The default value would be the Stage 2 Controller ID.

A minimum of 8 ISUP Call Progress traps can be placed in the monitor. Call Progress Traps consist of two related traps, an "Initial MSU Trap" and a "Sequence MSU Trap". When the "Initial MSU Trap" is triggered, "Call Progress Initial MSU Trap Triggered Information" is sent to the Stage 1 Process. When the "Sequence MSU Trap" is triggered, "Call Progress Sequence MSU Trap Triggered Information" is sent to the Stage 1 Process. The "Call Progress Initiate and Sequence Trap Triggered Information" contains the following:

Trap # - Number assigned to the trap when it was generated

MSU - Complete MSU including header information. Flags can be removed.

Type - Type of Trap Triggered. Response, User defined, or Call Progress.

Time - Time the "Reactive MSU" was detected by the monitor

Origin - Side of the link that the MSU was detected - Receive/Transmit

Priority - Number from 0 to 5 that identifies the interrupt priority of the information - 3.

User ID - Used to determine where the trap information is to be sent. The default value would be the Stage 2 Controller ID.

A Call Progress Initiate and Sequence MSU Trap is loaded into the monitor via "Call Progress Trap Information" sent from the Stage 1 Process. "Call Progress Trap Information" contains the following:

Trap # - Number assigned to the trap when it was generated

Mask - A representation of the MSU to be trapped, populated with the MSU field(s) values to be trapped on. If the Mask populated values match the equivalent MSU field values, a trap trigger indication is generated.

Script - Tells the monitor to send the trapped MSU to the user

Type - Type of Trap Triggered. Response, User Defined, or Call Progress

Origin - Side of the link that the MSU is to be trapped on - Receive/Transmit

Priority - Number from 0 to 5 that identifies the interrupt priority of the information - 1.

User ID - Used to determine where the trap information is to be sent. The default value would be the Stage 2 Controller ID.

"Call Progress Initiate MSU Trap Disable Information" is sent from the Stage 1 Process to disable the Initiate MSU Trap. This contains the following:

Trap # - Number assigned to the trap when it was generated

Type - Trap

Action - Action to be taken by the Stage 1 or Monitor Process

Disable Call Progress Initiate Trap

Priority - Number from 0 to 5 that identifies the interrupt priority of the information - 1

User ID - Used to determine where the trap information is to be sent. The default value would be the Stage 2 Controller ID.

"Call Progress Initiate MSU Trap Enable Information" is sent from the Stage 1 Process to enable the "Initiate MSU Trap". This contains the following:

Link ID - Numeric designation for the Link Monitor that is experiencing the trouble CTRL Unit - The Stage 1 Controller ID that the monitor is controlled from Trap # - Number assigned to the trap when it was generated Type - Trap Action - Action to be taken by the Stage 1 or Monitor Process Enable Call Progress Initiate Trap Priority - Number from 0 to 5 that identifies the interrupt priority of the information - 1

User ID - Used to determine where the trap information is to be sent. The default value would be the Stage 2 Controller ID.

"Call Progress Sequence MSU Trap Clear Information" is sent from the Stage 1 Process to remove or clear all "Sequence MSU Traps". This contains the following:

Link ID - Numeric designation for the Link Monitor that is experiencing the trouble CTRL Unit - The Stage 1 Controller ID that the monitor is controlled from Trap # - Number assigned to the trap when it was generated Type - Trap Action - Action to be taken by the Stage 1 or Monitor Process Clear Call Progress Sequence Trap Priority - Number from 0 to 5 that identifies the interrupt priority of the information - 1

User ID - Used to determine where the trap information is to be sent. The default value would be the Stage 2 Controller ID.

"Call Progress Initiate MSU Trap Clear Information" is sent from the Stage 1 Process to remove or clear "Initiate MSU Trap" and "Sequence MSU Traps". This contains the following:

Link ID - Numeric designation for the Link Monitor that is experiencing the trouble CTRL Unit - The Stage 1 Controller ID that the monitor is controlled from Trap # - Number assigned to the trap when it was generated Type - Trap Action - Action to be taken by the Stage 1 or Monitor Process Clear Call Progress Initiate Trap Priority - Number from 0 to 5 that identifies the interrupt priority of the information - 1.

User ID - Used to determine where the trap information is to be sent. The default value would be the Stage 2 Controller ID.

"Monitor Control Information" contains the following:

Priority - A number representing the interrupt priority of the message.

Command - Instructions that the monitor can interpret describing the action to be taken Actions to be taken can be:
Stop All Reactive Traps
Stop All Response Traps
Stop Selected Traps
Resume Reactive Traps
Resume Response Traps
Allocate Disk Space
Stop Protocol Analyzer
Stop Call Progress Traps
Connect AUX Storage device
Resume All Traps
Reset Monitor
Etc.

User ID: A number or Alpha-numeric character string used to allow use of this function and to identify where to send response information to.

"Link Array Information Request Information" is sent from the Stage 1 Process. This information identifies information contained in variable, array and array elements that either a Stage 2, Stage 3 or Stage 4 Process has been requested. This information is decoded and used to retrieve the appropriate variable, array(s) and element(s) in (P1-7) and sent to the Stage 1 Process. This request contains the following:

Link ID - Numeric designation for the monitor the link is connected to

Reg # - The number assigned to the Register or Array

RECNO - Record number in the Register or Array. Leave blank if not needed. If the RECNO is left blank, all elements for all records in the Array will be retrieved.

Element # - Element number within the record. Populated only if a particular element is needed. If the Element # is left blank, then all elements in the record will be retrieved.

VAR ID - The number or name assigned to the Variable. Leave blank if not needed.

Priority - A number representing the interrupt priority of the request

User ID: A number or Alpha-numeric character string used to identify where to send information when the trap is triggered. Default value is the Stage 3 Controller.

There are four arrays that can supply information to other processes:
"Link Load Array"
"MSU Interval Array"
"MSU Category Array"
"Error Array"

"Link Array Information" contains the data requested by "Link Array Information Request Information" and is sent to the Stage 1 Process. This contains the following:

Reg # - The number assigned to the Register or Array

RECNO - Record number in the Register or Array

Element # - Element number within the record

Element Data - The data contained in the array element identified by the RECNO and Element #

VAR ID - The number or name assigned to the Variable. Leave blank if not needed.

VAR Data - Data contained in the variable

Priority - A number representing the interrupt priority of the request

User ID: A number or Alpha-numeric character string used to identify where to send information when the trap is triggered. Default value is the Stage 3 Controller.

Ranges of elements identified by the "Link Array Information Request Information" will be sent to the Stage 1 Process one at a time by record and element order until all elements have been sent.

Transmit and receive link data presented to the monitor will be sent to the Stage 1 Process for temporary storage (Priority 0). All FISUs not containing a change in FSN, FIB, BSN or BIB from a previous SU will be discarded at the monitor.

All SUs sent to the Stage 1 Process will be time stamped (HH:MM:MS).

All Priority 1 trap and threshold exceeded information destined to the Stage 2 Process will arrive at the Stage 1 Process no more then 1 ms from the time the MSU was detected by the monitor.

Monitors will be time synchronized from the Stage 4 process.

All or selected array and register information can be retrieved from the monitor by the Stage 2, 3 and/or 4 processes. Access to this information will be User ID restricted.

All traps can be loaded into the monitor from the Stage 2, 3 or 4 processes.

Stage 1 Process

Link Data and trap handling are performed in the Stage 1 Process. Link data passed from the monitors is stored in a high capacity storage medium. Reactive Traps, Response Trap, and User Defined Trap information is collected and sent to the Stage 2 Process as required. Time synchronization information received from the master clock is loaded and controlled by this process.

The basic functions of the Stage 1 Process are the following:

Provides user defined Reactive MSU trapping. Receipt of an MSU identified as a Reactive Trap MSU triggers the monitor to send the MSU information to the Stage 2 Process for processing. Response time from receipt of the MSU to the delivery of MSU information to the Stage 2 Process is no greater than 1 ms.

Automatically stores all or selected link data to hard disk as it is received. At 40% aggregate load on 32 links, 30 minutes of data can be stored. This is a first in first out data buffer. Permanent store of link data can be achieved by establishing sessions within the monitor. This data can be protected so that ongoing real time recording will not over write this data. The establishment of sessions reduces the hard disk data storage capacity.

Provides creation of HEX, Level 2, 3 and 4 decode ASCII files for session data. These files can be down loaded to the Stage 2 and Stage 3 Processes for test result archiving and analysis.

P2: Link Monitor Control and Trap Handling

Reference is had to FIGS. 12A, 22 and 23.

The Stage 1 Process functions are:

Up to 32 monitors can be controlled via a high speed bus.

"Receive Link Load Threshold Exceeded Information" received from the monitor(s) is formatted into a "Stage 2 Receive Link Load Threshold Exceeded Alarm Message". This contains the following:

Link ID - Numeric designation for the monitor the link is attached to

Time - Time the threshold was exceeded

Threshold Type - Link Load

Array - Monitor Array whose threshold was exceeded

Element - Element number whose threshold was exceeded

Count - The Octet count of the "Receive Link Load Array" record

Priority - A number representing the interrupt priority of the trap

Origin - Indicates whether the Alarm is for link transmit register or receive register User ID - A number or Alpha-numeric character string used to identify where to send information when the trap is triggered Alarm messages should be processed and be presented to the Stage 2 Process no more than 100 ms from the time the threshold exceed information was presented to the Stage 1 Process. Alarm messages are prioritized based on user defined criteria.

"Stage 2 Receive Link Load Threshold Exceeded Alarm Message" is sent to the Stage 2 Process via "Perform Stage 2 Communication Control Function" (P2-10). This contains the following:

Link ID - Numeric designation for the monitor the link is attached to

CTRL Unit - The Stage 1 controller ID that the monitor is controlled from

Time - Time the threshold was exceeded

Threshold Type - Link Load

Array - Monitor Array whose threshold was exceeded

Element - Element number whose threshold was exceeded

Count - The Octet count of the "Receive Link Load Array" record

Priority - A number representing the interrupt priority of the trap

Origin - Indicates whether the Alarm is for link transmit register or receive register User ID - A number or Alpha-numeric character string used to identify where to send information when the trap is triggered "Link Load BERT Threshold Exceeded Information" received from the monitor(s) is formatted into a "Stage 2 Link Load BERT Threshold Exceeded Message". This contains the following:

Link ID - Numeric designation for the monitor the link is attached to

Time - Time the threshold was exceeded

Threshold Type - Link Load BERT

Array - Monitor Array whose threshold was exceeded

Element - Element number whose threshold was exceeded

Count - The Octet count of the "Receive Error Array"

Priority - A number representing the interrupt priority of the trap

Origin - Indicates whether the Alarm is for link transmit register or receive register User ID - A number or Alpha-numeric character string used to identify where to send information when the trap is triggered Alarm messages should be processed and be presented to the Stage 2 Process no more than 100 ms from the time the threshold exceed information was presented to the Stage 1 Process. Alarm messages are prioritized based on user defined criteria.

"Stage 2 Link Load BERT Threshold Exceeded Message" is sent to the Stage 2 Process via "Perform Stage 2 Communication Control Function" (P2-10). This contains the following:

Link ID - Numeric designation for the monitor the link is attached

CTRL Unit - The Stage 1 Controller ID that the monitor is controlled from

Time - Time the threshold was exceeded

Threshold Type - Link Load BERT

Array - Monitor Array whose threshold was exceeded

Array - Element - Element number whose threshold was exceeded

Count - The Octet count of the "Receive Error Array"

Priority - A number representing the interrupt priority of the trap

Origin register.

Origin - Indicates whether the Alarm is for link transmit register or receive register User ID - A number or Alpha-numeric character string used to identify where to send information when the trap is triggered "Transmit Link Load Threshold Exceeded Information" received from the monitor(s) is formatted into a "Stage 2 Transmit Link Load Threshold Exceeded Message". This contains the following:

Link ID - Numeric designation for the monitor the link is attached to

Time - Time the threshold was exceeded

Threshold Type - Link Load

Array - Monitor Array whose threshold was exceeded

Element - Element number whose threshold was exceeded

Count - The Octet count of the "Transmit Link Load Array" record

Priority - A number representing the interrupt priority of the trap

Origin - Indicates whether the Alarm is for link transmit register or receive register USER ID - A number or Alpha-numeric character string used to identify where to send information when the trap is triggered Alarm messages should be processed and be presented to the Stage 2 Process no more than 100 ms from the time the threshold exceed information was presented to the Stage 1 Process. Alarm messages are prioritized based on user defined criteria.

"Stage 2 Transmit Link Load Threshold Exceeded Message" is sent to the Stage 2 Process via "Perform Stage 2 Communication Control Function" (P2-10). This contains the following:

Link ID - Numeric designation for the monitor the link is attached to

CTRL Unit - The Stage 1 controller ID that the monitor is controlled from

Time - Time the threshold was exceeded

Threshold Type - Link Load

Array - Monitor Array whose threshold was exceeded

Element - Element number whose threshold was exceeded

Count - The Octet count of the "Transmit Link Load Array" record

Priority - A number representing the interrupt priority of the trap

Origin - Indicates whether the Alarm is for link transmit register or receive register User ID - A number or Alpha-numeric character string used to identify where to send information when the trap is triggered "Link Error Threshold Exceeded Information" received from the monitor(s) is formatted into a "Stage 2 Link Error Threshold Exceeded Message". This contains the following:

Link ID - Numeric designation for the monitor the link is attached to

Time - Time the threshold was exceeded

Threshold Type - Link Error

Array - Monitor Array whose threshold was exceeded

Element - Element number whose threshold was exceeded

Count - The Octet count of the "Transmit Error Array"

Priority - A number representing the interrupt priority of the trap

Origin - Indicates whether the Alarm is for link transmit register or receive register User ID - A number or Alpha-numeric character string used to identify where to send information when the trap is triggered Alarm messages should be processed and be presented to the Stage 2 Process no more than 100 ms from the time the threshold exceed information was presented to the Stage 1 Process. Alarm messages are prioritized based on user defined criteria.

"Stage 2 Link Error Threshold Exceeded Message" is sent to the Stage 2 Process via "Perform Stage 2 Communication Control Function" (P2-10). This contains the following:

Link ID - Numeric designation for the monitor the link is attached to

CTRL Unit - The Stage 1 Controller ID that the monitor is controlled from

Time - Time the threshold was exceeded

Threshold Type - Link Error

Array - Monitor Array whose threshold was exceeded

Element - Element number whose threshold was exceeded

Count - The Octet count of the "Transmit Error Array"

Priority - A number representing the interrupt priority of the trap

Origin - Indicates whether the Alarm is for link transmit register or receive register User ID - A number or Alpha-numeric character string used to identify where to send information when the trap is triggered "Receive (MSU Type) Interval Threshold Exceeded Information" received from the monitor(s) is formatted into a "Stage 2 Receive (MSU Type) Interval Threshold Exceeded Message". This contains the following:

Link ID - Numeric designation for the monitor the link is attached to

Time - Time the threshold was exceeded

Threshold Type - MSU Interval

Array - Monitor Array whose threshold was exceeded

Element - Element number whose threshold was exceeded

Count - The Octet count of the "Receive MSU Interval Array" record

Priority - A number representing the interrupt priority of the trap

Origin - Indicates whether the Alarm is for link transmit register or receive register User ID - A number or Alpha-numeric character string used to identify where to send information when the trap is triggered Alarm messages should be processed and be presented to the Stage 2 Process no more than 100 ms from the time the threshold exceed information was presented to the Stage 1 Process. Alarm messages are prioritized based on user defined criteria.

"Stage 2 Receive (MSU Type) Interval Threshold Exceeded Message" is sent to the Stage 2 Process via "Perform Stage 2 Communication Control Function" (P2-10). This contains the following:

Link ID - Numeric designation for the monitor the link is attached to

CTRL Unit - The Stage 1 Controller ID that the monitor is controlled from

Time - Time the threshold was exceeded

Threshold Type - MSU Interval

Array - Monitor Array whose threshold was exceeded

Element - Element number whose threshold was exceeded

Count - The Octet count of the "Receive MSU Interval Array" record

Priority - A number representing the interrupt priority of the trap

Origin - Indicates whether the Alarm is for link transmit register or receive register User ID - A number or Alpha-numeric character string used to identify where to send information when the trap is triggered "Transmit (MSU Type) Interval Threshold Exceeded Information" received from the monitor(s) is formatted into a "Stage 2 Transmit (MSU Type) Interval Threshold Exceeded Message". This contains the following:

Link ID - Numeric designation for the monitor the link is attached to

Time - Time the threshold was exceeded

Threshold Type - MSU Interval

Array - Monitor Array whose threshold was exceeded

Element - Element number whose threshold was exceeded

Count - The Octet count of the "Transmit MSU Interval Array" record

Priority - A number representing the interrupt priority of the trap

Origin - Indicates whether the Alarm is for link transmit register or receive register.

User ID - A number or Alpha-numeric character string used to identify where to send information when the trap is triggered.

Alarm messages should be processed and be presented to the Stage 2 Process no more than 100 ms from the time the threshold exceed information was presented to the Stage 1 Process. Alarm messages are prioritized based on user defined criteria.

"Stage 2 Transmit (MSU Type) Interval Threshold Exceeded Message" is sent to the Stage 2 Process via "Perform Stage 2 Communication Control Function" (P2-10). This contains the following:

Link ID - Numeric designation for the monitor the link is attached to

CTRL Unit - The Stage 1 Controller ID that the monitor is controlled from

Time - Time the threshold was exceeded

Threshold Type - MSU Interval

Array - Monitor Array whose threshold was exceeded

Element - Element number whose threshold was exceeded

Count - The Octet count of the "Transmit MSU Interval Array" record

Priority - A number representing the interrupt priority of the trap

Origin - Indicates whether the Alarm is for link transmit register or receive register User ID - A number or Alpha-numeric character string used to identify where to send information when the trap is triggered "Receive MSU Category Threshold Exceeded Information" received from the monitor(s) is formatted into a "Stage 2 Receive MSU Category Threshold Exceeded Message". This contains the following:

Link ID - Numeric designation for the monitor the link is attached to

Time - Time the threshold was exceeded

Threshold Type - MSU Category

Array - Monitor Array whose threshold was exceeded

Element - Element number whose threshold was exceeded

Count - The Octet count of the "Receive MSU Category Array" record

Priority - A number representing the interrupt priority of the trap

Origin - Indicates whether the Alarm is for link transmit register or receive register User ID - A number or Alpha-numeric character string used to identify where to send information when the trap is triggered Alarm messages should be processed and be presented to the Stage 2 Process no more than 100 ms from the time the threshold exceed information was presented to the Stage 1 Process. Alarm messages are prioritized based on user defined criteria.

"Stage 2 Receive MSU Category Threshold Exceeded Message" is sent to the Stage 2 Process via "Perform Stage 2 Communication Control Function" (P2-10). This contains the following:

Link ID - Numeric designation for the monitor the link is attached to

CTRL Unit - The Stage 1 Controller ID that the monitor is controlled from

Time - Time the threshold was exceeded

Threshold Type - MSU Category

Array - Monitor Array whose threshold was exceeded

Element - Element number whose threshold was exceeded

Count - The Octet count of the "Receive MSU Category Array" record

Priority - A number representing the interrupt priority of the trap

Origin - Indicates whether the Alarm is for link transmit register or receive register User ID - A number or Alpha-numeric character string used to identify where to send information when the trap is triggered "Transmit MSU Category Threshold Exceeded Information" received from the monitor(s) is formatted into a "Stage 2 Transmit MSU Category Threshold Exceeded Message". This contains the following:

Link ID - Numeric designation for the monitor the link is attached to

CTRL Unit - The Stage 1 Controller ID that the monitor is controlled from

Time - Time the threshold was exceeded

Threshold Type - MSU Category

Array - Monitor Array whose threshold was exceeded

Element - Element number whose threshold was exceeded

Count - The Octet count of the "Transmit MSU Category Array" record

Priority - A number representing the interrupt priority of the trap

Origin - Indicates whether the Alarm is for link transmit register or receive register User ID - A number or Alpha-numeric character string used to identify where to send information when the trap is triggered Alarm messages should be processed and be presented to the Stage 2 Process no more than 100 ms from the time the threshold exceed information was presented to the Stage 1 Process. Alarm messages are prioritized based on user defined criteria.

"Stage 2 Transmit MSU Category Threshold Exceeded Message" is sent to the Stage 2 Process via "Perform Stage 2 Communication Control Function" (P2-10). This contains the following:

Link ID - Numeric designation for the monitor the link is attached to

CTRL Unit - The Stage 1 Controller ID that the monitor is controlled from

Time - Time the threshold was exceeded

Threshold Type - MSU Category

Array - Monitor Array whose threshold was exceeded

Element - Element number whose threshold was exceeded

Count - The Octet count of the "Transmit MSU Category Array" record

Priority - A number representing the interrupt priority of the trap

Origin - Indicates whether the Alarm is for link transmit register or receive register User ID - A number or Alpha-numeric character string used to identify where to send information when the trap is triggered "Receive Reactive MSU Information" (RT-MSU) information received from the monitor is formatted into a "Stage 2 Receive Reactive MSU Message". This contains the following:

Link ID - Numeric designation for the monitor the link is attached to

Type - Type of MSU - Reactive

Time - Time that the Reactive MSU was detected

MSU - The MSU message that was trapped

Priority - A number representing the interrupt priority of the trap

Origin - Indicates whether the trap is for link transmit or receive

User ID - A number or Alpha-numeric character string used to identify where to send information when the trap is triggered Reactive MSU messages should be processed and be presented to the Stage 2 Process no more than 100 ms from the time the MSU information was presented to the Stage 1 Process. Reactive Trap MSU messages are assigned a Priority 1.

"Stage 2 Receive Reactive MSU Message" is sent to the Stage 2 Process via "Perform Stage 2 Communication Control Function" (P2-10). This contains the following:

Link ID - Numeric designation for the monitor the link is attached to

CTRL Unit - The Stage 1 controller ID that the monitor is controlled from

Type - Type of MSU - Reactive

Time - Time that the Reactive MSU was detected

MSU - The MSU message that was trapped

Priority - A number representing the interrupt priority of the trap

Origin - Indicates whether the trap is for link transmit or receive

User ID - A number or Alpha-numeric character string used to identify where to send information when the trap is triggered "Transmit Reactive MSU Information" (RT-MSU) information received from the monitor is formatted into a "Stage 2 Transmit Reactive MSU Message". This contains the following:

Link ID - Numeric designation for the monitor the link is attached to

Type - Type of MSU - Reactive
Time - Time that the Reactive MSU was detected
MSU - The MSU message that was trapped
Priority - A number representing the interrupt priority of the trap
Origin - Indicates whether the trap is for link transmit or receive
User ID - A number or Alpha-numeric character string used to identify where to send information when the trap is triggered Reactive MSU messages should be processed and be presented to the Stage 2 Process no more than 100 ms from the time the MSU information was presented to the Stage 1 Process. Reactive Trap MSU messages are assigned a Priority 1.

"Stage 2 Transmit Reactive MSU Message" is sent to the Stage 2 Process via "Perform Stage 2 Communication Control Function" (P2-10). This contains the following:
Link ID - Numeric designation for the monitor the link is attached to
CTRL Unit - The Stage 1 Controller ID that the monitor is controlled from
Type - Type of MSU - Reactive
Time - Time that the Reactive MSU was detected.
MSU - The MSU message that was trapped
Priority - A number representing the interrupt priority of the trap
Origin - Indicates whether the trap is for link transmit or receive
User ID - A number or Alpha-numeric character string used to identify where to send information when the trap is triggered "Receive Response MSU Information" (RSP-MSU) information received from the monitor is formatted into a "Stage 2 Receive Response MSU Message". This contains the following:
Link ID - Numeric designation for the monitor the link is attached to
CTRL Unit - The Stage 1 Controller ID that the monitor is controlled from
Type - Type of MSU - Response
Time - Time that the Response MSU was detected
MSU - The MSU message that was trapped
Priority - A number representing the interrupt priority of the trap
Origin - Indicates whether the trap is for link transmit or receive
User ID - A number or Alpha-numeric character string used to identify where to send information when the trap is triggered Response MSU messages should be processed and be presented to the Stage 2 Process no more than 100 ms from the time the MSU information was presented to the Stage 1 Process. Reactive Trap MSU messages are assigned a Priority 1.

"Stage 2 Receive Response MSU Message" is sent to the Stage 2 Process via "Perform Stage 2 Communication Control Function" (P2-10). This contains the following:
Link ID - Numeric designation for the monitor the link is attached to
CTRL Unit - The Stage 1 Controller ID that the monitor is controlled from
Type - Type of MSU - Response
Time - Time that the Response MSU was detected
MSU - The MSU message that was trapped
Priority - A number representing the interrupt priority of the trap
Origin - Indicates whether the trap is for link transmit or receive
User ID - A number or Alpha-numeric character string used to identify where to send information when the trap is triggered "Transmit Response MSU Information" (RSP-MSU) information received from the monitor is formatted into a "Stage 2 Transmit Response MSU Message". This contains the following:
Link ID - Numeric designation for the monitor the link is attached to
CTRL Unit - The Stage 1 Controller ID that the monitor is controlled from
Type - Type of MSU - Response
Time - Time that the Response MSU was detected
MSU - The MSU message that was trapped
Priority - A number representing the interrupt priority of the trap
Origin - Indicates whether the trap is for link transmit or receive
User ID - A number or Alpha-numeric character string used to identify where to send information when the trap is triggered Response MSU messages should be processed and be presented to the Stage 2 Process no more than 100 ms from the time the MSU information was presented to the Stage 1 Process. Reactive Trap MSU messages are assigned a Priority 1.

"Stage 2 Transmit Response MSU Message" is sent to the Stage 2 Process via "Perform Stage 2 Communication Control Function" (P2-10). This contains the following:
Link ID - Numeric designation for the monitor the link is attached to
CTRL Unit - The Stage 1 Controller ID that the monitor is controlled from
Type - Type of MSU - Response
Time - Time that the Response MSU was detected
MSU - The MSU message that was trapped
Priority - A number representing the interrupt priority of the trap
Origin - Indicates whether the trap is for link transmit or receive
User ID - A number or Alpha-numeric character string used to identify where to send information when the trap is triggered "Receive Response Trap Triggered Information" Information is formatted into a "Stage 2 Receive Response Trap Triggered Message". This contains the following:
Link ID - Numeric designation for the monitor the link is attached to
Trap Number - Number assigned to the Response Trap in the monitor
Type - Response
Time - Time that the Response Trap was triggered
MSU - The MSU message that was trapped
Priority - A number representing the interrupt priority of the trap
Origin - Indicates whether the trap is for link transmit or receive
User ID - A number or Alpha-numeric character string used to identify where to send information when the trap is triggered
OR
Link ID - Numeric designation for the monitor the link is attached to
Trap Number - Number assigned to the Trap in the monitor Type - Response
Time - Time that the trap was triggered
Trigger Information - Indication that the trap was triggered
Priority - A number representing the interrupt priority of the trap
Origin - Indicates whether the trap is for link transmit or receive
User ID - A number or Alpha-numeric character string used to identify where to send information when the trap is triggered.

Trap messages should be processed and be presented to the Stage 2 Process no more than 100 ms from the time the MSU information was presented to the Stage 1 Process. Response Trap messages are assigned a Priority 1.

"Stage 2 Receive Response Trap Triggered Message" is sent to the Stage 2 Process via "Perform Stage 2 Communication Control Function" (P2-10). This contains the following:

Link ID - Numeric designation for the monitor the link is attached to
CTRL Unit - The Stage 1 Controller ID that the monitor is controlled from
Trap Number - Number assigned to the Response Trap in the monitor
Type - Response
Time - Time that the Response Trap was triggered
MSU - The MSU message that was trapped
Priority - A number representing the interrupt priority of the trap
Origin - Indicates whether the trap is for link transmit or receive
User ID - A number or Alpha-numeric character string used to identify where to send information when the trap is triggered
OR
Link ID - Numeric designation for the monitor the link is attached to
CTRL Unit - The Stage 1 controller ID that the monitor is controlled from
Trap Number - Number assigned to the Trap in the monitor
Type - Response
Time - Time that the trap was triggered
Trigger Information - Indication that the trap was triggered
Priority - A number representing the interrupt priority of the trap
Origin - Indicates whether the trap is for link transmit or receive
User ID - A number or Alpha-numeric character string used to identify where to send information when the trap is triggered.

"Transmit Response Trap Triggered Information" Information is formatted into a "Stage 2 Transmit Response Trap Triggered Message". This contains the following:

Link ID - Numeric designation for the monitor the link is attached to
Trap Number - Number assigned to the Response Trap in the monitor
Type - Response
Time - Time that the Response Trap was triggered
MSU - The MSU message that was trapped
Priority - A number representing the interrupt priority of the trap
Origin - Indicates whether the trap is for link transmit or receive
User ID - A number or Alpha-numeric character string used send information when the trap is triggered
OR
Link ID - Numeric designation for the monitor the link is attached to
Trap Number - Number assigned to the Trap in the monitor
Type - Response
Time - Time that the trap was triggered
Trigger Information - Indication that the trap was triggered
Priority - A number representing the interrupt priority of the trap
Origin - Indicates whether the trap is for link transmit or receive
User ID - A number or Alpha-numeric character string used to identify where to send information when the trap is triggered Trap messages should be processed and be presented to the Stage 2 Process no more than 100 ms from the time the MSU information was presented to the Stage 1 Process. Response Trap messages are assigned a Priority 1.

"Stage 2 Transmit Response Trap Triggered Message" is sent to the Stage 2 Process via "Perform Stage 2 Communication Control Function" (P2-10). This contains the following:

Link ID - Numeric designation for the monitor the link is attached to
CTRL Unit - The Stage 1 controller ID that the monitor is controlled from
Trap Number - Number assigned to the Response Trap in the monitor
Type - Response
Time - Time that the Response Trap was triggered
MSU - The MSU message that was trapped
Priority - A number representing the interrupt priority of the trap
Origin - Indicates whether the trap is for link transmit or receive
User ID - A number or Alpha-numeric character string used to identify where to send information when the trap is triggered
OR
Link ID - Numeric designation for the monitor the link is attached to
CTRL Unit - The Stage 1 Controller ID that the monitor is controlled from
Trap Number - Number assigned to the Trap in the monitor
Type - Response
Time - Time that the trap was triggered
Trigger Information - Indication that the trap was triggered
Priority - A number representing the interrupt priority of the trap
Origin - Indicates whether the trap is for link transmit or receive
User ID - A number or Alpha-numeric character string used to identify where to send information when the trap is triggered "Receive User Defined Trap Triggered (UDT) Information" is formatted into a "Stage 2 Receive User Defined Trap Triggered (UDT) Message". This contains the following:

Link ID - Numeric designation for the monitor the link is attached to
Trap Number - Number assigned to the Trap in the monitor Type - User defined
Time - Time that the Trap was triggered
MSU - The MSU message that was trapped
Priority - A number representing the interrupt priority of the trap
Origin - Indicates whether the trap is for link transmit or receive
User ID - A number or Alpha-numeric character string used to identify where to send information when the trap is triggered
OR
Link ID - Numeric designation for the monitor the link is attached to
Trap Number - Number assigned to the Trap in the monitor
Type - User defined
Time - Time that the trap was triggered
Trigger Information - Indication that the trap was triggered
Priority - A number representing the interrupt priority of the trap
User ID - A number or Alpha-numeric character string used to identify where to send information when the trap is triggered
Origin - Indicates whether the trap is for link transmit or receive.

User Defined Trap messages should be processed and be presented to the Stage 2 Process no more than 300 ms from the time the MSU information was presented to the Stage 1 Process. Priority must be greater than 1.

"Stage 2 Receive User Defined Trap Triggered (UDT) Message" is sent to the Stage 2 Process via "Perform Stage 2 communication Control Function" (P2-10). This contains the following:

Link ID - Numeric designation for the monitor the link is attached to
CTRL Unit - The Stage 1 controller ID that the monitor is controlled from
Trap Number - Number assigned to the Trap in the monitor
Type - User defined
Time - Time that the Trap was triggered
MSU - The MSU message that was trapped
Priority - A number representing the interrupt priority of the trap
Origin - Indicates whether the trap is for link transmit or receive
User ID - A number or Alpha-numeric character string used to identify where to send information when the trap is triggered
OR
Link ID - Numeric designation for the monitor the link is attached to
CTRL Unit - The Stage 1 controller ID that the monitor is controlled from
Trap Number - Number assigned to the Trap in the monitor
Type - User defined
Time - Time that the trap was triggered
Trigger Information - Indication that the trap was triggered
Priority - A number representing the interrupt priority of the trap
User ID - A number or Alpha-numeric character string used send information when the trap is triggered
Origin - Indicates whether the trap is for link transmit or receive "Transmit User Defined Trap Triggered (UDT) Information" is formatted into a "Stage 2 Transmit user Defined Trap Triggered (UDT) Message". This contains the following:

Link ID - Numeric designation for the monitor the link is attached to
Trap Number - Number assigned to the Trap in the monitor
Type - User defined
Time - Time that the Trap was triggered
MSU - The MSU message that was trapped
Priority - A number representing the interrupt priority of the trap
Origin - Indicates whether the trap is for link transmit or receive
User ID - A number or Alpha-numeric character string used to identify where to send information when the trap is triggered
OR
Link ID - Numeric designation for the monitor the link is attached to
Trap Number - Number assigned to the Trap in the monitor
Type - User defined
Time - Time that the trap was triggered
Trigger Information - Indication that the trap was triggered
Priority - A number representing the interrupt priority of the trap
User ID - A number or Alpha-numeric character string used to identify where to send information when the trap is triggered
Origin - Indicates whether the trap is for link transmit or receive User Defined Trap messages should be processed and be presented to the Stage 2 Process no more than 300 ms from the time the MSU information was presented to the Stage 1 Process. Priority must be greater than 1.

"Stage 2 Transmit User Defined Trap Triggered (UDT) Message" is sent to the Stage 2 Process via "Perform Stage 2 Communication Control Function" (P2-10). This contains the following:

Link ID - Numeric designation for the monitor the link is attached to
CTRL Unit - The Stage 1 controller ID that the monitor is controlled from
Trap Number - Number assigned to the Trap in the monitor
Type - User defined
Time - Time that the Trap was triggered
MSU - The MSU message that was trapped
Priority - A number representing the interrupt priority of the trap
Origin - Indicates whether the trap is for link transmit or receive
User ID - A number or Alpha-numeric character string used to identify where to send information when the trap is triggered
OR
Link ID - Numeric designation for the monitor the link is attached to
CTRL Unit - The Stage 1 Controller ID that the monitor is controlled from
Trap Number - Number assigned to the Trap in the monitor
Type - User defined
Time - Time that the trap was triggered
Trigger Information - Indication that the trap was triggered Priority - A number representing the interrupt priority of the trap User ID - A number or Alpha-numeric character string used to identify where to send information when the trap is triggered. Origin - Indicates whether the trap is for link transmit or receive.

"Receive Call Progress Initiate MSU Trap Triggered (CPT) Information" is formatted into a "Stage 2 Receive Call Progress Initiate MSU Trap Triggered (CPT) Message". This contains the following:

Link ID - Numeric designation for the monitor the link is attached to

Trap Number - Number assigned to the Response Trap in the monitor

Type - Call Progress Initiate MSU

Time - Time that the Response Trap was triggered

MSU - The MSU message that was trapped

Priority - A number representing the interrupt priority of the trap

Origin - Indicates whether the trap is for link transmit or receive

User ID - A number or Alpha-numeric character string used to identify where to send information when the trap is triggered "Stage 2 Receive Call Progress Initiate MSU Trap Triggered (CPT) Message" is sent to the Stage 2 Process via "Perform Stage 2 Communication Control Function" (P2-10). This contains the following:

Link ID - Numeric designation for the monitor the link is attached to

CTRL Unit - The Stage 1 controller ID that the monitor is controlled from

Trap Number - Number assigned to the Response Trap in the monitor

Type - Call Progress Initiate MSU

Time - Time that the Response Trap was triggered

MSU - The MSU message that was trapped

Priority - A number representing the interrupt priority of the trap

Origin - Indicates whether the trap is for link transmit or receive

User ID - A number or Alpha-numeric character string used to identify where to send information when the trap is triggered "Progress Sequence MSU Trap Triggered (CPT) Information" is formatted into a "Stage 2 Receive Call Progress Sequence MSU Trap Triggered (CPT) Information". This contains the following:

Link ID - Numeric designation for the monitor the link is attached to

CTRL Unit - The Stage 1 controller ID that the monitor is controlled from

Trap Number - Number assigned to the Response Trap in the monitor

Type - Call Progress Sequence MSU

Time - Time that the Response Trap was triggered

MSU - The MSU message that was trapped

Priority - A number representing the interrupt priority of the trap

Origin - Indicates whether the trap is for link transmit or receive

User ID - A number or Alpha-numeric character string used to identify where to send information when the trap is triggered Call Progress Trap messages should be processed and be presented to the Stage 2 Process no more than 300 ms from the time the MSU(s) information was presented to the Stage 1 Process.

"Stage 2 Receive Call Progress sequence MSU Trap Triggered (CPT) Information" is sent to the Stage 2 Process via "Perform Stage 2 Communication Control Function" (P2-10). This contains the following:

Link ID - Numeric designation for the monitor the link is attached to

CTRL Unit - The Stage 1 controller ID that the monitor is controlled from

Trap Number - Number assigned to the Response Trap in the monitor

Type - Call Progress Sequence MSU

Time - Time that the Response Trap was triggered

MSU - The MSU message that was trapped

Priority - A number representing the interrupt priority of the trap

Origin - Indicates whether the trap is for link transmit or receive

User ID - A number or Alpha-numeric character string used to identify where to send information when the trap is triggered "Transmit Call Progress Initiate MSU Trap Triggered (CPT) Information" is formatted into a "Stage 2 Transmit Call Progress Initiate MSU Trap Triggered (CPT) Message". This contains the following:

Link ID - Numeric designation for the monitor the link is attached to

Trap Number - Number assigned to the Response Trap in the monitor

Type - Call Progress Initiate MSU

Time - Time that the Response Trap was triggered

MSU - The MSU message that was trapped

Priority - A number representing the interrupt priority of the trap

Origin - Indicates whether the trap is for link transmit or receive

User ID - A number or Alpha-numeric character string used to identify where to send information when the trap is triggered "Stage 2 Transmit Call Progress Initiate MSU Trap Triggered (CPT) Message" is sent to the Stage 2 Process via "Perform Stage 2 Communication Control Function" (P2-10). This contains the following:

Link ID - Numeric designation for the monitor the link is attached to

CTRL Unit - The Stage 1 controller ID that the monitor is controlled from

Trap Number - Number assigned to the Response Trap in the monitor

Type - Call Progress Initiate MSU

Time - Time that the Response Trap was triggered

MSU - The MSU message that was trapped

Priority - A number representing the interrupt priority of the trap

Origin - Indicates whether the trap is for link transmit or receive

User ID - A number or Alpha-numeric character string used to identify where to send information when the trap is triggered "Transmit Call Progress Sequence MSU Trap Triggered (CPT) Information" is formatted into a "Stage 2 Transmit Call Progress Sequence MSU Trap Triggered (CPT) Information". This contains the following:

Link ID - Numeric designation for the monitor the link is attached to

CTRL Unit - The Stage 1 controller ID that the monitor is controlled from

Trap Number - Number assigned to the Response Trap in the monitor

Type - Call Progress Sequence MSU
Time - Time that the Response Trap was triggered
MSU - The MSU message that was trapped
Priority - A number representing the interrupt priority of the trap
Origin - Indicates whether the trap is for link transmit or receive
User ID - A number or Alpha-numeric character string used to identify where to send information when the trap is triggered Call Progress Trap messages should be processed and be presented to the Stage 2 Process no more than 300 ms from the time the MSU(s) information was presented to the Stage 1 Process.

"Stage 2 Transmit Call Progress Sequence MSU Trap Triggered (CPT) Information" is sent to the Stage 2 Process via "Perform Stage 2 Communication Control Function" (P2-10). This contains the following:

Link ID - Numeric designation for the monitor the link is attached to
CTRL Unit - The Stage 1 controller ID that the monitor is controlled from
Trap Number - Number assigned to the Response Trap in the monitor
Type - Call Progress Sequence MSU
Time - Time that the Response Trap was triggered
MSU - The MSU message that was trapped
Priority - A number representing the interrupt priority of the trap
Origin - Indicates whether the trap is for link transmit or receive
User ID - A number or Alpha-numeric character string used to identify where to send information when the trap is triggered Link data supplied from the monitor(s) will be recorded on a storage medium (Hard Disk, RAM, DRAM, etc.). The storage medium will store a minimum of 20 minutes of live link data (40% aggregate link load). This "temporary link data buffer" will be a "first in first out" buffer. Data residing in the buffer will be accessible from the Stage 2 Process. Stage 2 Process access to the buffer data will not stop on going link data storage. Data capture can only be stopped by the user and has the highest keep alive priority. The storage medium can be partitioned (min. 268 meg total storage area) and selected link data directed to these partitions (minimum of 16 partitions) so that special link study routines can be performed. Partitioned storage space will subtract from the on going link data buffer storage capacity. If partitioned data storage uses up allocated storage space, the "first in first out" data capture technique will be used. SUs stored will have been time stamped with the time that it was presented to the monitor. Partitioned data capture can be stopped by the user and the by Stage 2 Process. It has the lowest keep alive priority. Partitioned data space will be made available to ongoing data capture if a Major Network Event is in progress.

All or selected link data will also be available at a 56 Kb Auxiliary (AUX) port. The orientation, contents and flow control will not lag monitor presentation time by more than 5 minutes. Data will be presented to this port in the same manner as the on going data is presented to the disk.

Every message sent to the Stage 2 Process by the Stage 1 Process is logged. The logs are compared against a user defined "Major Event Criteria Variable". If a Major Event is detected, the following procedures take place:

1. Selected threshold, Reactive and Response traps are suspended for affected links handled by the Stage 1 Process via "Monitor Control Information". Thresholds and traps can be reactivated by the Stage 3 Process or at the end of the event.

2. All User Defined Traps and Protocol Analyzer Functions are terminated for links handled by the Stage 1 Process via "Monitor Control Information". Even if other links are not affected. Thresholds and traps can be reactivated by the Stage 3 Process or at the end of the event.

3. A Priority 0 "Stage 2 Major Event Alarm Message" is sent to the Stage 2 Process.

4. All available storage medium is cleared for the increased link data via "Monitor Control Information".

5. Auxiliary storage medium device(s) are attached as required via "Monitor Control Information" so as much data leading up and during the event can be captured.

The "Stage 2 Major Event Alarm Message" contents include the following:

Link ID - Numeric designation for the link monitor that is experiencing the trouble
CTRL Unit - The Stage 1 controller ID that the monitor is controlled from
Severity # - A number representing the severity of the trouble
Time - Time that the alarm was detected
Priority - A number representing the interrupt priority of the request
Origin - Indicates whether the trouble is on the link transmit or receive
User ID - A number or Alpha-numeric character string used to identify where to send information when the trap is triggered. Default value is the Stage 3 controller.

The Stage 2 Process sends a "Stage 1 Control Message (P10-9)" to suspend, terminate or change the monitor traps and configuration during Major Events and to suspend, enable and clear "Call Progress Traps". This Message is decoded into "Monitor Control Information" and sent to the appropriate monitor. There are two types of "Stage 1 Control Messages".

"Stage 1 Control Message"
"Stage 1 Call Progress Trap Control Message"

"Stage 1 Control Message" contents include the following:

Link ID - Numeric designation for the link monitor that is experiencing the trouble
CTRL Unit - The Stage 1 controller ID that the monitor is controlled from
Priority - A number representing the interrupt priority of the message
Command - Instructions that the Stage 1 Process can interpret describing the action to be taken
Used ID - A number or Alpha-numeric character string used to allow use of this function and to identify where to send response information to "Monitor Control Information" contents include the following:

Link ID - Numeric designation for the link monitor that is experiencing the trouble
Priority - A number representing the interrupt priority of the message
Command: Instructions that the monitor can interpret describing the action to be taken. Actions to be taken can be:
  Stop All Reactive Traps
  Stop Selected Traps
  Resume Reactive Traps
  Allocate Disk Space
  Stop Call Progress Traps
  Resume All Traps etc.

Stop All Response Traps

Stop Selected Traps

Resume Response Traps

Stop Protocol Analyzer

Connect AUX Storage device

Reset Monitor etc.

User ID - A number or Alpha-numeric character string used to allow use of this function and to identify where to send response information to.

"Stage 1 Call Progress Trap Control Messages" are used to disable, enable and clear "Call Progress Traps". There are three "Stage 1 Call Progress Trap Control Messages".

"Stage 1 Call Progress Initiate MSU Trap Disable Message"

"Stage 1 Call Progress Initiate MSU Trap Enable Message"

"Stage 1 Call Progress Initiate MSU Trap Clear Message"

"Stage 1 Call Progress Initiate MSU Trap Disable Information" to temporarily disable the "Initiate MSU Trap". The contents include the following:

Link ID - Numeric designation for the link monitor that contains the "Call Progress Initiate Trap"

CTRL Unit - The Stage 1 controller ID that the monitor is controlled from

Trap # - Number assigned to the trap when it was generated

Type - Trap

Action - Action to be taken by the Stage 1 or monitor process. Disable Call Progress Initiate Trap Priority - Number from 0 to 5 that identifies the interrupt priority of the information - 1

User ID - Used to determine where the trap information is to be sent. The default value would be the Stage 2 Controller ID.

"Stage 1 Call Progress Initiate MSU Trap Enable Information" to enable the "Initiate MSU Trap". The contents include the following:

Link ID - Numeric designation for the link monitor that contains the "Call Progress Initiate Trap"

CTRL Unit - The Stage 1 controller ID that the monitor is controlled from

Trap # - Number assigned to the trap when it was generated

Type - Trap

Action - Action to be taken by the Stage 1 or monitor process. Enable Call Progress Initiate Trap Priority - Number from 0 to 5 that identifies the interrupt priority of the information - 1

User ID - Used to determine where the trap information is to be sent. The default value would be the Stage 2 Controller ID.

"Stage 1 Call Progress Sequence MSU Trap Clear Information" to clear or remove the "Sequence MSU Trap". The contents include the following:

Link ID - Numeric designation for the link monitor that contains the "Call Progress Sequence Trap"

CTRL Unit - The Stage 1 controller ID that the monitor is controlled from

Trap # - Number assigned to the trap when it was generated

Type - Trap

Action - Action to be taken by the Stage 1 or monitor process. Enable Call Progress Initiate Trap Priority - Number from 0 to 5 that identifies the interrupt priority of the information - 1

User ID - Used to determine where the trap information is to be sent. The default value would be the Stage 2 Controller ID.

"Stage 1 Call Progress Initiate MSU Trap Clear Information" to remove or clear "Initiate MSU Trap" and "Sequence MSU Traps". The contents include the following:

Link ID - Numeric designation for the link monitor that contains the "Call Progress Initiate and/or Sequence Traps"

CTRL Unit - The Stage 1 controller ID that the monitor is controlled from

Trap # - Number assigned to the trap when it was generated

Type - Trap

Action - Action to be taken by the Stage 1 or monitor process. Enable Call Progress Initiate Trap Priority - Number from 0 to 5 that identifies the interrupt priority of the information - 1

User ID - Used to determine where the trap information is to be sent. The default value would be the Stage 2 Controller ID.

Variable, Register and Array elements in the monitors can be polled either one at a time or all registers at once. The information obtained will be formatted into a Stage 2 information message and sent to the Stage 2 Process. Polling of register information is controlled by the Stage 2 Process via a "Stage 1 Information Request Message". This request message is decoded into "Link Array Information Request Information and sent to the monitor. This procedure allows addressing any monitor or group of monitors controlled by the Stage 1 Process. The "Stage Information Request Message" contents include the following:

Link ID - Numeric designation for the monitor the link is connected to

CTRL Unit - The Stage 1 controller ID that the monitor is controlled from

Reg # - The number assigned to the Register or Array

RECNO - Record number in the Register or Array. If only the RECNO is identified and the Element # left blank, then all elements in the record will be retrieved. Leave blank if not needed Element # - Element number within the record Populated only if a particular element is needed VAR ID - The number or name assigned to the Variable. Leave blank if not needed Priority - A number representing the interrupt priority of the request User ID - A number or Alpha-numeric character string used to identify where to send information when the trap is triggered. Default value is the Stage 3 controller.

"Stage 1 Information Request Message" is decoded into "Link Array Information Request Information" (P2-3). This information identifies information contained in variables, array and array elements that either a Stage 2, Stage 3 and Stage 4 processes wants to retrieve. This includes the following:

Link ID - Numeric designation for the monitor the link is connected to

CTRL Unit - The Stage 1 controller ID that the monitor is controlled from

Reg # - The number assigned to the Register or Array

RECNO - Record number in the Register or Array. Leave blank if not needed. If the RECNO is left blank, all elements for all records in the Array will be retrieved Element # - Element number within the record. Populated only if a particular element is needed. If the Element # left blank, then all elements in the record will be retrieved.

VAR ID - The number or name assigned to the Variable. Leave blank if not needed.

Priority - A number representing the interrupt priority of the request

User ID - A number or Alpha-numeric character string used to identify where to send information when the trap is triggered. Default value is the Stage 3 controller.

"Link Array Information Request Information" (P2-3) is sent to the appropriate monitor to initiate the retrieval of array information. This includes the following:

Link ID - Numeric designation for the monitor the link is connected to

CTRL Unit - The Stage 1 controller ID that the monitor is controlled from

Reg # - The number assigned to the Register or Array

RECNO - Record number in the Register or Array. Leave blank if not needed. If the RECNO is left blank, all elements for all records in the Array will be retrieved.

Element # - Element number within the record. Populated only if a particular element is needed. If the Element # left blank, then all elements in the record will be retrieved.

VAR ID - The number or name assigned to the Variable. Leave blank if not needed

Priority - A number representing the interrupt priority of the request

User ID - A number or Alpha-numeric character string used to identify where to send information when the trap is triggered. Default value is the Stage 3 controller.

"Link Array Information" is sent from the monitor in response to the "Link Array Information Request Information". This includes the following:

Link ID - Numeric designation for the monitor the link is connected to

Reg # - The number assigned to the Register or Array

RECNO - Record number in the Register or Array.

Element # - Element number within the record

Element Data - The data contained in the array element identified by the RECNO and Element #

VAR ID - The number or name assigned to the Variable. Leave blank if not needed.

VAR Data - Data contained in the variable.

Priority - A number representing the interrupt priority of the request.

User ID - A number or Alpha-numeric character string used to identify where to send information when the trap is triggered. Default value is the Stage 3 controller.

"Link Array Information" is formatted into a "Stage 2 Link Array Information Message" (P2-4) and sent to the Stage 2 Process via the "Perform Stage 2 Communication Control Function" (P2-10) process. This includes the following:

Link ID - Numeric designation for the monitor the link is connected to

CTRL Unit - The Stage 1 controller ID that the monitor is controlled from

Reg # - The number assigned to the Register or Array

RECNO - Record number in the Register or Array

Element # - Element number within the record

Element Data - The data contained in the array element identified by the RECNO and Element #

VAR ID - The number or name assigned to the Variable. Leave blank if not needed.

VAR Data - Data contained in the variable

Priority - A number representing the interrupt priority of the request

User ID - A number or Alpha-numeric character string used to identify where to send information when the trap is triggered. Default value is the Stage 3 controller.

Major Event Criteria Variable" can be changed using "Stage 1 Modify Major Event Criteria Variable Message" sent from the Stage 2 Process. This message is decoded into "Modify Major Event Criteria Variable Information". The "Stage 1 Modify Major Event Criteria Variable Message" includes the following:

Link ID - Not used

CTRL Unit - The Stage 1 controller ID that the monitor is controlled from

VAR ID - The number or name assigned to the Variable.

VAR Type - High threshold or Low Threshold

VAR Data - The threshold's value

Priority - A number representing the interrupt priority of the request

User ID - A number or Alpha-numeric character string used to identify where to send information when the trap is triggered. Default value is the Stage 3 controller.

"Modify Major Event Criteria Variable Information" is used to change the contents of the "Major Event Criteria Variable". Variable inform is replaced with the values contained in this information. The "Modify Major Event Criteria Variable Information" includes the following:

VAR ID - The number or name assigned to the Variable.

VAR Type - High threshold or Low Threshold

VAR Data - The threshold's value

Priority - A number representing the interrupt priority of the request.

User ID - A number or Alpha-numeric character string used to identify where to send information when the trap is triggered. Default value is the Stage 3 controller.

Poll Array Record elements can be changed using "Stage 1 Modify Pool Array Element Data Message" sent from the Stage 2 Process. This message is decoded into "Modify Poll Array Element Data Information". The "Stage 1 Modify Poll Array Element Data Message" includes the following:

Link ID - Numeric designation for the monitor the link is connected to

CTRL Unit - The Stage 1 controller ID that the monitor is controlled from

RECNO - Record number in the Array

Element # - Element number within the record that is to be modified. The following Elements are the minimum to be included:

Start Time - Time the Poll Interval is valid

End Time - The latest time the Poll Interval value is valid

Poll Interval - Time in milliseconds of the interval

Array ID - Array that the Poll Interval is for

RECNO - Record number in the Array that the Poll Interval is for

Element Data - Data to be placed in the array element

Priority - A number representing the interrupt priority of the request

User ID - A number or Alpha-numeric character string used to identify where to send information when the trap is triggered. Default value is the Stage 3 controller.

The "Modify Poll Array Element Data Information" is sent to the appropriate monitor, where it is used to change the identified Array Element. The "Modify Poll Array Element Data Information" contents include the following:

Link ID - Numeric designation for the monitor the link is connected to

RECNO - Record number in the Array

Element # - Element number within the record that is to be modified. The following Elements are the minimum to be included:

Start Time - Time the Poll Interval is valid

End Time - The latest time the Poll Interval value is valid

Poll Interval - Time in milliseconds of the interval

Array ID - Array that the Poll Interval is for

RECNO - Record number in the Array that the Poll Interval is for

Element Data - Data to be placed in the array element

Priority - A number representing the interrupt priority of the request

User ID - A number or Alpha-numeric character string used to identify where to send information when the trap is triggered. Default value is the Stage 3 controller.

"MSU Interval Threshold Variables" can be changed using "Stage 1 Modify MSU Interval Threshold Message" sent from the Stage 2 Process. This message is decoded into "Modify MSU Interval Threshold Variable Information". The "Stage 1 Modify MSU Interval Threshold Message" contents include the following:

Link ID - Numeric designation for the monitor the link is connected to

CTRL Unit - The Stage 1 controller ID that the monitor is controlled from

VAR ID - The number or name assigned to the Variable

VAR Type - High threshold or Low Threshold

Var Data - The threshold's value

Priority - A number representing the interrupt priority of the request

User ID - A number or Alpha-numeric character string used to identify where to send information when the trap is triggered. Default value is the Stage 3 controller.

The "Modify MSU Interval Threshold Information" contents include the following:

Link ID - Numeric designation for the monitor the link is connected to

VAR ID - The number or name assigned to the Variable

VAR Type - High threshold or Low Threshold

Var Data - The threshold's value

Priority - A number representing the interrupt priority of the request

User ID - A number or Alpha-numeric character string used to identify where to send information when the trap is triggered. Default value is the Stage 3 controller.

"MSU Category Threshold Variables" can be changed using "Stage 1 Modify MSU Category Threshold Message" sent from the Stage 2 Process. This message is decoded into "Modify MSU Category Threshold Variable Information" . The "Modify MSU Category Threshold Message" contents include the following:

Link ID - Numeric designation for the monitor the link is connected to

CTRL Unit - The Stage 1 controller ID that the monitor is controlled from

VAR ID - The number or name assigned to the Variable

VAR Type - High threshold or Low Threshold

Var Data - The threshold's value

Priority - A number representing the interrupt priority of the request

User ID - A number or Alpha-numeric character string used to identify where to send information when the trap is triggered. Default value is the Stage 3 controller.

"Modify MSU Category Threshold Information" contents include the following:

Link ID - Numeric designation for the monitor the link is connected to

VAR ID - The number or name assigned to the Variable

VAR Type - High threshold or Low Threshold

Var Data - The threshold's value

Priority - A number representing the interrupt priority of the request

User ID - A number or Alpha-numeric character string used to identify where to send information when the trap is triggered. Default value is the Stage 3 controller.

"Link Load Threshold Variables" can be changed using "Stage 1 Modify Link Load Threshold Message" sent from the Stage 2 Process. This message is decoded into "Modify Link Load Threshold Variable Information". The "Modify Link Load Threshold Message" contents include the following:

Link ID - Numeric designation for the monitor the link is connected to

CTRL Unit - The Stage 1 controller ID that the monitor is controlled from

VAR ID - The number or name assigned to the Variable

VAR Type - High threshold or Low Threshold

VAR Data - The threshold's value

Priority - A number representing the interrupt priority of the request

User ID - A number or Alpha-numeric character string used to identify where to send information when the trap is triggered. Default value is the Stage 3 controller.

The "Modify Link Load Threshold Information" contents include the following:.

Link ID - Numeric designation for the monitor the link is connected to

VAR ID - The number or name assigned to the Variable

VAR Type - High threshold or Low Threshold

VAR Data - The threshold's value

Priority - A number representing the interrupt priority of the request

User ID - A number or Alpha-numeric character string used to identify where to send information when the trap is triggered. Default value is the Stage 3 controller.

"BERT Threshold Variables" can be changed using "Stage 1 Modify BERT Threshold Message" sent from the Stage 2 Process. This message is decoded into "Modify BERT Threshold Variable Information". The "Modify BERT Threshold Message" contents include the following:

Link ID - Numeric designation for the monitor the link is connected to

CTRL Unit - The Stage 1 controller ID that the monitor is controlled from

VAR ID - The number or name assigned to the Variable

VAR Type - High threshold, there is only one type for BERT threshold

VAR Data - The threshold's value

Priority - A number representing the interrupt priority of the request

User ID - A number or Alpha-numeric character string used to identify where to send information when the trap is triggered. Default value is the Stage 3 controller.

"Modify BERT Threshold Information" contents include the following:

Link ID - Numeric designation for the monitor the link is connected to

VAR ID - The number or name assigned to the Variable

VAR Type - High threshold, there is only one type for BERT threshold

VAR Data - The threshold's value

Priority - A number representing the interrupt priority of the request

User ID - A number or Alpha-numeric character string used to identify where to send information when the trap is triggered. Default value is the Stage 3 controller.

"Link Error Threshold Variables" can be changed using "Stage 1 Modify Link Error Threshold Message" sent from the Stage 2 Process. This message is decoded into "Modify Link Error Threshold Variable Information". The "Modify Link Error Threshold Message" contents include the following:

Link ID - Numeric designation for the monitor the link is connected to

CTRL Unit - The Stage 1 controller ID that the monitor is controlled from

VAR ID - The number or name assigned to the Variable

VAR Type - High threshold, there is only one type for Link Error threshold

VAR Data - The threshold's value

Priority - A number representing the interrupt priority of the request

User ID - A number or Alpha-numeric character string used to identify where to send information when the trap is triggered. Default value is the Stage 3 controller.

The "Modify Link Error Threshold Information" contents include the following:

Link ID - Numeric designation for the monitor the link is connected to

VAR ID - The number or name assigned to the Variable

VAR Type - High threshold, there is only one type for Link Error threshold

VAR Data - The threshold's value

Priority - A number representing the interrupt priority of the request

User ID - A number or Alpha-numeric character string used to identify where to send information when the trap is triggered. Default value is the Stage 3 controller.

A user defined or system generated Response Trap is loaded into the monitor using "Stage 1 Response Trap Message" received from the Stage 2 Process (P2-10). This message is decoded into "Response Trap Information" (P2-2), which is sent to the appropriate monitor. The "Stage 1 Response Trap Message" contents include the following:

Link ID - Numeric designation for the link monitor that is experiencing the trouble CTRL Unit - The Stage 1 controller ID that the monitor is controlled from Trap # - Number assigned to the trap when it was generated Mask - A representation of the MSU to be trapped, populated with the MSU field(s) values to be trapped on. If the Mask populated values match the equivalent MSU field values, a trap trigger indication is generated.

Script - A set of instructions used by the monitor to handle the information supplied by the trapped MSU. Note: this function could be handled by the Stage 1, 2, 3 or 4 Process if the MSU is sent to the appropriate process when triggered.

Type - Response Trap

Origin - Side of the link that the MSU is be trapped on - Receive/Transmit

Priority - Number from 0 to 5 that identifies the interrupt priority of the information - 1

User ID - Used to determine where the trap information is to be sent. The default value would be the Stage 2 Controller ID.

"Response Trap Information" contents include the following:

Link ID - Numeric designation for the link monitor that is experiencing the trouble Trap # - Number assigned to the trap when it was generated Mask - A representation of the MSU to be trapped, populated with the MSU field(s) values to be trapped on. If the Mask populated values match the equivalent MSU field values, a trap trigger indication is generated.

Script - A set of instructions used by the monitor to handle the information supplied by the trapped MSU. Note: this function could be handled by the Stage 1, 2, 3 or 4 Process if the MSU is sent to the appropriate process when triggered.

Type - Response Trap

Origin - Side of the link that the MSU is be trapped on - Receive/Transmit

Priority - Number from 0 to 5 that identifies the interrupt priority of the information - 1.

User ID - Used to determine where the trap information is to be sent. The default value would be the Stage 2 Controller ID.

A "Stage 1 User Defined Trap Message" received from the Stage 2 Process (P2-10). This message is decoded into "User Defined Trap Information" (P2-5), which is then sent to the appropriate monitor. "Stage 1 User defined Trap Message" contents include the following:

Link ID - Numeric designation for the link monitor that is experiencing the trouble CTRL Unit - The Stage 1 controller ID that the monitor is controlled from Trap # - Number assigned to the trap when it was generated Mask - A representation of the MSU to be trapped, populated with the MSU field(s) values to be trapped on. If the Mask populated values match the equivalent MSU field values, a trap trigger indication is generated Script - A set of instructions used by the monitor to handle the information supplied by the trapped MSU. Note: this function could be handled by the Stage 1, 2, 3 or 4 Process if the MSU is sent to the appropriate process when triggered Type - User Defined Trap Origin - Side of the link that the MSU is be trapped on - Receive/Transmit Priority - Number from 0 to 5 that identifies the interrupt priority of the information - 1

User ID - Used to determine where the trap information is to be sent. The default value would be the Stage 2 Controller ID.

"User defined Trap Information" contents include the following:

Link ID - Numeric designation for the link monitor that is experiencing the trouble Trap # - Number assigned to the trap when it was generated Mask - A representation of the MSU to be trapped, populated with the MSU field(s) values to be trapped on. If the Mask populated values match the equivalent MSU field values, a trap trigger indication is generated.

Script - A set of instructions used by the monitor to handle the information supplied by the trapped MSU. Note: this function could be handled by the Stage 1, 2, 3 or 4 Process if the MSU is sent to the appropriate process when triggered.

Type - User Defined Trap

Origin - Side of the link that the MSU is be trapped on - Receive/Transmit

Priority - Number from 0 to 5 that identifies the interrupt priority of the information - 1.

User ID - Used to determine where the trap information is to be sent. The default value would be the Stage 2 Controller ID.

A "Stage 1 Call Progress Initiate MSU Trap Message" received from the Stage 2 Process (P2-10). This message is decoded into "Call Progress Initiate MSU Information" (P2-5), which is then sent to the appropriate monitor. The "Stage 1 Call Progress Initiate MSU Trap Message" contents include the following:

Link ID - Numeric designation for the link monitor that is experiencing the trouble CTRL Unit - The Stage 1 controller ID that the monitor is controlled from. Trap # - Number assigned to the trap when it was generated Mask - A representation of the MSU to be trapped, populated with the MSU field(s) values to be trapped on. If the Mask populated values match the equivalent MSU field values, a trap trigger indication is generated.

Script - Send MSU trapped to the user Type - Call Progress Initiate MSU Trap

Origin - Side of the link that the MSU is be trapped on - Receive/Transmit

Priority - Number from 0 to 5 that identifies the interrupt priority of the information - 1

User ID - Used to determine where the trap information is to be sent. The default value would be the Stage 2 Controller ID.

"Call Progress Initiate MSU Trap Information" contents include the following:

Link ID - Numeric designation for the link monitor that is experiencing the trouble Trap # - Number assigned to the trap when it was generated Mask - A representation of the MSU to be trapped, populated with the MSU field(s) values to be trapped on. If the Mask populated values match the equivalent MSU field values, a trap trigger indication is generated.

Script - Send MSU trapped to the user

Type - Call Progress Initiate MSU Trap

Origin - Side of the link that the MSU is be trapped on - Receive/Transmit

Priority - Number from 0 to 5 that identifies the interrupt priority of the information - 1.

User ID - Used to determine where the trap information is to be sent. The default value would be the Stage 2 Controller ID.

A "Stage 1 Call Progress Sequence MSU Trap message" received from the Stage 2 Process (P2-10). This message is decoded into "Call Progress Sequence MSU Trap Information", which is sent to the appropriate monitor. The "Call Progress Sequence MSU Trap Message" contents include the following:

Link ID - Numeric designation for the link monitor that is experiencing the trouble CTRL Unit - The Stage 1 controller ID that the monitor is controlled from. Trap # - Number assigned to the trap when it was generated Mask - A representation of the MSU to be trapped, populated with the MSU field(s) values to be trapped on. If the Mask populated values match the equivalent MSU field values, a trap trigger indication is generated.

Script - Send MSU trapped to the user

Type - Call Progress Sequence MSU Trap

Origin - Side of the link that the MSU is be trapped on - Receive/Transmit

Priority - Number from 0 to 5 that identifies the interrupt priority of the information - 1.

User ID - Used to determine where the trap information is to be sent. The default value would be the Stage 2 Controller ID.

"Call Progress Sequence MSU Trap Information" contents include the following:

Link ID - Numeric designation for the link monitor that is experiencing the trouble Trap # - Number assigned to the trap when it was generated Mask - A representation of the MSU to be trapped, populated with the MSU field(s) values to be trapped on. If the Mask populated values match the equivalent MSU field values, a trap trigger indication is generated.

Script - Send MSU trapped to the user Type - Call Progress Sequence MSU Trap

Origin - Side of the link that the MSU is be trapped on - Receive/Transmit

Priority - Number from 0 to 5 that identifies the interrupt priority of the information - 1.

User ID - Used to determine where the trap information is to be sent. The default value would be the Stage 2 Controller ID.

Time synchronization will be passed to the Stage 1 Process and the monitors from time synchronization control messages sent from the Stage 4 Process (Master Clock).

Stage 1 allows the user to pass Test Data to the monitors. This test data is used to verify Reactive Trap Scripts before they are incorporated in the routine monitor procedures.

A Stage 2 Test Data message is received by the "Perform Stage 2 Communication Control Function" (P2-10) and formatted into Test Information for the appropriate monitor(s) (P2-7) and sent to the monitor(s) via the high speed bus.

The Test Information is triggered by the Poll Array Timer in the monitor. When triggered, the monitor will pass test data to the designated registers, arrays and traps. This should activate the desired Reactive Trap Script and initiate an Alarm Information. The Priority of this information will be 9, indicating test information.

Stage 1 will receive this Test Information over the high speed bus and format it into a Test Data Message (P2-8) and send it to Stage 2 via the Perform Stage 2 Communication Control Function process (P2-10).

The format of the Stage 2 Test Data message will be:

Link ID - Number assigned to the link

Test Data Elements - An array of values representing the test data's value, Register/Array to be tested and time the test should start Priority - Priority will equal 9

User ID - Used to determine where the Test Result Information is to be sent

The format of the Test Result Information will be the same as any previously described alarm information except that the priority will be set for 9.

The format of the Stage 2 Test Data Message will be the same as any previously described alarm information except that the priority will be set for 9.

Stage 2 Process

The Stage 2 process is a multi-tasking/multi-user processor located at one of the STP locations (Local Network Control Site). Stage 1 controllers from each STP in an STP pair are connected to the Stage 2 Process via their Direct Control Port. The process's principle function is to react to messages sent from the monitors and provide basic test and administrative functions. Access to the Stage 2 process from the other locations is provided via remote terminal.

The functions and operations of the Stage 2 process are the following:

A. React to link threshold triggers by making some basic determination of the status of the link and determine if a potential problem may exist or is in the process of escalating, i.e., if a link load threshold is exceeded, the process may wait to see if this condition is temporary or on going. It does this by resetting the threshold to see if it is triggered again. If the link was part of an ICN network it may also poll the other related link's counters to determine if the problem is isolated to one link or is a network problem. If a trouble is indicated, the process further analyzes the data and informs maintenance personnel of the problem. It also displays recommended corrective action procedures, if any can be identified. It also determines whether the problem represents a 905 certification parameter (i.e., uneven load distribution)

and flags the results in the Link History Data Base for later analysis.

B. React to Reactive Trap triggers by generating Response Traps. These Response Traps are used to further define the problem and determine if correct action is taken by the network elements involved. If the Response Traps indicate that network reaction is impaired, the results of the traps are analyzed. Using previous link history information, node configuration parameters and Certification results, the process determines if a serious problem is beginning or is reaching a critical point. Maintenance personnel are immediately informed of the problem and are given corrective action instructions, i.e., a TFC (Transfer Congestion Control message) is detected leaving the monitor's STP toward an ICN network. RCT (Route set Congestion Test Message) and APC (Affected Point Code) traps are generated by the process. The Link Access Data Base is searched for any related nodes to the link transmitting the TFC. The RCT and APC traps are then loaded into the appropriate monitors. If the RCT trap is triggered, meaning an RCT message was sent from the far end network, the APC trap was triggered, meaning the far end network stopped sending traffic of one less then the congestion status of the TFC message, then the far end network is handling the congestion properly. The process will go one step further. Since this is an interconnect link, ISUP traffic might have stopped to the APC node. If this node is an Access Tandem and if the ICN is an Access Tandem interconnect only, prolonged congestion could cause a real problem for both networks. The process would then inform maintenance personnel of this event and suggest possible corrective action procedures to allow ISUP traffic to flow again, even if the congestion is still present. This scenario is also a 905 certification, so the Link History Data base would flag the data entry accordingly.

So far 80 Reactive Traps have been identified. These traps will run when ever a Reactive MSU is detected. Up to 256 Reactive and Response trap scenarios could be running simultaneously on up to 512 links.

C. Provide manual access to monitor protocol analyzer function. All or selected link data can be displayed on the Stage 2 process terminal. Protocol analyzer results can be saved in the Test Results DB and printed on the process printer.

D. Provide trap and protocol test result analysis tools.

E. Maintain various data bases needed to access link monitors, generated traps, analyzed results and provide corrective action descriptions. These databases are:

Link History DB - Used to hold a running link history information

Link Access DB - Used locate link monitors

Link Profile DB - Used to hold information about link design and configuration including diversity Network Certification DB - Used to hold certification parameters for ICN networks Test Results DB - Used hold protocol analysis results for archiving or analysis STP Profile File - Used to hold STP parameters Corrective Action DB - Used to hold corrective descriptions Trap DB - Used to hold predefined user traps Reactive Trap DB - Used to hold reactive trap script definitions Report DB - Used to hold predefined report definitions User Profile DB - Used to hold user log-ins, passwords and other user information F. Provide report generator.

G. Provide Stage 3 and Stage 4 process access.

Figures 1, 24:
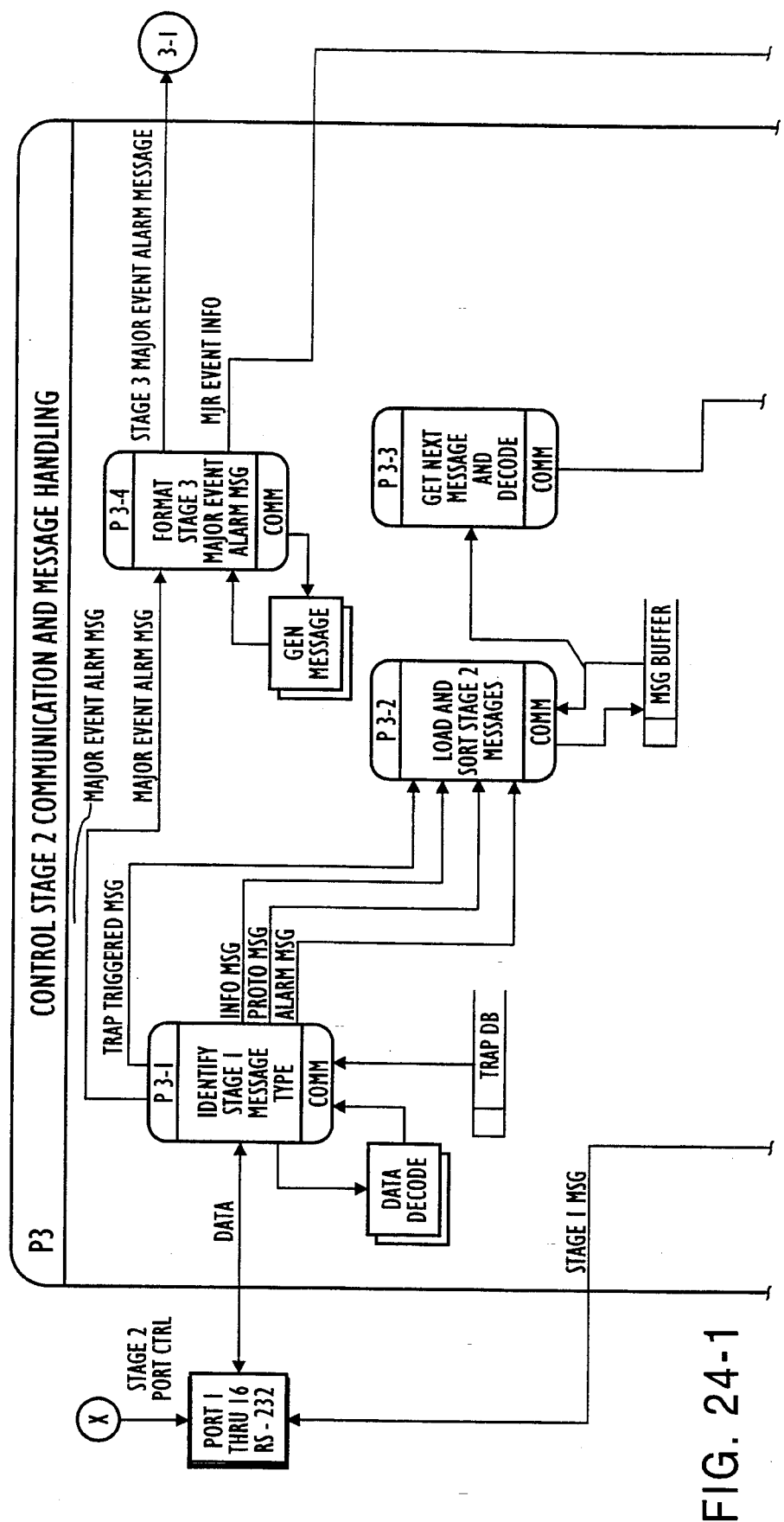
FIGS. 24–31 show the Stage 2 Controller flow.
Figures 2, 24:
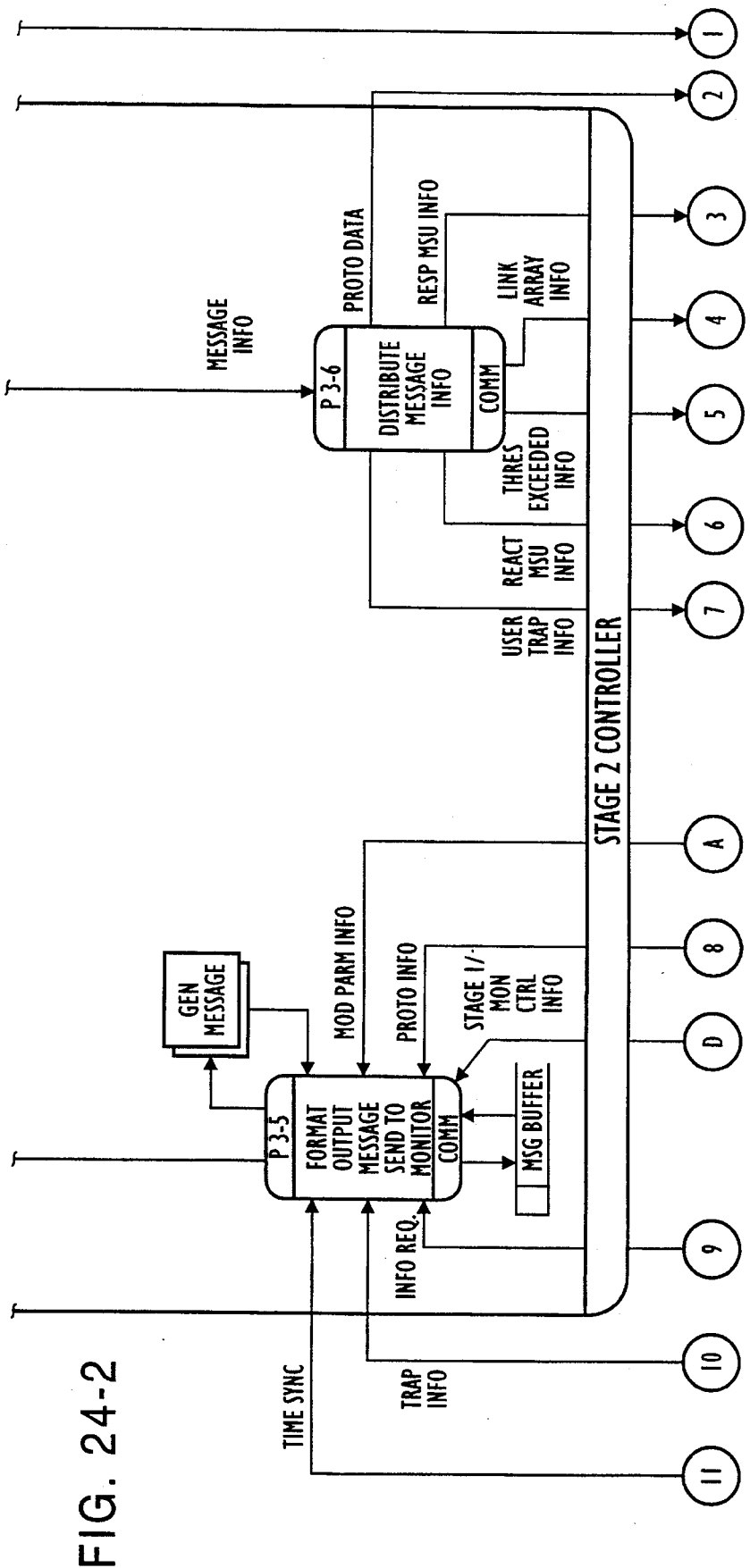

P3: Control Data Communication and Message Handling Between Stage 1 and Stage 2 Process Reference is had to FIGS. 12A and 24.

The Stage 2 Process can communicate with and handle up to 16 Stage 1 Processes.

"Stage 2 Messages" are received by the "Control Stage 2 Communication and Message Handling (P3-1)" process There are Seven types of "Stage 2 Messages":

Major Event Alarm Message

Stage 2 Alarm Message

Stage 2 Reactive MSU Message

Stage 2 Response MSU Message

Stage 2 Trap Triggered Message

Stage 2 Information Message

"Stage 2 Messages" are stored in a temporary message buffer by priority (P3-2). Messages of the same priority are sorted by time they were received.

Messages are taken from the message buffer as soon as possible, but should not exceed 100 ms for Priority 1 and 2 messages and one to two seconds for Priority 3 through 5 messages. "Stage 2 Major Event Alarm Messages" are not buffered, but are decoded into "Major Event Information" (P3-4) . "Major Event Information" is formatted into a "Stage 3 Major Event Alarm Message" and sent directly to the Stage 3 process (3-1) via the "Perform Stage 3 Communication Control" (P10) process. It is also analyzed along with other "Major Event Information" (P5) to determine what Stage 2, Stage 1 and monitor processes to suspend or terminate.

"Stage 2 Major Event Alarm Message" contents include the following:

Link ID - Numeric designation for the link monitor that is experiencing the trouble CTRL Unit - The Stage 1 controller ID that the monitor is controlled from Severity # - A number representing the severity of the trouble Time - Time that the alarm was detected Priority - A number representing the interrupt priority of the message. Priority=0.

Origin - Indicates whether the trouble is on the link transmit or receive

User ID - A number or Alpha-numeric character string used to identify where to send information when the trap is triggered. Default value is the Stage 3 controller.

"Major Event Information" includes the following:

Link ID - Numeric designation for the link monitor that is experiencing the trouble CTRL Unit - The Stage 1 controller ID that the monitor is controlled from Severity # - A number representing the severity of the trouble MSU Type - The MSU type that caused the event to be detected Time - Time that the alarm was detected Priority - A number representing the interrupt priority of the message. Priority=0.

Origin - Indicates whether the trouble is on the link transmit or receive

User ID - A number or Alpha-numeric character string used to identify where to send information when the trap is triggered. Default value is the Stage 3 controller.

"Stage 2 Alarm Messages" are sent from the Stage 1 process. They indicate a threshold has been exceeded in the monitor and represent a possible trouble in the network. The information contained in these messages when compared with alarms sent from other monitors, Link History Information, Link/Network Benchmarks and SS7 ICN Certification Benchmarks will determine the severity of the potential trouble. If the alarm is determined to be harmless, an entry is made in the Link History Data Base. If the alarm analysis indicates a real trouble, a "Stage 3 Alarm Message" is sent to the Stage 3 process. There are a minimum of eight "Stage 2 Alarm Messages":

"Receive Link Load Threshold Exceeded Message"
"Link Load BERT Threshold Exceeded Message"
"Transmit Link Load Threshold Exceeded Message"
"Link Error Threshold Exceeded Message"
"Receive (MSU TYPE) Interval Threshold Exceeded Message"
"Transmit (MSU TYPE) Interval Threshold Exceeded Message"
"Receive MSU Category Threshold Exceeded Message"
"Transmit MSU Category Threshold Exceeded Message"

All threshold exceeded messages are decoded (P3-3) into threshold exceeded information and sent to sent to the "Analyze Threshold and Call Progress Information" (P4) process. This process analyzes the threshold exceeded information and determines if a real trouble exists.

"Stage 2 Reactive MSU Message" is decoded (P3-3) into "Reactive MSU Information". This information is sent to the Analyze Reactive Trap Info and Generate Response Trap(s) (P5) process where it will activate a "Reactive Trap Script". There are a minimum of two "Stage 2 Reactive MSU Messages":

"Receive Reactive MSU Message"
"Transmit Reactive MSU Message"

"Stage 2 Response MSU Messages" is decoded (P3-3) into "Response MSU Information". This information is sent to the Analyze Reactive Trap Info and Generate Response Trap(s) (P5) process where it supplies information to a previously activated "Reactive Trap Script". There are a minimum of two "Stage 2 Response MSU Messages":

"Receive Response MSU Message"
"Transmit Response MSU Message"

"Stage 2 Trap Triggered Message" is decoded (P3-3) into "Trap Triggered Information". There are a minimum of eight "Stage 2 Trap Triggered Messages":

"Receive Response Trap Triggered Message"
"Transmit Response Trap Triggered Message"
"Receive User Defined Trap Triggered Message"
"Transmit User defined Trap Triggered Message"
"Receive Call Progress Initiate Trap Triggered Message"
"Transmit Call Progress Initiate Trap Triggered Message"
"Receive Call Progress Sequence Trap Triggered Message"
"Transmit Call Progress Sequence Trap Triggered Message"

"Receive and Transmit Response Trap Triggered Information" is sent to the Analyze Reactive Trap Info and Generate Response Trap(s) (P5) process where it supplies information to a previously activated "Reactive Trap Script" or "Analyze Exceeded Threshold and Call Progress Trap Information" (P4) process where the information is used to further define the threshold exceeded trouble.

Transmit and Receive User Defined Trap Triggered Information is sent to the "Format and Control Local Terminal" (P8) process if the local terminal owned the trap or to "Perform Stage 3 Communication Control" process (P10) process where it is formatted into a "Stage 3 Trap Triggered Message".

Transmit and Receive Call Progress Initiate Trap Triggered Information is sent to the Analyze Threshold and "Call Progress Trap Information" (P4) process where it is formatted into a "Stage 3 Call Progress Trap Triggered Message" and sent to the Stage 3 process. It is also used to generate "Stage 1 Call Progress Sequence Trap Messages" so that Call Progress Sequence Traps can be placed in the appropriate monitors.

Transmit and Receive "Call Progress Sequence Trap Triggered Information" is sent to "Analyze Threshold and Call Progress Trap Information" (P4) process where it is formatted into a "Stage 3 Call Progress Trap Triggered Message" and sent to the Stage 3 process.

"Stage 2 Link Array Information Message" is decoded into "Link Array Information" (P3-3). There are four types of "Link Array Information":

"Link Load Array Information"
"MSU Interval Array Information"
"MSU Category Array Information"
"Error Array Information"

Transmit and Receive "Link Array Information" is sent to "Analyze Reactive Trap Info and Generate Response Trap(s)" (P5) process, "Analyze Threshold and Call Progress Information" (P4) process, "Generate Corrective Action" (P7) process, "Format and Control Local Terminal" (P8) process and "Perform Stage 3 Communication and Control" (P10) process depending on which process requested the information.

"Protocol Analyzer Data Message" is sent from the Stage 1 process. This message is decoded into "Protocol Data" (P3-3) and is sent to the "Perform Manual Protocol Analysis" (P6) process, "Control Remote Port" (P9) process and "Perform Stage 3 Communication Control" (P10) process depending on which process requested the information.

Information requests and monitor control information from other stage 2 processes is formatted into "Stage 1 Messages" (P3-5) and are sent to the Stage 1 process. There are six types of "Stage 1 Messages":

"Stage 1 Trap "Message"
"Stage 1 Information Request Message"
"Stage 1 Control Message"
"Stage 1 Modify Parameter Message"
"Stage 1 Protocol Analyzer Control Message"
"Stage 1 Time Synchronization Message"

A "Stage 1 Trap Message" is used to add or modify traps to the monitors. "Stage 1 Trap Messages" are generated from "Stage 2 Trap Information" supplied from the "Analyze Threshold and Call Progress Trap Information" (P4) process, "Analyze Reactive Trap Information and Generate Response Traps" (P5) process, "Format and Control Local Terminal" (P8) process and "Perform Stage 3 Communication Control" (P10) process. There are four "Stage 1 Trap Messages":

"Stage 1 Response Trap Message"
"Stage 1 User Defined Trap Message"
"Stage 1 Call Progress Initiate Trap Message"
"Stage 1 Call Progress Sequence Trap Message"

"Stage 1 Response Trap Message" is generated (P3-5) from "Stage 1 Response Trap Information" supplied by the received from the "Analyze Threshold and Call Progress Trap Information" (P4) process, "Analyze Reactive Trap Information and Generate Response Traps" (P5) process, "Format and Control Local Terminal" (P8) process and "Perform Stage 3 Communication Control" (P10) process.

"Stage 1 User Defined Trap Message" is generated (P3-5) from "Stage 1 User Defined Information" supplied by the received from the "For at and Control Local Terminal" (P8)

process and "Perform Stage 3 Communication Control" (P10) process.

"Stage 1 Call Progress Initiate MSU Trap Message" is generated (P3-5) from "Stage 1 Call Progress Initiate MSU Trap Information" supplied by the received from the "Analyze Threshold and Call Progress Trap Information" (P4) process.

"Stage 1 Call Progress Sequence MSU Trap Message" is generated (P3-5) from the "Stage 1 Call Progress Sequence MSU Trap Information" supplied by the received from the "Analyze Threshold and Call Progress Trap Information" (P4) process.

"Stage 1 Information Request Message" is generated (P3-5) from "Stage 1 Information Request Information" supplied by the "Analyze Threshold and Call Progress Trap Information" (P4) process, "Analyze Reactive Trap Information and Generate Response Traps" (P5) process, "Format and Control Local Terminal" (P8) process and "Perform Stage 3 Communication Control" (P10) process.

"Stage 1 Control Message" is used to suspend, terminate or change the monitor traps and configuration during Major Events and to suspend, enable and clear "Call Progress Traps". This Message is generated (P3-5) from information supplied by the "Analyze Threshold and Call Progress Trap Information" (P4) process, "Analyze Reactive Trap Information and Generate Response Traps" (P5) process, "Generate Corrective Action Information" (P7) process and "Perform Stage 3 Communication Control" (P10) process. There are four "Stage 1 Control Messages":

"Stage 1 Control Message"

"Stage 1 Call Progress Initiate MSU Trap Disable Message"

"Stage 1 Call Progress Initiate MSU Trap Enable Message"

"Stage 1 Call Progress Initiate MSU Trap Clear Message"

"Stage 1 Control Message (P10-9)" acts to suspend, terminate or change the monitor traps and configuration during Major Events and control basic monitor functions. This Message is generated (P3-5) from information supplied by the "Analyze Reactive Trap Information and Generate Response Traps" (P5) process, "Generate Corrective Action Information" (P7) process and "Perform Stage 3 Communication Control" (P10) process.

"Stage 1 Call Progress Initiate MSU Trap Disable Message" acts to temporarily disable the "Initiate MSU Trap". It is generated (P3-5) from "Call Progress Initiate MSU Trap Information" supplied by the received from the "Analyze Threshold and Call Progress Trap Information" (P4) process.

"Stage 1 Call Progress Initiate MSU Trap Enable Message" acts to enable the "Initiate MSU Trap" is generated (P3-5) from "Call Progress Initiate MSU Trap Information" supplied by the received from the "Analyze Threshold and Call Progress Trap Information" (P4) process.

"Stage 1 Call Progress Sequence MSU Trap Clear Message" acts to remove or clear all "Sequence MSU Traps". It is generated (P3-5) from "Call Progress Initiate MSU Trap Information" supplied by the received from the "Analyze Threshold and Call Progress Trap Information" (P4) process.

"Stage 1 Call Progress Initiate MSU Trap Clear Message" acts to remove or clear "Initiate MSU Trap" and "Sequence MSU Traps" is generated (P3-5) from Progress Initiate MSU Trap Information" supplied by the received from the "Analyze Threshold and Call Progress Trap Information" (P4) process.

"Stage 1 Response Trap Clear Message" acts to remove or clear "Response Trap" is generated (P3-5) from "Response Trap Clear Information" supplied by the received from the "Generate and Analyze Reactive Trap Trigger Information" (P5) process.

"Stage 1 Modify Parameter Message" is used to change the values of variables and array elements. It is generated from information supplied from the "Analyze Threshold and Call Progress Trap Information" (P4) process, "Format and Control Local Terminals" (P8) process and "Perform Stage 3 Communication Control" (P10) process. There are four "Stage 1 Control Message". There are seven "Stage 1 Modify Parameter Messages":

"Stage 1 Modify Major Event Criteria Variable Message"

"Stage 1 Modify Poll Array Element Data Message"

"Stage 1 Modify MSU Interval Threshold Message"

"Stage 1 Modify MSU Category Threshold Message"

"Stage 1 Modify Link Load Threshold Message"

"Stage 1 Modify BERT Threshold Message"

"Stage 1 Modify Link Error Threshold Message"

"Stage 1 Modify Major Event Criteria Variable Message" is used to change the value of the "Major Event Criteria Variable" in the Stage 1 process. It is generated from information supplied from the "Format and Control Local Terminals" (PS) process and "Perform Stage 3 Communication Control" (P10) process. There are four "Stage 1 Control Messages".

"Stage 1 Modify Poll Array Element Data Message" is used to change the values in the "Poll Array". It is generated from information supplied from the "Format and Control Local Terminals" (P8) process and "Perform Stage 3 Communication Control" (P10) process.

"Stage 1 Modify MSU Interval Threshold Message" is used to change the value of the "MSU Interval Threshold" variables. It is generated from information supplied from the "Analyze Threshold and Call Progress Trap Information" (P4) process, "Format and Control Local Terminals" (P8) process and "Perform Stage 3 Communication Control" (P10) process.

"Stage 1 Modify MSU Category Threshold Message" is used to change the value of the "MSU Category Threshold" variables. It is generated from information supplied from the "Analyze Threshold and Call Progress Trap Information" (P4) process, "Format and Control Local Terminals" (PS) process and "Perform Stage 3 Communication Control" (P10) process.

"Stage 1 Modify Link Load Threshold Message" is used to change the value of the "Link Load Threshold" variables. It is generated from information supplied from the "Analysis Threshold and Call Progress Trap Information" (P4) process, "Format and Control Local Terminal" (P8) process and "Perform Stage 3 Communication Control" (P10) process.

"Stage 1 Modify BERT Threshold Message" is used to change the value of the "BERT Threshold" variables. It is generated from information supplied from the "Analyze Threshold and Call Progress Trap Information" (P4) process, "Format and Control Local Terminals" (P8) process and "Perform Stage 3 Communication Control" (P10) process.

"Stage 1 Modify Link Error Threshold Message" is used to change the value of the "Link Error Threshold" variables. It is generated from information supplied from the "Analyze Threshold and Call Progress Trap Information" (P4) process, "Format and Control Local Terminals" (P8) process and "Perform Stage 3 Communication Control" (P10) process.

"Stage 1 Protocol Analyzer Control Messages" are used to control Protocol Analyzer functions in the Stage 1 process and/or monitor. It is generated from information supplied from the "Perform Manual Protocol Analysis" (P6) process. See the following description of Optional Input and Output Messages for further detail.

"Stage 1 Time Synchronization Message" is used to synchronize the Monitors and Stage 1 and 2 process to the "Master Clock" in the Stage 4 process. It is generated from information supplied from the "Perform Stage 3 Communication Control" (P10) process.

Optional Input and Output Messages

Protocol Analyzer Information is sent to Perform Manual Protocol Analysis process (P6) if this function is implemented.

Protocol Analyzer Control Information is formatted into a Monitor Message and sent to the appropriate Monitor. This message contains the following information:

1. User ID: A number or Alpha-numeric character string used to allow use of this function and to identify where to send response information to.

2. Instruction: predetermined Protocol Analyzer instruction used to perform the desired function.

3. Link ID: Number assigned to the monitor that is to receive the instructions.

P4: Analyze Exceeded Threshold and Call Progress Trap Information

Figures 1, 25:
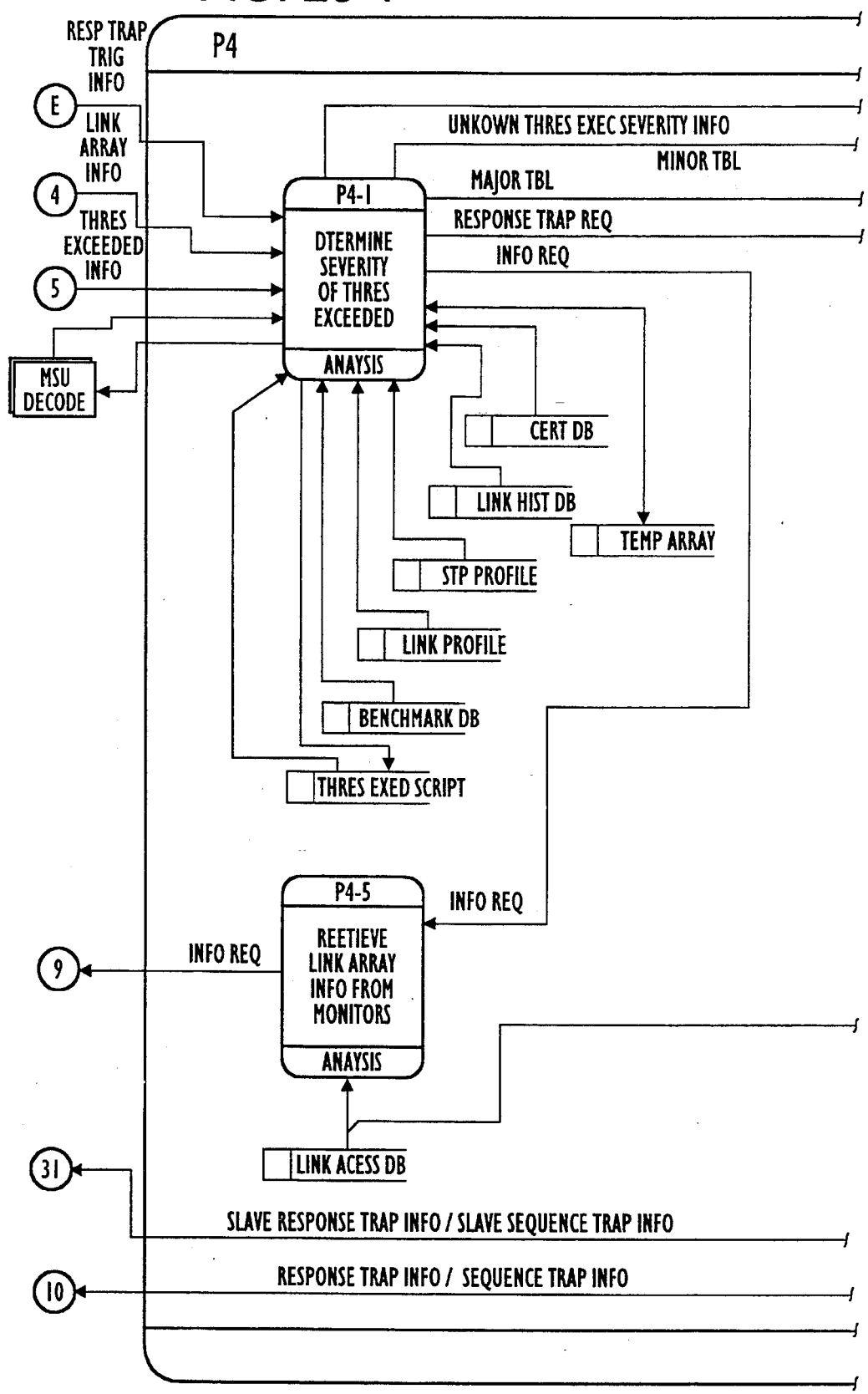
Figures 2, 25:
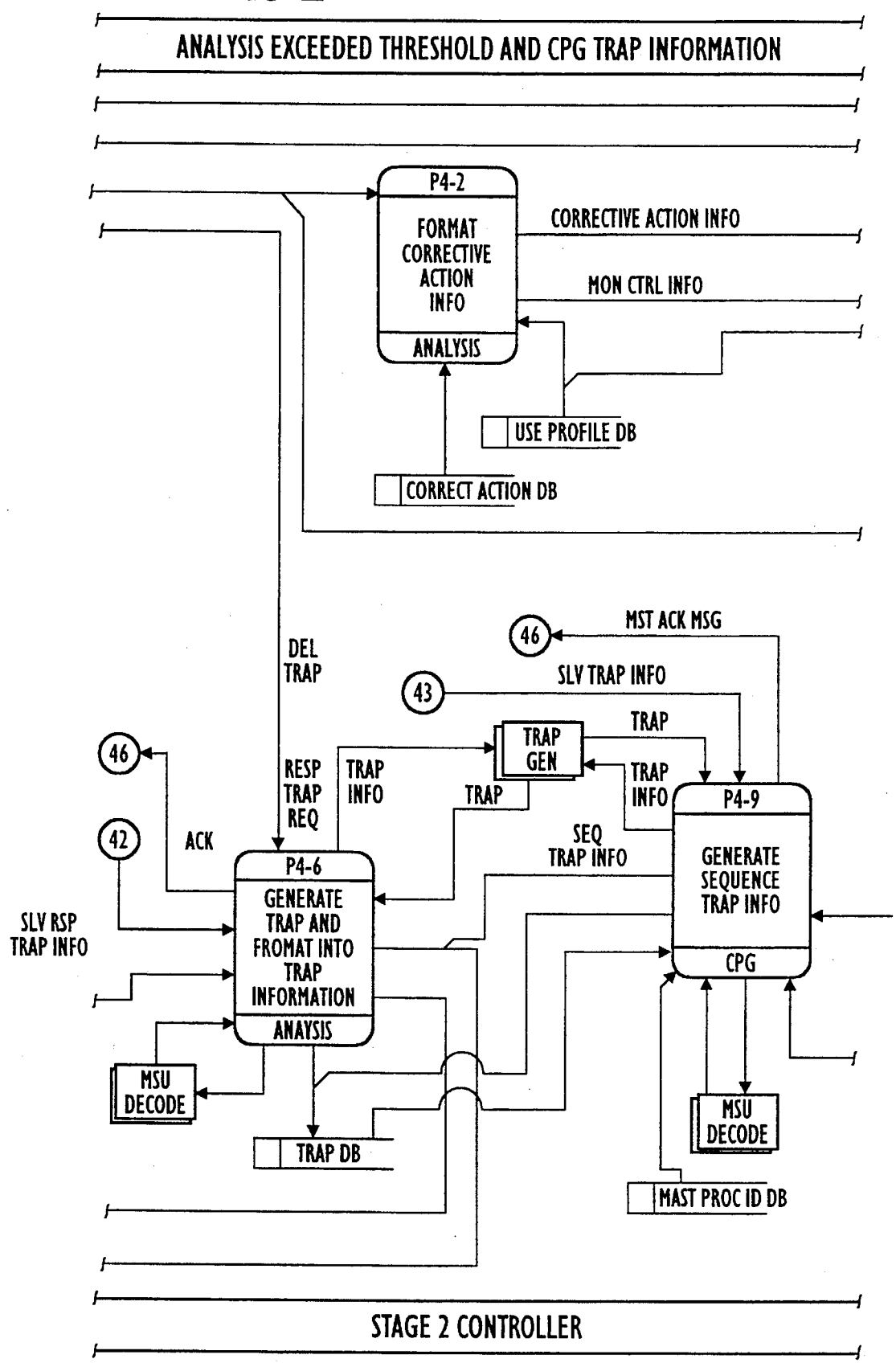
Figure 25:
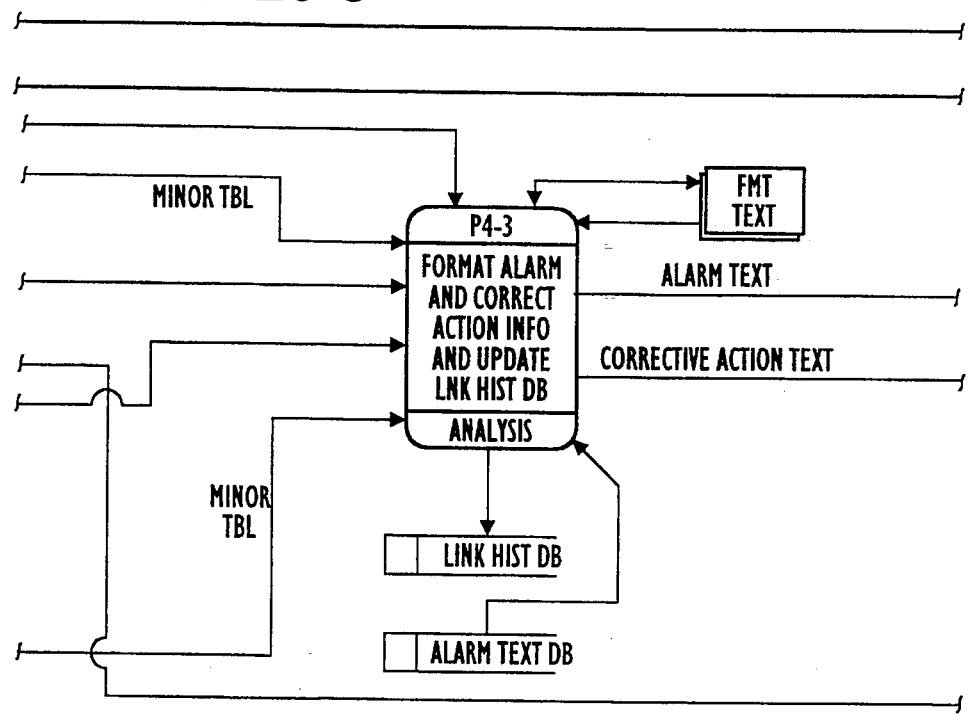
Figure 3:
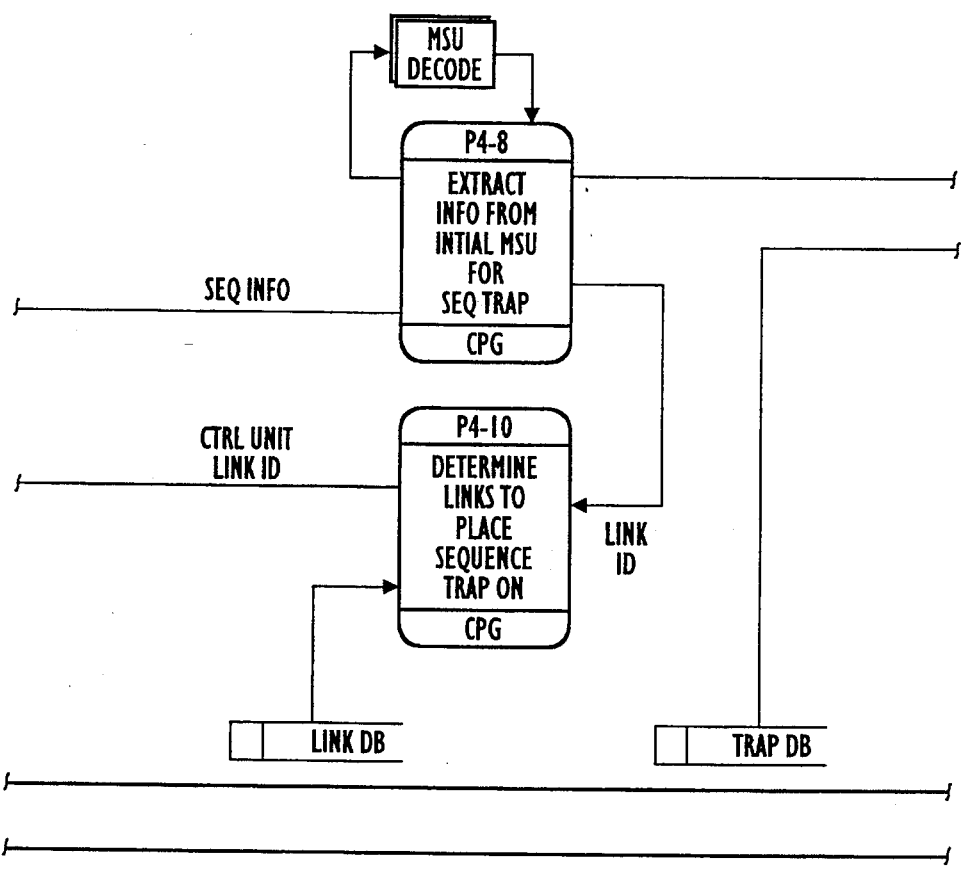
Figures 4, 25:
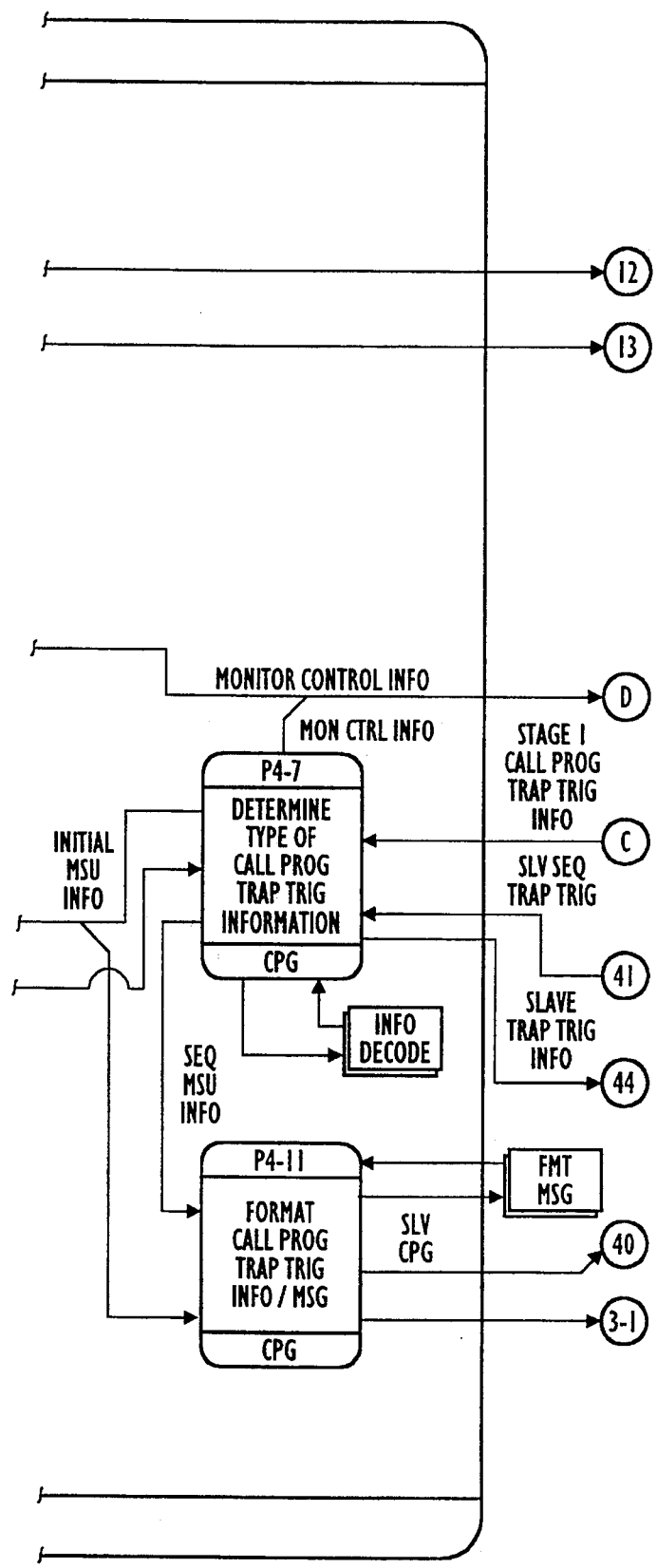

Reference is had to FIGS. 12A and 25.

The decoded "Threshold Exceeded Information" is analyzed using user defined "Threshold Analysis Scripts", "Link Array Information", "Response Trap Triggered Information" and information supplied from the following databases:

Link Benchmark DB - Contains normal link load statistics

STP Profile DB - Contains STP operating parameters, timer values, buffer sizes, etc.

Link History DB - Contains information of events experienced by the link during its life Certification DB - Contains CCSN Certification Test Results (Used only on ICN and LCN network links)

Temporary Array - Used to hold threshold exceeded information when a suspected single threshold trigger is detected The user defined "Threshold Exceeded Script" is a "C" language program written for a particular threshold exceeded scenario. It will determine the severity of the trouble and possible corrective action to be taken (Corrective Action #1). This script will utilize all operating system functions needed to perform the analysis. It will also use the following minimum set of functions:

Trap Generator Function - Script or user supplied MSU information is formatted into a MSU trap MSU Decode Function - Used to decode MSU field information so that it can be used by the script Mask Generator Function - Used to create MSU Masks Link Threshold Exceeded analysis (P4-1) will produce four link status indications:

Minor Trouble - The Threshold Exceeded was temporary and considered non-service affecting Major Trouble - The Threshold Exceeded is on-going and considered a potential service affecting condition Information Request - Not enough information was presented to determine the status of the trouble. Additional information is needed.

Response Trap - Response Trap(s) is needed to determine the severity of the trouble Unknown Threshold Exceeded Severity Information - The threshold that was exceeded can be analyzed using all available Stage 2 information sources Minor Trouble Information is formatted into "Threshold Alert Text" (P4-3) and passed to "Format and Control Local Terminal" (P8) process. It is also formatted into a "Stage 3 Alarm Message" (P4-4) and sent to the Stage 3 process via the "Perform Stage 3 Communication Control" (P10). There is no "Corrective Action" generated for this failure. The content of this information includes the following:

Link ID - Number of the link that had the threshold exceeded

CTRL Unit - The Stage 1 controller ID that the monitor is controlled from

Sub-System - Name or number assigned to the Stage 2 process. For Stage 3 message only.

Origin - Indicates whether the trap is for link transmit or receive

Threshold Exceeded - The type of threshold that was exceeded. Threshold types:

0 No Threshold Exceeded
1 Link Load Threshold
2 MSU Interval Threshold
3 MSU Category Threshold
4 Link Error Threshold
5 Link BERT Threshold
6 Duration Threshold Threshold Scripts # - The number of the Threshold script used Reactive MSU Type - MSU type that was triggered Reactive Script # - Number of the Reactive Script used Corrective Action # - Number representing the record of the corrective Time - Time (HH:MM:SS:MS) that the threshold was exceeded Duration - the length of time the threshold was exceeded Alarm Text - Text describing the failure Trouble Severity Code - Code used to identify the severity of the trouble Severity categories are:

100 - Normal trouble, no corrective action needed
200 - Normal trouble, corrective action required
300 - Minor trouble, no corrective action needed
400 - Minor trouble, manual intervention required
500 - Major trouble, STP affecting
600 - Major trouble, Network affecting
700 - Major trouble, Major Event possible Priority - A number representing the interrupt priority of the trap User ID - A number or Alpha-numeric character string used to identify who controlled or requested the trouble indication Stage 3 default "Stage 3 Alarm Message" content includes the following:

Message Type - Type of alarm the message represents
1 Threshold Exceeded
2 Event Failure
3 Major Event
4 Critical Duration Failure
5 Unknown Failure Link ID - Number of the link that had the threshold exceeded CTRL Unit - The Stage 1 controller ID that the monitor is controlled from Sub-System - Name or number assigned to the Stage 2 process. For Stage 3 message only.

Origin - Indicates whether the trap is for link transmit or receive

Threshold Exceeded - The type of threshold that was exceeded. Threshold types:

0 No Threshold Exceeded
1 Link Load Threshold

2 MSU Interval Threshold
3 MSU Category Threshold
4 Link Error Threshold
5 Link BERT Threshold
6 Duration Threshold Threshold Script # - The number of the Threshold script used Reactive MSU Type - MSU type that was triggered Reactive Script # - Number of the Reactive Script used Corrective Action # - Number representing the record of the corrective Time - Time (HH:MM:SS:MS) that the threshold was exceeded Duration - The length of time the threshold was exceeded Alarm Text - Text describing the failure Trouble Severity Code - Code used to identify the severity of the trouble. Severity categories are:
  100 - Normal trouble, no corrective action needed
  200 - Normal trouble, corrective action required
  300 - Minor trouble, no corrective action needed
  400 - Minor trouble, manual intervention required
  500 - Major trouble, STP affecting
  600 - Major trouble, Network affecting
  700 - Major trouble, Major Event possible Priority - A number representing the interrupt priority of the trap User ID - A number or Alpha-numeric character string used to identify who controlled or requested the trouble indication Stage 3 default The record format of the "Alarm Text Database" includes the following:

Threshold Script # - The number of the Threshold script used

Reactive Script # - Number of the Reactive Script used

Alarm Script - Used to populate the Alarm Text with the appropriate information

Fill Entries - Number of entries in the text that must be populated

Length - Length of the text

Color - Yes, indicates there are color attributes to the text. No, indicates no color attributes provided.

Blink - Yes, indicates blinking text is provided. No, indicates no blinking text provided.

Sound - Yes, indicates audio parameters are provided for the text. No, indicates no audio is provided Peripheral - Contains peripheral control codes to activate external system alarms Text - ASCII Corrective Action Text Monitor Control - Contains a list of monitor functions that must be terminated or enabled in order track the trouble Protocol - The protocol needed to display and or transmit the text, i.e., ASCII, Synchronous, X.25, etc.

Graphics - Color drawing illustrating where the trouble exists Resolution is 1024×1024 HVGA. Note: Drawing could exist in a separate database.

The "Threshold Alert Text" content includes the following:

Date - Date the trouble was detected

Time - Time the trouble was detected

Trigger Time - The time the threshold was exceeded or MSU was detected

Alarm - ASCII text describing the trouble

Priority - A number representing the interrupt priority of the trap

User ID - A number or Alpha-numeric character string used to identify who controlled or requested the trouble indication Stage 3 default Minor Trouble Information is formatted into "Link History Database" format and loaded into the "Link History DB". The loaded information includes the following:

Record Type - The type of parameter information the record contains (Threshold)

Link ID - Number of the link that had the threshold exceeded

CTRL Unit - The Stage 1 controller ID that the monitor is controlled from

Date - Date the event occurred (MM/DD/YY)

Time - Time of day the event occurred (HH:MM:SS:MS)

Sub-System - Name or number assigned to the Stage 2 process. For Stage 3 message only.

Trouble ID - Number given to the event - range 1 to 999

Corrective Action # - Number representing the record of the corrective action used in the Corrective Action database Certification Parameter - Yes/No entry if the exceeded threshold represents a SS7 Certification parameter Major Event - Yes, if the exceeded threshold represents a Major Event. No, if it was not.

Minor Event - Yes, if the exceeded threshold represents a Minor Event. No, if it is not.

Normal Event - Yes, if exceeded threshold is expected. Usually a Certification parameter was triggered. No, if it is not.

Threshold Failure - Yes, if the Event was a Threshold Exceeded Event. No, if it was not.

Threshold Type - If the event was a threshold exceeded event, this field holds the type of threshold that was exceeded. Left blank if the event was not a Threshold Exceeded event.

Threshold types:

Threshold Value - Array element value for threshold type that was exceeded

Threshold Script # - The number of the Threshold Exceeded Script used

Duration - The length of time the threshold was exceeded

Alarm Text - Text describing the failure

Reactive Trap - Yes, Reactive trap was triggered. No, Reactive Trap was not triggered.

Reactive MSU Type - Type of MSU that triggered the trap

Reactive Script # - The number of the reactive script used

Origin - Indicates whether the trap is for link transmit or receive

Trouble Severity Code - Code used to identify the severity of the trouble

Priority - A number representing the interrupt priority of the trap

User ID - A number or Alpha-numeric character string used to identify who controlled or requested the trouble indication. Stage 3 default.

Major Trouble Information is formatted into "Threshold Alarm Text" (P4-3) and passed to "Format and Control Local Terminal" (P8) process. It is also formatted into a "Stage 3 Alarm Message" (P4-4) or is formatted into a "Stage 3 Message" (P4-4) and sent to the "Perform Stage 3 Communication Control" (P10) process depending on the "User ID". The "Major Trouble Information" content of this information includes the following:

Link ID - Number of the link that had the threshold exceeded

CTRL Unit - The Stage 1 controller ID that the monitor is controlled from

Sub-System # - Name or number assigned to the Stage 2 process For Stage 3 message only Origin - Indicates whether the trap is for link transmit or receive Threshold Exceeded - The type of threshold that was exceeded. Threshold types:
  0 No Threshold Exceeded
  1 Link Load Threshold
  2 MSU Inventory Threshold
  3 MSU Category Threshold
  4 Link Error Threshold
  5 Link BERT Threshold
  6 Duration Threshold
Threshold Script # - The number of the Threshold Exceeded Script used
Corrective Action # - Number representing the record of the corrective
Reactive MSU Type - MSU type that was triggered
Reactive Script # - Number of the Reactive Script used
Time - Time (HH:MM:SS:MS) that the threshold was exceeded
Duration - The length of time the threshold was exceeded
Alarm Text - Text describing the failure
Trouble Severity Code - Code used to identify the severity of the trouble. Severity categories are:
  100 - Normal trouble, no corrective action needed
  200 - Normal trouble, corrective action required
  300 - Minor trouble, no corrective action needed
  400 - Minor trouble, manual intervention required
  500 - Major trouble, STP affecting
  600 - Major trouble, Network affecting
  700 - Major trouble, Major Event possible
Priority - A number representing the interrupt priority of the trap
User ID - A number or Alpha-numeric character string used to identify who controlled or requested the trouble indication. Stage 3 default.

The "Stage 3 Alarm Message" content includes the following:
Message Type - Type of alarm the message represents.
  1 Threshold Exceeded
  2 Event Failure
  3 Major Event
  4 Critical Duration Failure
  5 Unknown Failure
Link ID - Number of the link that had the threshold exceeded
CTRL Unit - The Stage 1 controller ID that the monitor is controlled from
Sub-System - Name or number assigned to the Stage 2 process. For Stage 3 message only.
Origin - Indicates whether the trap is for link transmit or receive
Threshold Exceeded - The type of threshold that was exceeded. Threshold types:
  0 No Threshold Exceeded
  1 Link Load Threshold
  2 MSU Interval Threshold
  3 MSU Category Threshold
  4 Link Error Threshold
  5 Link BERT Threshold
  6 Duration Threshold
Threshold Script # - The number of the Threshold Exceeded Script used
Corrective Action # - Number representing the record of the corrective
Reactive MSU Type - MSU type that was triggered
Reactive Script # - Number of the Reactive Script used
Time - Time (HH:MM:SS:MS) that the threshold was exceeded
Duration - the length of time the threshold was exceeded
Alarm Text - Text describing the failure
Trouble Severity Code - Code used to identify the severity of the trouble. Severity categories are:
  100 - Normal trouble, no corrective action needed
  200 - Normal trouble, corrective action required
  300 - Minor trouble, no corrective action needed
  400 - Minor trouble, manual intervention required
  500 - Major trouble, STP affecting
  600 - Major trouble, Network affecting
  700 - Major trouble, Major Event possible
Priority - A number representing the interrupt priority of the trap
User ID - A number or Alpha-numeric character string used to identify who controlled or requested the trouble indication. Stage 3 default.

The content of the "Alarm Text Database" includes the following:
Threshold Script # - The number of the Threshold script used
Reactive Script # - Number of the Reactive Script used
Alarm Script - Used to populate the Alarm Text with the appropriate information
Fill Entries - Number of entries in the text that must be populated
Length - Length of the text
Color - Yes, indicates there are color attributes to the text. No, indicates no color attributes provided.
Blink - Yes, indicates blinking text is provided. No, indicates no blinking text provided.
Sound - Yes, indicates audio parameters are provided for the text. No, indicates no audio is provided.
Peripheral - Contains peripheral control codes to activate external system alarms
Text - ASCII Corrective Action Text
Monitor Control - Contains a list of monitor functions that must be terminated or enabled in order track the trouble
Graphics Color drawing illustrating where the trouble exists. Resolution is 1024×1024 HVGA.

The "Threshold Alarm Text" content includes the following:
Date - Date the trouble was detected
Time - Time the trouble was detected
Trigger Time - The time the threshold was exceeded or MSU was detected
Alarm - ASCII text describing the trouble
Priority - A number representing the interrupt priority of the trap
User ID - A number or Alpha-numeric character string used to identify who controlled or requested the trouble indication. Stage 3 default.

"Major Trouble Information" is analyzed to determine the required "Corrective Action" (P4-2). "Corrective Action Text" is taken from the "Corrective Action Data Base" using the "Corrective Action #" supplied by the "Threshold Exceeded Script" and populated with the appropriate link/network information. The "Corrective Action Text" is sent (P4-3) to the "Format and Control Local Terminal" (P8) process or is formatted into a "Stage 3 Message" (P4-4) and sent to the "Perform Stage 3 Communication Control" (P10) process, depending on the "User ID".

The content of the "Corrective Action Database" includes the following:
Corrective Action # - Number assigned to the corrective action text
Corrective Action Script - Used to populate the Corrective Action Text with the appropriate information
Fill Entries - Number of entries in the text that must be populated Length - Length of the text Color - Yes, indicates there are color attributes to the text. No, indicates no color attributes provided Blink - Yes, indicates blinking text is provided. No, indicates no blinking text provided.

Sound - Yes, indicates audio parameters are provided for the text. No, indicates no audio is provided.

Peripheral - Contains peripheral control codes to activate external system

Text - ASCII Corrective Action Text

Monitor Control - Contains a list of monitor functions that must be terminated or enabled in order track the trouble Protocol - The protocol needed to display and/or transmit the text, i.e., ASCII, Synchronous, X.25, etc.

Graphics - Color drawing illustrating where the trouble can be fixed. Resolution is 1024×1024 HVGA.

The "Corrective Action Text" is formatted by the "Corrective Action Script" to accommodate the terminal or process that is receive the information using information in the "User Profile Database". The "Corrective Action Text" content includes the following:

Text - Contains both text and embedded control codes

Priority - A number representing the interrupt priority of the trap

User ID - A number or Alpha-numeric character string used to identify who controlled or requested the trouble indication. Stage 3 default.

If the "Corrective Action Text" contains "Monitor Control Information", it is sent to the "Control Stage 2 Communication and Message Handling" (P3) process. The "Monitor Control Information" content includes the following:

Link ID - Numeric designation for the link monitor that is experiencing the trouble CTRL Unit - The Stage 1 controller ID that the monitor is controlled from Priority - A number representing the interrupt priority of the message Command - Instructions that the monitor can interpret describing the action to be taken. Actions to be taken can be:

Stop All Reactive Traps

Stop All Response Traps

Stop Selected Traps

Resume Reactive Traps

Resume Response Traps

Allocate Disk Space

Stop Protocol Analyzer

Stop Call Progress Traps

Connect AUX Storage Device

Resume All Traps

Reset Monitor

Etc.

User ID - A number or Alpha-numeric character string used to allow use of this function and to identify where to send response information to Major Trouble Information is formatted into Link History Data Base format and loaded into the Link History DB.

If "Link Array Information" is required by the "Threshold Exceeded Script" to further analyze the "Threshold Exceeded Information", "Information Request Information" is generated (P4-5). If array information from the link whose threshold was exceeded is needed, "Information Request Information" is generated using the "Threshold Exceeded Script" and "Threshold exceeded Information" data. If array information from related links is needed, the "Link ID" and "Control Unit" parameters for the link whose threshold exceeded are used to search the "Link Access Database" for the link's "Network ID". The "Network ID" is used to search for the required "Link ID" and "Control Unit" for the related links in the "Link Access Database." This information is used to generate as much "Information Request Information" as is needed. The "Information Request Information" is sent to the "Control Stage 2 Communication and Message Handling" (P3) process. The content includes the following:

Link ID - Numeric designation for the monitor the link is connected to

CTRL Unit - The Stage 1 controller ID that the monitor is controlled from

Reg # - The number assigned to the Register or Array

RECNO - Record number in the Register or Array. If only the RECNO is identified and the Element # left blank, then all elements in the record will be retrieved. Leave blank if not needed.

Element # - Element number within the record. Populated only if a particular element is needed.

VAR ID - The number or name assigned to the Variable. Leave blank if not needed.

Priority - A number representing the interrupt priority of the request

User ID - A number or Alpha-numeric character string used to identify where to send information when the trap is triggered. Default value is the Stage 3 controller.

If analysis of the "Threshold Exceeded Information" indicates that a different kind of trouble may be starting, "Response Trap Information" is generated (P4-6). Related link "Link ID" and "Control Unit" are retrieved from the "Link Access Database" and together with "Threshold Exceeded Script" and "Threshold Exceeded Information", "Response Trap Information" is generated for each related link. The "Response Trap Information" is sent to the "Control Stage 2 Communication and Message Handling" (P3) process. The contents includes the following:

Link ID - Numeric designation for the link monitor that is experiencing the trouble Trap # - Number assigned to the trap when it was generated.

Mask - A representation of the MSU to be trapped, populated with the MSU field(s) values to be trapped on. If the Mask populated values match the equivalent MSU field values, a trap trigger indication is generated.

Script - A set of instructions used by the monitor to handle the information supplied by the trapped MSU. Note: This function could be handled by the Stage 1, 2, 3 or 4 Process if the MSU is sent to the appropriate process when triggered.

Type - Response Trap

Origin - Side of the link that the MSU is be trapped on Receive/Transmit

Priority - Number from 0 to 5 that identifies the interrupt priority of the information - 1.

User ID - Used to determine where the trap information is to be sent. The default value would be the Stage 2 Controller ID.

When either requested "Link Array Information" and/or "Response Trap Triggered Information" is sent from the "Control Stage 2 Communication and Message Handling" (P3) process in response to the information and trap requests, it is decoded and used by the "Threshold Exceeded Script" to further analyze the trouble. Data previously analyzed is held in a "Temporary Array" and is also in the analysis. All traps will be removed after their information has been utilized by generating "Trap Information" and sending it to the "Control Stage 2 Communication and Message Handling" (P3) process.

The "Link Array Information" contents of this information includes the following:

Link ID - Numeric designation for the monitor the link is connected to

CTRL Unit - The Stage 1 controller ID that the monitor is controlled from

Reg # - The number assigned to the Register or Array

RECNO - Record number in the Register or Array

Element # - Element number within the record

Element Data - The data contained in the array element identified by the RECNO and Element #

VAR ID - The number or name assigned to the Variable. Leave blank if not needed.

VAR Data - Data contained in the variable

Priority - A number representing the interrupt priority of the request

User ID - A number or Alpha-numeric character string used to identify where to send information when the trap is triggered. Default value is the Stage 3 controller.

The "Response Trap Triggered Information" contents include the following:

Link ID - Numeric designation for the monitor the link is attached to

CTRL Unit - The Stage 1 controller ID that the monitor is controlled from

Trap Number - Number assigned to the Response Trap in the monitor

Type - Response

Time - Time that the Response Trap was triggered

MSU - The MSU message that was trapped

Priority - A number representing the interrupt priority of the trap

Origin - Indicates whether the trap is for link transmit or receive

Master Proc ID - Number assigned by the "Reactive Trap Script" to identify Slave Stage 2 information User ID - A number or Alpha-numeric character string used to identify where to send information when the trap is triggered

OR

Link ID - Numeric designation for the monitor the link is attached to

CTRL Unit - The Stage 1 controller ID that the monitor is controlled from

Trap Number - Number assigned to the Trap in the monitor

Type - Response

Time - Time that the trap was triggered

Trigger Information - Indication that the trap was triggered

Priority - A number representing the interrupt priority of the trap

Origin - Indicates whether the trap is for link transmit or receive

Master Proc ID - Number assigned by the "Reactive Trap Script" to identify Slave Stage 2 information.

User ID - A number or Alpha-numeric character string used to identify where to send information when the trap is triggered "Response Trap Information" contents include the following:

Link ID - Numeric designation for the link monitor that is experiencing the trouble Trap # - Number assigned to the trap when it was generated Mask - A representation of the MSU to be trapped, populated with the MSU field(s) values to be trapped on. If the Mask populated values match the equivalent MSU field values, a trap trigger indication is generated. Value=NULL.

Script - A set of instructions used by the monitor to handle the information supplied by the trapped MSU. Note: This function could be handled by the Stage 1, 2, 3 or 4 process if the MSU is sent to the appropriate process when triggered. Value=NULL.

Type - Value=CLEAR TRAP

Origin - Side of the link that the MSU is be trapped on Receive/Transmit

Priority - Number from 0 to 5 that identifies the interrupt priority of the information - 1.

Master Proc ID - Number assigned by the "Reactive Trap Script" to identify Slave Stage 2 information User ID - Used to determine where the trap information is to be sent. The default value would be the Stage 2 Controller ID.

Unknown Threshold Exceeded Severity Information is generated if no severity determination can be made.

Unknown Threshold Exceeded Severity Information is formatted into "Unknown Failure Alarm Information" (P4-3) and passed to "Format and Control/Local Terminal" (P8) process or is formatted into a "Stage 3 Alarm Message" (P4-4) and sent to the "Perform Stage 3 Communication Control" (P10) process depending on the "User ID." This information/message includes the following:

Link ID - Number of the link that had the threshold exceeded

CTRL Unit - The Stage 1 controller ID that the monitor is controlled from

Sub-System - Name or number assigned to the Stage 2 process. For Stage 3 message only.

Origin - Indicates whether the trap is for link transmit or receive

Threshold Exceeded - The type of threshold that was exceeded. Threshold types:

0 No Threshold Exceeded
1 Link Load Threshold
2 MSU Interval Threshold
3 MSU Category Threshold
4 Link Error Threshold
5 Link BERT Threshold
6 Duration Threshold Threshold Script # - The number of the Threshold Exceeded Script used Corrective Action # - Number representing the record of the corrective Reactive MSU Type - MSU type that was triggered Reactive Script # - Number of the Reactive Script used Time - Time (HH:MM:SS:MS) that the threshold was exceeded Duration - The length of time the threshold was exceeded Alarm Text - Text describing the failure Trouble Severity Code - Code used to identify the severity of the trouble. Severity categories are:

100 - Normal trouble, no corrective action needed
200 - Normal trouble, corrective action required
300 - Minor trouble, no corrective action needed
400 - Minor trouble, manual intervention required
500 - Major trouble, STP affecting
600 - Major trouble, Network affecting
700 - Major trouble, Major Event possible.

Priority - A number representing the interrupt priority of the trap

User ID - A number or Alpha-numeric character string used to identify who controlled or requested the trouble indication. Stage 3 default.

The "Alarm Text Database" includes the following:

Threshold script # - The number of the Threshold script used

Reactive Script # - Number of the Reactive Script used

Alarm Script - Used to populate the Alarm Text with the appropriate information

Fill Entries - Number of entries in the text that must be populated

Length - Length of the text

Color - Yes, indicates there are color attributes to the text. No, indicates no color attributes provided.

Blink - Yes, indicates blinking text is provided. No, indicates no blinking text provided.

Sound - Yes, indicates audio parameters are provided for. No, indicates no audio is provided.

Peripheral - Contains peripheral control codes to activate external system alarms.

Text - ASCII Corrective Action Text

Monitor Control - Contains a list of monitor functions that must be terminated or enabled in order track the trouble. The protocol needed to display and/or transmit the text. i.e., ASCII, Synchronous, X.25, etc.

Graphics - Color drawing illustrating where the trouble exists. Resolution is 1024×1024 HVGA. Note: Drawing could exist in a separate database.

The "Unknown Failure Alarm Text" content includes the following:

Date - Date the trouble was detected

Time - Time the trouble was detected

Trigger Time - The time the threshold was exceeded or MSU was detected

Alarm - ASCII text describing the trouble

Priority - A number representing the interrupt priority of the trap

User ID - A number or Alpha-numeric character string used to identify who controlled or requested the trouble indication. Stage 3 default.

The "Stage 3 Alarm Message" content includes the following:

Message Type - Type of alarm the message represents

1 Threshold Exceeded

2 Event Failure

3 Major Event

4 Link Error Threshold

5 Link BERT Threshold

Link ID - Number of the link that had the threshold exceeded

CTRL Unit - The Stage 1 controller ID that the monitor is controlled from

Sub-System - Name or number assigned to the Stage 2 process for Stage 3 message only Origin - Indicates whether the trap is for link transmit or receive Threshold Exceeded - The type of threshold that was exceeded. Threshold types:

0 No Threshold Exceeded

1 Link Load Threshold

2 MSU Interval Threshold

3 MSU Category Threshold

4 Link Error Threshold

5 Link BERT Threshold

6 Duration Threshold

Threshold Script # - The number of the Threshold Exceeded Script used

Corrective Action # - Number representing the record of the corrective

Reactive MSU Type - MSU type that was triggered

Reactive Script # - Number of the Reactive Script used

Time - Time (HH:MM:SS:MS) that the threshold was exceeded

Duration - The length of time the threshold was exceeded

Alarm Text - Text describing the failure

Trouble Severity Code - Code used to identify. Categories are:

100 - Normal trouble, no corrective action needed

200 - Normal trouble, corrective action required

300 - Minor trouble, no corrective action needed

400 - Minor trouble, manual intervention required

500 - Major trouble, STP affecting

600 - Major trouble, Network affecting

700 - Major trouble, Major Event possible

Priority - A number representing the interrupt priority of the trap

User ID - A number or Alpha-numeric character string used to identify who controlled or requested the trouble indication Stage 3 default Link ID - Numeric designation for the monitor the link is attached to CTRL Unit - The Stage 1 controller ID that the monitor is controlled from Sub-System - Name or number assigned to the Stage 2 process. For Stage 3 message only.

Date - Date the trouble was detected

Time - Time the trouble was detected

Trigger Time - The time the threshold was exceeded or MSU was detected

Alarm - ASCII text describing the trouble

Priority - A number representing the interrupt priority of the information

User ID - A number or Alpha-numeric character string used to identify who controlled or requested the trouble indication. Stage 3 default.

Unknown Threshold Exceeded Alarm Information is formatted into Link History Database format and loaded into the "Link History DB."

Depending upon the number of links to be monitored, the speed of the Stage 2 process platform, and the physical location of "Mated STP Pairs", it may be necessary to have two or more Stage 2 processes controlling monitors in both STPs. If two or more Stage 2 processes are required, these Stage 2 processes are connected to each other via a data communication channel. Since "Reactive Traps", "Response Traps" and "Call Progress Traps" detect an MSU and cause traps to be placed on links in both STPs, the Stage 2 process generating the traps must receive trap triggered information from the traps it places. To accomplish this, the Stage 2 process detecting the "Initial MSU" is considered to be the "Master Stage 2 Process" for all subsequent traps and trap triggered analysis initiated as a result of detecting the "Initial MSU". Stage 2 processes receiving trap information from the "Master Stage 2 Process" via the communication channel are considered to be the "Slave Stage 2 Process" for these traps only. Trap triggered information generated from a trap initiated by the "Master Stage 2 Process" will be sent to the "Master Stage 2 Process" via the data communication channel. Once all trap requirements have been satisfied, the "Master Stage 2 Process" will remove the traps in all "Slave Stage 2 Process". Stage 2 processes are designated as Master or Slave. Only those traps that were generated by some other Stage 2 process (Master) are considered to be slave processes. A Stage 2 process can be simultaneously running "Master Stage 2 Process" and "Slave Stage 2 Process".

If only one Stage 2 process is needed, then there will be no "Master" or "Slave" process running. The following description is applicable to both "Master" and "Slave" scenarios.

"Call Progress Trap Triggered Information" received from the "Control Stage 2 Communication and Message Handling" (P3) process is reviewed to determine if it is a "Call Progress Initiate MSU" or "Call Progress Sequence MSU" (P4-7).

If a "Call Progress Initiate MSU" is identified, it is formatted into a "Stage 3 Call Progress Trap Triggered Message" (P4-11) and is sent to the "Perform Stage 3 Communication Control" (P10) process. "Stage 1 Call Progress Initiate MSU Trap Disable Information" is generated to temporarily disable the "Call Progress Initiate Trap". This information is sent to the "Control Stage 2 Communication and Message Handling" (P3) process in the form of a "Monitor Control Information". Also, the following "Initiate MSU Information" is extracted (P4-8):

| | |
|---|---|
| Originating Point Code (OPC) | |
| Destiation Point Code (DPC) | |
| Circuit Identification Code (CIC) | (ISUP only) |
| Destination Local Reference (DLF) | (SCCP connection oriented service only) |
| Source Local Reference (SLR) | (SCCP connection oriented service only) |
| Calling Party Address (CPA) | (SCCP Connection - less oriented service only) |
| Transaction ID (TID) | (TCAP service only) |

This information is used to generate two "Call Progress Sequence MSU Traps":

"Originate Sequence Trap"

"Terminate Sequence Trap"

The "Mask" for the "Originate Sequence MSU Trap" will have the following fields populated:

ISUP Call Progress:

| Mask Field | | Initiate MSU Information | |
|---|---|---|---|
| | OPC | equals | OPC |
| | DPC | equals | DPC |
| | CIC | equals | CIC |

SCCP Connection Oriented Service Call Progress:

| Mask Field | | Initiate MSU Information | |
|---|---|---|---|
| | OPC | equals | OPC |
| | DPC | equals | DPC |

*DLR equals DLR
*SLR equals SLR

The field values are "ORed" in the Mask. If the DPC and OPC match and either DLR or SLR or both match, the trigger condition is satisfied.

SCCP Connectionless Oriented Service Call Progress:

| Mask Field | | Initiate MSU Information | |
|---|---|---|---|
| | OPC | equals | OPC |
| | DPC | equals | DPC |
| | CPA | equals | CPA |

TCAP Call Progress:

| Mask Field | | Initiate MSU Information | |
|---|---|---|---|
| | OPC | equals | OPC |
| | DPC | equals | DPC |
| | TID | equals | TID |

The "Mask" for the "Terminate Sequence MSU Trap" will have the following fields populated:

ISUP Call Progress:

| Mask Field | | Initiate MSU Information | |
|---|---|---|---|
| | OPC | equals | DPC |
| | DPC | equals | OPC |
| | CIC | equals | CIC |

SCCP Connection Oriented Service Call Progress:

| Mask Field | | Initiate MSU Information | |
|---|---|---|---|
| | OPC | equals | DPC |
| | DPC | equals | OPC |

*DLR equals DLR
*SLR equals SLR

The field values are "ORed" in the Mask. If the DPC and OPC match and either DLR or SLR or both match, the trigger condition is satisfied.

SCCP Connectionless Oriented Service Call Progress:

| Mask Field | | Initiate MSU Information | |
|---|---|---|---|
| | OPC | equals | DPC |
| | DPC | equals | OPC |
| | CPA | equals | CPA |

TCAP Call Progress:

| Mask Field | | Initiate MSU Information | |
|---|---|---|---|
| | OPC | equals | DPC |
| | DPC | equals | OPC |
| | TID | equals | TID |

This information is used to generate the two traps (P4-9) by passing it to the system "Trap Generator Function". Also, the "Link ID" and "Control Unit" information from the "Call Progress Trap Triggered Information" is used to search the "Link Access Database" to find the link's "Network ID". The "Network ID" is used to find all related links. "Link ID" and "Control Unit" information "Originate Sequence Trap Information" and "Terminating Sequence Trap Information" is generated for each related link. "Trap #s" are obtained from the "Trap Database" for those traps that will reside in monitors controlled by the Stage 2 process that received the "Call Progress Initiate MSU Trap Triggered Information" (Master Stage 2 Process) and is added to the sequence trap information. Also a "Master Procedure ID" is obtained form the "Master Proc ID Database" and is added to all sequence trap information. Entries are made for each of these traps in the "Trap Database". "Originate Sequence Trap Information" and "Terminating Sequence-Trap Information" destined for monitors controlled by the "Master Stage 2 Process" is sent to the "Control Stage 2 Communication and Message Handling" (P3) process as "Sequence MSU Trap Information".

If the information is for monitors controlled by the (Slave Stage 2 Process), it is converted into "Slave Trap Message" (P9-10-4) and sent to the "Slave Stage 2 Process" via the "Control Remote Port" (P9) process.

This procedure is used only when there are two or more Stage 2 processes used to control monitors in the Mated STP Pair.

"Call Progress Initiate MSU Trap Triggered (CPT) Information" contents include the following:

Link ID - Numeric designation for the monitor the link is attached to

CTRL Unit - The Stage 1 controller ID that the monitor is controlled from

Trap Number - Number assigned to the Response Trap in the monitor

Type - Call Progress Initiate MSU

Time - Time that the Response Trap was triggered

MSU - The MSU message that was trapped

Priority - A number representing the interrupt priority of the trap

Origin - Indicates whether the trap is for link transmit or receive

Master Proc ID - Number assigned by the "Reactive Trap Script" to identify Slave Stage 2 information User ID - A number or Alpha-numeric character string used to identify where to send information when the trap is triggered "Stage 3 Call Progress Trap Triggered Message" contents includes the following:

Link ID - Numeric designation for the monitor the link is attached to

CTRL Unit - The Stage 1 controller ID that the monitor is controlled from

Sub-System - Name or number assigned to the Stage 2 process. For Stage 3 message only.

Trap Number - Number assigned to the Response Trap in the monitor

Type - Type of Call Progress MSU

Time - Time that the Response Trap was triggered

MSU - The MSU message that was trapped

Priority - A number representing the interrupt priority of the trap

Origin - Indicates whether the trap is for link transmit or receive

Master Proc ID - Number assigned by the "Reactive Trap Script" to identify Slave Stage 2 information User ID - A number or Alpha-numeric character string used to identify where to send information when the trap is triggered "Stage 1 Call Progress Initiate MSU Trap Disable Information" acts to temporarily disable the "Initiate MSU Trap". The contents includes the following:

Link ID - Numeric designation for the link monitor that contains the "Call Progress Initiate Trap"

CTRL Unit - The Stage 1 controller ID that the monitor is controlled from

Trap # - Number assigned to the trap when it was generated

Type - Trap

Action - Action to be taken by the Stage 1 or monitor process. Disable Call Progress Initiate Trap.

Priority - Number from 0 to 5 that identifies the interrupt priority of the information - 1.

User ID - Used to determine where the trap information is to be sent. The default value would be the Stage 2 Controller ID.

"Monitor Control Information" contents include the following:

Link ID - Numeric designation for the link monitor that is experiencing the trouble Priority - A number representing the interrupt priority of the message Command - Instructions that the monitor can interpret describing the action to be taken Actions to be taken can be:

Stop All Reactive Traps
    Stop All Response Traps
    Stop Selected Traps
    Resume Reactive Traps
    Resume Response Traps
    Allocate Disk Space
    Stop Protocol Analyzer
    Stop Call Progress Traps
    Connect AUX Storage device
    Resume All Traps
    Reset Monitor
    Etc.

User ID - A number or Alpha-numeric character string used to allow use of this function and to identify where to send response information "Sequence MSU Trap Information" contents include the following:

Link ID - Numeric designation for the link monitor that is experiencing the trouble CTRL Unit - The Stage 1 controller ID that the monitor is controlled from Trap # - Number assigned to the trap when it was generated Mask - A representation of the MSU to be trapped, populated with the MSU field(s) values to be trapped on. If the Mask populated values match the equivalent MSU field values, a trap trigger indication is generated.

Script - Send MSU trapped to the user

Type - Call Progress (Originating/Terminating) Sequence MSU Trap

Origin - Side of the link that the MSU is be trapped on - Receive/Transmit

Priority - Number from 0 to 5 that identifies the interrupt priority of the information - 1.

Master Proc ID - Number assigned by the "Reactive Trap Script" to identify Slave Stage 2 information User ID - Used to determine where the trap information is to be sent. The default value would be the Stage 2 Controller ID.

"Slave Trap Message" contents include the following:

Link ID - Numeric designation for the link monitor that is experiencing the trouble CTRL Unit - The Stage 1 controller ID that the monitor is controlled from Sub-System - Name or number assigned to the Stage 2 process. For Stage 3 message only.

Mask - A representation of the MSU to be trapped, populated with the MSU field(s) values to be trapped on. If the Mask populated values match the equivalent MSU field values, a trap trigger indication is generated.

Script - Send MSU trapped to the user

Type - Call Progress (Originating/Terminating) Sequence MSU Trap

Origin - Side of the link that the MSU is be trapped on - Receive/Transmit

Priority - Number from 0 to 5 that identifies the interrupt priority of the information - 1.

Master Proc ID - Number assigned by the "Reactive Trap Script" to identify Slave Stage 2 information.

User ID - Used to determine where the trap information is to be sent. The default value would be the Stage 2 Controller ID.

When The "Slave Stage 2 Process" has generated the "Sequence Traps" requested, it generates a "Master Acknowledgment Message" and sends it to the "Master Stage 2 Process" identified by the "User ID" via the "Control Remote Port" (P9) process. When the "Master Stage 2 Process" receives the message, it is decoded into "Master Acknowledgment Information" (P9-10-7). This information is used to create new "Trap Database" records (P9-10-6). These records will have different "Trap #s" than the related "Call Progress Sequence MSU Traps" generated by the "Master Stage 2 Process" but will have the same "Master Process ID" and "User ID".

"Master Acknowledgment Message" contents include the following:

Trap Type - Indicates what kind of trap was placed ("Response Trap" or "Response MSU")

Link ID - Numeric designation for the monitor the link is attached to

CTRL Unit - The Stage 1 controller ID that the monitor is controlled from

Sub-System - Name or number assigned to the Stage 2 process that originated the message Trap # - Number assigned to the trap Time - Time that the NEW Reactive MSU was detected Origin - Indicates whether the information is for link transmit or receive Script - Left blank Master Proc ID - Number assigned by the "Reactive Trap Script" to identify Slave Stage 2 information User ID - A number or Alpha-numeric character string used to identify where to send information when the MSU is triggered. Default Stage 2 (Master Stage 2).

NOTE: There will be as many of these messages generated as there are "Call Progress Sequence MSU Traps" placed in the "Trap Database."

"Master Acknowledgment Information" contents include the following:

Trap Type - Indicates what kind of trap was placed. ("Response Trap", "Response MSU" or "CPG Sequence Trap")

Link ID - Numeric designation for the monitor the link is attached to

CTRL Unit - The Stage 1 controller ID that the monitor is controlled from

Sub-System - Name or number assigned to the Stage 2 process that originated the message Trap # - Number assigned to the trap Time - Time that the NEW Reactive MSU was detected Origin - Indicates whether the information is for link transmit or receive Script # - Left blank Master Proc ID - Number assigned by the "Reactive Trap Script" to identify Slave Stage 2 information User ID - A number or Alpha-numeric character string used to identify where to send information when the MSU is triggered. Default Stage 2 (Master Stage 2).

Note: There will be as many of this information decoded as there were "Call Progress Sequence MSU Traps" in the Slave Stage 2 processes "Trap Database".

If a "Call Progress Sequence MSU Trap Triggered Information" is received from the "Control Stage 2 Communication and Message Handling" (P3) process, it is formatted into a "Stage 3 Call Progress Trap Triggered Message" (P4-11) and sent to the "Stage 3" process. If a "Release Complete Message" (RLC) is detected, "Call Progress Initiate MSU Trap Enable Information" and "Call Progress Sequence MSU Trap Clear Information" is generated (P4-7) using information from the "Trap DB" and sent to the "Control Stage 2 Communication and Message Handling" (P3) process. This will clear all sequence traps and restart the call progress procedure by enabling the "Call Progress Initiate MSU Trap".

"Call Progress Sequence MSU Trap Triggered (CPT) Information" contents include the following:

Link ID - Numeric designation for the monitor the link is attached to

CTRL Unit - The Stage 1 controller ID that the monitor is controlled from

Trap Number - Number assigned to the Response Trap in the monitor

Type - Call Progress Sequence MSU

Time - Time that the Response Trap was triggered

MSU - The MSU message that was trapped

Priority - A number representing the interrupt priority of the trap

Origin - Indicate whether the trap is for link transmit or receive

Master Proc ID - Number assigned by the "Reactive Trap Script" to identify Slave Stage 2 information User ID - A number or Alpha-numeric character string used to identify where to send information when the trap is triggered "Stage 3 Call Progress Trap Triggered Message" contents include the following:

Link ID - Numeric designation for the monitor the link is attached to

CTRL Unit - The Stage 1 controller ID that the monitor is controlled from

Sub-System - Name or number assigned to the Stage 2 process. For Stage 3 message only.

Trap Number - Number assigned to the Response Trap in the monitor.

Type - Type of Call Progress - MSU

Time - Time that the Response Trap was triggered

MSU - The MSU message that was trapped

Priority - A number representing the interrupt priority of the trap

Origin - Indicate whether the trap is for link transmit or receive

Master Proc ID - Number assigned by the "Reactive Trap Script" to identify Slave Stage 2 information User ID - A number or Alpha-numeric character string used to identify where to send information when the trap is triggered "Stage 1 Call Progress Sequence MSU Trap Clear Information" acts to enable the "Initiate MSU Trap". The contents include the following:

Link ID - Numeric designation for the link monitor that contains the "Call Progress Initiate Trap"

CTRL Unit - The Stage 1 controller ID that the monitor is controlled from

Trap # - Number assigned to the trap when it was generated

Type - Trap

Action - Action to be taken by the Stage 1 or monitor process Enable Call Progress Initiate Trap Priority - Number from 0 to 5 that identifies the interrupt priority of the information - 1.

User ID - Used to determine where the trap information is to be sent. The default value would be the Stage 2 Controller ID.

"Stage 1 Progress Sequence MSU Trap Clear Information" acts to clear or remove all "Sequence MSU Traps". The contents include the following:

Link ID - Numeric designation for the link monitor that contains the "Call Progress Sequence Trap"

CTRL Unit - The Stage 1 controller ID that the monitor is controlled from

Trap # - Number assigned to the trap when it was generated

Type - Trap

Action - Action to be taken by the Stage 1 or monitor process Clear Call Progress Sequence Trap Priority - Number from 0 to 5 that identifies the interrupt priority of the information - 1.

User ID - Used to determine where the trap information is to be sent. The default value would be the Stage 2 Controller ID.

"Call Progress Traps" can only be terminated by the user. If not cleared, they will continue to track MSUs indefinitely. To clear the "Call Progress Traps", "Call Progress Initiate MSU Trap Clear Information" is received from the "Perform Stage 3 Communication Control" (P10) process or the "Format and Control Local Terminal" (P8) process depending on who initiated the trap ("User ID").

"Stage 1 Call Progress Initiate MSU Trap Clear Information" to remove or clear "Initiate MSU Trap" and "Sequence MSU Traps". The contents include the following:

Link ID - Numeric designation for the link monitor that contains the "Call Progress Initiate and/or Sequence Traps"

CTRL Unit - The Stage 1 controller ID that the monitor is controlled from

Trap # - Number assigned to the trap when it was generated

Type - Trap

Action - Action to be taken by the Stage 1 or monitor process. Enable Call progress Initiate Trap.

Priority - Number from 0 to 5 that identifies the interrupt priority of the information - 1.

User ID - Used to determine where the trap information is to be sent. The default value would be the Stage 2 Controller ID.

P5 Generate and Analyze Reactive Trap Trigger

Figures 1, 26:
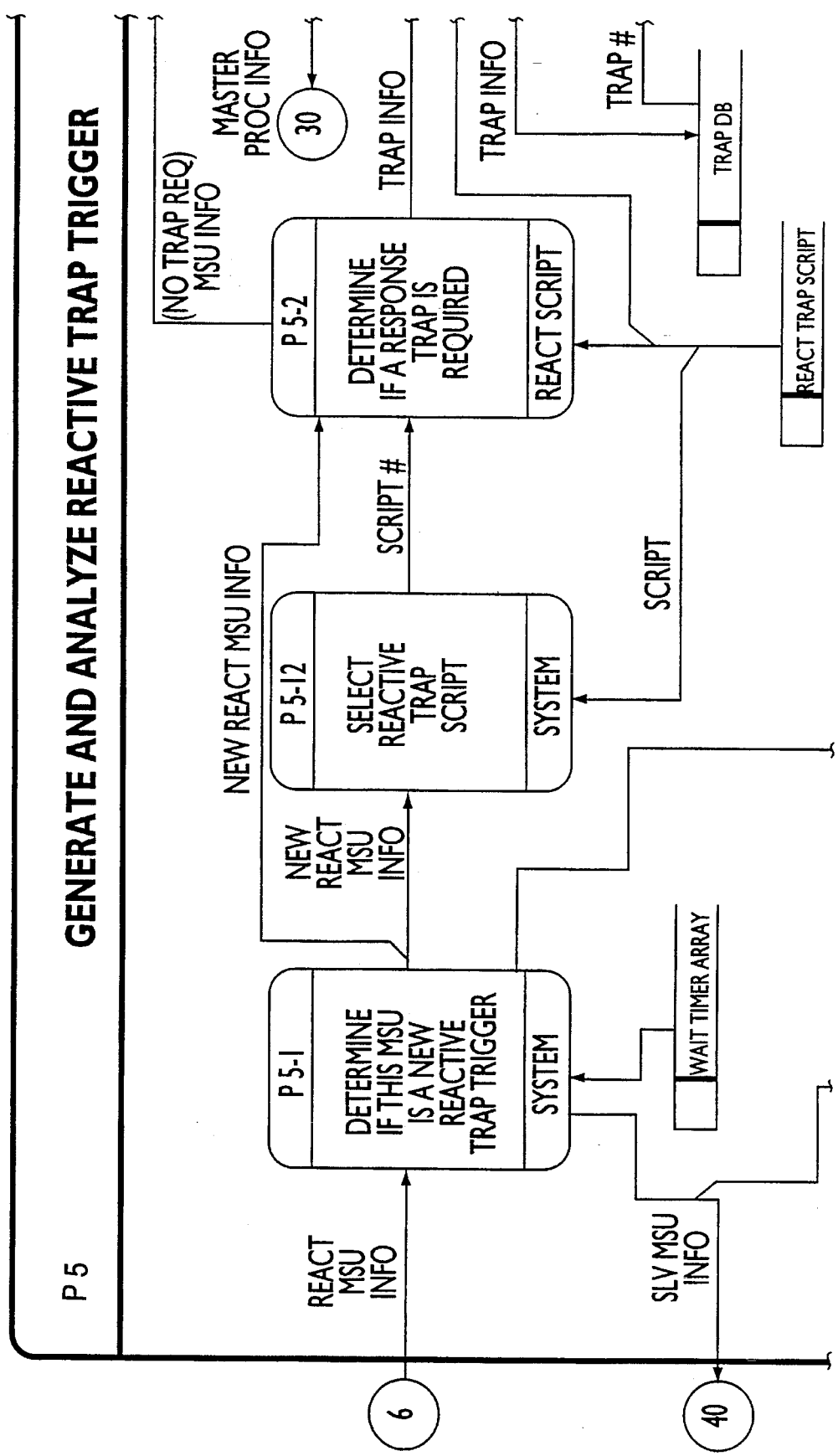
Figures 2, 26:
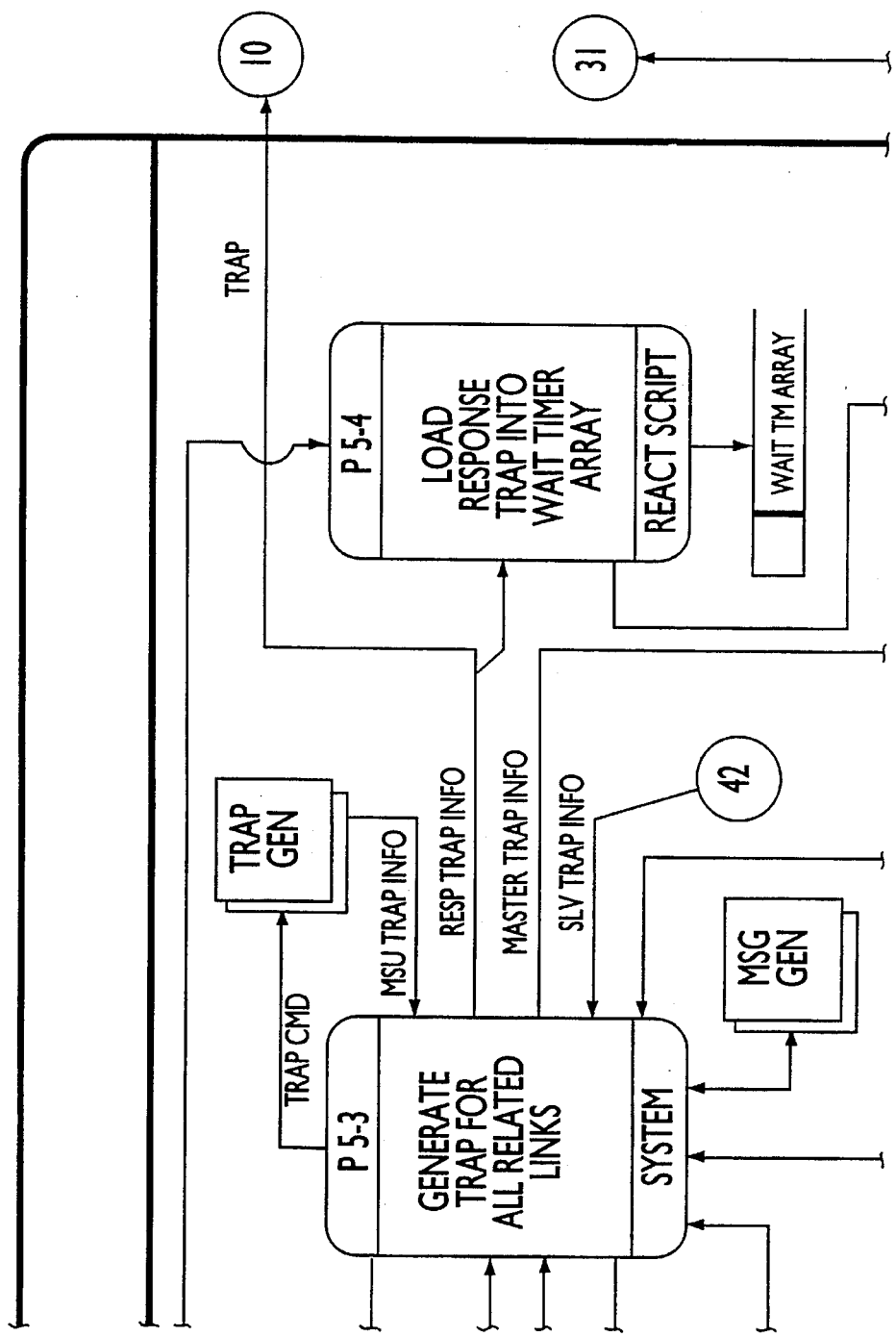
Figures 3, 26:
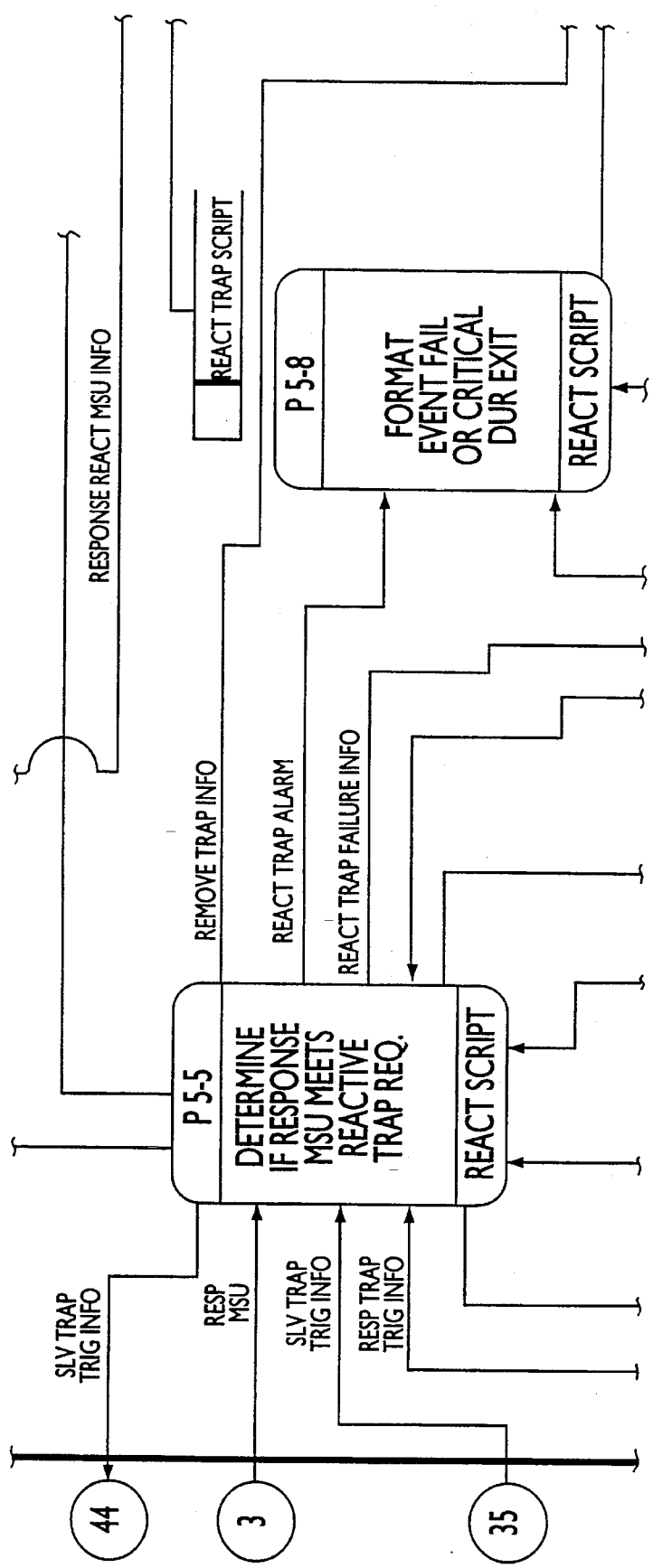
Figures 4, 26:
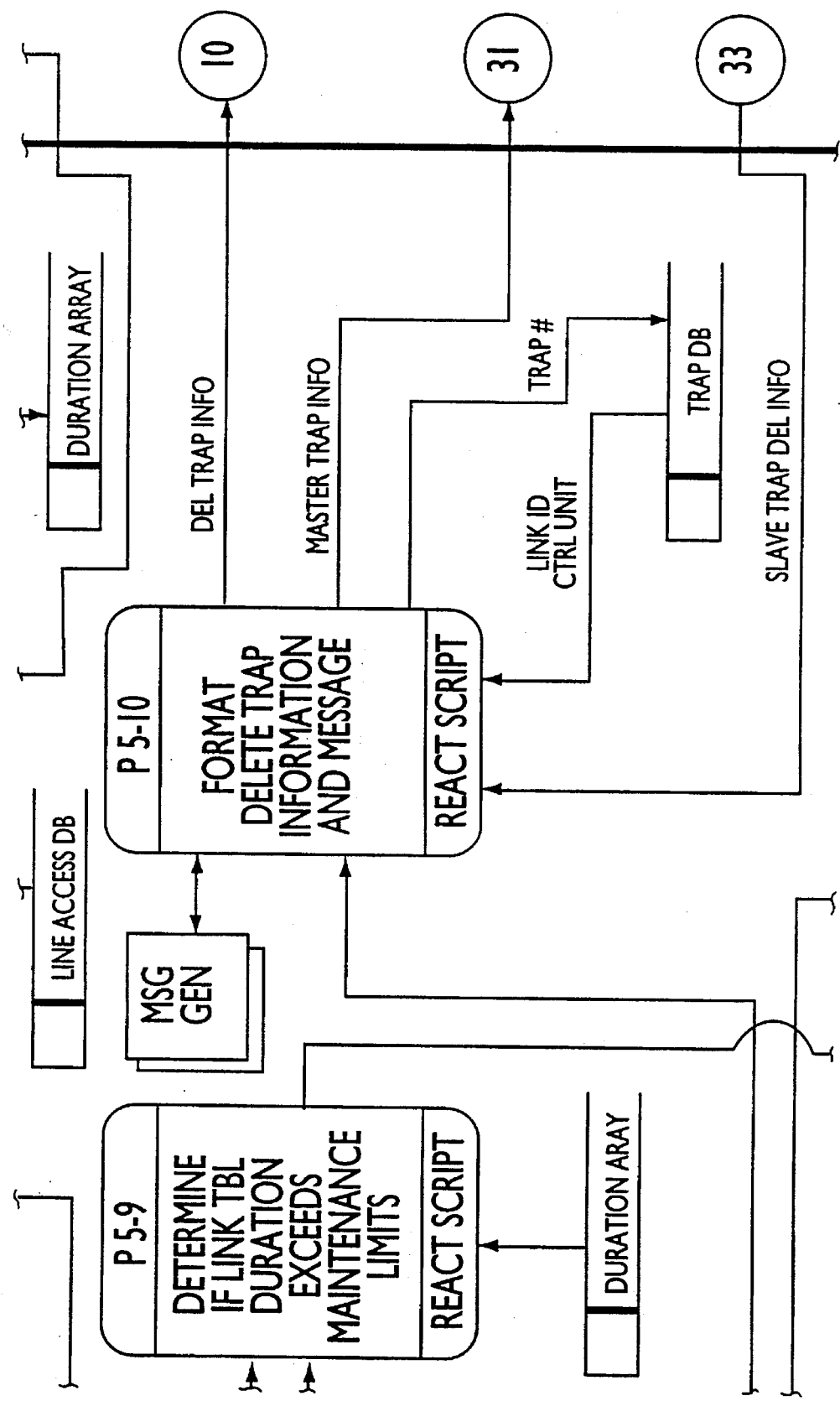
Figures 5, 26:
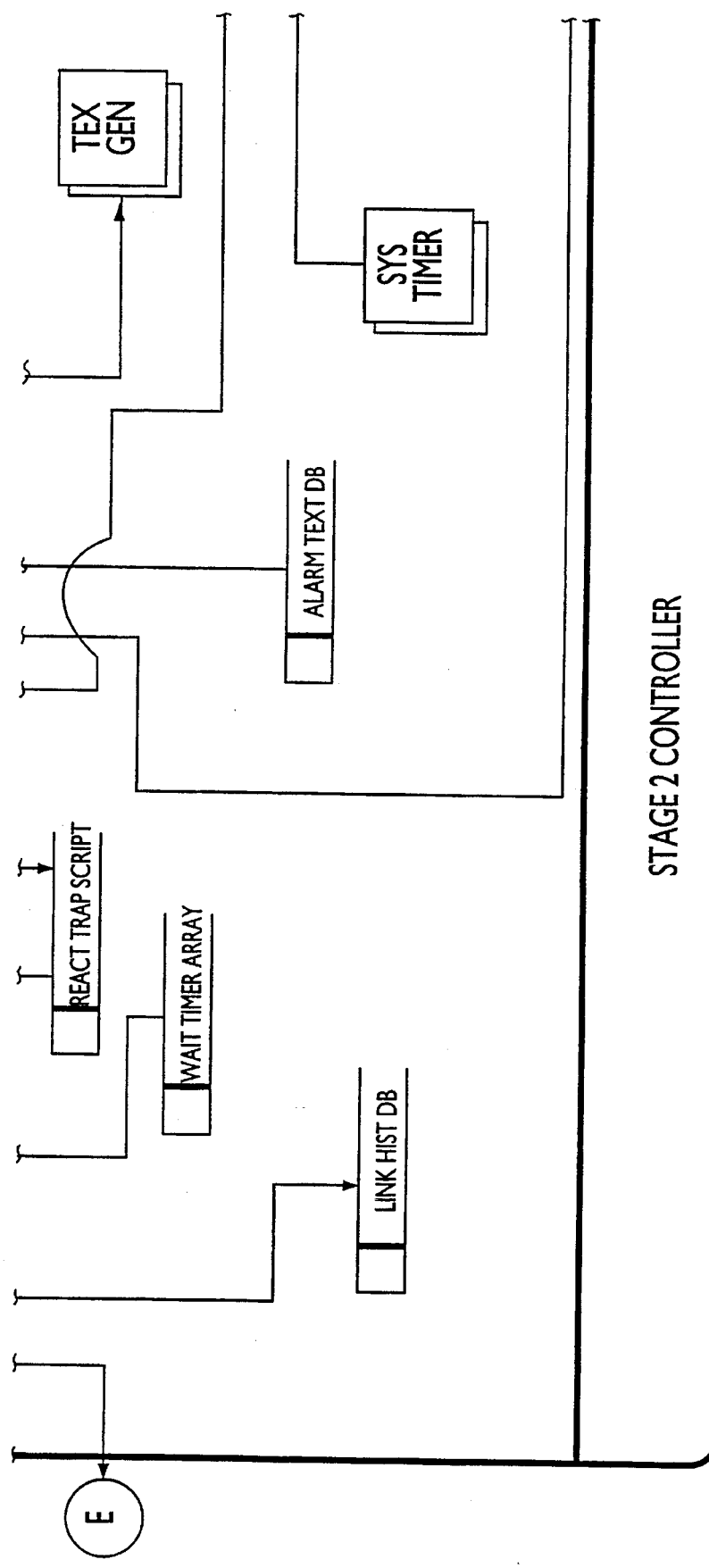
Figures 6, 26:
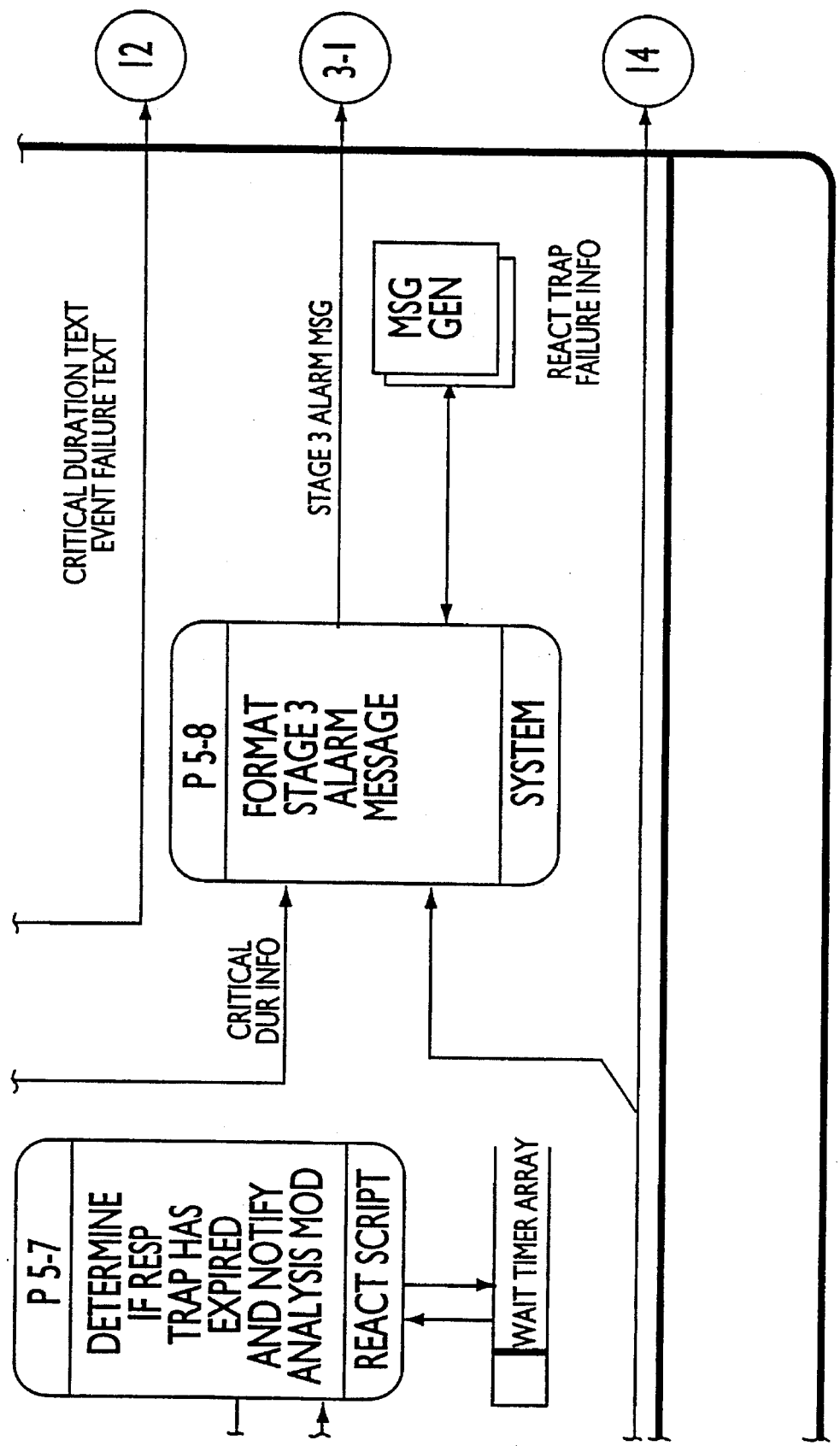

Reference is had to FIGS. 12A and 26.

Depending upon the number of links to be monitored, the speed of the Stage 2 process platform, and the physical location of "Mated STP Pairs", it may be necessary to have two or more Stage 2 processes controlling monitors in both STPs. If two or more Stage 2 processes are required, each Stage 2 process must be connected to each other via a sync link carrying master/slave information. Such a link is shown at 131 in FIGS. 11 and 12. Since "Reactive Trap", "Response Traps" and "Call Progress Traps" detect an MSU and cause traps to be placed on links in both STPs, the Stage 2 process generating the traps must receive trap triggered information from the traps it placed. To accomplish this, the Stage 2 process detecting the "Initial MSU" is considered to be the "Master Stage 2 Process" for all subsequent traps and trap triggered analysis initiated as a result of detecting the Initial MSU. Stage 2 processes receiving trap information from the Master Stage 2 Process via the communication channel are considered to be the "Slave Stage 2 Process" for these traps only. Trap triggered information generated from a trap initiated by the Master Stage 2 Process will be sent to the Master Stage 2 Process via the data communication channel (sync link). Once all trap requirements have been satisfied, the Master Stage 2 Process will remove the traps in all "Slave Stage 2 Process". "Stage 2" processes are not designated as Master or Slave. Only those traps that were generated by some other Stage 2 process (Master) are considered to be slave processes. A Stage 2 process can be simultaneously running "Master Stage 2 Processes" and "Slave Stage 2 Processes".

If only one Stage 2 process is needed, then there will be no "Master" or "Slave" process running. The following description is applicable to both "Master" and "Slave" scenarios.

When a "Reactive MSU" is detected by the monitor, "Reactive MSU Information" (receive or transmit) is received from the "Control Stage 2 Communication and Message Handling" (P3) process. The MSU information is checked against previously triggered "Reactive MSUs" in the "Wait Timer Array" to determine if the MSU is a new "Reactive MSU", or a "Reactive MSU" that was initiated in response to a "Response MSU" or a "Reactive MSU" that was initiated in response to a "Response MSU" but is controlled by a "Master Stage 2 Process" ("Slave Reactive MSU") (P5-1). This is accomplished by comparing data in the "Reactive MSU Information" with the same flagged information in the Wait Timer Array. If there is a match and the "User ID" is the same as the Stage 2 process, the "Reactive MSU" is considered to be a "Response Reactive MSU". If there is a match and the "User ID" is different then the Stage 2 process "Slave MSU Information" is generated and sent to the Control Remote Port (P9) process. If no match is made after comparing all records in the "Wait Timer Array", then it is considered to be a "New Reactive MSU". (MSU Type, OPC, DPC and MSU Priority are always compared).

The following describes the difference between a "New Reactive MSU" and a "Response Reactive MSU":

1. A Far End Network sends a "Reactive MSU" indicating the loss of a route to one of the Far End Network's signaling nodes.

2. The Near End Network responds to the "Reactive MSU" by transmitting a "Response MSU" that queries the Far End Network about the present state of the route.

3. If the route is still not available, the Far End Network will send another "Reactive MSU" indicating that the route is still unavailable.

4. Processes 2 and 3 continue until the Far End Network responds to the Near End Network's "Response MSU" with a different "Reactive MSU" indicating the route is now available.

Item 1 describes a "New Reactive MSU" because no "Response MSU" has been sent. This indicates the beginning of a Network Management Procedure described in the SS7 protocol.

Item 3 describes a "Response Reactive MSU" to the "Response MSU" sent by the Near End Network. This indicates that the Network Management Procedure is in progress.

Item 4 indicates the termination of the Network Management procedure.

The "Wait Timer Array" is a system array (Global) used to hold information about "Reactive MSU" and "Reactive MSU Traps" that have been previously triggered and have not been terminated. It also contains information needed to determine how long a trap should be run. If this time duration is exceeded, a "Reactive Trap Script Interrupt" is generated by the system. When a "Reactive Trap Script" is terminated, the entry is removed from the "Wait Timer Array". The "Wait Timer Array" contents include the following information:

MSU Type - Type of "Reactive MSU" triggered

OPC - Originating Point Code of the "Reactive MSU"

DPC - Destination Point Code of the "Reactive MSU"

MSU Priority - Priority of the "Reactive MSU" if applicable

APC - Affected Point Code of the "Reactive MSU" if applicable

APC Flag - Applicable comparison field if set to 1

CPN - Calling Party Number of the "Reactive MSU" if applicable

CPN Flag - Applicable comparison field if set to 1

CLD - Called Party Number of the "Reactive MSU" if applicable

CLD Flag - Applicable comparison field if set to 1

CIC - Circuit Identification Code of the "Reactive MSU" if applicable

CIC Flag - Applicable comparison field if set to 1

DLR - Destination Local Reference of the "Reactive MSU" if applicable

DLR Flag - Applicable comparison field if set to 1

SLR - Source Local Reference of the "Reactive MSU" if applicable

SLR Flag - Applicable comparison field if set to 1

CPA - Calling Party Address of the "Reactive MSU" if applicable

CPA Flag - Applicable comparison field if set to 1

TID - Transaction ID of the "Reactive MSU" if applicable

TID Flag - Applicable comparison field if set to 1

Origin - Indicates whether the information is for link transmit or receive

Trap # - Number assigned to the trap by the "Reactive Trap Script"

Link ID - Numeric designation for the monitor the link is attached to

CTRL Unit - The Stage 1 controller ID that the monitor is controlled from

Time - Time that the New Reactive MSU was detected

Duration Time - The time, in milliseconds, that the trap should be active. This parameter is set by the "Reactive Trap Script"

Script # - Number indicating the "Reactive Trap Script" that generated the Trap

Master Proc ID - Number assigned by the "Reactive Trap Script" to identify Slave Stage 2 information User ID - A number or Alpha-numeric character string used to identify where to send information when the MSU is triggered Default Stage 2

"New Reactive MSU" Information is used to determine which "Reactive Trap Script" will be used to track the reactive scenario ("Event"). Included in the criteria used to determine which Reactive Trap Script is needed are:

MSU Type and Origin
MSU Type and OPC/DPC
MSU Type and Priority
Global Title
Link ID "New Reactive MSU Information" contents include the following information:

LINK ID - Numeric designation for the monitor the link is attached to

CTRL Unit - Stage 1 controller ID that the monitor is controlled from

MSU - Complete MSU including header information. Flags can be removed.

Type - Type of MSU. Either Reactive or Response.

Time - Time the "Reactive MSU" was detected by the monitor

Origin - Side of the link that the MSU was detected - Receive/Transmit

User ID - Used to determine where the threshold information is to be sent. The default value would be the Stage 2 Controller ID.

Priority - Number from 0 to 5 that identifies the interrupt priority of the information - 1.

"Response Reactive MSU Information" contents include the following information:

LINK ID - Numeric designation for the monitor the link is attached to

CTRL Unit - Stage 1 controller ID that the monitor is controlled from

MSU - Complete MSU including header information. Flags can be removed.

Type - Type of MSU. Either Reactive or Response.

Time - Time the "Reactive MSU" was detected by the monitor

Origin - Side of the link that the MSU was detected - Receive/Transmit

User ID - Used to determine where the threshold information is to be sent. The default value would be the Stage 2 Controller ID.

Priority - Number from 0 to 5 that identifies the interrupt priority of the information - 1.

"Slave MSU Information" contents include the following information:

LINK ID - Numeric designation for the monitor the link is attached to

CTRL Unit - Stage 1 controller ID that the monitor is controlled from

MSU - Complete MSU including header information. Flags can be removed.

Type - Type of MSU. Either Reactive or Response.

Time - Time the "Reactive MSU" was detected by the monitor

Origin - Side of the link that the MSU was detected - Receive/Transmit

Master Proc ID - Number assigned by the "Reactive Trap Script" to identify Slave Stage 2 information User ID - Used to determine where the threshold information is to be sent. The default value would be the Stage 2 Controller ID.

Priority - Number from 0 to 5 that identifies the interrupt priority of the information - 1.

Once the "Reactive Trap Script" is identified, the "New Reactive MSU Information" is passed to the script. The "Reactive Trap Script" tracks the "Event" described by the script until it completes or is terminated by a "Wait Timer Array" record time out.

All "Reactive Trap Scripts" perform three main functions:

Determine if "Response Traps" are required and generate them if they are.

Wait for "Response MSUs", "Slave Response MSUs", "Response Reactive MSUs", "Slave Response Reactive MSUs", "Response MSU Traps", "Slave Response MSU Traps" to trigger or not to trigger and then determine if they conform to expected results.

Continue to follow the "Event" until it has terminated in the SS7 Network.

If a "Response MSU Trap(s)" is required (P5-2), the "Reactive Trap Script" will extract information needed for a "Response MSU Trap" from the "Reactive MSU Information", populate a "Generate Trap Command" and send it to the system's "Trap Generator Function". When complete, the function returns formatted "MSU Trap Information" (P5-3). Also, the "Link ID" and "CTRL Unit #" are used to search the "Link Access DB" for a "Network ID". The "Network ID" is used to search the "Link Access DB" for any other related link(s). When related links are found, the "Link ID" and "CTRL Unit #" information is retrieved and combined with the "MSU Trap Information", a trap "Script" supplied by the "Reactive Trap Script" and "Reactive MSU Information" to create "Response Trap Information" (P5-3). "Response Trap Information" is generated for all related links, including the link that the "Reactive MSU" was detected on. If more than one "Response MSU Trap" is needed, the process is repeated until all traps are generated. Records are created in the "Trap Database" for every trap generated.

If "Response Traps" are needed in monitors controlled by a different Stage 2 process, "Trap Required Information" is generated. Also a "Master Procedure ID" is assigned from the "Master Proc ID Database". This ID is used to identify traps that are triggered in the "Slave Stage 2 Process". This ID is populated in every related trap record in the "Trap Database". The "Reactive MSU Information", "Trap Required Information" and the "Master Proc ID" are formatted into "Master Procedure Information" (P5-3). This information is sent to the appropriate Stage 2 processes via the "Control Remote Port" (P9) process.

Once the "Slave Stage 2 Processes" have updated their "Wait Timer Array" and "Trap Databases" with the "Master Procedure Information", they send a "Master Acknowledgment Message" back to the "Master Stage 2 Process". This message is decoded into "Master Acknowledgment Information" (P9-10-7), where it is used to update the "Master Stage 2 Process", "Wait Timer Array" and "Trap Database" with the "Slave Stage 2 Process's" trap(s) information (Trap #).

Once the "Master Acknowledgment Information" is received and processed, "Master Trap Information" is generated for every monitor identified (P5-3). All remaining "Wait Timer Array" and Trap Database record fields are populated. This information is sent to the "Control Remote Port" (P9) process where it is formatted into a "Slave Trap Message" (P9-10-4). This message is sent to the appropriate "Slave Stage 2 Process" via the "AUX 1 Port".

When the "Slave Stage 2 Process" receives the "Slave Trap Message", it is decoded into "Slave Response Trap Information" (P9-10-9). This information is used to generate the required "Response Trap Information", which is sent to "Control Stage 2 Communication and Message Handling" (P3) process to load the traps in the appropriate monitors. All remaining "Slave Stage 2 Process's", "Wait Timer Array" and "Trap Database" record fields are also populated at this time.

If the "Error" field in the "Master Acknowledgment Information" is set, the "Reactive Trap Script" is informed and a "Reactive Script Failure" indication is sent to the Stage 3 and/or Stage 4 process.

Such procedures are used only when two or more Stage 2 processes are used to control monitors for an "STP Pair".

If a "Response MSU Trap" is not required, a record is created and the elements populated in the "Wait Timer Array" (P5-4). "Response MSUs" and "Response Reactive MSUs" are also entered into the "Wait Timer Array" in both the "Master Stage 2 Process" and "Slave Stage 2 Process."

"Generate Trap Command" contents is able to address the following minimum MSU fields:

MSU Type - H0 and H1 octet values for the MSU Type to Trap
OPC - Originating Point Code of the MSU to be trapped
DPC - Destination Point Code of the MSU to be trapped
MSU Priority - Priority of MSU to be trapped
Congestion Level - for TFC traps only
APC - Affected Point Code of the "Reactive MSU" if applicable
CPN - Calling Party Number of the "Reactive MSU" if applicable
CLD - Called Party Number of the "Reactive MSU" if applicable
CIC - Circuit Identification Code of the "Reactive MSU" if applicable
DLR - Destination Local Reference of the "Reactive MSU" if applicable
SLR - Source Local Reference of the "Reactive MSU" if applicable
CPA - Calling Party Address of the "Reactive MSU" if applicable
TID - Transaction ID of the "Reactive MSU" if applicable The "Trap Generator Function" uses this information to create an MSU "Mask". More detailed message traps can be generated by supplying the "Trap Generator Function" with a MSU "Mask" instead of field values. The "Trap Generator Function" will also assign a unique "Trap #" to the "MSU Trap Information".

MSU Trap Information contents include the following information:

Trap # - Number assigned to the trap when it was generated
Mask - A representation of the MSU to be trapped, populated with the MSU field(s) values to be trapped on. If the Mask populated values match the equivalent MSU field values, a trap trigger indication is generated.

"Response Trap Information" contents include the following information:

Link ID - Numeric designation for the link monitor that is experiencing the trouble
CTRL Unit - The Stage 1 controller ID that the monitor is controlled from
Sub-System - Name or number assigned to the Stage 2 process. For Stage 3 message only. Used if information is to be sent to another Stage 2 process.
Trap # - Number assigned to the trap when it was generated
Mask - A representation of the MSU to be trapped, populated with the MSU field(s) values to be trapped on. If the Mask populated values match the equivalent MSU field values, a trap trigger indication is generated.
Script - Instructions to the monitor on how to determine if the trap has been triggered and what information to send to the user ("User ID"). This information is supplied by the "Reactive Trap Script". Note: This function could be handled by the Stage 1, 2, 3 or 4 Process if the MSU is sent to the appropriate process when triggered.
Type - User Defined Trap
Origin - Side of the link that the MSU is to be trapped on - Receive/Transmit
Master Proc ID - Number assigned by the "Reactive Trap Script" to identify Slave Stage 2 information
User ID - Used to determine where the trap information is to be sent. The default value would be the Stage 2 Controller ID.

Record elements in the "Trap Database" contents include the following information:

Trap Type - Type of trap (Response, CPG, Reactive, etc.)
Link ID - Numeric designation for the link monitor that is experiencing the trouble
CTRL Unit - The Stage 1 controller ID that the monitor is controlled from
Sub-System - Name or number assigned to the Stage 2 process. For Stage 3 message only. Used if information was sent to another Stage 2 process.
Trap # - Number assigned to the trap when it was generated
Master Proc ID - Number assigned by the "Reactive Trap Script" to identify Slave Stage 2 information
User ID - A number or Alpha-numeric character string used to identify where to send information when the MSU is triggered Default Stage 2

NOTE: New Trap Numbers are created by searching the Trap Database for the last number used and incrementing it by one. There can be a maximum of 512 active trap numbers. If this maximum number is reached, the next trap number will be zero. If a created trap number already exists, the new number is incremented until a spare number is identified.

"Trap Required Information" contents include the following information:

Type - Indicates whether a trap is needed ("Response Trap" or "No Trap")

Link ID - Numeric designation for the monitor the link is attached to

CTRL Unit - The Stage 1 controller ID that the monitor is controlled from # of Traps - Identifies how many traps will be needed for each SS7 link

User ID - A number or Alpha-numeric character string used to identify where to send information when the MSU is triggered. Default Stage 2.

NOTE: There will be a set of these parameters for each SS7 link that require trap placed "Master Procedure Information" contents include the following information:

Trap Type - Indicates whether a trap is needed ("Response Trap" or "No Trap")

Link ID - Numeric designation for the monitor the link is attached to

CTRL Unit - The Stage 1 controller ID that the monitor is controlled from # of Traps - Identifies how many traps will be needed for each SS7 link

Resp MSU - Response MSU(s) to be looked for on related SS7 links

Time - Time that the NEW Reactive MSU was detected

Origin - Indicates whether the information is for link transmit or receive

Duration Time - The time, in milliseconds, that the trap should be active. This parameter is set by the "Reactive Trap Script".

Script # - Number indicating the "Reactive Trap Script" that generated the Trap

User ID - A number or Alpha-numeric character string used to identify where to send information when the MSU is triggered. Default Stage 2.

NOTE: There will be a set of these parameters for each SS7 link that requires traps placed.

"Master Procedure ID" contents include the following information:

Master Proc ID - Number assigned by the "Reactive Trap Script" to identify Slave Stage 2 information "Master Acknowledgment Message" contents include the following information:

Trap Type - Indicates what kind of trap was placed ("Response Trap" or "Response MSU")

Link ID - Numeric designation for the monitor the link is attached to

CTRL Unit - The Stage 1 controller ID that the monitor is controlled from

Sub-System - Name or number assigned to the Stage 2 process that originated the message Trap # - Number assigned to the trap Time - Time that the New Reactive MSU was detected Origin - Indicates whether the information is for link transmit or receive Script # - Number indicating the "Reactive Trap Script" that generated the Trap Master Proc ID - Number assigned by the "Reactive Trap Script" to identify Slave Stage 2 information Error - Traps cannot be placed as requested User ID - A number or Alpha-numeric character string used to identify where to send information when the MSU is triggered. Default Stage 2 (Master Stage 2).

NOTE: There will be as many of these messages generated as there are "Response Traps" and/or "Response MSUs" placed in the "Trap Database" and "Wait Timer Array".

"Master Acknowledgment Information" contents include the following information:

Trap Type - Indicates what kind of trap was placed ("Response Trap", "Response MSU" or "CPG Sequence Trap")

Link ID - Numeric designation for the monitor the link is attached to

CTRL Unit - The Stage 1 controller ID that the monitor is controlled from

Sub-System- Name or number assigned to the Stage 2 process that originated the message Trap # - Number assigned to the trap Time - Time that the New Reactive MSU was detected Origin - Indicates whether the information is for link transmit or receive Script # - Number indicating the "Reactive Trap Script" that generated the Trap Master Proc ID - Number assigned by the "Reactive Trap Script" to identify Slave Stage 2 information Error - Traps cannot be placed as requested User ID - A number or Alpha-numeric character string used to identify where to send information when the MSU is triggered. Default Stage 2 (Master Stage 2).

NOTE: There will be as many of this information decoded as there were "Response Traps" and/or "Response MSUs" placed in the Slave Stage 2 process's "Trap Database" and "Wait Timer Array"

"Response Trap Information" is also used to generate a record and populate the appropriate elements in the "Wait Timer Array" (P5-4). An entry is also made in the "Duration Array" so that the "Event" duration limits can be monitored by the "Reactive Trap Script".

"Response Trap Information" is generated and presented to the appropriate Stage 1 processes (Master and Slave) within 500 ms from the time the "Reactive MSU" was detected by the monitor.

Response Traps are placed in the monitors and activated within 100 ms from the time "Response Trap Information" is received by the appropriate Stage 1 process.

Once the "Response Trap(s)" are placed and activated, the "Reactive Trap Script" waits for a "Response MSU Information" and/or "Response Trap Triggered Information" to be sent from the "Control Stage 2 Communication and Message Handling" (P3) process and/or "Control Remote Port" (P9) ("Slave Stage 2 Process"). It also waits for the associated "Wait Timer Array" record(s) to time out, indicating that a "Response Trap" has not triggered within the specified time set by the script (P5-7) The "Reactive Trap Script" uses this information to perform one of the following functions (P5-5).

Determine that the "Event" was handled correctly and no trouble exists. The Script will then add a record to the "Link History Database".

Determine that one or more procedures were handled incorrectly and a potential trouble exists. The script will then format "Reactive Trap Alarm Information" (P5-6) and send it to the "Format and Control Local Terminal" (P8) process. It will also format "Reactive Trap Failure Information" and pass it to the "Generate Corrective Action Information" (P7) process. Reactive Trap Failure Information is also formatted into a "Stage 3 Alarm Message" (P5-8) and sent to the "Perform Stage 3 Communication Control" (P10) process. The script will also add a record to the "Link History Database."

When it has been determined that there is or is not a trouble, all "Response Traps" are removed from the monitors by formatting "Response Trap Clear Information". This information is sent to the "Control Stage 2 Communication and Message Handling" (P3) process. If "Slave Stage 2 Processes" are involved, "Master Trap Information" is generated and sent to the "Control Remote Port" (P9) process. This is a general procedure. The "Reactive Trap Script" could determine that some or all of the traps should stay in place and would be removed by the Stage 3 or Stage 4 process via direct control messages.

Whether or not a trouble exists, the "Event" is tracked until the link or network status is returned to a normal in-service state. This tracking is performed by the "Reactive Trap Script". When the "Event" was first detected, a record was created in the "Duration Array". This record was populated with the "Start Time" of the "Event". The "Reactive Trap Script" contains the maximum allowed duration for the "Event" it is monitoring. When a "Response Reactive MSU" is detected (P5-1), the "Start Time" is subtracted from the current time. If the result is greater than the maximum allowed duration time, "Critical Duration Alarm Information" is generated (P5-9). This information is formatted into a "Stage 3 Alarm Message" (P5-8) and sent to the "Perform Stage 3 Communication Control" (P10) process. The "Reactive Trap Script" will continue to monitor the duration until either "Response MSU Information" is received from the "Control Stage 2 Communication and Message Handling" (P3) process indicating a normal in-service state has been achieved or by receiving a "Terminate Reactive Trap Information" from the Stage 3 or Stage 4 process (P5-10). These are the only ways a "Reactive Trap Script" can be terminated.

These procedures are used only when two or more Stage 2 processes are used to control monitors for an STP Pair.

"Response MSU Information" contents include the following information:

LINK ID - Numeric designation for the monitor the link is attached to

CTRL Unit - Stage 1 controller ID that the monitor is controlled from

MSU - Complete MSU including header information. Flags can be removed

Type - Type of MSU. Either Reactive or Response.

Time - Time the "Reactive MSU" was detected by the monitor

Origin - Side of the link that the MSU was detected - Receive/Transmit

Master Proc ID - Number assigned by the "Reactive Trap Script" to identify Slave Stage 2 information User ID - Used to determine where the threshold information is to be sent. The default value would be the Stage 2 Controller ID.

Priority - Number from 0 to 5 that identifies the interrupt priority of the information - 1.

"Slave MSU Information" contents include the following information:

LINK ID - Numeric designation for the monitor the link is attached to

CTRL Unit - Stage 1 controller ID that the monitor is controlled from

MSU - Complete MSU including header information. Flags can be removed

Type - Type of MSU. Either Reactive or Response

Time - Time the "Reactive MSU" was detected by the monitor

Origin - Side of the link that the MSU was detected - Receive/Transmit

Master Proc ID - Number assigned by the "Reactive Trap Script" to identify Slave Stage 2 information User ID - Used to determine where the threshold information is to be sent. The default value would be the Stage 2 Controller ID.

Priority - Number from 0 to 5 that identifies the interrupt priority of the information - 1.

"Response Trap Triggered Information" contents include the following information:

LINK ID - Numeric designation for the monitor the link is attached to

CTRL Unit - Stage 1 controller ID that the monitor is controlled from

Trap # - Number assigned to the trap when it was generated

MSU - Complete MSU including header information. Flags can be removed

Type - Type of Trap Triggered, Response, User defined, or Call Progress

Time - Time the "Reactive MSU" was detected by the monitor

Origin - Side of the link that the MSU was detected - Receive/Transmit

Priority - Number from 0 to 5 that identifies the interrupt priority of the information - 2.

Master Proc ID - Number assigned by the "Reactive Trap Script" to identify Slave Stage 2 information User ID - Used to determine where the trap information is to be sent. The default value would be the Stage 2 Controller ID.

OR

LINK ID - Numeric designation for the monitor the link is attached to

CTRL Unit - Stage 1 controller ID that the monitor is controlled from

Trap # - Number assigned to the trap when it was generated

Trigger Info - Information about the trap trigger

Type - Type of Trap Triggered, Response, User defined, or Call Progress

Time - Time the "Reactive MSU" was detected by the monitor

Origin - Side of the link that the MSU was detected - Receive/Transmit

Priority - Number from 0 to 5 that identifies the interrupt priority of the information - 2.

Master Proc ID - Number assigned by the "Reactive Trap Script" to identify Slave Stage 2 information User ID - Used to determine where the trap information is to be sent. The default value would be the Stage 2 Controller ID.

"Reactive Trap Failure Information" content includes the following information:

Link ID - Number of the link that had the threshold exceeded

CTRL Unit - The Stage 1 controller ID that the monitor is controlled from

Sub-System - Name or number assigned to the Stage 2 process. For Stage 3 message only.

Origin - Indicates whether the trap is for link transmit or receive

Reactive MSU Type - MSU type that was triggered

Reactive Script# - Number of the Reactive Script used

Failure ID - Number assigned by the "Reactive Trap Script" identifying the type of failure Time - Time (HH:MM:SS:MS) that the threshold was exceeded Duration - the length of time the threshold was exceeded The "Reactive Trap Alarm Information" content includes the following information:

Link ID - Number of the link that had the threshold exceeded

CTRL Unit - The Stage 1 controller ID that the monitor is controlled from

Sub-System - Name or number assigned to the Stage 2 process. For Stage 3 message only.

Origin - Indicates whether the trap is for link transmit or receive

Threshold Exceeded - The type of threshold that was exceeded

Threshold types:
0 No Threshold Exceeded
1 Link Load Threshold
2 MSU Interval Threshold
3 MSU Category Threshold
4 Link Error Threshold
5 Link BERT Threshold
6 Duration Threshold Threshold Script # - The number of the Threshold Exceeded Script used Corrective Action # - Number representing the record of the corrective Reactive MSU Type - MSU type that was triggered Reactive Script # - Number of the Reactive Script used Time - Time (HH:MM:SS:MS) that the threshold was exceeded Duration - The length of time the threshold was exceeded Alarm Text - Text describing the failure Trouble Severity Code - Code used to identify the severity of the trouble. Severity categories are:
100 - Normal trouble, no corrective action needed
200 - Normal trouble, corrective action required
300 - Minor trouble, no corrective action needed
400 - Minor trouble, manual intervention required
500 - Major trouble, STP affecting
600 - Major trouble, Network affecting
700 - Major trouble, Major Event possible Priority - A number representing the interrupt priority of the trap User ID - A number or Alpha-numeric character string used to identify who controlled or requested the trouble indication. Stage 3 default.

The "Stage 3 Alarm Message" content includes the following information:

Message Type - Type of alarm the message represents:
1 Threshold Exceeded
2 Event Failure
3 Major Event
4 Critical Duration Failure
5 Unknown Failure Link ID - Number of the link that had the threshold exceeded CTRL Unit - The Stage 1 controller ID that the monitor is controlled from Sub-System - Name or number assigned to the Stage 2 process. For Stage 3 message only.

Origin - Indicates whether the trap is for link transmit or receive

Threshold Exceeded - the type of threshold that was exceeded. Threshold types:
0 No Threshold Exceeded
1 Link Load Threshold
2 MSU Interval Threshold
3 MSU Category Threshold
4 Link Error Threshold
5 Link BERT Threshold
6 Duration Threshold Threshold Script - The number of the Threshold Exceeded Script used Corrective Action - Number representing the record of the corrective Reactive MSU Type - MSU type that was triggered Reactive Script - Number of the Reactive Script used Time - Time (HH:MM:SS:MS) that the threshold was exceeded Duration - The length of time the threshold was exceeded Alarm Text - Text describing the failure Trouble Severity Code - Code used to identify the severity of the trouble. Severity categories are:
100 - Normal trouble, no corrective action needed
200 - Normal trouble, corrective action required
300 - Minor trouble, no corrective action needed
400 - Minor trouble, manual intervention required
500 - Major trouble, STP affecting
600 - Major trouble, Network affecting
700 - Major trouble, Major Event possible Priority - A number representing the interrupt priority of the trap User ID - A number or Alpha-numeric character string used to identify who controlled or requested the trouble indication. Stage 3 default.

"Critical Duration Alarm Information" content includes the following information:

Link ID - Number of the link that had the threshold exceeded

CTRL Unit - The Stage 1 controller ID that the monitor is controlled from

Sub-System - Name or number assigned to the Stage 2 process. For Stage 3 message only.

Origin - Indicates whether the trap is for link transmit or receive

Threshold Exceeded - The type of threshold that was exceeded. Threshold types:
0 No Threshold Exceeded
1 Link Load Threshold
2 MSU Interval Threshold
3 MSU Category Threshold
4 Link Error Threshold
5 Link BERT Threshold
6 Duration Threshold Threshold Script # - The number of the Threshold Exceeded Script used Corrective Action # - Number representing the record of the corrective Reactive MSU Type - MSU type that was triggered Reactive Script # - Number of the Reactive Script used Time - Time (HH:MM:SS:MS) that the threshold was exceeded Duration - The length of time the threshold was exceeded Alarm Test - Text describing the failure Trouble Severity Code - Code used to identify the severity of the trouble. Severity categories are:
100 - Normal trouble, no corrective action needed
200 - Normal trouble, corrective action required
300 - Minor trouble, no corrective action needed
400 - Minor trouble, manual intervention required
500 - Major trouble, STP affecting
600 - Major trouble, Network affecting
700 - Major trouble, Major Event possible Priority - A number representing the interrupt priority of the trap User ID - A number or Alpha-numeric character string used to identify who controlled or requested the trouble indication. Stage 3 default.

The "Alarm Text Database" includes the following information:

Threshold Script # - The number of the Threshold scripts used

Reactive Script # - Number of the Reactive Scripts used

Alarm Script - Used to populate the Alarm Text with the appropriate information

Fill Entries - Number of entries in the text that must be populated

Length - Length of the text

Color - Yes, indicates there are color attributes to the test. No, indicates no color attributes provided.

Blink - Yes, indicates blinking text is provided. No, Indicates no blinking text provided.

Sound - Yes, indicates audio parameters are provided for the text. No, indicates no audio is provided.

Peripheral - Contains peripheral control codes to activate external system alarms Text - ASCII Corrective Action Text Monitor Control - Contains a list of monitor functions that must be terminated or enabled in order to track the trouble Protocol - The protocol needed to display and/or transmit the text is ASCII, Synchronous, X.25, etc.

Graphics - Color drawing illustrating where the trouble exists. Resolution is 1024×1024 HVGA. Note: Drawing could exist in a separate database.

The "Critical Duration Alarm Test" content includes the following information:

Date - Date the trouble was detected

Time - Time the trouble was detected

Trigger Time - The time the threshold was exceeded or MSU was detected

Alarm - ASCII text describing the trouble

Priority - A number representing the interrupt priority of the trap

User ID - A number or Alpha-numeric character string used to identify who controlled or requested the trouble indication. Stage 3 default.

"Stage 3 Alarm Message" content includes the following information:

Message Type - Type of alarm the message represents:
1 Threshold Exceeded
2 Event Failure
3 Major Event
4 Critical Duration Failure
5 Unknown Failure Link ID - Number of the link that had the threshold exceeded CTRL Unit - The Stage 1 controller ID that the monitor is controlled from Sub-System - Name or number assigned to the Stage 2 process. For Stage 3 message only.

Origin - Indicates whether the trap is for link transmit or receive

Threshold Exceeded - the type of threshold that was exceeded. Threshold types:
0 No Threshold Exceeded
1 Link Load Threshold
2 MSU Interval Threshold
3 MSU Category Threshold
4 Link Error Threshold
5 Link BERT Threshold
6 Duration Threshold Threshold Script # - The number of the Threshold Exceeded Script used Corrective Action # - Number representing the record of the corrective Reactive MSU Type - MSU type that was triggered Reactive Script # - Number of the Reactive Script used Time - Time (HH:MM:SS:MS) that the threshold was exceeded Duration - The length of time the threshold was exceeded Alarm Text - Text describing the failure Trouble Severity Code - Code used to identify the severity of the trouble. Severity categories are:
100 - Normal trouble, no corrective action needed
200 - Normal trouble, corrective action required
300 - Minor trouble, no corrective action needed
400 - Minor trouble, manual intervention required
500 - Major trouble, STP affecting
600 - Major trouble, Network affecting
700 - Major trouble, Major Event possible Priority - A number representing the interrupt priority of the trap User ID - A number or Alpha-numeric character string used to identify who controlled or requested the trouble indication. Stage 3 default.

"Terminate Reactive Trap Script Command" is sent from the Stage 2 process to remove or clear "Reactive Trap". The contents include the following information:

Link ID - Numeric designation for the link monitor that is experiencing the trouble CTRL Unit - The Stage 1 controller ID that the monitor is controlled from Trap # - Number assigned to the trap when it was generated Type - Trap Action - Action to be taken by the Stage 1 or monitor process Clear Reactive Trap Priority - Number from 0 to 5 that identifies the interrupt priority of the information - 1.

User ID - Used to determine where the trap information is to be sent. The default value would be the Stage 2 Controller ID.

"Response Trap Clear Information" is sent from the Stage 2 process to remove or clear "Response Trap". The contents include the following information:

Link ID - Numeric designation for the link monitor that is experiencing the trouble CTRL Unit - The Stage 1 controller ID that the monitor is controlled from Trap # - Number assigned to the trap when it was generated Type - Trap Action - Action to be taken by the Stage 1 or monitor process Clear Response Trap Priority - Number from 0 to 5 that identifies the interrupt priority of the information - 1

User ID - Used to determine where the trap information is to be sent. The default value would be the Stage 2 Controller ID.

"Master Trap Information" contents include the following information:

Link ID - Numeric designation for the link monitor that is experiencing the trouble CTRL Unit - The Stage 1 controller ID that the monitor is controlled from Trap # - Number assigned to the trap when it was generated Mask - A representation of the MSU to be trapped, populated with the MSU field(s) values to be trapped on. If the Mask populated values match the equivalent MSU field values, a trap trigger indication is generated. Value=NULL.

Script - Value=NULL

Type - Value=CLEAR TRAP

Origin - Side of the link that the MSU is to be trapped on - Receive/Transmit

Priority - Number from 0 to 5 that identifies the interrupt priority of the information Value=1.

Master Proc ID - Number assigned by the "Reactive Trap Script" to identify Slave Stage 2 information User ID - Used to determine where the trap information is to be sent The default value would be the Stage 2 Controller ID "Response Reactive MSU Information" contents include the following information:

Link ID - Numeric designation for the monitor the link is attached to

CTRL Unit - The Stage 1 controller ID that the monitor is controlled from

Type - Type of MSU - Reactive

Time - Time that the Reactive MSU was detected

MSU - The MSU message that was trapped

Priority - A number representing the interrupt priority of the trap

Origin - Indicates whether the information is for link transmit or receive

Figure 27:
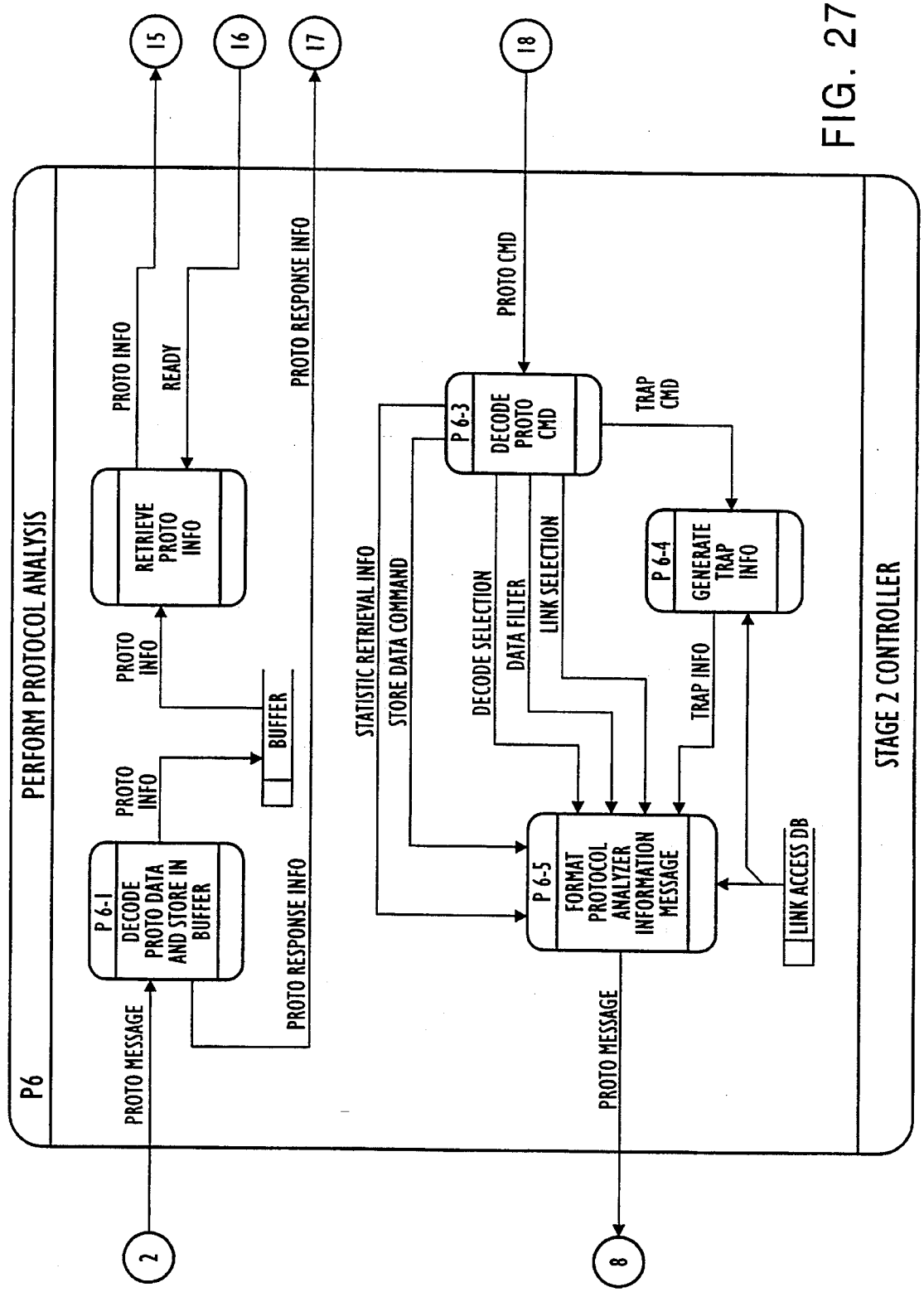

User ID - A number or Alpha-numeric character string used to identify where to send information when the MSU is triggered P6 Perform Manual Protocol Analysis Reference is had to FIGS. 12A and 27.

Protocol Analyzer function ability will be provided using the link data sent to the storage buffer. This function is implemented in the Stage 2, Stage 3 and Stage 4 process by requesting specific link data from the Stage 1 process. This data can be transmitted via the Stage 1, Stage 2 and Stage 3 system links in a pass through mode, or by remote Stage 1 access via the Stage 1 Remote Port. The following are the minimum functions that will be supported by this analyzer:

Display: Link data can be displayed in any of 6 ways. The following description applied to live protocol analysis sessions, no analysis of data saved from a previous live session.

Level 2: Only Level 2 MSUs will be displayed for this mode. Presentation and orientation of data will be up to the vendor, but displays should contain the following:

Orientation - Direction, as seen by the monitor of data transmission. (DTE/DCE, FE/NE, TRNS/RCV, etc.)

Link Number - Number assigned to the link by Stage 3 Process

Time - Time in milliseconds that the MSU was detected

FIB - Forward Indicator Bit, changes in status should be highlighted

BIB - Backward Indicator Bit, changes in status should be highlighted

FSN - Forward Sequence Number

BSN - Backward Sequence Number

MSU - SIO, SIOS, SIN, SIE, SIB, SIPO, SLTM, SLTA

FISU - Fisus should only be displayed if they contain the first indication of FIB or BIB Status change.

Level 3: Level 3 MSUs will be displayed for this mode. ISUP, SCCP and TCP MSU will also be displayed. However, only the information listed below will be shown. Presentation and orientation of this data is up to the vendor, but displays should contain the following:

Orientation - Direction, as seen by the monitor of data transmission, (DTE/DCE, FE/NE, TRNS/RCV, etc.)

Link Number - Number assigned to the link by Stage 3

Time - Time in milliseconds that the MSU was detected

FIB - Forward Indicator Bit, changes in status should be highlighted (i.e., FSN=Normal, FSN= Change)

BIB - Backward Indicator Bit, changes in status should be highlighted (i.e., BSN=Normal, BSN= Change)

FSN - Forward Sequence Number

BSN - Backward Sequence Number

OPC - Originating Point Code

DPC - Destination Point Code

APC - Affected Point Code

MSU Type - i.e., TFR, TFC, IAM, REL UCIC, UDT, CREF, UDTS, etc.

Priority - Priority of MSU. Also Congestion Status for TFC MSUs

TCIC - Trunk Circuit Identification Code

ISUP: Only ISUP MSUs will be displayed for this mode. Presentation and orientation of data will be up to the vendor, but displays should contain the following:

Orientation - Direction, as seen by the monitor of data transmission. (DTE/DCE, FE/NE, TRNS/RCV, etc.)

Link Number - Number assigned to the link by Stage 3 Process

Time - Time in milliseconds that the MSU was detected

OPC - Originating Point Code

DPC - Destination Point Code

MSU Type - i.e., IAM, ACM ANS, SUS, REL, RLC, UCIC, etc.

TCIC - Trunk Circuit Identification Code

* Called Party Number

* Calling Party Number

* Charge Number

* These parameters can be activated or suppressed at any time by hitting a function key.

SCCP: Only SCCP MSUs will be displayed for this mode. Presentation and orientation of data will be up to the vendor, but displays should contain the following:

Orientation - Direction, as seen by the monitor of data transmission, (DTE/DCE, FE/NE, TRNS/RCV, etc.)

Link Number - Number assigned to the link by Stage 3 Process

Time - Time in Milliseconds that the MSU was detected

OPC - Originating Point Code

DPC - Destination Point Code

MSU Type - i.e. , UDT, UDTS, AK, CC, CR, CREF, ERR, etc.

* Transaction Number

* System Number

* Subsystem Number

* These parameters can be activated or suppressed at any time by hitting a function key.

TCAP: Only TCAP MSUs will be displayed for this mode. Presentation and orientation of data will be up to the vendor, but displays should contain the following:

Orientation - Direction, as seen by the monitor of data transmission (DTE/DCE, FE/NE, TRNS, RCV, etc.)

Link Number - Number assigned to the link by Stage 3 Process

Time - Time in milliseconds that the MSU was detected

OPC - Originating Point Code

DPC - Destination Point Code

MSU Type - i.e., UDT, UDTS, AK, CC, CR, CREF, ERR, etc.

* Transaction Number

* These parameters can be activated or suppressed at any time by hitting a function key.

Expand: Any MSU can be decoded and all parameters displayed in either binary, Hexadecimal or English Test.

Presentation and orientation of data will be up to the vendor.

During live protocol analysis sessions, display modes can be changed by pressing designated function keys.

Data display can be stopped and replayed while in a live session. The previously displayed data then can be reviewed in any mode. When the review of the previous data is complete, the live session can be resumed where it was stopped. No data will be lost while using this procedure.

While in review data mode, ASCII test can be added at any place on the display. This text data will be saved along with the results either as part of link data or in a related text file.

While in a review data mode, any data presented to the screen can be marked (blocked) and then saved as a file. The original data will not be affected when using this procedure. Any text data will also be saved with this data.

Filters

Data filters will be provided. The user can build their own filters using any legitimate MSU parameter(s). These filters will limit the data presented to the screen, but ALL link data will be available for decode during and after the live session is complete. The user creation of filters is vendor dependent, but should be user friendly, requiring only basic SS7 protocol expertise. More complex filter generation should also be provided for users experienced in the SS7 protocol. The number of MSU parameters that can be filtered on is vendor dependant but will allow a minimum of 5 parameters. The following default filters will be supplied by the vendor:

OPC - Filter all data by designated Originating Point Code

DPC - Filter all data by designated Destination Point Code

OPC .AND. DPC - Filter all data so that only MSUs containing the designated OPC and DPC are displayed OPC .OR. DPN - Filter all data so that only MSUs containing the designated OPC or DPC are displayed OPC .AND. CPN - Filter all data so that only MSUs containing the designated OPC and Calling Party Number (CPN) are displayed Transaction Number - Filter all data by Transaction Number (TN). Filtering on ranges of TNs will also be provided.

OPC .AND. TN - Filter all data so that only MSUs containing the designated OPC and TN are displayed System Number - Filter all data by System Number (SN)

OPC .AND. SN - Filter all data so that only MSUs containing the designated OPC and SN are displayed Subsystem Number - Filter all data by Subsystem Number (SSN)

OPC .AND. SSN - Filter all data so that only MSUs containing the designated OPC and SSN are displayed Trapping MSU traps will be placed in designated monitors. MSUs that match a populated Trap Mask will initiate Trap Triggered information that will be sent to the Stage 3 or Stage 4 process via the Stage 1, Stage 2 and Stage 3,1 for Stage 4 display only. MSU Traps can also initiate a data transfer from the Stage 1 data storage medium to an allocated disk partition. The Stage 3 or Stage 4 user can then retrieve this data for analysis.

Data Storage

All protocol analysis data can be saved as a filed in the Stage 3 and/or Stage 4 process for retrieval by other processes or the user.

Printing

All protocol analyzer data can be printed on a standard printer. The format of the data being printed can be changed by the user.

P7 Generate Corrective Action and Major Exit Information

Figures 1, 28:
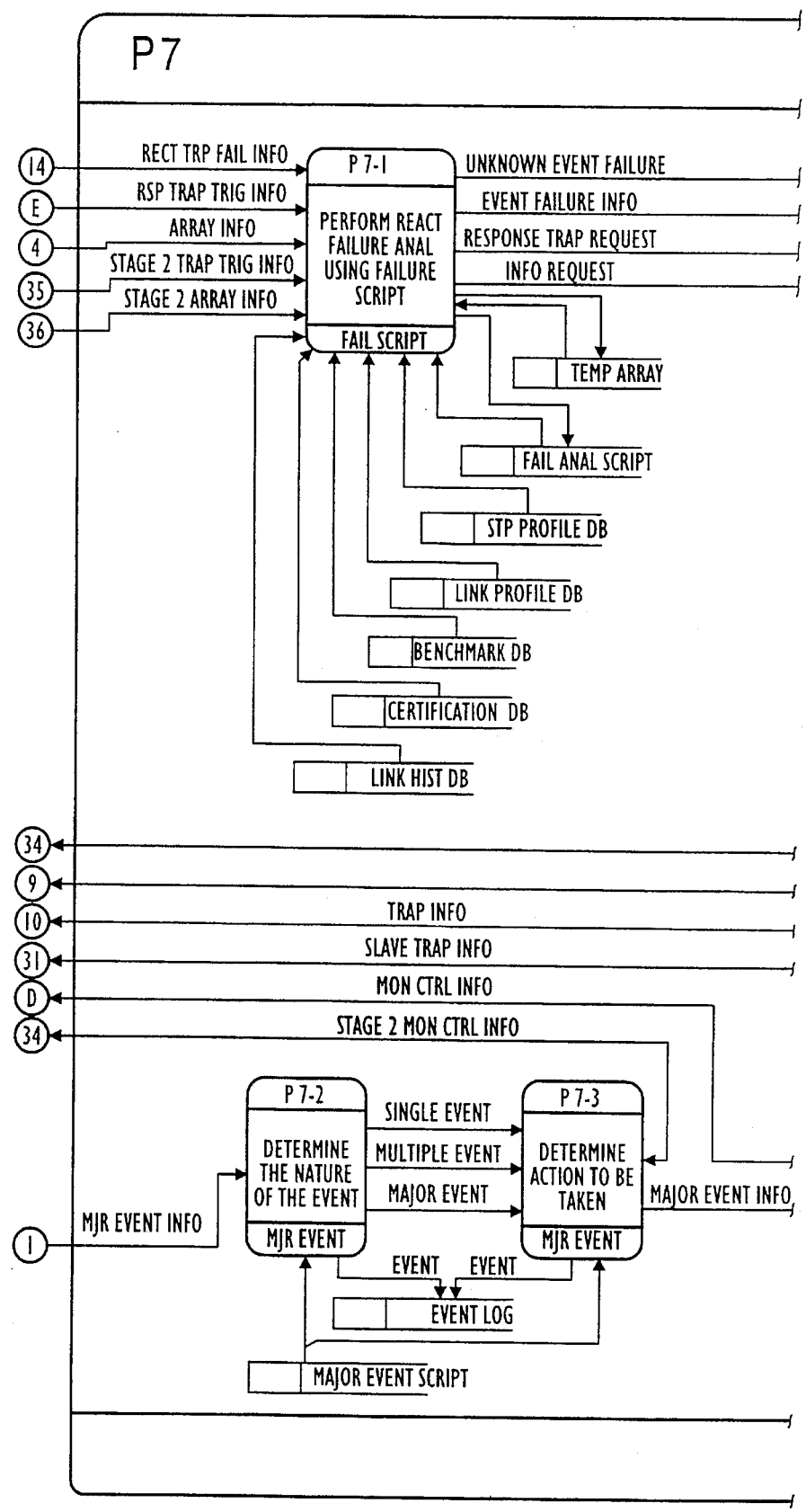
Figures 2, 28:
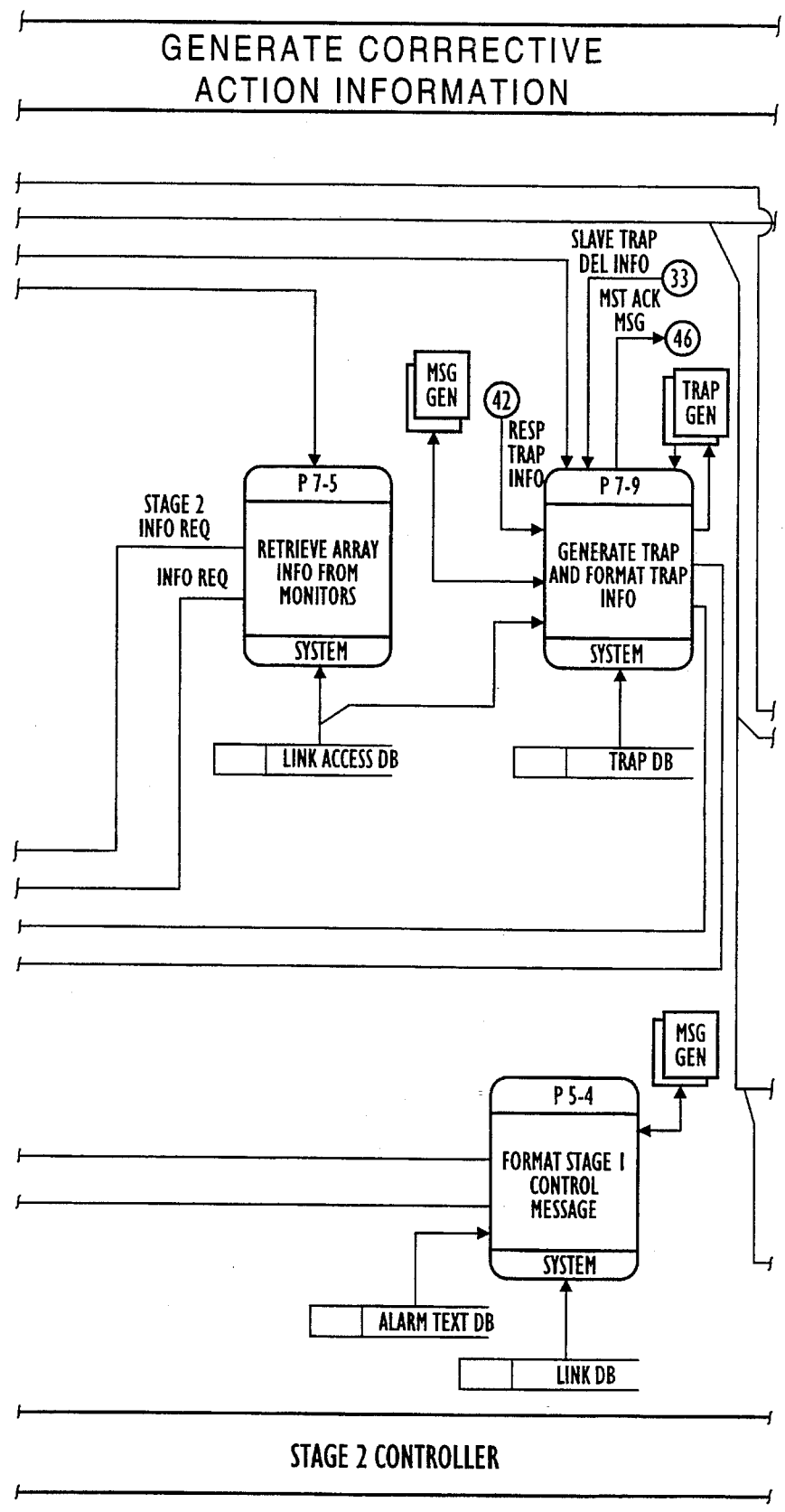
Figures 3, 28:
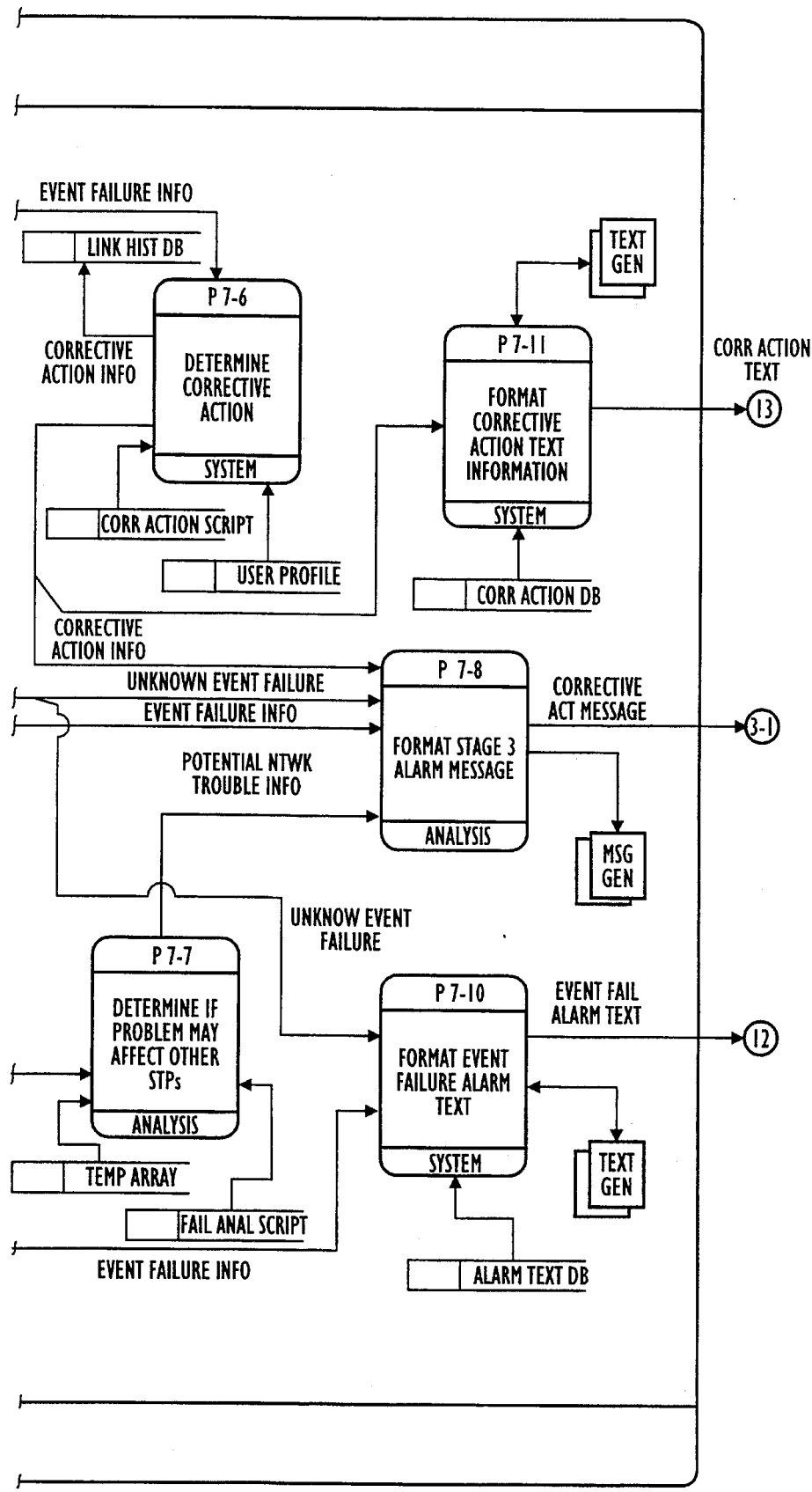

Reference is had to FIGS. 12A and 28.

The "Failure ID" in the "Reactive Trap Failure Information" sent from the "Generate and Analyze Reactive Trap Trigger" (P5) process is used to select a "Failure Analysis Script". The "Failure Analysis Script" is a user created or vendor supplied "C" program detailing the procedures needed to determine the impact and severity of the "Event Failure". The script uses information from the following databases along with the "Reactive Trap Failure Information" supplied by the "Reactive Trap Script" to analyze the failure (P7-1).

Link History Database
STP Profile Database
Link Profile Database
Benchmark Database
Certification Database The "Failure Analysis Script" can generate the following:

Event Failure Information

Response Trap Request

Information Request

Unknown Event Failure Information

"Event Failure Information" is formatted into "Event Failure Alarm Text" (P7-10) and passed to the "Format and Control Local Terminal" (P8) process. It is also formatted into a "Stage 3 Alarm Message" (P7-8) and sent to the "Perform Stage 3 Communication Control" (P10) process depending on the "User ID." The "Event Failure Information" content includes the following information:

Link ID - Number of the link that had the threshold exceeded

CTRL Unit - The Stage 1 controller ID that the monitor is controlled from

Sub-System - Name or number assigned to the Stage 2 process. For Stage 3 messages only.

Origin - Indicates whether the trap is for link transmit or receive

Threshold Exceeded - The type of threshold that was exceeded. Threshold types:
0 - No Threshold Exceeded
1 - Link Load Threshold
2 - MSU Interval Threshold
3 - MSU Category Threshold
4 - Link Error Threshold
5 - Link BERT Threshold
6 - Duration Threshold Threshold Script # - The number of the Threshold Exceeded Script used Corrective Action # - Number representing the record of the corrective Reactive MSU Type - MSU type that was triggered Reactive Script # - Number of the Reactive Script used Time - Time (HH:MM:SS:MS) that the threshold was exceeded Duration - The length of time the threshold was exceeded Alarm Text - Text describing the failure Trouble Severity Code - Code used to identify the severity of the trouble. Severity categories are:
100 - Normal trouble, no corrective action needed
200 - Normal trouble, corrective action required
300 - Minor trouble, no corrective action needed
400 - Minor trouble, manual intervention required
500 - Major trouble, STP affecting
600 - Major trouble, Network affecting
700 - Major trouble, Major Event possible.

Priority - A number representing the interrupt priority of the trap

User ID - A number or Alpha-numeric character string used to identify who controlled or requested the trouble indication. Stage 3 default.

The "Stage 3 Alarm Message" content includes the following information:

Message Type - Type of alarm the message represents
1 Threshold Exceeded
2 Event Failure
3 Major Event
4 Critical Duration Failure
5 Unknown Failure Link ID - Number of the link that had the threshold exceeded CTRL Unit - The Stage 1 controller ID that the monitor is controlled from Sub-System - Name or number assigned to the Stage 2 process. For Stage 3 message only.

Origin - Indicates whether the trap is for link transmit or receive

Threshold Exceeded - The type of threshold that was exceeded. Threshold types:
0 No Threshold Exceeded
1 Link Load Threshold
2 MSU Interval Threshold
3 MSU Category Threshold
4 Link Error Threshold
5 Link BERT Threshold
6 Duration Threshold Threshold Script # - The number of the Threshold Exceeded Script used Corrective Action # - Number representing the record of the corrective Reactive MSU Type - MSU type that was triggered Reactive Script # - Number of the Reactive Script used Time - Time (HH:MM:SS:MS) that the threshold was exceeded Duration - The length of time the threshold was exceeded Alarm Text - Text describing the failure Trouble Severity Code - Code used to identify the severity of the trouble. Severity categories are:
100 - Normal trouble, no corrective action needed
200 - Normal trouble, corrective action required
300 - Minor trouble, no corrective action needed
400 - Minor trouble, manual intervention required
500 - Major trouble, STP affecting
600 - Major trouble, Network affecting
700 - Major trouble, Major Event possible Priority - A number representing the interrupt priority of the trap User ID - A number or Alpha-numeric character string used to identify who controlled or requested the trouble indication. Stage 3 default.

The "Alarm Text Database" contains the following information:

Threshold Script # - The number of the Threshold script used

Reactive Script # - Number of the Reactive Script used

Alarm Script - Used to populate the Alarm Text with the appropriate information

Fill Entries - Number of entries in the text that must be populated

Length - Length of the text

Color - Yes, indicates there are color attributes. No, indicates no color attributes provided.

Blink - Yes, indicates blinking text is provided. No, indicates no blinking text provided.

Sound - Yes, indicates audio parameters are provided for the text. No, indicates no audio is provided.

Peripheral - Contains peripheral control codes to activate external system alarms.

Text - ASCII Corrective Action Text

Monitor Control - Contains a list of monitor functions that must be terminated or enabled in order track the trouble Protocol - The protocol needed to display and/or transmit the text, i.e., ASCII, Synchronous, X.25, etc.

Graphics - Color drawing illustrating where the trouble exists. Resolution is 1024×1024 HVGA. Note: Drawing could exist in a separate database.

The "Event Failure Alarm Text" content includes the following information:

Date - Date the trouble was detected
Time - Time the trouble was detected
Event Time - The time the "Event" was detected
Alarm - ASCII text describing the trouble
Priority - A number representing the interrupt priority of the trap User ID - A number or Alpha-numeric character string used to identify who controlled or requested the trouble indication. Stage 2 default.

"Event Failure Information" is analyzed to determine the required Corrective Action (P7-6). "Corrective Action Text" is taken from the "Corrective Action Database" using the "Corrective Action #" supplied by the "Failure Analysis Script" and populated with the appropriate link/network information. The "Corrective Action Text" is sent (P7-11) to the "Format and Control Local Terminal" (P8) process "Stage 3 Message" (P7-8) and sent to the "Perform Stage Communication Control" (P10) process, depending on the "User ID".

The "Corrective Action Database" contains the following information:

Corrective Action # - Number assigned to the corrective action text

Corrective Action Script - Used to populate the Corrective Action Text with the appropriate information Fill Entries - Number of entries in the text that must be populated Length - Length of the text Color - Yes, indicates there are color attributes to the text. No, indicates no color attributes provided.

Blink - Yes, indicates blinking text is provided. No, indicates no blinking text provided.

Sound - Yes, indicates audio parameters are provided for the text. No, indicates no audio is provided.

Peripheral - Contains peripheral control codes to activate external system alarms Text - ASCII Corrective Action Text Monitor Control - Contains a list of monitor functions that must be terminated or enabled in order track the trouble Protocol - The protocol needed to display and or transmit the text, i.e., ASCII, Synchronous, X.25, etc.

The "Corrective Action Text" is formatted by the "Corrective Action Script" to accommodate the terminal or process, that is, receive the information using information in the "User Profile Database". The "Corrective Action Text" content includes the following information:

Text - Contains both text and embedded control codes

Priority - A number representing the interrupt priority of the trap

User ID - A number or Alpha-numeric character string used to identify who controlled or requested the trouble indication. Stage 3 default.

If the "Corrective Action Text" contains "Monitor Control Information", it is sent to the "Control Stage 2 Communication and Message Handling" (P3) process. The "Monitor Control Information" content includes the following information:

Link ID - Numeric designation for the link monitor that is experiencing the trouble CTRL Unit - The Stage 1 controller ID that the monitor is controlled from Priority - A number representing the interrupt priority of the message Command - Instructions that the monitor can interpret describing the action to be taken. Action to be taken can be:
Stop All Reactive Traps
Stop All Response Traps
Stop Selected Traps
Resume Reactive Traps
Resume Response Traps
Allocate Disk Space
Stop Protocol Analyzer
Stop Call Progress Traps
Connect AUX Storage device
Resume All Traps
Reset Monitor
Etc.

User ID - A number or Alpha-numeric character string used to allow use of this function and to identify where to send response information to "Event Failure Information" is formatted into Link History Database format and loaded into the Link History DB (P7-6).

If "Link Array Information" is required by the "Failure Analysis Script" to further analyze the "Reactive Trap Failure", "Information Request Information" and/or "Stage 2 Information Request Information" is generated (P7-5). If only array information from the link where the "Reactive MSU" was detected, "Information Request Information" is generated using the "Failure Analysis Script" and "Reactive Trap Failure Information" data. If array information from related links in the other Stage 2 process is needed, the "Link ID" and "Control Unit" parameters for the link the "Reactive MSU" was detected is used to search the "Link Access Database" for the link's "Network ID". The "Network ID" is used to search for the required "Link ID" and "Control Unit" for the related links in the "Link Access Database". This information is used to generate as much "Information Request Information" and "Slave Information Request Information" as is needed. The "Information Request Information" is sent to the "Control Stage 2 Communication and Message Handling" (P3) process. "Slave Information Request Information" is sent to "Control Remote Port" (P9) process.

"Information Request Information" contents include the following information:

Link ID - Numeric designation for the monitor the link is connected to

CTRL Unit - The Stage 1 controller ID that the monitor is controlled from

Reg # - The number assigned to the Register or Array

RECNO - Record number in the Register or Array If only the RECNO is identified and the Element # left blank, then all elements in the record will be retrieved. Leave blank if not needed.

Element # - Element number within the record. Populated only if a particular element is needed.

VAR ID - The number or name assigned to the Variable. Leave blank if not needed.

Priority - A number representing the interrupt priority of the request

Master Proc ID - Number assigned by the "Reactive Trap Script" to identify Slave Stage 2 information User ID - A number or Alpha-numeric character string used to identify where to send information when the trap is triggered. Default value is the Stage 3 controller "Slave Information Request Information" contents include the following information:

Link ID - Numeric designation for the monitor the link is connected to

CTRL Unit - The Stage 1 controller ID that the monitor is controlled from

Sub-System - Name or number assigned to the Stage 2 process. For Stage 3 message only.

Reg # - The number assigned to the Register or Array

RECNO - Record number in the Register or Array If only the RECNO is identified and the Element # left blank, then all elements in the record will be retrieved. Leave blank if not needed.

Element # - Element number within the record. Populated only if a particular element is needed.

VAR ID - The number or name assigned to the Variable. Leave blank if not needed.

Master Proc ID - Number assigned by the "Reactive Trap Script" to identify Slave Stage 2 information Priority - A number representing the interrupt priority of the request User ID - A number or Alpha-numeric character string used to identify where to send information when the trap is triggered. Default value is the Stage 3 controller.

If analysis of the "Reactive Trap Failure Information" indicates that a different kind of trouble may be starting, "Response Trap Information" and/or "Stage 2 Response Trap Information" is generated (P7-9). If only "Response Traps" are needed for links where the "Reactive MSU" was detected, "Response Trap Information" is generated using the "Failure Analysis Script" and "Reactive Trap Failure Information" data. If "Response Traps" for related links in the same STP or the other Stage 2 process is needed, the "Link ID" and "Control Unit" parameters for the link in which the "Reactive MSU" was detected is used to search for the required "Link ID" and "Control Unit" for the related links in the "Link Access Database." This information is used to generate as much "Response Trap Information" and "Slave Response Trap Information" as is needed. The "Response Trap Information" is sent to the "Control Stage 2 Communication and Message Handling" (P3) process "Slave Response Trap Information" is sent to "Control Remote Port" (P9) process.

"Response Trap Information" contents include the following information:

Link ID - Numeric designation for the link monitor that is experiencing the trouble CTRL Unit - The Stage 1 controller ID that the monitor is controlled from Trap # - Number assigned to the trap when it was generated Mask - A representation of the MSU to be trapped, populated with the MSU field(s) values to be trapped on. If the Mask populated values match the equivalent MSU field values, a trap trigger indication is generated.

Script - A set of instructions used by the monitor to handle the information supplied by the trapped MSU. Note: This function could be handled by the Stage 1, 2, 3 or 4 Process if the MSU is sent to the appropriate process when triggered.

Type - Response Trap

Origin - Side of the link that the MSU is be trapped on Receive/Transmit

Priority - Number from 0 to 5 that identifies the interrupt priority of the information - 1.

Master Proc ID - Number assigned by the "Reactive Trap Script" to identify Slave Stage 2 information User ID - Used to determine where the trap information is to be sent. The default value would be the Stage 2 Controller ID.

"Slave Response Trap Information" contents include the following information:

Link ID - Numeric designation for the link monitor that is experiencing the trouble CTRL Unit - The Stage 1 controller ID that the monitor is controlled from Sub-System - Name or number assigned to the Stage 2 process. For Stage 3 message only.

Trap # - Number assigned to the trap when it was generated

Mask - A representation of the MSU to be trapped, populated with the MSU field(s) values to be trapped on. If the Mask populated values match the equivalent MSU field values, a trap trigger indication is generated.

Script - A set of instructions used by the monitor to handle the information supplied by the trapped MSU. Note: This function could be handled by the Stage 1, 2, 3 or 4 Process if the MSU is sent to the appropriate process when triggered.

Type - Response Trap

Origin - Side of the link that the MSU is to be trapped on Receive/Transmit

Priority - Number from 0 to 5 that identifies the interrupt priority of the information - 1.

Master Proc ID - Number assigned by the "Reactive Trap Script" to identify Slave Stage 2 information User ID - Used to determine where the trap information is to be sent. The default value would be the Stage 2 Controller ID.

When either requested "Link Array Information", "Response Trap Triggered Information", "Slave Link Array Information" and/or "Slave Response Trap Triggered Information" is received in response to the information and trap requests, it is decoded and used by the "Failure Analysis Script" to further analyze the trouble (7-1). Data previously analyzed is held in a "Temporary Array" and is also used in the analysis. All traps are cleared when the "Trap Triggered Information" has been received and used by generating "Trap Information" and sending it to the "Control Stage 2 Communication and Message Handling" (P3) process and/ or generating "Master Trap Information" and sending it to the "Control Remote Port" (P9) process for "Slave Stage 2 Process" traps.

The "Link Array Information" contents include the following information:

Link ID - Numeric designation for the monitor the link is connected to

CTRL Unit - The Stage 1 controller ID that the monitor is controlled from

Reg # - The number assigned to the Register or Array

RECNO - Record number in the Register or Array

Element # - Element number within the record

Element Data - The data contained in the array element identified by the RECNO and Element #

VAR ID - The number or name assigned to the Variable. Leave blank if not needed.

VAR Data - Data contained in the variable

Priority - A number representing the interrupt priority of the request

Master Proc ID - Number assigned by the "Reactive Trap Script" to identify Slave Stage 2 information User ID - A number or Alpha-numeric character string used to identify where to send information when the trap is triggered. Default value is the Stage 3 controller.

The "Response Trap Triggered Information" contents include the following information:

Link ID - Numeric designation for the monitor the link is attached to

CTRL Unit - The Stage 1 controller ID that the monitor is controlled from

Trap Number - Number assigned to the Response Trap in the monitor

Type - Response

Time - Time that the Response Trap was triggered

MSU - The MSU message that was trapped

Priority - A number representing the interrupt priority of the trap

Origin - Indicates whether the trap is for link transmit or receive

Master Proc ID - Number assigned by the "Reactive Trap Script" to identify Slave Stage 2 information User ID - A number or Alpha-numeric character string used to identify where to send information when the trap is triggered.

OR

Link ID - Numeric designation for the monitor the link is attached to

CTRL Unit - The Stage 1 controller ID that the monitor is controlled from

Trap Number - Number assigned to the Trap in the monitor

Type - Response

Time - Time that the trap was triggered

Trigger Information - Indication that the trap was triggered

Priority - A number representing the interrupt priority of the trap

Origin - Indicates whether the trap is for link transmit or receive

Master Proc ID - Number assigned by the "Reactive Trap Script" to identify Slave Stage 2 information User ID - A number or Alpha-numeric character string used to identify where to send information when the trap is triggered.

The "Slave Link Array Information" contents include the following information:

Link ID - Numeric designation for the monitor the link is connected to

CTRL Unit - The Stage 1 controller ID that the monitor is controlled from

Sub-System - Name or number assigned to the Stage 2 process. For Stage 3 message only.

Reg # - The number assigned to the Register or Array

RECNO - Record number in the Register or Array

Element # - Element number within the record

Element Data - The data contained in the array element identified by the RECNO and Element #

VAR ID - The number or name assigned to the Variable. Leave blank if not needed.

VAR Data - Data contained in the variable

Priority - A number representing the interrupt priority of the request

Master Proc ID - Number assigned by the "Reactive Trap Script" to identify Slave Stage 2 information User ID - A number or Alpha-numeric character string used to identify where to send information when the trap is triggered. Default value is the Stage 3 controller.

The "Slave Response Trap Triggered Information" contents include the following information:

Link ID - Numeric designation for the monitor the link is attached to

CTRL Unit - The Stage 1 controller ID that the monitor is controlled from

Sub-System - Name or number assigned to the Stage 2 process. For Stage 3 message only.

Trap Number - Number assigned to the Response Trap in the monitor

Type - Response

Time - Time that the Response Trap was triggered

MSU - The MSU message that was trapped

Priority - A number representing the interrupt priority of the trap

Origin - Indicates whether the trap is for link transmit or receive

Master Proc ID - Number assigned by the "Reactive Trap Script" to identify Slave Stage 2 information User ID - A number or Alpha-numeric character string used to identify where to send information when the trap is triggered

OR

Link ID - Numeric designation for the monitor the link is attached to

CTRL Unit - The Stage 1 controller ID that the monitor is controlled from

Sub-System - Name or number assigned to the Stage 2 process. For Stage 3 message only.

Trap Number - Number assigned to the Trap in the monitor

Type - Response

Time - Time that the trap was triggered

Trigger Information - Indication that the trap was trigger

Priority - A number representing the interrupt priority of the trap

Origin - Indicates whether the trap is for link transmit or receive

Master Proc ID - Number assigned by the "Reactive Trap Script" to identify Slave Stage 2 information User ID - A number or Alpha-numeric character string used to identify where to send information when the trap is triggered.

"Trap Information" contents include the following information:

Link ID - Numeric designation for the link monitor that is experiencing the trouble CTRL Unit - The Stage 1 controller ID that the monitor is controlled from Trap # - Number assigned to the trap when it was generated Mask - A representation of the MSU to be trapped, populated with the MSU field(s) value to be trapped on. If the Mask populated values match the equivalent MSU field values, a trap trigger indication is generated. Value=NULL.

Script - Value=NULL

Type - Value=CLEAR TRAP

Origin - Side of the link that the MSU is to be trapped on - Receive/Transmit

Priority - Number from 0 to 5 that identifies the interrupt priority of the information - 1.

Master Proc ID - Number assigned by the "Reactive Trap Script" to identify Slave Stage 2 information User ID - Used to determine where the trap information is to be sent. The default value would be the Stage 2 Controller ID.

"Master Trap Information" contents include the following information:

Link ID - Numeric designation for the link monitor that is experiencing the trouble CTRL Unit - The Stage 1 controller ID that the monitor is controlled from Trap # - Number assigned to the trap when it was generated Mask - A representation of the MSU to be trapped, populated with the MSU field(s) values to be trapped on. If the Mask populated values match the equivalent MSU field values, a trap trigger indication is generated. Value=NULL.

Script - Value=NULL

Type - Value=CLEAR TRAP

Origin - Side of the link that the MSU is be trapped on - Receive/Transmit

Priority - Number from 0 to 5 that identifies the interrupt priority of the information - 1.

Master Proc ID - Number assigned by the "Reactive Trap Script" to identify Slave Stage 2 information User ID - Used to determine where the trap information is to be sent The default value would be the Stage 2 Controller ID Unknown Event Failure Information is generated if no "Failure ID" is supplied from the "Reactive Trap Script".

Unknown Event Failure Information is formatted into "Event Failure Alarm Text" (P7-10) and passed to "Format and Control Local Terminal" (P8) process or is formatted into a "Stage 3 Alarm Message" (P7-8) and sent to the "Perform Stage Communication Control" (P10) process depending on the "User ID". This information/message includes the following information:

Link ID - Number of the link that had the threshold exceeded

CTRL Unit - The Stage 1 controller ID that the monitor is controlled from

Sub-System - Name or number assigned to the Stage 2 process. For Stage 3 message only.

Origin - Indicates whether the trap is for link transmit or receive

Threshold Exceeded - The type of threshold that was exceeded. Threshold types:

0 No Threshold Exceeded

1 Link Load Threshold

2 MSU Interval Threshold

3 MSU Category Threshold

4 Link Error Threshold

5 Link BERT Threshold

6 Duration Threshold

Threshold Script # - The number of the Threshold Exceeded Script used

Corrective Action # - Number representing the record of the corrective

Reactive MSU Type - MSU type that was triggered

Reactive Script # - Number of the Reactive Script used

Time - Time (HH:MM:SS:MS) that the threshold was exceeded

Duration - The length of time the threshold was exceeded

Alarm Text - Text describing the failure

Trouble Severity Code - Code used to identify the severity of the trouble. Severity categories are:

100 - Normal trouble, no corrective action needed

200 - Normal trouble, corrective action required

300 - Minor trouble, no corrective action needed

400 - Minor trouble, manual intervention required

500 - Major trouble, STP affecting

600 - Major trouble, Network affecting

700 - Major trouble, Major Event possible.

Priority - A number representing the interrupt priority of the trap

User ID - A number or Alpha-numeric character string used to identify who controlled or requested the trouble indication. Stage 3 default.

The Alarm Text Database includes the following information:

Threshold Script # - The number of the Threshold script used

Reactive Script # - Number of the Reactive Script used

Alarm Script - Used to populate the Alarm Text with the appropriate information

Fill Entries - Number of entries in the text that must be populated

Length - Length of the text

Color - Yes, indicates there are color attributes to the text. No, indicates no color attributes provided.

Blink - Yes, indicates blinking text is provided No, Indicates no blinking text provided.

Sound - Yes, indicates audio parameters are provided for the text. No, indicates no audio is provided.

Peripheral - Contains peripheral control codes to activate external system alarms Text - ASCII Corrective Action Text Monitor Control - Contains a list of monitor functions that must be terminated or enabled in order track the trouble.

Protocol - The protocol needed to display and or transmit the text, i.e, ASCII, Synchronous, X.25, etc.

Graphics - Color drawing illustrating where the trouble exists. Resolution is 1024×1024 HVGA. Note: Drawing could exist in a separate database.

The Unknown Failure Alarm Text content includes the following information:

Date - Date the trouble was detected

Time - Time the trouble was detected

Trigger Time - The time the threshold was exceeded or MSU was detected

Alarm - ASCII text describing the trouble

Priority - A number representing the interrupt priority of the trap

User ID - A number or Alpha-numeric character string used to identify who controlled or requested the trouble indication. Stage 3 default.

The Stage 3 Alarm Message content includes the following information:

Message Type - Type of alarm the message represents

1 Threshold Exceeded

2 Event Failure

3 Major Event

4 Critical Duration Failure

5 Unknown Failure

Link ID - Number of the link that had the threshold exceeded

CTRL Unit - The Stage 1 controller ID that the monitor is controlled from

Sub-System - Name or number assigned to the Stage 2 process. For Stage 3 message only.

Origin - Indicates whether the trap is for link transmit or receive

Threshold Exceeded - The type of threshold that was exceeded. Threshold types:

0 No Threshold Exceeded

1 Link Load Threshold

2 MSU Interval Threshold

3 MSU Category Threshold

4 Link Error Threshold

5 Link BERT Threshold

6 Duration Threshold

Threshold Script # - The number of the Threshold Exceeded Script used

Corrective Action # - Number representing the record of the corrective

Reactive MSU Type - MSU type that was triggered

Reactive Script - Number of the Reactive Script used

Time - Time (HH:MM:SS:MS) that the threshold was exceeded

Duration - The length of time the threshold was exceeded

Alarm Text - Text describing the failure

Trouble Severity Code - Code used to identify the severity of the trouble. Severity categories are:

100 - Normal trouble, no corrective action needed

200 - Normal trouble, corrective action required

300 - Minor trouble, no corrective action needed

400 - Minor trouble, manual intervention required

500 - Major trouble, STP affecting

600 - Major trouble, Network affecting

700 - Major trouble, Major Event possible

Priority - A number representing the interrupt priority of the trap

User ID - A number or Alpha-numeric character string used to identify who controlled or requested the trouble indication. Stage 3 default.

Unknown Event Failure Alarm Information is formatted into Link History Database format and loaded into the "Link History DB".

"Major Event Alarm Information" is sent from the "Control Stage 2 Communication and Message Handling" (P3) process when Stage 1 detects a "Major Event" in progress. This information compared to previous "Major Event Alarm information" contained in the "Event Log" (P7-2). There are three types of Major Events:

Single Event - Only one link controlled by the Stage 2 process detected multiple MSUs sufficient to define an "Event"

Multiple Event - Two or more links controlled by the Stage 2 process detected multiple MSUs of the same type sufficient to define an "Event".

Major Event - More than two links controlled by the Stage 2 process detected multiple MSUs of different types sufficient to define an "Event".

This information is passed to a user defined "Major Event Script" (P7-3). The "Major Event Script" determines what action needs to be taken at all monitors involved in order to control maintenance procedures and restore the links to normal operation. "Monitor Control Information" is sent to the "Control Stage 2 Communication and Message Handling" (P3) for those links controlled by the Stage 2 process receiving the "Major Event Information". "Stage 2 Monitor Control Information" is sent to the "Control Remote Port" (P9) process for those links controlled by the other Stage 2 process. Also, "Stage 3 Major Event Alarm Information" is formatted and sent to the "Control Stage 3 Communication" (P10) process.

Major Event Alarm Information contents include the following information:

Link ID - Numeric designation for the link monitor that is experiencing the trouble CTRL Unit - The Stage 1 controller ID that the monitor is controlled from MSU Type - The MSU type that caused the event to be detected Severity # - A number representing the severity of the trouble Time - Time that the alarm was detected Priority - A number representing the interrupt priority of the message. Priority=0.

Origin - Indicates whether the trouble is on the link transmit or receive

User ID - A number or Alpha-numeric character string used to identify where to send information when the trap is triggered. Default value is the Stage 3 controller.

The "Event Log" is an array used to hold information about previous "Major Events". Once the "Major Event" has been corrected, all entries in the log are removed by the Stage 3 or Stage 4 process, depending on who was controlling the maintenance for the event ("User ID"). The "Event Log" contents include the following information:

Link ID - Numeric designation for the link monitor that is experiencing the trouble CTRL Unit - The Stage 1 controller ID that the monitor is controlled from MSU Type - The MSU type that caused the event to be detected Severity # - User defined a number representing the severity of the trouble Time - Time that the alarm was detected Origin - Indicates whether the trouble is on the link transmit or receive User ID - A number or Alpha-numeric character string used to identify where to send information when the trap is triggered. Default value is the Stage 3 controller.

The "Stage 3 Alarm Message" content includes the following information:

Message Type - Type of alarm the message represents.
1. Threshold exceeded
2. Event Failure
3. Major Event
4. Critical Duration Failure
5. Unknown Failure Link ID - Number of the link that had the threshold exceeded CTRL Unit - The Stage 1 controller ID that the monitor is controlled from Sub-System - Name or number assigned to the Stage 2 process. For Stage 3 message only.

Origin - Indicates whether the trap is for link transmit or receive

Threshold Exceeded - The type of threshold that was exceeded. Threshold types:
0 No Threshold Exceeded
1 Link Load Threshold
2 MSU Interval Threshold
3 MSU Category Threshold
4 Link Error Threshold
5 Link BERT Threshold
6 Duration Threshold Threshold Script # - The number of the Threshold Exceeded Script used Corrective Action # - Number representing the record of the corrective Reactive MSU Type - MSU type that was triggered Reactive Script # - Number of the Reactive Script used Time - Time (HH:MM:SS:MS) that the threshold was exceeded Duration - The length of time the threshold was exceeded Alarm Text - Text describing the failure Trouble Severity Code - Code used to identify the severity of the trouble. Severity categories are:
100 - Normal trouble, no corrective action needed
200 - Normal trouble, corrective action required
300 - Minor trouble, no corrective action needed
400 - Minor trouble, manual intervention required
500 - Major trouble, STP affecting
600 - Major trouble, Network affecting
700 - Major trouble, Major Event possible.

Priority - A number representing the interrupt priority of the trap

Use ID - A number or Alpha-numeric character string used to identify who controlled or requested the trouble indication. Stage 3 default.

Figures 1, 29:
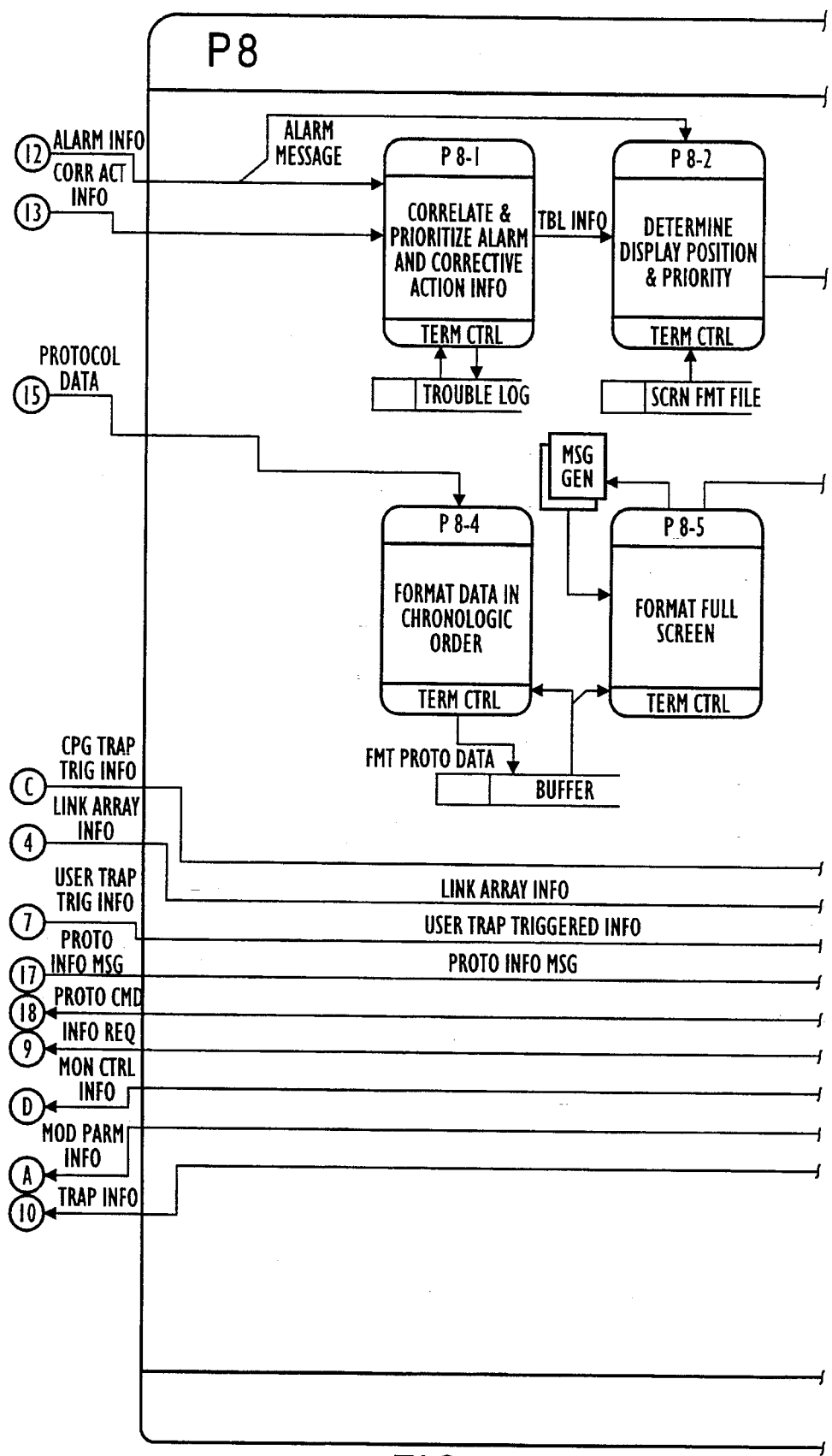
Figures 2, 29:
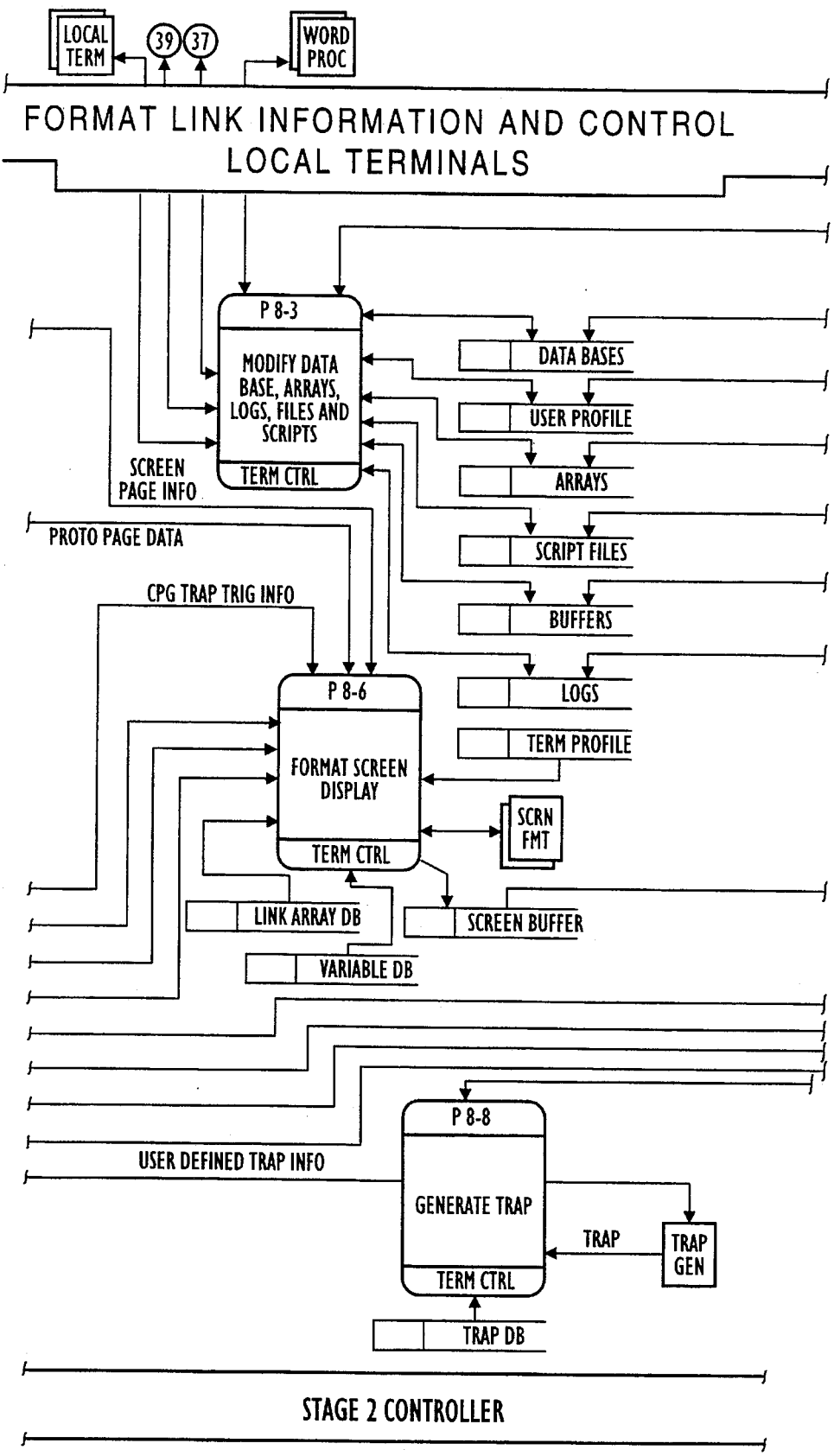
Figures 3, 29:
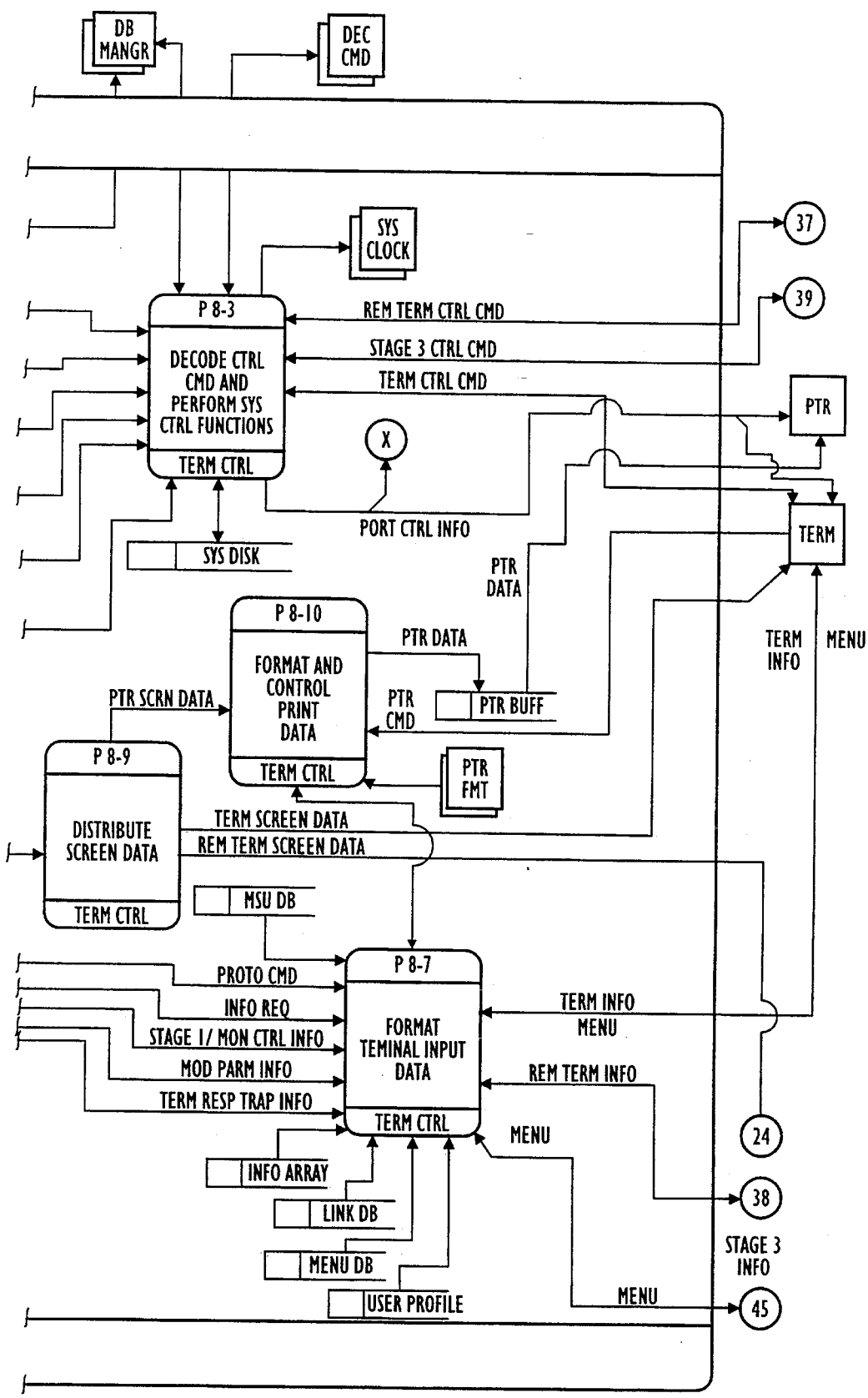

P8: Format Link Information and Control Local Terminals
Reference is had to FIGS. 12A and 29.

The "Format Link Information and Control Local Terminals" process is used to display information about the links and to control the operation of the Stage 2, Stage 1 and Monitor Process. This process can drive a color graphic, 1024×1024 pixel resolution video display terminal with mouse. Information can also be passed to or received from a Remote Terminal via the Control Remote Port (P9) process. Remote Terminal Ports are capable of handling 56 Kb DDS or LAN/WAN type data and the port protocol will handle graphics information. Local terminals are not required for this process and are considered to be optional. The "Format Link Information and Control Local Terminals" process performs the following functions:

Display Alarm and Corrective Action Information

Request and Display Link Array Information

Manually Control Monitor, Stage 1 and Stage 2 Operations

Manually Modify Monitor, Stage 1 and Stage 2 Parameters

Manually Generate Traps and Display Trap Triggered Information

Automatically and/or Manually Print Data

Manually Initiate Monitor, Stage 1 and Stage 2 System Tests

Display and Control Manual Protocol Analysis (Optional)

Display Alarm and Corrective Action Information

"Alarm Text" from the "Analyze Threshold and CPG Trap Information" (P4) process, "Analyze Reactive Trap Information and Generate Response Traps" (P5) process and "Generate Corrective Action and Major Event Information" (P7) process is prioritized by the "Priority" and Timer field values and is stored in the "Trouble Log" (P8-1). Information having the same "Priority" value is sorted in chronological order according to the "Time" field value. "Corrective Action Information" related to "Alarm Text" is placed in a record prior to the "Alarm Text" record in the "Trouble Log" if the "Alarm Information" is resident in the "Trouble Log". There are five types of alarms that the "Alarm Text" can represent:
1. Threshold Exceeded
2. Event Failure
3. Major Event
4. Critical Duration Failure
5. Unknown Failure "Alarm Text" and related "Corrective Action Text" is taken from the "Trouble Log" and formatted into "Screen Page Information" (P8-2). Graphics and screen display codes are placed on the appropriate display lines for the terminal (P8-5) according to the "Terminal Requirements" identified by the "Terminal Profile Database". The "User ID" in the "Alarm Text" and "Corrective Action Text" is used to identify the "Terminal Type" in the "Terminal Profile Database". "Screen Page Information" is stored in a "Screen Buffer" until retrieved by the "Local Terminal" or "Remote Terminal".

The "Alarm Text" content includes the following information:

Date - Date the trouble was detected

Time - Time the trouble was detected

Trigger Time - The time the threshold was exceeded or MSU was detected

Alarm - ASCII text describing the trouble

Priority - A number representing the interrupt priority of the trap

User ID - A number or Alpha-numeric character string used to identify who controlled or requested the trouble indication. Stage 3 default.

The "Corrective Action Text" content includes the following information:

Text - Contains both text and embedded control codes

Priority - A number representing the interrupt priority of the trap

User ID - A number or Alpha-numeric character string used to identify who controlled or requested the trouble indication. Stage 3 default.

"Terminal Profile Database" holds information about the terminal. The content includes the following information:

User ID - A number or Alpha-numeric character string used to identify who controlled or requested the trouble indication. Stage 3 default.

Protocol - Terminal's communication protocol

Control Codes - Control codes that the terminal can handle

Color Code - Codes used by the terminal to display color

Resolution - Screen resolution (Min 1024×1024)

Graphics Emulation - Type of graphics emulation used

Window - Type of windows used (X-Windows, Micro Soft Windows, etc.)

Mouse Type - 2 button or 3 button

Fonts - List of available fonts supported

Ports - Number of ports and type (RS-232, Ethernet, etc.)

Audio Ports - Number of ports and type

"Screen Page Information" content includes the following information:

Peripheral Codes - Codes used to active Graphics or Indicator devices external to the Local or Remote Terminal, i.e.:

Light(s)

Bell

Whistle

Network Display Board

Etc.

Start Page - Put cursor at top of screen

Start Graphics - Screen position for top of drawing. If no graphics is provided, this field will contain a value equal to the screen's Top of Page/Top of Screen.

Graphic - Graphics data

Start Text - Screen position where text is to start

Text - ASCII text including character handling codes embedded in text, i.e.:

Color

Blink

Highlight

Size

Font

End Page - End of the current page.

Peripheral Codes will be included in every page. External devices can store the codes and can be manually reset.

If no Graphics is provided for this page, text will starts at the screen's Top of Page/Top of Screen position.

Pages are requested by the user or will appear automatically depending upon the "Local Terminal's" or "Remote Terminal's" settings. The "Local Terminal" and "Remote Terminal" will be capable of holding 16 pages of information in its "Screen Buffer". Pages can be scrolled through the terminal's "Screen Buffer".

"Trouble Log" is used to temporarily hold "Alarm Text" and "Corrective Action Text" Entries are deleted from the log when they are retrieved. "Trouble Log" content includes the following information:

Info Type - 1 equals "Alarm Text" and 2 equals "Corrective Action Text"

Date - Date the trouble was detected or corrective action was generated

Time - Time the trouble was detected or corrective action was generated

Trigger Time - The time the threshold was exceeded or MSU was detected. This field is nulled if the record is a corrective action entry.

Text - ASCII text describing the trouble or corrective action

Priority - A number representing the interrupt priority of the trap

User ID - A number or Alpha-numeric character string used to identify who controlled or requested the trouble indication. Stage 3 default.

Request and Display Link Array Information

"Link Array Information" contained in the monitors can be manually retrieved and displayed on the Local Terminal or Remote Terminal "Link Information Request Menus" are presented to the user (P8-7), "Local Terminal", "Control Remote Port" (P9) or "Control Stage 3 Communications Control" (P10) process, where single or multiple "Link Array Information" elements can be selected. These are interactive menus generating "Terminal Response Information" when the user makes entries in the menu. When the user has completed all entries, "Information Request Information" is generated and sent to the "Control Stage 2 Communication and Message Handling" (P3) process.

When the monitors and Stage 1 process have extracted the requested array information, "Link Array Information" is received from the "Control Stage 2 Communication and Message Handling" (P3) process. This information is formatted into "Screen Page Information" (P8-6) using information in the "Link Array Database" and sent to the "Local Terminal", "Control Remote Port" (P9), or "Control Stage 3 Communication Control" (P10) process.

"Link Information Request Menu" is a series of interactive menus held in the "Menu Database" listing all available "Link Arrays" and "Link IDs". The following array information can be accessed:

Receive Error Array

Receive Link Load Array

Receive MSU Interval Array

Receive MSU Category Array

Transmit Error Array

Transmit Link Load Array

Transmit MSU Interval Array

Transit MSU Category Array

Poll Array

"Menu Database" contains all menus and menu control scripts needed to control user input and generate "Terminal Response Information". The menus and menu control scripts contained in the database can be modified by the user to suit needs. The information contained in the database is capable of performing the following minimum functions:

Display all available information entries (multiple menus)

Select single or multiple entries on multiple menus (if used)

Select monitor to retrieve information from (Link ID and Ctrl Unit #)

Set "Priority of request (1 through 5)

Set "User ID" by "LOG IN"

Restrict Information available by User ID"

"Terminal Response Information" provides all information needed to generate "Information Request Information". The minimum information required is:

Link ID - Numeric designation for the monitor the link is connected to

CTRL Unit - The Stage 1 controller ID that the monitor is controlled from

Reg # - The number assigned to the Register or Array

RECNO - Record number in the Register or Array. If only the RECNO is identified and the Element # left blank, then all elements in the record will be retrieved. Leave blank if not needed.

Element # - Element number within the record Populated only if a particular element is needed.

Priority - A number representing the interrupt priority of the request

User ID - A number or Alpha-numeric character string used to identify where to send information when the trap is triggered. Default value is the Stage 3 controller.

"Information Request Information" contents include the following information:

Link ID - Numeric designation for the monitor the link is connected to

CTRL Unit - The Stage 1 controller ID that the monitor is controlled from

Reg # - The number assigned to the Register or Array

RECNO - Record number in the Register or Array. If only the RECNO is identified and the Element # left blank, then all elements in the record will be retrieved. Leave blank if not needed.

Element # - Element number within the record Populated only if a particular element is needed VAR ID - The number or name assigned to the Variable. Leave blank if not needed.

Priority - A number representing the interrupt priority of the request

User ID - A number or Alpha-numeric character string used to identify where to send information when the trap is triggered. Default value is the Stage 3 controller.

"Link Array Information" content includes the following information:

Link ID - Numeric designation for the monitor the link is connected to

CTRL Unit - The Stage 1 controller ID that the monitor is controlled from

Reg # - The number assigned to the Register or Array

RECNO - Record number in the Register or Array

Element # - Element number within the record

Element Data - The data contained in the array element identified by the RECNO and Element VAR ID - The number or name assigned to the Variable. Leave blank if not needed.

VAR DATA - Data contained in the variable

Priority - A number representing the interrupt priority of the request

User ID - A number or Alpha-numeric character string used to identify where to end information when the trap is triggered. Default value is the Stage 3 controller.

"Link Array Database" is used to hold the "Reg #", "RECNO", and "Element" names. This is a vendor supplied database, but will contain the following minimum information:

Reg # - The number assigned to the Register or Array

RECNO - Record number in the Register or Array

Element # - Element number within the record

Name - ASCII string identifying the English name for the data held in the Element.

Reg # - 1
RECNO - 24
Element - 1
Name - "IAM Interval Value"

Manually Control Monitor, Stage 1 and Stage 2 Operations

The user can manually control the operation of the monitor(s), Stage 1 and Stage 2 process functions. This can be accomplished using "Control Menus" or "Control Commands Control Menus". These are interactive menus that allow the user to perform a predetermined series of "Control Functions" by issuing multiple "Control Commands Control Commands" which are one line commands that will initiate specific "Control Functions". "Control Functions" perform the following control function.

Monitor Control Information
Stop All Reactive Traps
Stop Selected Traps
Stop All Response Traps
Stop Call Progress Traps
Resume All Traps
Delete Traps
Resume Reactive Traps
Resume Selected Traps
Resume Response Trap
Resume Call Progress Traps
Reset Monitor
Set Interrupts
Stage 1 Control Information
Discard Selected Monitor Input Data
Discard All Monitor Input Data
Discard Selected Monitor Input Data
Suspend Selected Traps
Enable Selected Traps
Perform "Link Data Store" Control Functions
Create Session Disk Directory
Clear Disk Space
Format Disk
Perform Disk Diagnostics
Configure Stage 1 System
Configure COM: Ports
Configure Databases
Load Files to Stage 1 System Disk
Perform Stage 1 System Disk Administration
Connect AUX Storage device
Synchronize Stage 1 Clock
Perform Loop Back
Sync Stage 1 Clock
Perform Clock Check
Stage 2 Control Information
Discard Selected Stage 1 Input Data
Discard All Stage 1 Input Data
Discard Selected Stage 1 Input Data
Perform Disk Control Functions
Create Session Disk Directory
Clear Disk Space
Format Disk
Perform Disk Diagnostics
Configure Stage 2 System
Configure COM: Ports
Configure Databases
Load Files to System Disk
Delete Files on System Disk etc
Synchronize Stage 2 Clock
Perform Loop Back
Sync Stage 1 Clock
Perform Clock Check "Control Menus" are a series of interactive menus held in the "Menu Database" listing all available "Control functions" for the monitors, Stage 1 and Stage 2 processes.

"Menu Database" contains all menus and menu control scripts needed to control user input and generate "Terminal Response Information". The menus and menu control scripts contained in the database can be modified by the user to suit needs. The information contained in the database is capable of performing the following functions:

Display all available Control Functions (multiple menus)

Select single or multiple entries on multiple menus (if used)

Select Monitor, Stage 1 or Stage 2 process where Control Functions are to be initiated Set "Priority of Control Function" (1 through 5)

Set "User ID" by "LOG IN"

Restrict access to available Control Functions by "User ID"

"Terminal Response Information" is dependent upon vendor implementation, but provides all information needed to generate "Monitor Control Information" (P8-7) or "Stage 1 Control Information" (P8-7) or "Stage 2 Control Instructions" (P8-3).

"Terminal Control Commands", "Remote Terminal Control Commands" (P9) and "Stage 3 Control Commands" (P10) are formatted into "Monitor Control Information" (P8-7) and sent to the "Control Stage 2 Communication and Message Handling" (P3) process.

"Terminal Control Commands", "Remote Terminal Control Commands" (P9) and "Stage 3 Control Commands" (P10) are formatted into "Stage 1 Control Information" (P8-7) and sent to the "Control Stage 2 Communication and Message Handling" (P3) process.

"Terminal Control Commands", "Remote Terminal Control Commands" (P9) and "Stage 3 Control Commands" (P10) are decoded and "Stage 2 System Control Instructions" are performed (P8-3).

"Terminal Control Command" contents include the following information:

Link ID - Numeric designation for the link monitor that is experiencing the trouble CTRL Unit - The Stage 1 controller ID that the monitor is controlled from Priority - A number representing the interrupt priority of the message Command - Instructions that the monitor can interpret describing the action to be taken. Actions to be taken can be:

User ID - A number or Alpha-numeric character string used to allow use of this function and to identify where to send response information to "Remote Terminal Control Command" contents include the following information:

Link ID - Numeric designation for the link monitor that is experiencing the trouble CTRL Unit - The Stage 1 controller ID that the monitor is controlled from Priority - A number representing the interrupt priority of the message Command - Instructions that the monitor can interpret describing the action to be taken Actions to be taken can be:

User ID - A number or Alpha-numeric character string used to allow use of this function and to identify where to send response information to "Stage 3 Control Command" contents include the following information:

Link ID - Numeric designation for the link monitor that is experiencing the trouble CTRL UNIT - The Stage 1 controller ID that the monitor is controlled from Sub-System - Name or number assigned to the Stage 2 process. For Stage 3 message only.

Priority - A number representing the interrupt priority of the message

Command - Instructions that the monitor can interpret describing the action to be taken. Actions to be taken can be:

User ID - A number or Alpha-numeric character string used to allow use of the function and to identify where to send response information to "Monitor Control Information" contents include the following information:

Link ID - Numeric designation for the link monitor that is experiencing the trouble CTRL Unit - The Stage 1 controller ID that the monitor is controlled from Priority - A number representing the interrupt priority of the message Command - Instructions that the monitor can interpret describing the action to be taken Actions to be taken can be User ID - A number or Alpha-numeric character string used to allow use of this function and to identify where to send response information to "Stage 1 Control Information" contents include the following information:

CTRL Unit - The Stage 1 controller ID that the monitor is controlled from

Priority - A number representing the interrupt priority of the message

Command - Instructions that the monitor can interpret describing the action to be taken Actions to be taken can be:

User ID - A number or Alpha-numeric character string used to allow use of this function and to identify where to send response information to.

"Stage 2 System Control Instructions" are dependent upon the operating system and control system software and contain the following:

Instruction - System instruction needed to perform the requested Control Function Manually Modify Monitor, Stage 1 and Stage 2 Parameters The user can manually modify the values contained in arrays, variables, tables, databases and logs in the monitor(s), Stage 1 and Stage 2 processes. This can be accomplished using "Modify Data Menus", "Database Manager" or "Text Editor".

"Modify Data Menus" are a series of interactive menus held in the "Menu Database" that allow the user to select and modify variables, tables and array elements in the monitors, Stage 1 or Stage 2 processes. The "Menus" will generate "Modify Parameters Information" (P8-7) that will be sent to the "Control Stage 2 Communication and Message Handling" (P3) processes. The following "Variables" and "Array Elements" can be modified using these menus:

Monitor

MSU Interval Threshold Variable

MSU Category Threshold Variable

Link Load Threshold Variable

BERT Threshold Variable

Link Error Threshold Variable

Poll Array Elements

Stage 1 Process

Link ID Table Elements

Major Event Criteria Variable

"Menu Database" contains all menus and menu control scripts needed to control user input and generate "Terminal Response Information." The menus and menu control scripts contained in the database can be modified by the user to suit needs. The information contained in the database is capable of performing the following functions:

Display all available Variables and Array Elements (multiple menus)

Select single or multiple entries on multiple menus (if used)

Select Monitor, Stage 1 or Stage 2 process where Variable and Array Elements reside Set "Priority" of Information Set User ID by "Log In"

Restrict access to available Variables and Array Elements by "User ID"

"Terminal Response Information" is dependant upon vendor implementation, but will provide all information needed to generate "Modify Parameter Information" (P8-7) or Modify Stage 1 Parameter Information (P8-7). The following types of "Modify Parameter Information" will be generated.

The "Modify MSU Interval Threshold Information" contents include the following information:

Link ID - Numeric designation for the monitor the link is connected to

CTRL Unit - The Stage 1 controller ID that the monitor is controlled from

VAR ID - The number or name assigned to the Variable

VAR Type - High threshold or Low Threshold

VA Data - The threshold's value

Priority - A number representing the interrupt priority of the request.

User ID - A number or Alpha-numeric character string used to identify where to send information when the trap is triggered. Default value is the Stage 3 controller.

"Modify MSU Category Threshold Variable Information" contents include the following information:

Link ID - Numeric designation for the monitor the link is connected to

CTRL Unit - The Stage 1 controller ID that the monitor is controlled from

VAR ID - The number or name assigned to the Variable

VAR Type - High threshold or Low Threshold

VAR Data - The threshold's value

Priority - A number representing the interrupt priority of the request

User ID - A number or Alpha-numeric character string used to identify where to send information when the trap is triggered. Default value is the Stage 3 controller.

"The Modify Link Load Threshold Information" contents include the following information:

Link ID - Numeric designation for the monitor the link is connected to

CTRL Unit - The Stage 1 controller ID that the monitor is controlled from

VAR ID - The number or name assigned to the Variable

VAR Type - High threshold or Low Threshold

VAR Data - the threshold's value

Priority - A number representing the interrupt priority of the request

User ID - A number or Alpha-numeric character string used to identify where to send information when the trap is triggered. Default value is the Stage 3 controller.

"Modify BERT Threshold Information" contents include the following information:

Link ID - Numeric designation for the monitor the link is connected to

CTRL Unit - The Stage 1 controller ID that the monitor is controlled from

VAR ID - The number or name assigned to the Variable

VAR Type - High threshold, there is only one type for BERT threshold

VAR Data - The threshold's value

Priority - A number representing the interrupt priority of the request

User ID - A number or Alpha-numeric character string used to identify where to send information when the trap is triggered. Default value is the Stage 3 controller.

The "Modify Link Error Threshold Information" contents include the following information:

Link ID - Numeric designation for the monitor the link is connected to

CTRL Unit - The Stage 1 controller ID that the monitor is controlled from

VAR ID - The number or name assigned to the Variable

VAR Type - High threshold. There is only one type for Link Error threshold.

VAR Data - The threshold's value

Priority - A number representing the interrupt priority of the request

User ID - A number or Alpha-numeric character string used to identify where to send information when the trap is triggered. Default value is the Stage 3 controller.

"Modify Major Event Criteria Variable Information" contents include the following information:

Link ID - Not used

CTRL Unit - The Stage 1 controller ID that the monitor is controlled from

VAR ID - The number or name assigned to the variable

VAR Type - High threshold or Low Threshold

Var Data - The threshold's value

Priority - A number representing the interrupt priority of the request

User ID - A number or Alpha-numeric character string used to identify where to send information when the trap is triggered. Default value is the Stage 3 controller.

Poll Array Record elements can be changed using "Stage 1 Modify Pool Array Element Data Message" sent from the Stage 2 process. This message is decoded into "Modify Poll Array Element Data Information." The "Stage 1 Modify Poll Array Element Data Message" contents include the following information:

Link ID - Numeric designation for the monitor the link is connected to

CTRL Unit - The Stage 1 controller ID that the monitor is controlled from

RECNO - Record number in the Array

Element # - Element number within the record that is to be modified. The following Elements are the minimum to be included:

Start Time - Time the Poll Interval is valid

End Time - The latest time the Poll Interval value is valid

Poll Interval - Time in milliseconds of the interval

Array ID - Array that the Poll Interval is for

RECNO - Record number in the Array that the Poll Interval is for

Element Data - Data to be placed in the array element

Priority - A number representing the interrupt priority of the request

User ID - A number or Alpha-numeric character string used to identify where to send information when the trap is triggered. Default value is the Stage 3 controller.

A "Database Manager" is used to modify the values in the record elements of arrays and databases in the Stage 2 process. This "Database Manager" can be any commercially available program capable of performing standard database management functions. The "Database Manager" program can also be accessed and used by a remote terminal via the "Control Remote Port" (P9) process or the "Control Stage 3 Communication Control" (P10) process. The arrays and databases that can be modified using the "Database Manager" program are:

Link Benchmark Database
Link Profile Database
STP Profile Database
Link History Database
Certification Database
Corrective Action Database
Link Access Database
Alarm Text Database
Screen Database
Trap Database
Link Array Database
Variable Database
User Profile Database
Terminal Profile Database
Menu Database
MSU Database
Wait Timer Array
Information Array Scripts used in the Stage 2 process can be modified using a "Text Editor". The "Text Editor" can be a commercially available text editor or word processor program capable of performing standard text editing functions. The "Text Editor" program can also be accessed and used by a remote terminal via the "Control Remote Port" (P9) process or the "Control Stage 3 Communication Control" (P10) process. The scripts that can be modified using the "Text Editor" program are:

Reactive Trap Script
Corrective Action Script
Threshold Exceeded Script
Failure Analysis Script
Major Event Script "Information Request Information" is automatically generated for the variable(s), table element(s) or array element(s) after they have been modified. The "Information Request Information" is sent to the "Control Stage 1 Communication and Message Handling" (P3) process. Monitor or Stage 1 process receiving the request information will format and send "Link Array Information". This information is formatted into "Screen Display Data" and presented to the "Local Terminal", "Control Remote Port" (P9) process or "Control Stage 3 Communication Control" (P10) process depending upon the "User ID".

Variables, table elements and array elements contained in the monitors and Stage 1 process can also be manually retrieved and displayed on the "Local Terminal" or "Control Remote Port" (P9) process or "Control Stage 3 Communication Control" (P10) process. "Link Information Request Menus" are presented to the user (P8-7), "Local Terminal", "Control Remote Port" (P9) or "Control Stage 3 Communications Control" (P10) process, where single or multiple variables, table elements and array elements can be selected. These are interactive entries in the menu. When the user has completed all entries, "Information Request Information" is generated and sent to the "Control Stage 2 Communication and Message Handling" (P3) process menus generating "Terminal Response Information" when the user makes entries in the menu. When the user has completed all entries, "Information Request Information" is generated and sent to the "Control Stage 2 Communication and Message Handling" (P3) process.

When the monitors and Stage 1 process have extracted the requested variables, table elements or array element data, "Link Array Information" is received from the "Control Stage 2 Communication and Message Handling" (P3) process. This information is formatted into "Screen Page Information" (P8-6) using information in the "Link Array Database" and the "Variable Database" and sent to the "Local Terminal", "Control Remote Port" (P9), or "Control Stage 3 Communication Control (P10) process.

"Link Information Request Menu" is a series of interactive menus held in the "Menu Database" listing all available variables, table elements and array elements. The following variables, table element and array element information can be accessed:

Monitor
MSU Interval Threshold Variable
MSU Category Threshold Variable
Link Load Threshold Variable
BERT Threshold Variable
Link Error Threshold Variable
Poll Array Elements
Stage 1 Process
Link ID Table Elements
Major Event Criteria Variable "Menu Database" contains all menus and menu control scripts needed to control user input and generate "Terminal Response Information". The menus and menu control scripts contained in the database can be modified by the user to suit needs. The information contained in the database is capable of performing the following minimum functions:

Display all available information entries (multiple menus)
Select single or multiple entries on multiple menus (if used)
Select Monitor or Stage 1 process to retrieve information from
Set "Priority" of request (1 through 5)
Set "User ID" by "Log In"
Restrict Information available by "User ID"

"Terminal Response Information" provides all information needed to generate "Information Request Information". The minimum information required is:

Link ID - Numeric designation for the monitor the link is connected to
CTRL Unit - The Stage 1 controller ID that the monitor is controlled from
Reg # - The number assigned to the Register or Array
RECNO - Record number in the Register or Array. If only the RECNO is identified and the Element # left blank, then all elements in the record will be retrieved Leave blank if not needed.
Element # - Element number within the record. Populated only if a particular element is needed.
VAR ID - The number or name assigned to the Variable. Leave blank if not needed.
Priority - A number representing the interrupt priority of the request
User ID - A number or Alpha-numeric character string used to identify where to send information when the trap is triggered. Default value is the Stage 3 controller.

"Information Request Information" contents include the following information:

Link ID - Numeric designation for the monitor the link is connected to
CTRL Unit - The Stage 1 controller ID that the monitor is controlled from
Reg # - The number assigned to the Register or Array
RECNO - Record number in the Register or Array. If only the RECNO is identified and the Element left blank, then all elements in the record will be retrieved. Leave blank if not needed.

Element # - Element number within the record. Populated only if a particular element is needed.

VAR ID - The number or name assigned to the Variable. Leave blank if not needed.

Priority - A number representing the interrupt priority of the request

User ID - A number or Alpha-numeric character string used to identify where to send information when the trap is triggered. Default value is the Stage 3 controller.

"Link Array Information" contents include the following information:

Link ID - Numeric designation for the monitor the link is connected to

CTRL Unit - The Stage 1 controller ID that the monitor is controlled from

Reg # - The number assigned to the Register or Array

RECNO - Record number in the Register or Array

Element # - Element number within the record

Element Data - The data contained in the array element identified by the RECNO and Element #

VAR ID - The number or name assigned to the Variable. Leave blank if not needed.

VAR Data - Data contained in the variable

Priority - A number representing the interrupt priority of the request

User ID - A number or Alpha-numeric character string used to identify where to send information when the trap is triggered. Default value is the Stage 3 controller.

"Variable Database" is used to hold the "VAR ID" names. This database contains the following minimum information:

VAR ID - The number assigned to the variable

Name - ASCII string identifying the English name for the data held in the Element # e.g.

VAR ID 1

Name - "Major Event Criteria Variable Value"

"Link Array Database" is used to hold the "Reg #", "RECNO" and "Element" names. This contains the following information:

Reg # - The number assigned to the Register or Array

RECNO - Record number in the Register or Array

Element # - Element number within the record

Name - ASCII string identifying the English name for the data held in the Element # e.g.

| Reg # | 1 |
|---|---|
| RECNO | 24 |
| Element # | 1 |
| Name - | "Start Time for MSU Interval Array Element - UDT" |

Manually Generate Traps and Display Trap Triggered Information

Traps can be generated from the "Local Terminal", "Remote Terminal" via the "Control Remote Port" (P9) process and the "Control Stage 3 Communication Control" (P10) process by using "Trap Generator Menus".

"Trap Generator Menus" are a series of interactive menus held in the "Menu Database" that allow the user to create "User Defined Traps" to be placed in the monitors. The "Menus" will generate "Terminal Response Trap Information" (P8-8) that will be sent to the "Control Stage 2 Communication and Message Handling" (P3) process. Information supplied from the "MSU Database", "Link Access Database", "Information Array", "User Profile Database" and "Trap Database" will be used to generate the appropriate "Terminal Response Trap Information". This information is sent to a system "Trap Generator Function" where the "User Defined Trap Information" is created.

"Menu Database" contains all menus and menu control scripts needed to control user input and generate "Terminal Response Information". The menus and menu control scripts contained in the database can be modified by the user to suit needs. The information contained in the database is capable of performing the following functions:

Display all available MSUs that can be trapped on

Select single or multiple MSUs on multiple menus (if used)

Display all available fields of the MSU(s) selected that can be trapped

Select Monitor(s) where Traps are to be placed

Select side of link the trap is to be placed (Transmit/Receive)

Set "Priority" of User Defied Trap Information

Set "User ID" by "Log In"

Restrict access to available monitors by "User ID"

"Terminal Response Information" will provide all information needed to generate "User Defined Trap Information" (P8-7). The following information will be supplied to the "Trap Generator Function":

Link ID - Numeric designation for the link monitor that is experiencing the trouble CTRL Unit - The Stage 1 controller ID that the monitor is controlled from MSU Type - H0 and H1 codes for the MSU to be trapped MSU Fields - Field values (HEX or Decimal) to be trapped on (8 fields minimum)

Null Fields - Fields in the MSU that can be ignored

Trap Type - Indicates whether the MSU or a trap triggered indication is sent back to the user when the trap is triggered Range - A value that indicates how many MSUs should be received until a trap triggered indication is sent back to the user (1 to 9999)

Trap # - Number assigned to the trap when it was generated

Type - User Defined Trap

Origin - Side of the Link that the MSU is to be trapped on - Receive/Transmit

Priority - Number from 0 to 5 that identifies the interrupt priority of the information - 2.

User ID - Used to determine where the trap information is to be sent The default value would be the Stage 2 Controller ID.

"User Defined Trap Information" contents include the following information:

Link ID - Numeric designation for the link monitor that is experiencing the trouble CTRL Unit - The Stage 1 controller ID that the monitor is controlled from Trap # - Number assigned to the trap when it was generated Mask - A representation of the MSU to be trapped, populated with the MSU field(s) value to be trapped on. If the Mask populated values match the equivalent MSU field values, a trap trigger indication is generated.

Script - Instructions to the monitor on how to determine if the trap has been triggered and what information to send to the user ("User ID"). This information is supplied by the "Reactive Trap Script". Note: This function could be handled by the Stage 1, 2, 3 or 4 Process if the MSU is sent to the appropriate process when triggered.

Type - User Defined Trap

Origin - Side of the link that the MSU is to be trapped on Receive/Transmit

Priority - Number from 0 to 5 that identifies the interrupt of the information - 2.

User ID - Used to determine where the trap information is to be sent. The default value would be the Stage 2 Controller ID.

When a trap is triggered, the monitor will send "User Defined Trap Triggered Information to the Control Stage 2 Communication and Message Handling" (P3) process. This information is formatted into "Screen Display Data" and sent to the "Local Terminal" or "Control Remote Port" (P9) process.

"User Defined Trap Triggered Information" content and format is vendor dependent, but must contain the following minimum information:

Trap # - Number assigned to the trap when it was generated

MSU - Complete MSU including header information. Flags can be removed

Type - Type of Trap Triggered Response, User defined, or Call Progress

Time - Time the "Reactive MSU" was detected by the monitor

Origin - Side of the link that the MSU was detected - Receive/Transmit

Priority - Number from 0 to 5 that identifies the interrupt priority of the information - 2.

User ID - Used to determine where the trap information is to be sent. The default value would be the Stage 2 Controller ID.

OR

Trap # - Number assigned to the trap when it was generated

Trigger Info - Information about the trap trigger

Type - Type of Trap Triggered Response, User defined, or Call Progress

Time - Time the "Reactive MSU" was detected by the monitor

Origin - Side of the link that the MSU was detected - Receive/Transmit

Priority - Number from 0 to 5 that identifies the interrupt priority of the information - 2.

User ID - Used to determine where the trap information is to be sent. The default value would be the Stage 2 Controller ID.

"Call Progress Trap Triggered Information" can also be displayed to the user in the same way that the "User Defined Trap Triggered Information" is displayed. However, the user cannot generate "Call Progress Traps". Only the Stage 3 and Stage 4 process are allowed to generate these traps.

"Call Progress Initiate MSU Trap Triggered (CPT) Information" contents include the following information:

Link ID - Numeric designation for the monitor the link is attached to

CTRL Unit - The Stage 1 controller ID that the monitor is controlled from

Trap Number - Number assigned to the Response Trap in the monitor

Type - Call Progress Initiate MSU

Time - Time that the Response Trap was triggered

MSU - The MSU message that was trapped

Priority - A number representing the interrupt priority of the trap

Origin - Indicates whether the trap is for link transmit or receive

User ID - A number or Alpha-numeric character string used to identify where to send information when the trap is triggered "Call Progress Sequence MSU Trap Triggered (CPT) Information" contents include the following information:

Link ID - Numeric designation for the monitor the link is attached to

CTRL Unit - The Stage 1 controller ID that the monitor is controlled from

Trap Number - Number assigned to the Response Trap in the monitor

Type - Call Progress Sequence MSU

Time - Time that the Response Trap was triggered

MSU - The MSU message that was trapped

Priority - A number representing the interrupt priority of the trap

Origin - Indicates whether the trap is for link transmit or receive

User ID - A number or Alpha-numeric character string used to identify where to send information when the trap is triggered Automatically and/or Manually Print Data Any information sent to or from the "Local Terminal", "Control Remote Port" (P9) process or "Control Stage 3 Communication Control" (P10) process can be printed to the local terminal (8-10). The user identifies the information to be printed. The information is stored in a "Print Buffer" until the printer can accept it. The following information can be printed:

Alarm Text

Corrective Action Text

Link Array Information

Variable Information

Control Information

User Defined Trap Triggered Information

Call Progress Trap Triggered Information

Script Files

Database Information

Print Screen (This is a Terminal and Stage 2 System Function)

Display and Control Manual Protocol Analysis (Optional)

P9: Control Remote Port

Figures 1, 30:
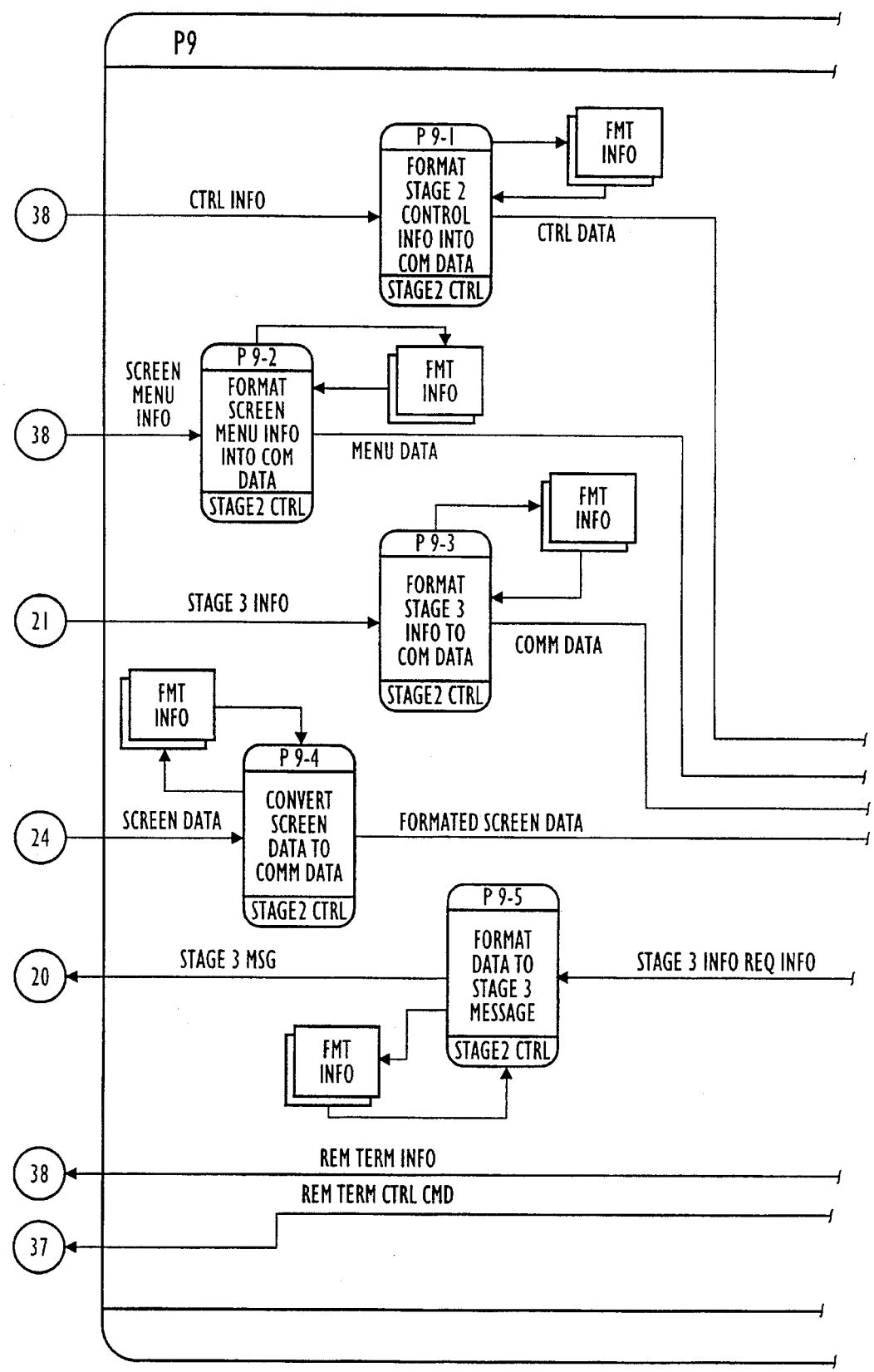
Figures 2, 30:
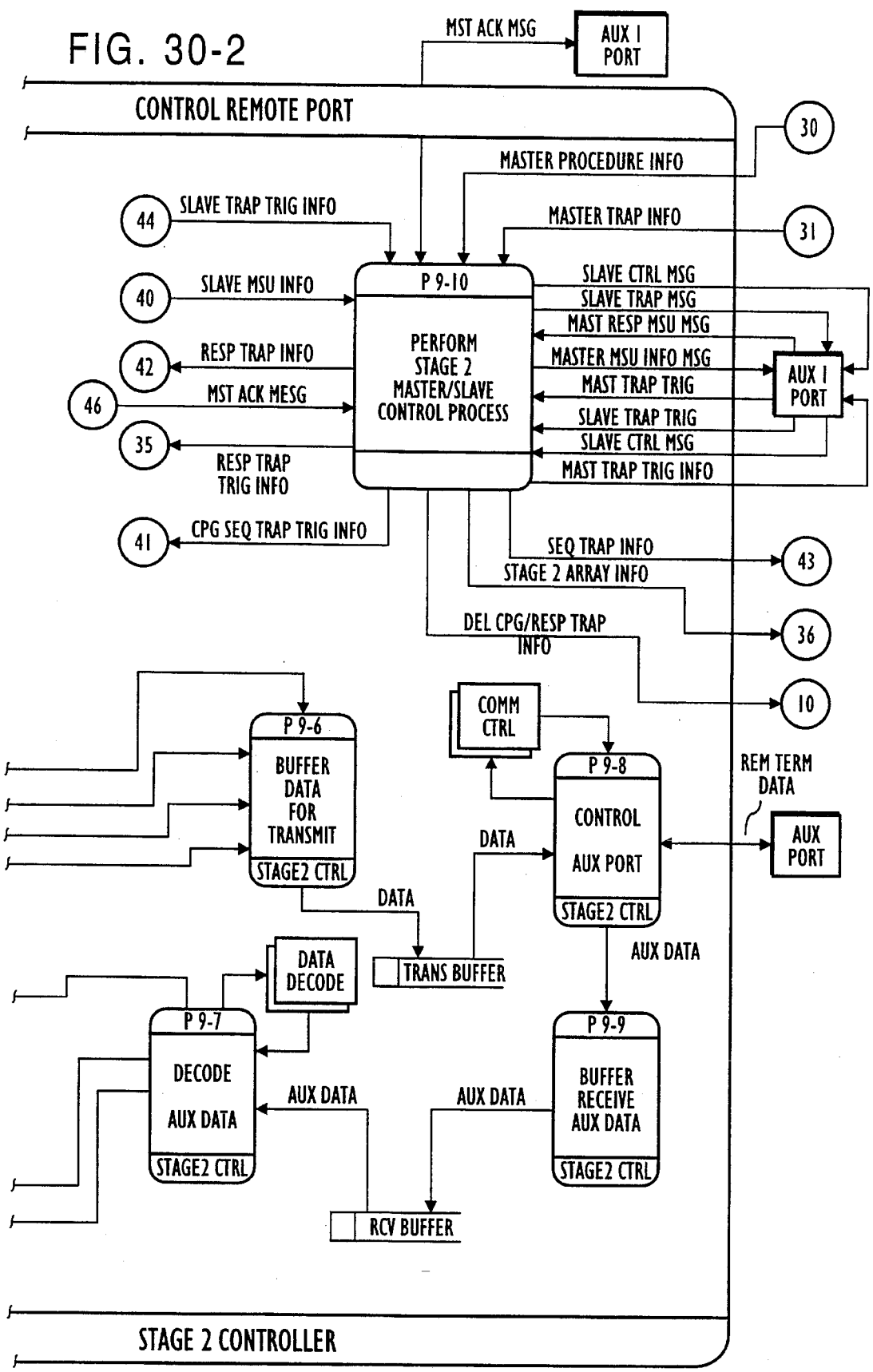
Figures 1, 30A:
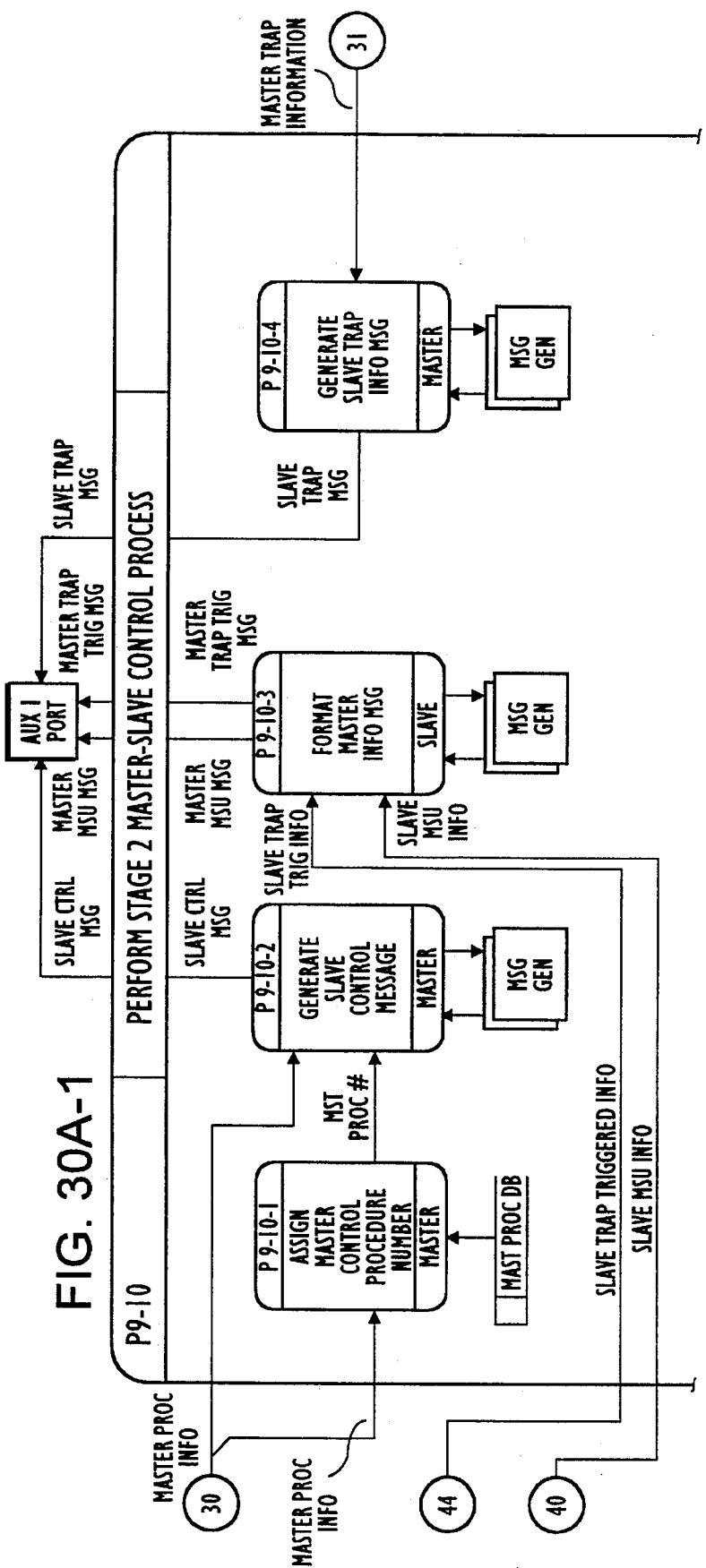
Figures 2, 30A:
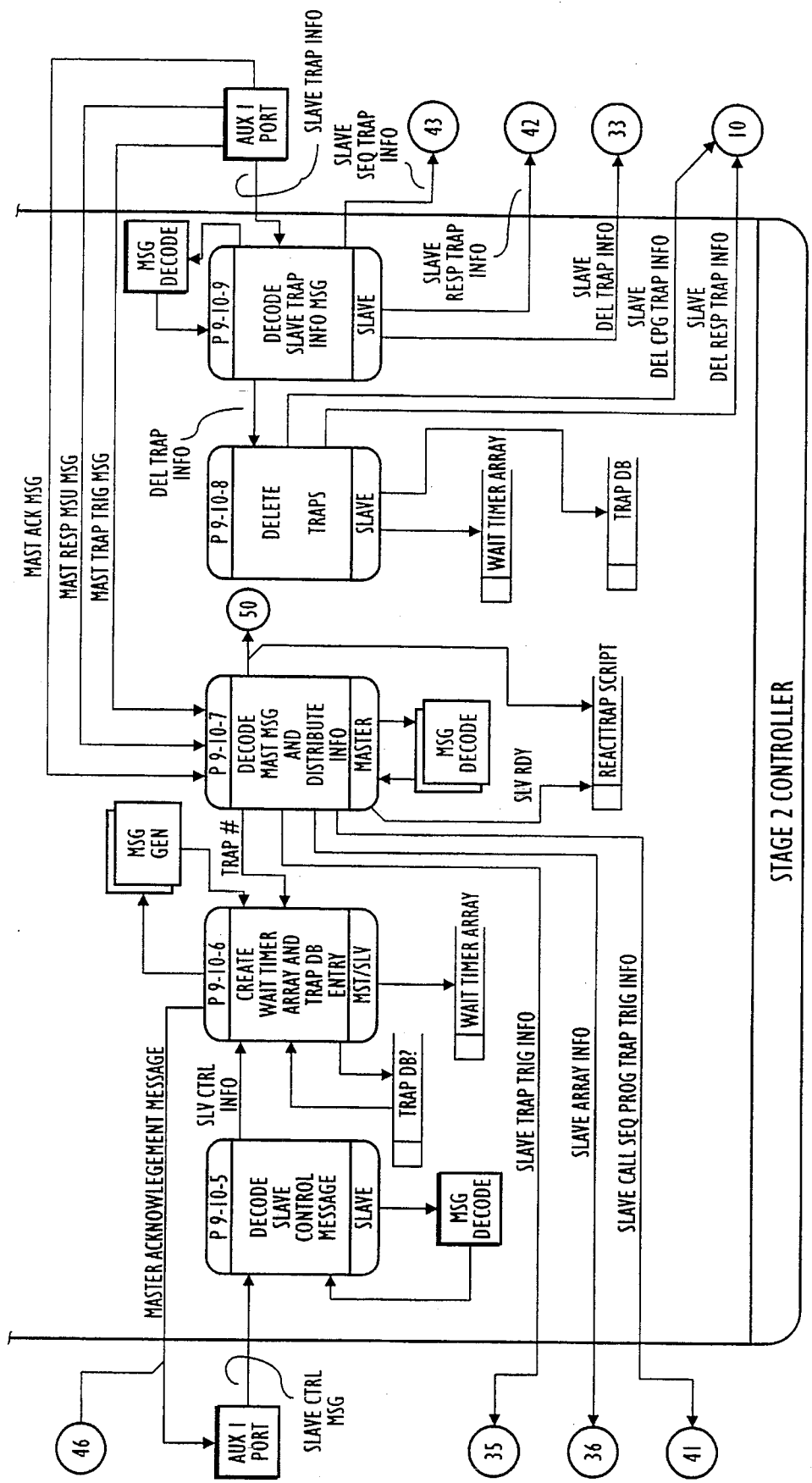

Reference is had to FIGS. 12A, 30 and 30A.

The "Remote Port" can be used in lieu of or in conjunction with a "Local Terminal". Everything a "Local Terminal" can do, the "Remote Terminal" can do. This process also controls the communication between "Mated Stage 2 Processes".

"Mated Stage 2 Processes" are required when two or more Stage 2 processes are needed to control monitors and Stage 1 processes at the "Mated STP Pair". If only one Stage 2 process is needed to control all the monitors for the "Mated STP Pair", then no communication is needed. Since "Reactive Traps", "Response MSUs" and "Call Progress Traps" can be initially triggered in only one STP for each event, the Stage 2 process that receives this information must place traps in or look for trap triggered information from both STP monitors. This can only be accomplished by providing a communication link between the two or more Stage 2 processes. This link can be a high speed Digital Data Service (DDS) circuit (56 Kb) or an Ethernet type network.

The Stage 2 process that initially receives "New Reactive MSU Information" or "Call Progress Initiate MSU Trap Triggered Information" is considered to be the "Master Stage 2 Process" for the duration of the "Event". The other Stage 2 process becomes the "Slave Stage 2 Process" for the duration of the "Event". A Stage 2 process can be both master and slave for different events.

A "Master Stage 2 Process" is initiated by a Stage 2 process when "New Reactive MSU Information" or "Call Progress Initiate MSU Trap Triggered Information" is received from the "Control Stage 2 Communication and Message Handling" (P3) process.

When "New Reactive MSU Information" is received, the "Wait Timer Array" is checked to determine if the MSU is "New Reactive MSU" or a response to a "Response MSU" (P5-1). If it is New, the "Reactive Trap Script" determines if "Response Traps" need to be generated for SS7 links related to the one that detected the "New Reactive MSU" (5-3). If trap(s) are needed for links in the "Mated STP" monitors controlled by a different Stage 2 process, "Trap Required Information" and "Response MSU" information is formatted into "Master Procedure Information" (5-3). This information is used to assign a "Master Procedure ID" (P9-10-1). The "Master Procedure ID" and "Master Procedure Information" is sent to a system "Message Generator Function" and is formatted into a "Slave Control Message" (P9-10-2) and sent to the "Mated Stage 2 Process(s)" via the "AUX 1 Port(s)".

When the "Mated Stage 2" process receives the "Slave Control Message", it is decoded (P9-10-5) using the system "Decode Message Function" into "Slave Control Information". This information is used to create a record(s) in its "Wait Timer Array". A record(s) is created in the "Trap Database". The resulting "Trap" is retrieved from the "Trap Database" and entered into the appropriate "Wait Timer Array" record(s). Records are made in both the "Wait Timer Array" and "Trap Database" for each link ("CTRL Unit" and "Link ID") and "Reactive MSU" or "Response Trap" identified.

"New Reactive MSU Information" contents include the following information:

MSU - Complete MSU including header information Flags can be removed

Type - Type of MSU Either Reactive or Response

Time - Time the "Reactive MSU" was detected by the monitor

Origin - Side of the link that the MSU was detected - Receive/Transmit

User ID - Used to determine where the threshold information is to be sent. The default value would be the Stage 2 Controller ID.

Priority - Number from 0 to 5 that identifies the interrupt priority of the information - 1.

"Trap Required Information" contents include the following information:

Type - Indicates whether a trap is needed ("Response Trap" or "No Trap")

Link ID - Numeric designation for the monitor the link is attached to

CTRL Unit - The Stage 1 Controller ID that the monitor is controlled from

Type of Traps - Identifies how many traps will be needed for each SS7 link

User ID - A number or Alpha-numeric character string used to identify where to send information when the MSU is triggered. Default Stage 2.

There will be a set of these parameters for each SS7 link that requires traps placed.

"Master Procedure Information" contents include the following information"

Trap Type - Indicates whether a trap is needed ("Response Trap" or "No Trap")

Link ID - Numeric designation for the monitor the link is attached to

CTRL Unit - The Stage 1 Controller ID that the monitor is controlled from

Type of Traps - Identifies how many traps will be needed for each SS7 link

Resp MSU - Response MSU(s) to be looked for on related SS7 links

Time - Time that the New Reactive MSU was detected

Origin - Indicates whether the information is for link transmit or receive

Duration Time - The time, in milliseconds, that the trap should be active. This parameter is set by the "Reactive Trap Script".

Script # - Number indicating the "Reactive Trap Script" that generated the Trap

User ID - A number or Alpha-numeric character string used to identify where to send information when the MSU is triggered. Default Stage 2.

There will be a set of these parameters for each SS7 link that requires traps placed.

"Master Procedure ID" contents include the following information:

Master Proc ID - Number assigned by the "Reactive Trap Script" to identify Slave Stage 2 information "Slave Control Message" contents include the following information:

Trap Type - Indicates whether a trap is needed ("Response Trap" or "No Trap") vendor defined designation for the monitor the link is attached CTRL Unit - The Stage 1 Controller ID that the monitor is controlled from Sub-System # - Name or number assigned to the Stage 2 process that originated the message # of Traps - Identifies how many traps will be needed for each SS7 link

Resp MSU - Response MSU(s) to be looked for on related SS7 links

Time - Time that the New Reactive MSU was detected

Origin - Indicates whether the information is for link transmit or receive

Duration Time - The time, in milliseconds, that the trap should be active. This parameter is set by the "Reactive Trap Script".

Script # - Number indicating the "Reactive Trap Script" that generated the Trap

Master Proc ID - Number assigned by the "Reactive Trap Script" to identify Slave Stage 2 information User ID - A number or Alpha-numeric character string used to identify where to send information when the MSU is triggered. Default Stage 2.

There will be a set of these parameters for each SS7 link that requires traps placed.

"Slave Control Information" contents include the following information:

Trap Type - Indicates whether a trap is needed ("Response Trap" or "No Trap")

Link ID - Numeric designation for the monitor the link is attached

CTRL Unit - The Stage 1 Controller ID that the monitor is controlled from

Sub-System # - Name or number assigned to the Stage 2 process that originated the message # of Traps - Identifies how many traps will be needed for each SS7 link

Resp MSU - Response MSU(s) to be looked for on related SS7 links

Time - Time that the New Reactive MSU was detected

Origin - Indicates whether the information is for link transmit or receive

Duration Time - The time, in milliseconds, that the trap should be active. This parameter is set by the "Reactive Trap Script".

Script # - Number indicating the "Reactive Trap Script" that generated the Trap

Master Proc ID - Number assigned by the "Reactive Trap Script" to identify Slave Stage 2 information User ID - A number or Alpha-numeric character string used to identify where to send information when the MSU is triggered. Default Stage 2.

There will be a set of these parameters for each SS7 link that requires traps placed.

The "Wait Timer Array" contents include the following information:

MSU Type - Type of "Reactive MSU" triggered

OPC - Originating Point Code of the "Reactive MSU"

DPC - Destination Point Code of the "Reactive MSU"

MSU Priority - Priority of the "Reactive MSU" if applicable

APC - Affected Point Code of the "Reactive MSU" if applicable

APC Flag -Applicable comparison field if Set to 1

CPN - Calling Party Number of the "Reactive MSU" if applicable

CPN Flag - Applicable comparison field if set to 1

CLD - Called Party Number of the "Reactive MSU" if applicable

CLD Flag - Applicable comparison field if set to 1

CIC - Circuit Identification Code of the "Reactive MSU" if applicable

CIC Flag - Applicable comparison field if set to 1

DLR - Destination Local Reference of the "Reactive MSU" if applicable

DLR Flag - Applicable comparison field if set to 1

SLR - Source Local Reference of the "Reactive MSU" if applicable

SLR Flag - Applicable comparison field if set to 1

CPA - Calling Party Address of the "Reactive MSU" if applicable

CPA Flag - Applicable comparison field if set to 1

TID - Transaction ID of the "Reactive MSU" if applicable

TID Flag - Applicable comparison field if set to 1

Origin - Indicates whether the information is for link transmit or receive

Trap # - Number assigned to the trap by the "Reactive Trap Script"

Link ID - Numeric designation for the monitor the link is attached to

CTRL Unit - The Stage 1 Controller ID that the monitor is controlled from

Time - Time that the New Reactive MSU was detected

Duration Time - The time, in milliseconds, that the trap should be active. This parameter is set by the "Reactive Trap Script".

Script # - Number indicating the "Reactive Trap Script" that generated Trap

Master Proc ID - Number assigned by the "Reactive Trap Script" to identify Slave Stage 2 information User ID - A number or Alpha-numeric character string used to identify where to send information when the MSU is triggered. Default Stage 2.

Record elements in the "Trap Database" contents include the following information:

Trap Type - Type of trap (Response, CPG, Reactive, etc.)

Link ID - Numeric designation for the link monitor that is experiencing the trouble CTRL Unit - The Stage 1 Controller ID that the monitor is controlled from Sub-System # - Name or number assigned to the Stage 2 process For Stage 3 message only. Used if information was sent to an other Stage 2 process.

Trap # - Number assigned to the trap when it was generated

Master Proc ID - Number assigned by the "Reactive Trap Script" to identify Slave Stage 2 information User ID - A number or Alpha-numeric character string used to identify where to send information when the MSU is triggered. Default Stage 2.

New Trap Numbers are created by searching the Trap Database for the last number used and incrementing it by one. There can be a maximum of 512 active trap numbers. If this maximum number is reached, the next trap number will be zero. If the created trap number already exists, the new number is incremented until a spare number is found.

When both the "Wait Timer Array" and "Trap Database" have been updated with "Slave Control Information", "Master Acknowledgment Messages" are generated and sent to the Stage 2 process that initiated the "Slave Control Information" (P9-10-6).

When a Stage 2 process receives a "Master Acknowledgment Message" via the "Control Remote Port" (P9) process, it is decoded into "Master Acknowledgment Information" (P9-10-7). This information is used to create new "Wait Timer Array" and "Trap Database" records (P9-10-6). These records will have different "Trap #s" than the related "Response Traps" generated for this "Event", but will have the same "Master Process ID" and "User ID".

"Master Acknowledgment Message" contents include the following information:

Trap Type - Indicates what kind of trap was placed "Response Trap" or "Response MSU")

Link ID - Numeric designation for the monitor the link is attached to

CTRL Unit - The Stage 1 Controller ID that the monitor is controlled from

Sub-System # - Name or number assigned to the Stage 2 process that originated the message Trap # - Number assigned to the trap Time - Time that the New Reactive MSU was detected Origin - Indicates whether the information is for link transmit or receive Script # - Number indicating the "Reactive Trap Script" that generated the Trap Master Proc ID - Number assigned by the "Reactive Trap Script" to identify Slave Stage 2 information Error - Traps cannot be placed as requested User ID - A number or Alpha-numeric character string used to identify where to send information when the MSU is triggered. Default Stage 2 (Master Stage 2).

There will be as many of these messages generated as there are "Response Traps" and/or "Response MSUs" placed in the "Trap Database" and "Wait Timer Array".

"Master Acknowledgment Information" contents include the following information:

Trap Type - Indicates what kind of trap was placed ("Response Trap", "Response MSU" or "CPG Sequence Trap")

Link ID - Numeric designation for the monitor the link is attached to

CTRL Unit - The Stage 1 Controller ID that the monitor is controlled from

Sub-System # - Name or number assigned to the Stage 2 process that originated the message Trap # - Number assigned to the trap Time - Time that the New Reactive MSU was detected Origin - Indicates whether the information is for link transmit or receive Script # - Number indicating the "Reactive Trap Script" that generated the Trap Master Proc ID - Number assigned by the "Reactive Trap Script" to identify Slave Stage 2 information Error - Traps cannot be placed as requested User ID - A number or Alpha-numeric character string used to identify where to send information when the MSU is triggered. Default Stage 2 (Master Stage 2).

There will be as many of this information decoded as there were "Response Traps" and/or "Response MSUs" placed in the Slave Stage 2 process' "Trap Database" and "Wait Timer Array".

When "Response Traps" trigger in monitors controlled by the "Slave Stage 2 Process", "Response Trap Triggered Information" is sent from the "Control Stage 2 Communication and Message Handling" (P3) process. This information is compared against information in the "Wait Timer Array" (P5-5). If the "User ID" is different than the Stage 2 process, "Slave Trap Triggered Information" is generated (P5-5). This information is formatted into "Master Trap Triggered Message" (P9-10-3) and sent to the appropriate "Master Stage 2 Process" via the "AUX 1 Port".

The "Master Trap Triggered Message" is decoded into "Slave Trap Triggered Information" (P9-10-7) and sent to the "Generate and Analyze Reactive Trap Trigger" (P5) process.

The "Response Trap Triggered Information" contents include the following information:

Link ID - Numeric designation for the monitor the link is attached to

CTRL Unit - The Stage 1 Controller ID that the monitor is controlled from

Trap Number - Number assigned to the Response Trap in the monitor

Type - Response

Time - Time that the Response Trap was triggered

MSU - The MSU message that was trapped

Priority - A number representing the interrupt priority of the trap

Origin - Indicates whether the trap is for link transmit or receive

Master Proc ID - Number assigned by the "Reactive Trap Script" to identify Slave Stage 2 information User ID - A number or Alpha-numeric character string used to identify where to send information when the trap is triggered

OR

Link ID - Numeric designation for the monitor the link is attached to

CTRL Unit - The Stage 1 Controller ID that the monitor is controlled from

Trap Number - Number assigned to the Trap in the monitor

Type - Response

Time - Time that the trap was triggered

Trigger Information - Indication that the trap was triggered

Priority - A number representing the interrupt priority of the trap

Origin - Indicates whether the trap is for link transmit or receive

Master Proc ID - Number assigned by tho "Reactive Trap Script" to identify Slave Stage 2 information User ID - A number or Alpha-numeric character string used to identify where to send information when the trap is triggered The "Slave Trap Triggered Information" contents include the following information:

Link ID - Numeric designation for the monitor the link is attached to

CTRL Unit - The Stage 1 Controller ID that the monitor is controlled from

Trap Number - Number assigned to the Response Trap in the monitor

Type - Response

Time - Time that the Response Trap was triggered

MSU - The MSU message that was trapped

Priority - A number representing the interrupt priority of the trap

Origin - Indicates whether the trap is for link transmit or receive

Master Proc ID - Number assigned by the "Reactive Trap Script" to identify Slave Stage 2 information User ID - A number or Alpha-numeric character string used to identify where to send information when the trap is triggered

OR

Link ID - Numeric designation for the monitor the link is attached to

CTRL Unit - The Stage 1 Controller ID that the monitor is controlled from

Trap Number - Number assigned to the Trap in the monitor

Type - Response

Time - Time that the trap was triggered

Trigger Information - Indication that the trap was triggered

Priority - A number representing the interrupt priority of the trap

Origin - Indicates whether the trap is for link transmit or receive

Master Proc ID - Number assigned by the "Reactive Trap Script" to identify Slave Stage 2 information User ID - A number or Alpha-numeric character string used to identify where to send information when the trap is triggered The "Master Trap Triggered Message" contents include the following information:

Link ID - Numeric designation for the monitor the link is attached to

CTRL Unit - The Stage 1 Controller ID that the monitor is controlled from Name or number assigned to the Stage 2 process that originated the message Trap Number - Number assigned to the Response Trap in the monitor Type - Response Time - Time that the Response Trap was triggered MSU - The MSU message that was trapped Priority - A number representing the interrupt priority of the trap Origin - Indicates whether the trap is for link transmit or receive Master Proc ID - Number assigned by the "Reactive Trap Script" to identify Slave Stage 2 information User ID - A number or Alpha-numeric character string used to identify where to send information when the trap is triggered

OR

Link ID - Numeric designation for the monitor the link is attached to

CTRL Unit - The Stage 1 Controller ID that the monitor is controlled from Name or number assigned to the Stage 2 process that originated the message Trap Number - Number assigned to the Trap in the monitor Type - Response Time - Time that the trap was triggered Trigger Information - Indication that the trap was triggered Priority - A number representing the interrupt priority of the trap Origin - Indicates whether the trap is for link transmit or receive Master Proc ID - Number assigned by the "Reactive Trap Script" to identify Slave Stage 2 information User ID - A number or Alpha-numeric character string used to identify where to send information when the trap is triggered The "Slave Trap Triggered Information" contents include the following information:

Link ID - Numeric designation for the monitor the link is attached to

CTRL Unit - The Stage 1 Controller ID that the monitor is controlled from Name or number assigned to the Stage 2 process that originated the message Trap Number - Number assigned to the Response Trap in the monitor Type - Response Time - Time that the Response Trap was triggered MSU - The MSU message that was trapped Priority - A number representing the interrupt priority of the trap Origin - Indicates whether the trap is for link transmit or receive Master Proc ID - Number assigned by the "Reactive Trap Script" to identify Slave Stage 2 information User ID - A number or Alpha-numeric character string used to identify where to send information when the trap is triggered

OR

Link ID - Numeric designation for the monitor the link is attached

CTRL Unit - The Stage 1 Controller ID that the monitor is controlled from

Sub-System # - Name or number assigned to the Stage 2 process that originated the message Trap Number - Number assigned to the Trap in the monitor Type - Response Time - Time that the trap was triggered Trigger Information - Indication that the trap was triggered Priority - A number representing the interrupt priority of the trap Origin - Indicates whether the trap is for link transmit or receive Master Proc ID - Number assigned by the "Reactive Trap Script" to identify Slave Stage 2 information User ID - A number or Alpha-numeric character string used to identify where to send information when the trap is triggered When "Call Progress Initiate MSU Trap Triggered (CPT) Information" is received, MSU field information is extracted (P4-8), related link information is retrieved from the "Link Access Database" (P4-10) and "Call Progress Sequence MSU Trap Information" is generated (P4-9). Trap information that needs to be placed in the "Mated Stage 2 Process(s)" is formatted into "Master Trap Information". This information is used to generate "Slave Trap Messages" (P9-10-4) and are sent to the "Mated Stage 2 Process" (AUX 1 Port).

When a "Slave Trap Message" is received by the "Mated Stage 2 Process", it is decoded (P9-10-9) and "Slave Sequence MSU Trap Information" is generated. This information is used to place "Call Progress Sequence MSU Trap" in the appropriate monitors via the "Analyze Exceeded Threshold and CPG Trap Information" (P4) process.

When the "Sequence MSU Trap(s)" have been generated by the "Slave Stage 2 Process" (P4-9), they are down loaded to the appropriate monitors via the "Control Stage 2 Communication and Message Handling" (P3) process. Also, a "Master Acknowledgment Message" is generated and sent to the "Master Stage 2 Process".

When a Stage 2 process receives a "Master Acknowledgment Message" via the "Control Remote Port" (P9) process, it is decoded into "Master Acknowledgment Information" (P9-10-7). This information is used to create new "Trap Database" records (P9-10-6). These records will have different "Trap #s" than the related "Call Progress Sequence MSU Traps" generated by the "Master Stage 2 Process" but will have the same "Master Process ID" and "User ID".

"Call Progress Initiate MSU Trap Triggered (CPT) Information" contents include the following information:

Link ID - Numeric designation for the monitor the link is attached to

CTRL Unit - The Stage 1 Controller ID that the monitor is controlled from

Trap Number - Number assigned to the Response Trap

Type - Call Progress Initiate MSU

Time - Time that the Response Trap was triggered

MSU - The MSU message that was trapped

Priority - A number representing the interrupt priority of the trap

Origin - Indicates whether the trap is for link transmit or receive

Master Proc ID - Number assigned by the "Reactive Trap Scripts to identify Slave Stage 2 information User ID - A number or Alpha-numeric character string used to identify where to send information when the trap is triggered Call Progress Sequence MSU Trap Information" contents include the following information:

Link ID - Numeric designation for the link monitor that is experiencing the trouble CTRL Unit - The Stage 1 Controller ID that the monitor is controlled from Trap # - Number assigned to the trap when it was generated Mask - A representation of the MSU to be trapped, populated with the MSU field(s) values to be trapped on. If the Mask populated values match the equivalent MSU field values, a trap trigger indication is generated.

Script - Send MSU trapped to the user

Type - Call Progress Sequence MSU Trap

Origin - Side of the link that the MSU is to be trapped on - Receive/Transmit

Priority - Number from 0 to 5 that identifies the interrupt priority of the information - 1.

Master Proc ID - Number assigned by the "Reactive Trap Script" to identify Slave Stage 2 information User ID - Used to determine where the trap information is to be sent. The default value would be the Stage 2 Controller ID.

"Master Trap Information" contents include the following Information:

Link ID - Numeric designation for the link monitor that is experiencing the trouble CTRL Unit - The Stage 1 Controller ID that the monitor is controlled from Trap # - Number assigned to the trap when it was generated Mask - A representation of the MSU to be trapped, populated with the MSU field(s) values to be trapped on. If the Mask populated values match the equivalent MSU field values, a trap trigger indication is generated.

Script - Send MSU trapped to the user

Type - Call Progress Sequence MSU Trap

Origin - Side of the link that the MSU is to be trapped on - Receive/Transmit

Priority - Number from 0 to 5 that identifies the interrupt priority of the information - 1.

Master Proc ID - Number assigned by the "Reactive Trap Script" to identify Slave Stage 2 information User ID - Used to determine where the trap information is to be sent. The default value would be the Stage 2 Controller ID.

"Slave Trap Message" contents include the following information:

Link ID - Numeric designation for the link monitor that is experiencing the trouble CTRL Unit - The Stage 1 Controller ID that the monitor is controlled from Sub-System # - Name or number assigned to the Stage 2 process that originated the message Mask - A representation of the MSU to be trapped, populated with the MSU field(s) values to be trapped on. If the Mask populated values match the equivalent MSU field values, a trap trigger indication is generated.

Script - Send MSU trapped to the user

Type - Call Progress Sequence MSU Trap

Origin - Side of the link that the MSU is to be trapped on - Receive/Transmit

Priority - Number from 0 to 5 that identifies the interrupt priority of the information - 1.

Master Proc ID - Number assigned by the "Reactive Trap Script" to identify Slave Stage 2 information User ID - Used to determine where the trap information is to be sent. The default value would be the Stage 2 Controller ID.

"Slave Sequence Trap Information" contents include the following Information:

Link ID - Numeric designation for the link monitor that is experiencing the trouble CTRL Unit - The Stage 1 Controller ID that the monitor is controlled from Sub-System # - Name or number assigned to the Stage 2 process that originated the message Mask - A representation of the MSU to be trapped, populated with the MSU field(s) values to be trapped on. If the Mask populated values match the equivalent MSU field values, a trap trigger indication is generated.

Script - Send MSU trapped to the user

Type - Call Progress Sequence MSU Trap

Origin - Side of the link that the MSU is to be trapped on - Receive/Transmit

Priority - Number from 0 to 5 that identifies the interrupt priority of the information - 1.

Master Proc ID - Number assigned by the "Reactive Trap Script" to identify Slave Stage 2 information User ID - Used to determine where the trap information is to be sent. The default value would be the Stage 2 Controller ID.

"Master Acknowledgment Message" contents include the following information:

Trap Type - Indicates what kind of trap was placed ("Response Trap" or "Response MSU")

Link ID - Numeric designation for the monitor the link is attached to

CTRL Unit - The Stage 1 Controller ID that the monitor is controlled from

Sub-System # - Name or number assigned to the Stage 2 process that originated the message Trap # - Number assigned to the trap Time - Time that the New Reactive MSU was detected Origin - Indicates whether the information is for link transmit or receive Script # - Left blank Master Proc ID - Number assigned by the "Reactive Trap Script" to identify Slave Stage 2 information User ID - A number or Alpha-numeric character string used to identify where to send information when the MSU is triggered. Default Stage 2 (Master Stage 2).

There will be as many of these messages generated as there are "Call Progress Sequence MSU Traps" placed in the "Trap Database".

"Master Acknowledgment Information" contents include the following information:

Trap Type - Indicates what kind of trap was placed ("Response Trap" or "Response MSU")

Link ID - Numeric designation for the monitor the link is attached to

CTRL Unit - The Stage 1 Controller ID that the monitor is controlled from

Sub-System # - Name or number assigned to the Stage 2 process that originated the message Trap # - Number assigned to the trap Time - Time that the New Reactive MSU was detected Origin - Indicates whether the information is for link transmit or receive Script # - Left blank Master Proc ID - Number assigned by the "Reactive Trap Script" to identify Slave Stage 2 information User ID - A number or Alpha-numeric character string used to identify where to send information when the MSU is triggered. Default Stage 2 (Master Stage 2).

There will be as many of this information decoded as there were "Call Progress Sequence MSU Traps" in the Slave Stage 2 process's "Trap Database.

When "Call Progress Sequence MSU Traps" trigger in monitors controlled by the "Slave Stage 2 Process", "Call Progress Sequence MSU Trap Triggered Information" is sent from the "Control Stage 2 Communication and Message Handling" (P3) process. This information is compared against information in the "Trap Database" (P4-7). If the "User ID" is different than the Stage 2 process, "Slave Trap Triggered Information" is generated (P7-7). This information is formatted into "Master Trap Triggered Message" (P9-10-3) and sent to the appropriate "Master Stage 2 Process" via the "AUX 1 Port".

The "Master Trap Triggered Message" is decoded into "Slave Trap Triggered Information" (P9-10-7) and sent to the "Analyze Exceeded Threshold and CPG Trap Information" (P4) process.

The "Call Progress Sequence MSU Trap Triggered Information" contents include the following information:

Link ID - Numeric designation for the monitor the link is attached to

CTRL Unit - The Stage 1 Controller ID that the monitor is controlled from

Trap Number - Number assigned to the Response Trap in the monitor

Type - CPG Sequence

Time - Time that the Response Trap was triggered

MSU - The MSU message that was trapped

Priority - A number representing the interrupt priority of the trap

Origin - Indicates whether the trap is for link transmit or receive

Master Proc ID - Number assigned by the "Reactive Trap Script" to identify Slave Stage 2 information User ID - A number or Alpha-numeric character string used to identify where to send information when the trap is triggered

OR

Link ID - Numeric designation for the monitor the link is attached to

CTRL Unit - The Stage 1 Controller ID that the monitor is controlled from

Trap Number - Number assigned to the Trap in the monitor

Type - CPG Sequence

Time - Time that the trap was triggered

Trigger Information - Indication that the trap was triggered

Priority - A number representing the interrupt priority of the trap

Origin - Indicates whether the trap is for link transmit or receive

Master Proc ID - Number assigned by the "Reactive Trap Script" to identify Slave Stage 2 information User ID - A number or Alpha-numeric character string used to identify where to send information when the trap is triggered The "Slave Trap Triggered Information" contents include the following information:

Link ID - Numeric designation for the monitor the link is attached to

CTRL Unit - The Stage 1 Controller ID that the monitor is controlled from

Trap Number - Number assigned to the Response Trap in the monitor

Type - CPG Sequence

Time - Time that the Response Trap was triggered

MSU - The MSU message that was trapped

Priority - A number representing the interrupt priority of the trap

Origin - Indicates whether the trap is for link transmit or receive

Master Proc ID - Number assigned by the "Reactive Trap Script" to identify Slave Stage 2 information User ID A number or Alpha-numeric character string used to identify where to send information when the trap is triggered

OR

Link ID - Numeric designation for the monitor the link is attached

CTRL Unit - The Stage 1 Controller ID that the monitor is controlled from

Trap Number - Number assigned to the Trap in the monitor

Type - CPG Sequence

Time - Time that the trap was triggered

Trigger Information - Indication that the trap was triggered

Priority - A number representing the interrupt priority of the trap

Origin - Indicates whether the trap is for link transmit or receive

Master Proc ID - Number assigned by the "Reactive Trap Script" to identify Slave Stage 2 information User ID - A number or Alpha-numeric character string used to identify where to send information when the trap is triggered The "Master Trap Triggered Message" contents include the following information Link ID - Numeric designation for the monitor the link is attached to CTRL Unit - The Stage 1 Controller ID that the monitor is controlled from Sub-System # - Name or number assigned to the Stage 2 process that originated the message Trap Number - Number assigned to the Response Trap in the monitor Type - CPG Sequence Time - Time that the Response Trap was triggered MSU - The MSU message that was trapped Priority - A number representing the interrupt priority of the trap Origin - Indicates whether the trap is for link transmit or receive Master Proc ID - Number assigned by the "Reactive Trap Script" to identify Slave Stage 2 information User ID - A number or Alpha-numeric character string used to identify where to send information when the trap is triggered

OR

Link ID - Numeric designation for the monitor the link is attached

The Stage 1 Controller ID that the monitor is controlled from

Sub-System # - Name or number assigned to the Stage 2 process that originated the message Trap Number - Number assigned to the Trap in the monitor Type - CPG Sequence Time - Time that the trap was triggered Trigger Information - Indication that the trap was triggered Priority - A number representing the interrupt priority of the trap Origin - Indicates whether the trap is for link transmit or receive Master Proc ID - Number assigned by the "Reactive Trap Script" to identify Slave Stage 2 information User ID - A number or Alpha-numeric character string used to identify where to send information when the trap is triggered The "Slave Trap Triggered Information" contents include the following information:

Link ID - Numeric designation for the monitor the link is attached to

CTRL Unit - The Stage 1 Controller ID that the monitor is controlled from

Sub-System # - Name or number assigned to the Stage 2 process that originated the message Trap Number - Number assigned to the Response Trap in the monitor Type - CPG Sequence Time - Time that the Response Trap was triggered MSU - The MSU message that was trapped Priority - A number representing the interrupt priority of the trap Origin - Indicates whether the trap is for link transmit or receive Master Proc ID - Number assigned by the "Reactive Trap Script" to identify Slave Stage 2 information User ID - A number or Alpha-numeric character string used to identify where to send information when the trap is triggered

OR

Link ID - Numeric designation for the monitor the link is attached to

CTRL Unit - The Stage 1 Controller ID that the monitor is controlled from

Sub-System # - Name or number assigned to the Stage 2 process" that originated the message Trap Number - Number assigned to the Trap in the monitor Type - CPG Sequence Time - Time that the trap was triggered Trigger Information - Indication that the trap was triggered Priority - A number representing the interrupt priority of the trap Origin - Indicates whether the trap is for link transmit or receive Master Proc ID - Number assigned by the "Reactive Trap Script" to identify Slave Stage 2 information User ID - A number or Alpha-numeric character string used to identify where to send information when the trap is triggered "Slave Response MSU Information"

"Slave Response Reactive MSU Information"

"Slave Delete CPG Trap Information"

"Slave Delete Response Trap Information"

Figures 1, 31:
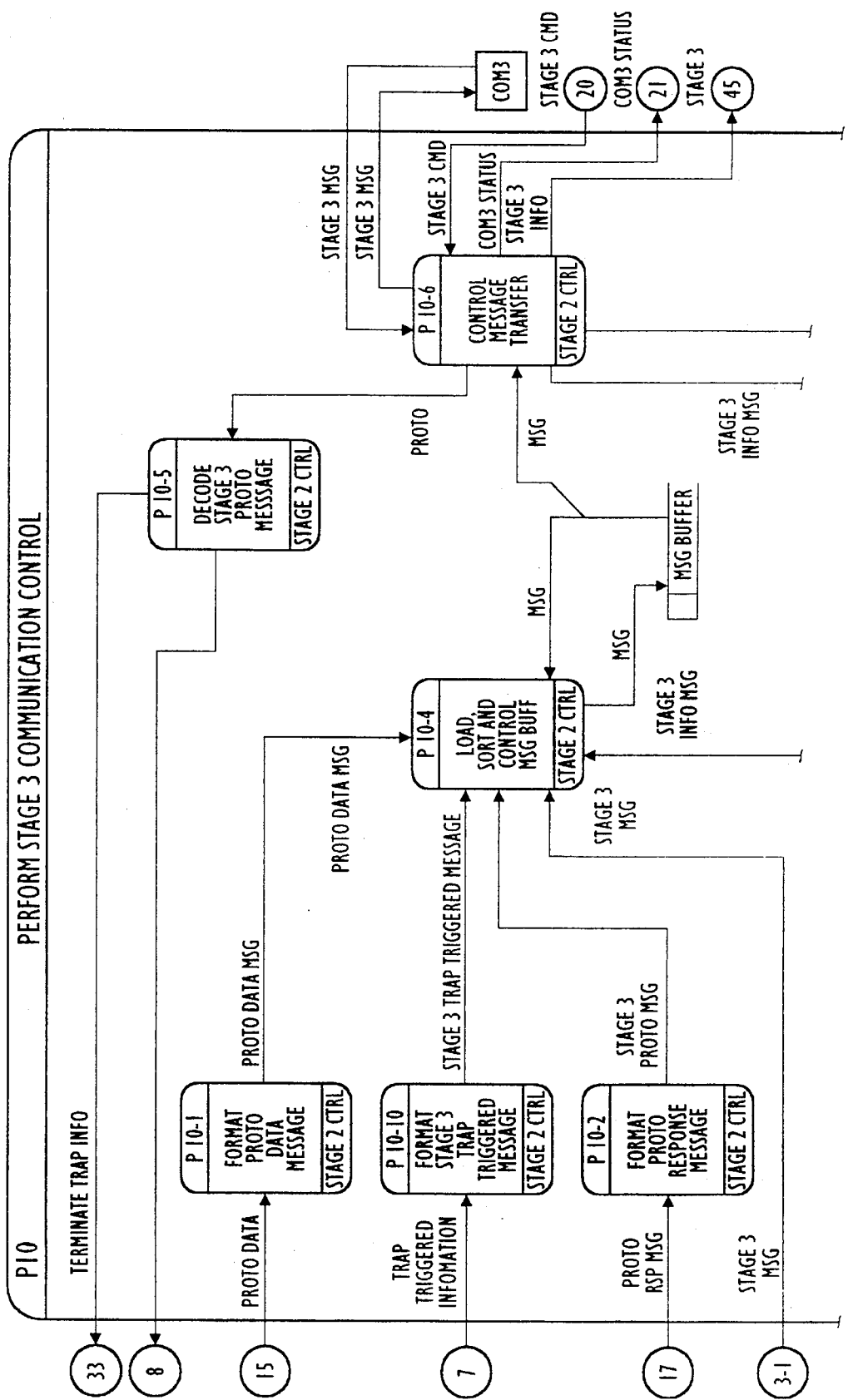
Figures 2, 31:
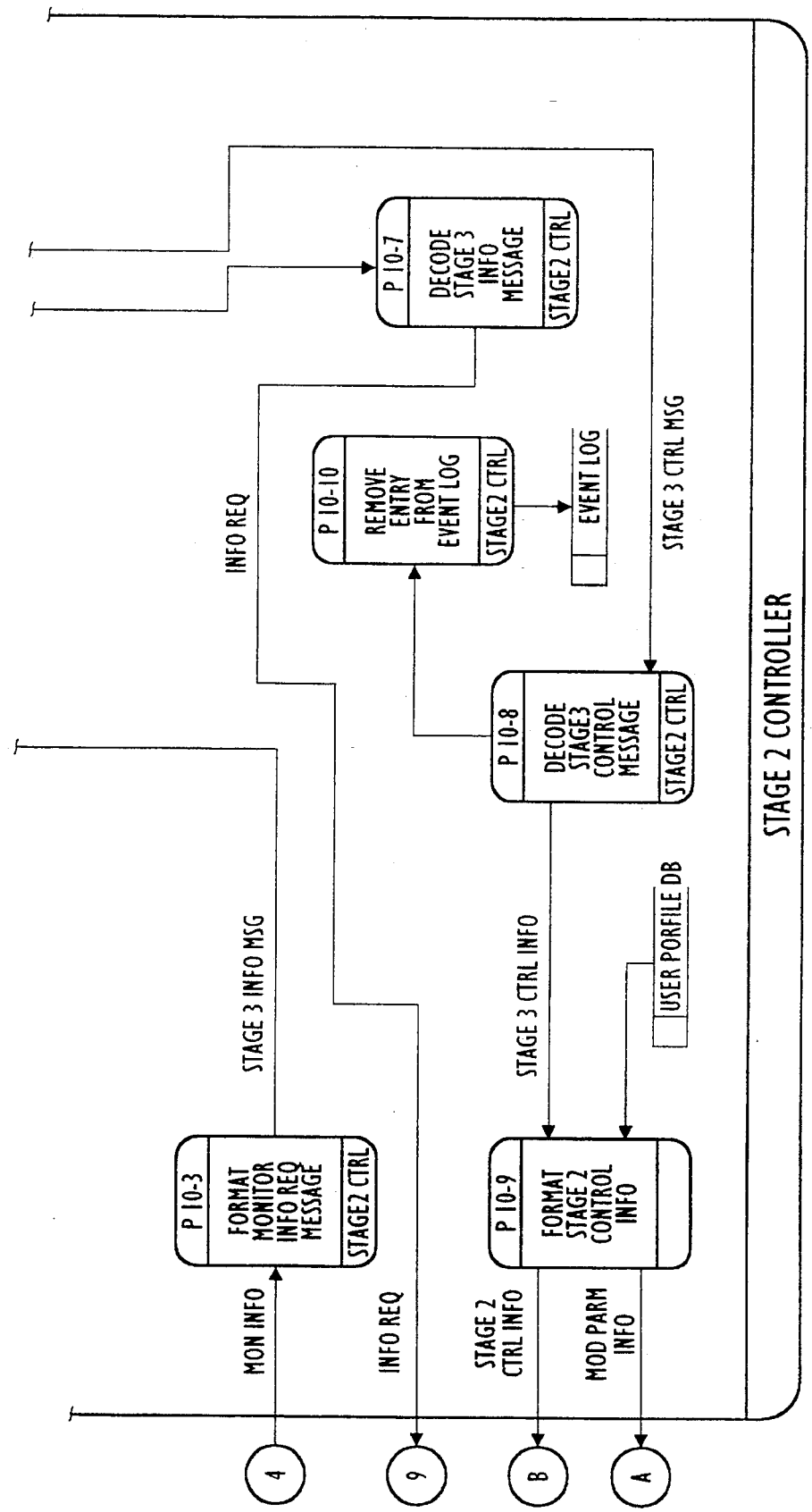
Figures 1, 32:
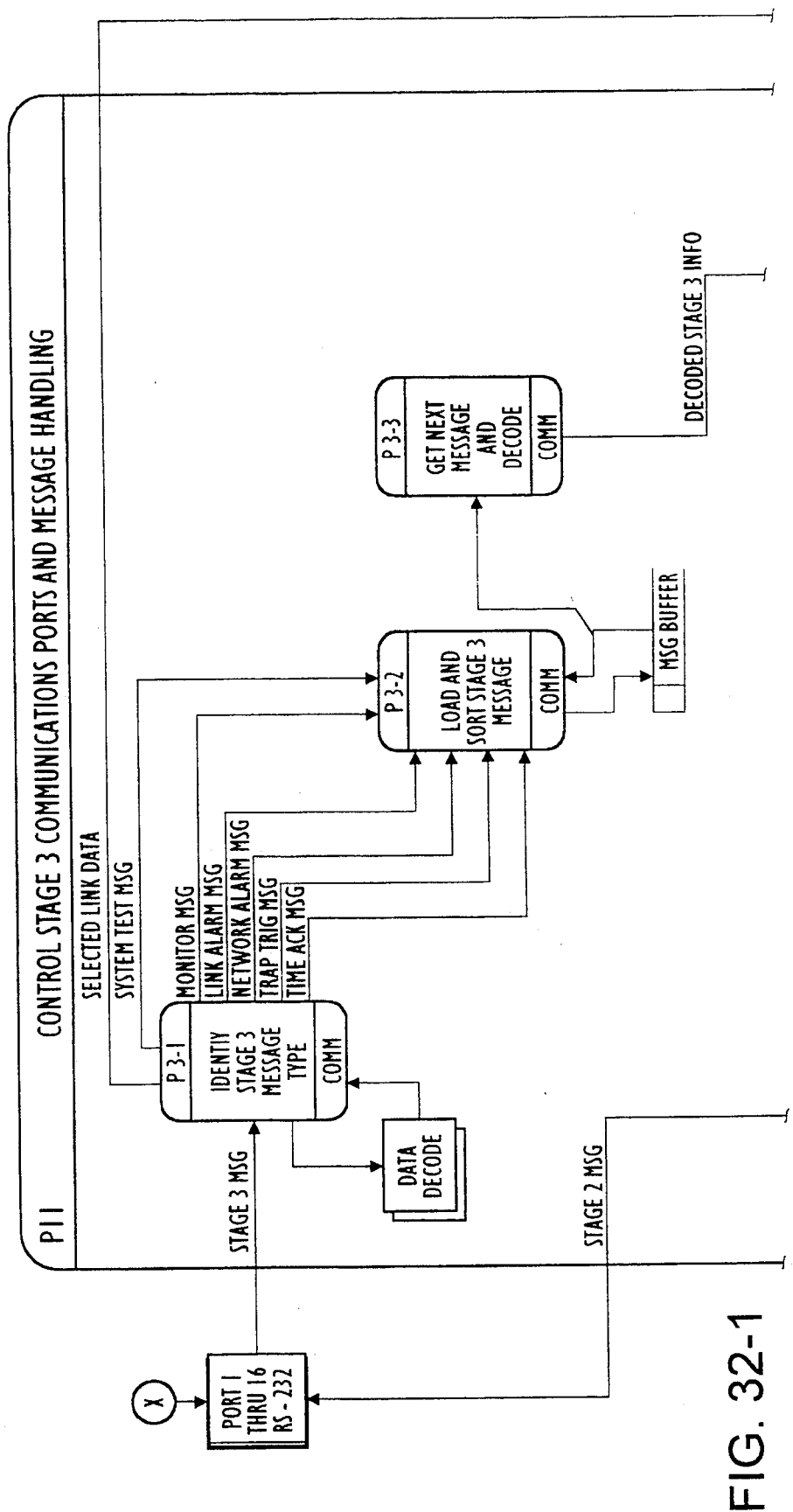
FIGS. 32–42 show the Stage 3 Controller flow.
Figures 2, 32:
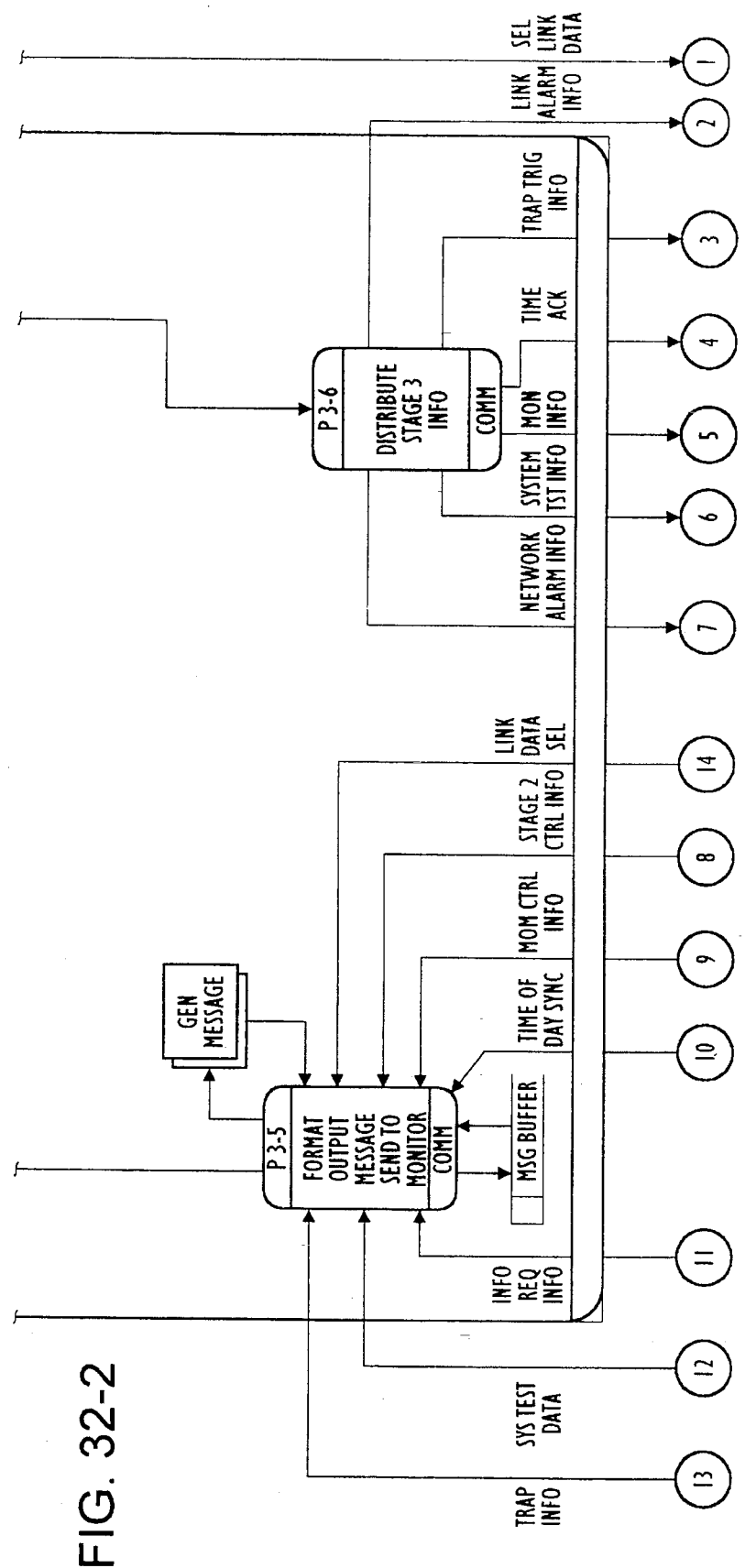
Figures 1, 33:
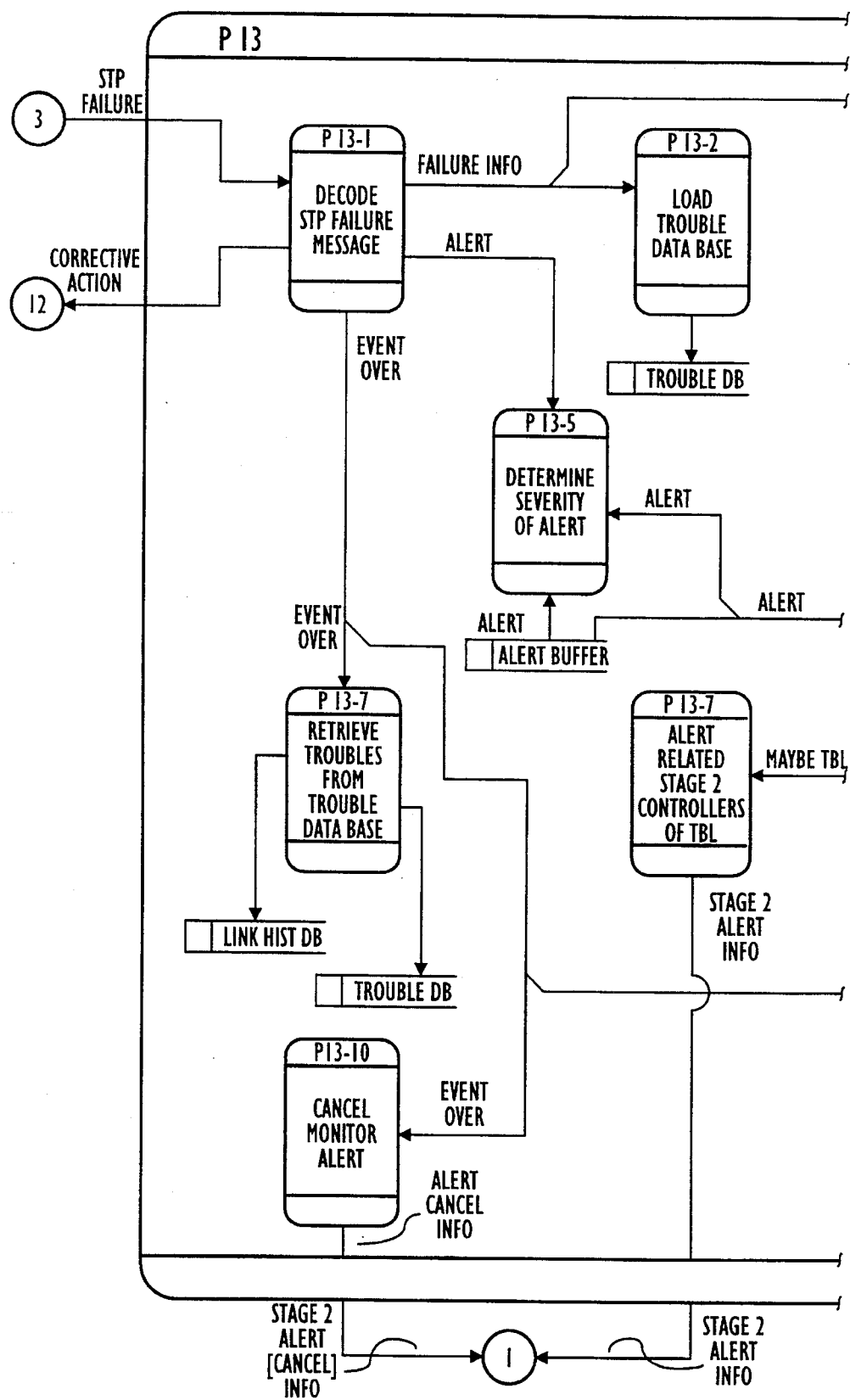
Figures 2, 33:
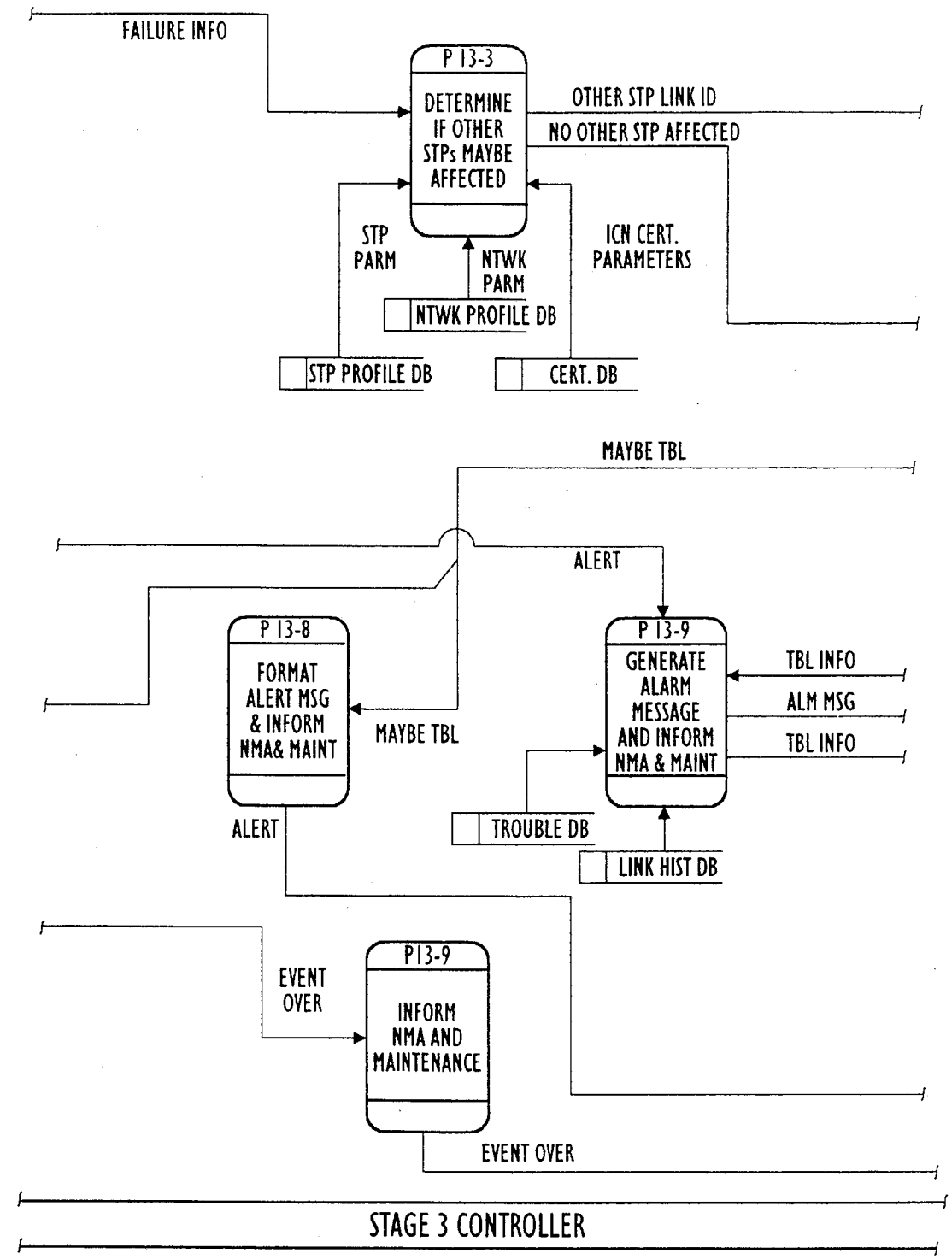
Figure 34:
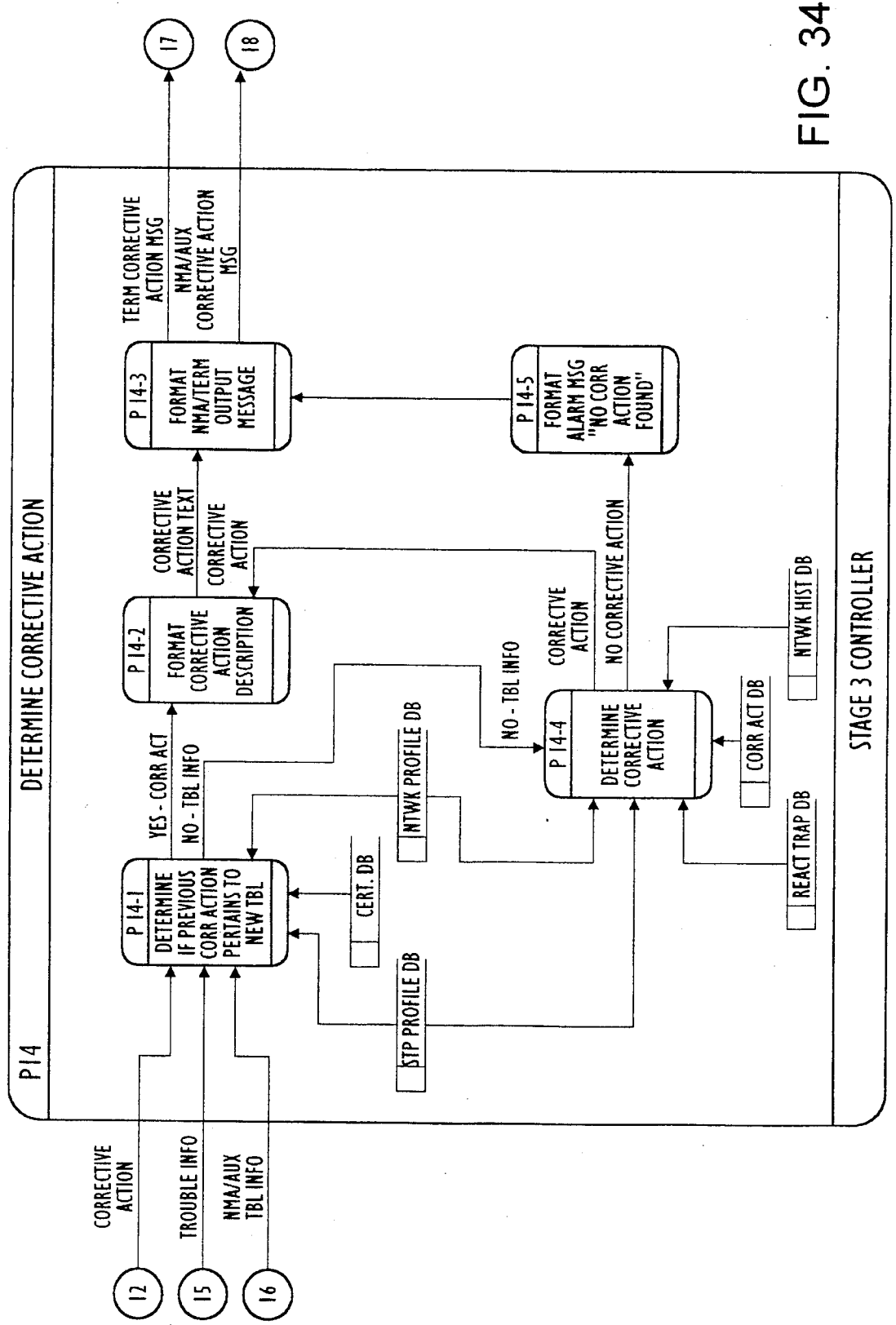
Figure 35:
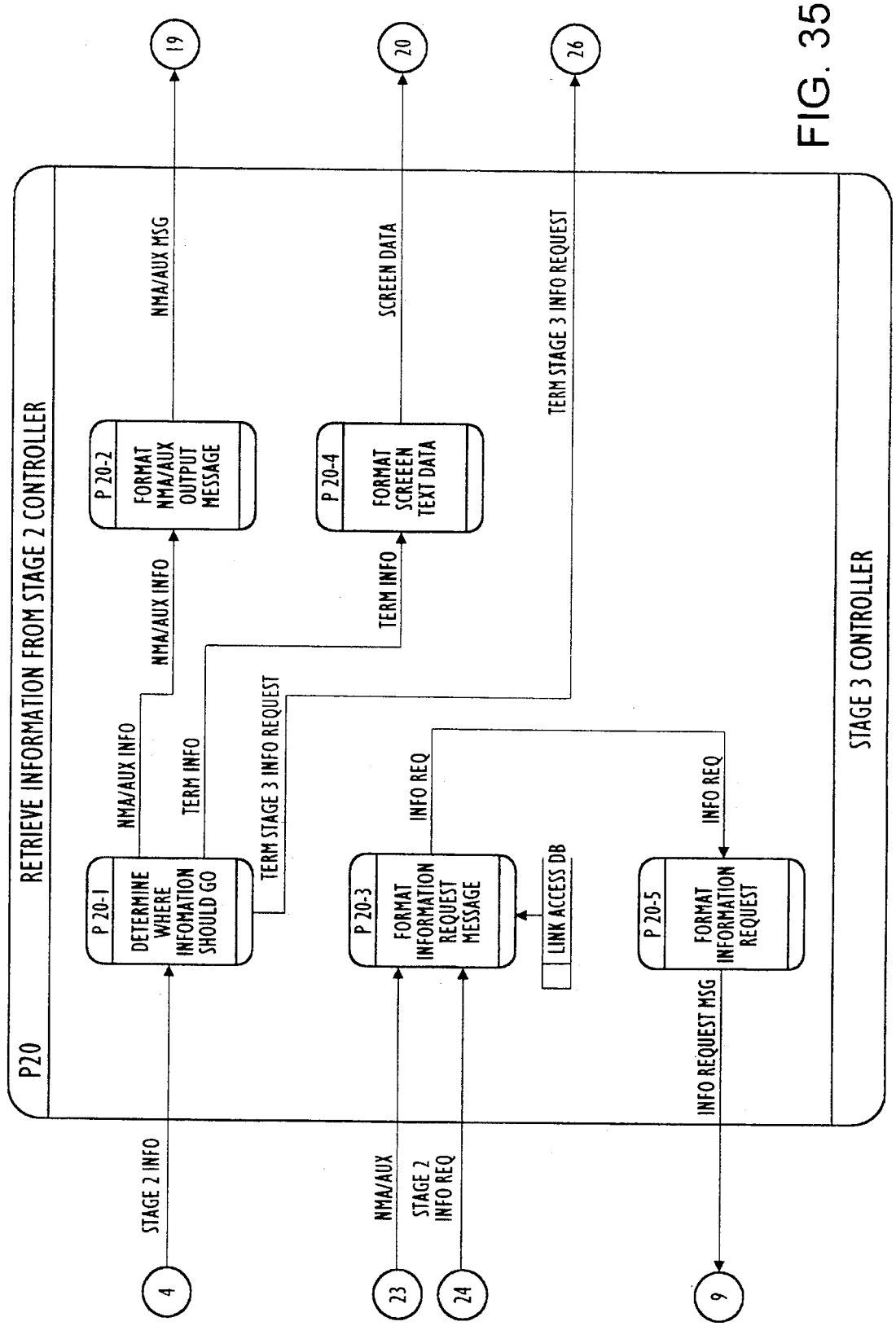
Figures 1, 36:
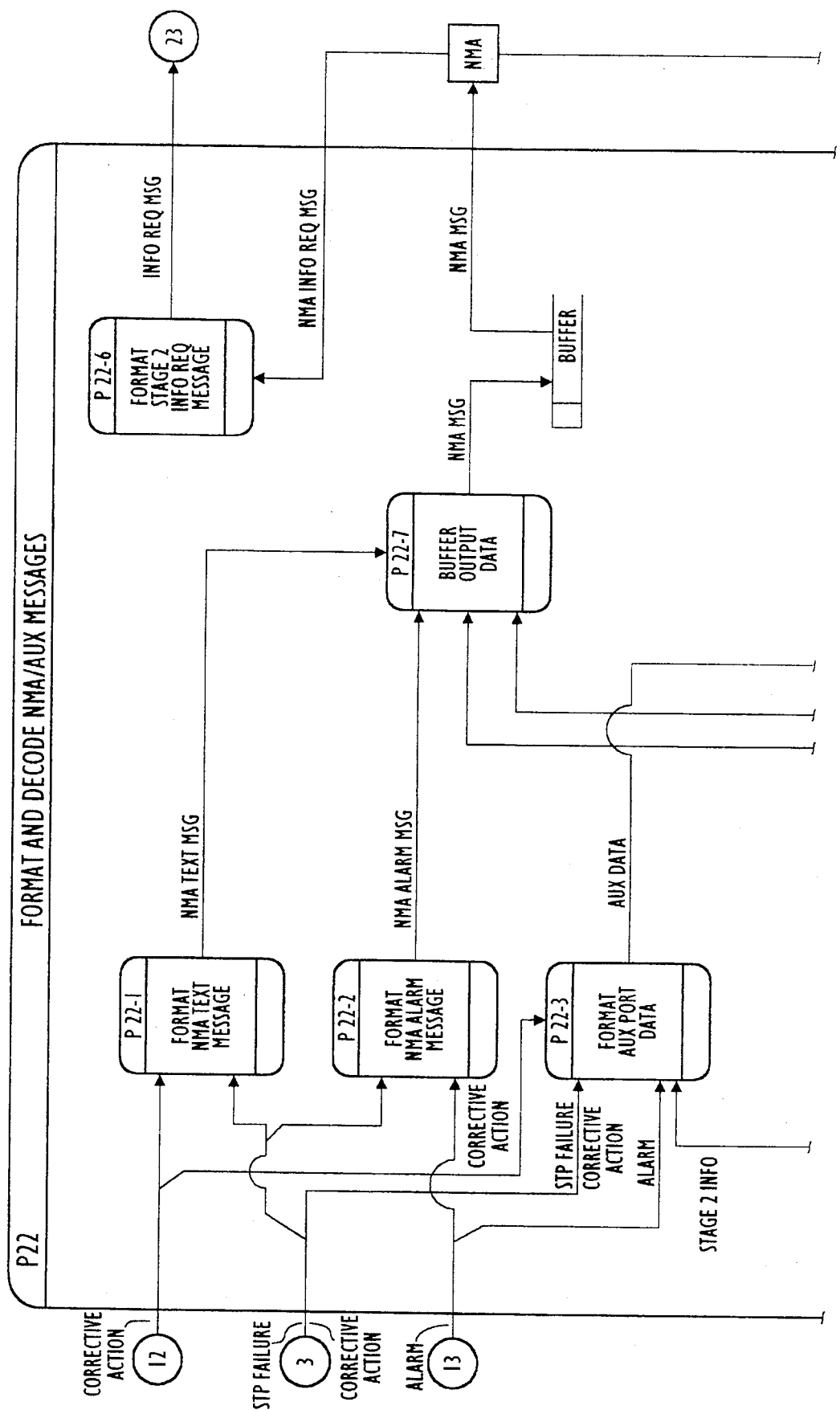
Figures 2, 36:
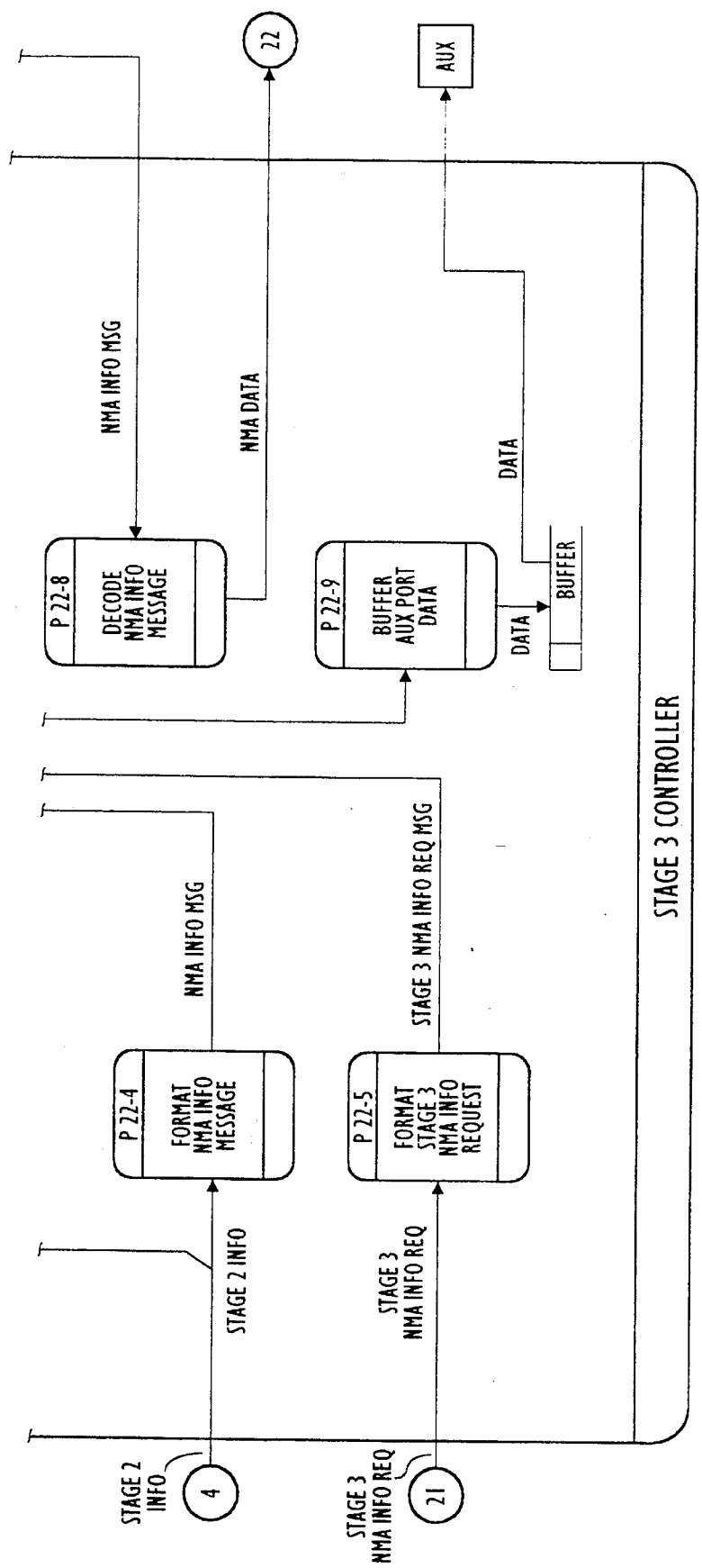
Figures 1, 37:
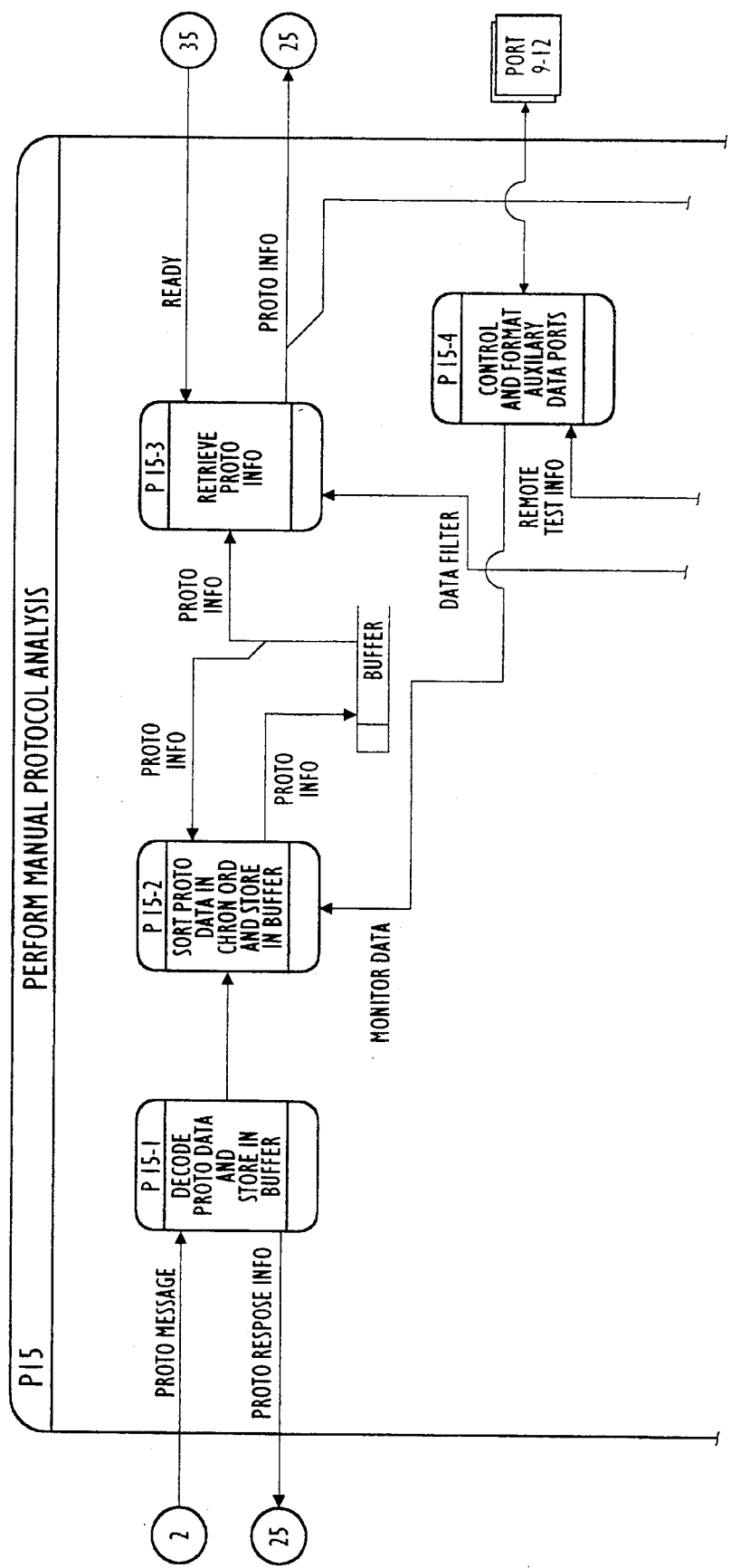
Figures 2, 37:
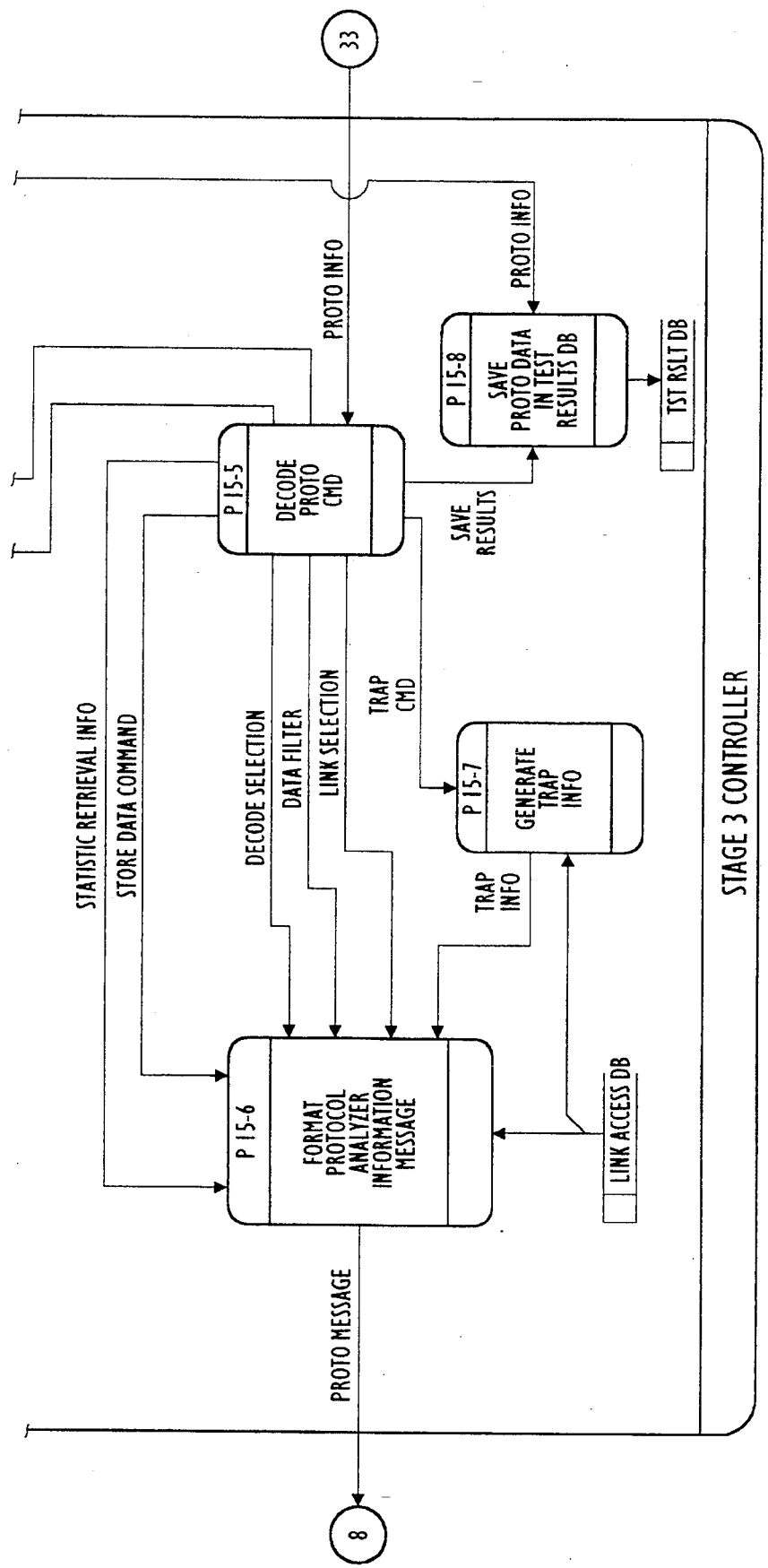
Figure 38:
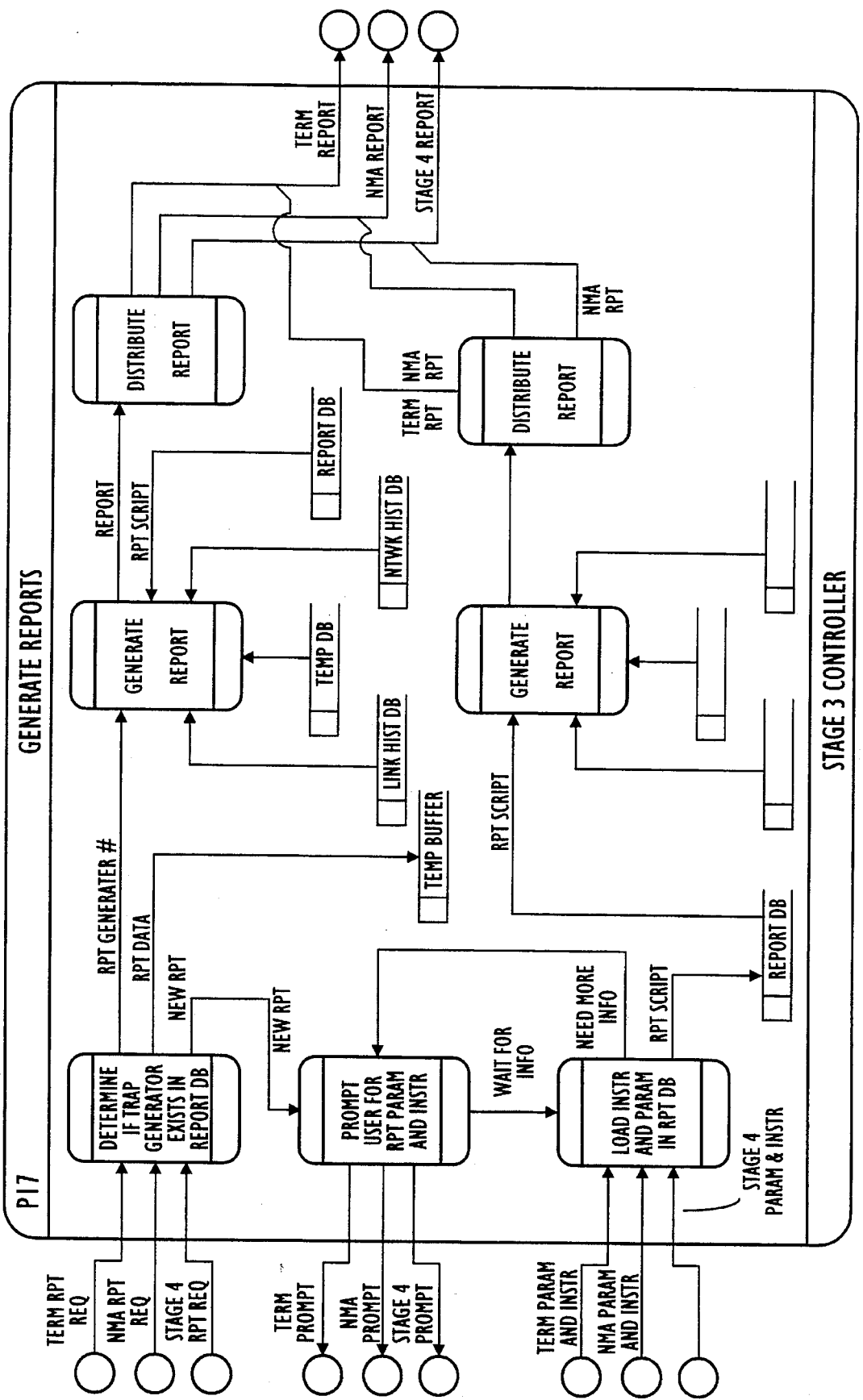
Figures 1, 39:
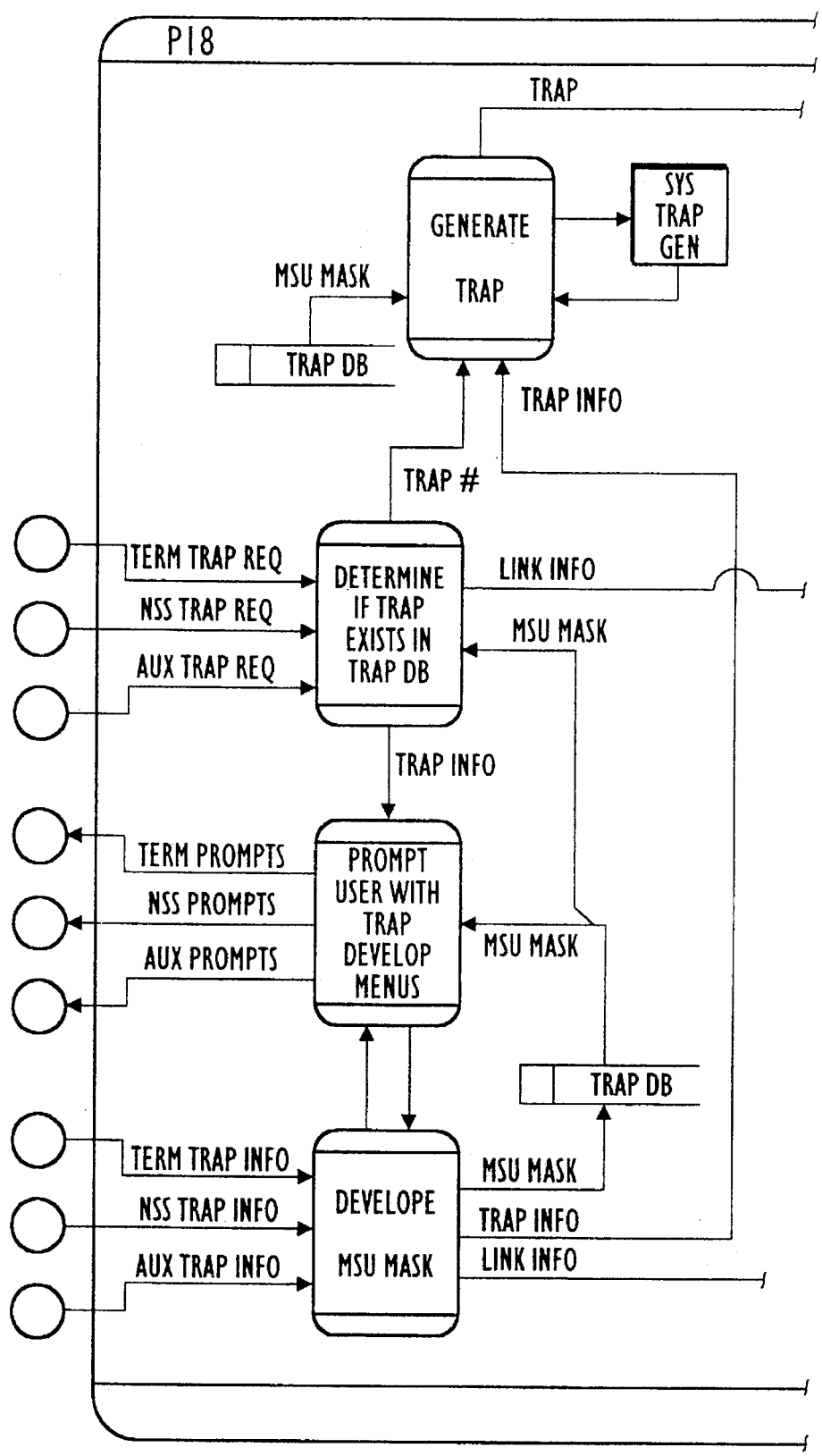
Figures 2, 39:
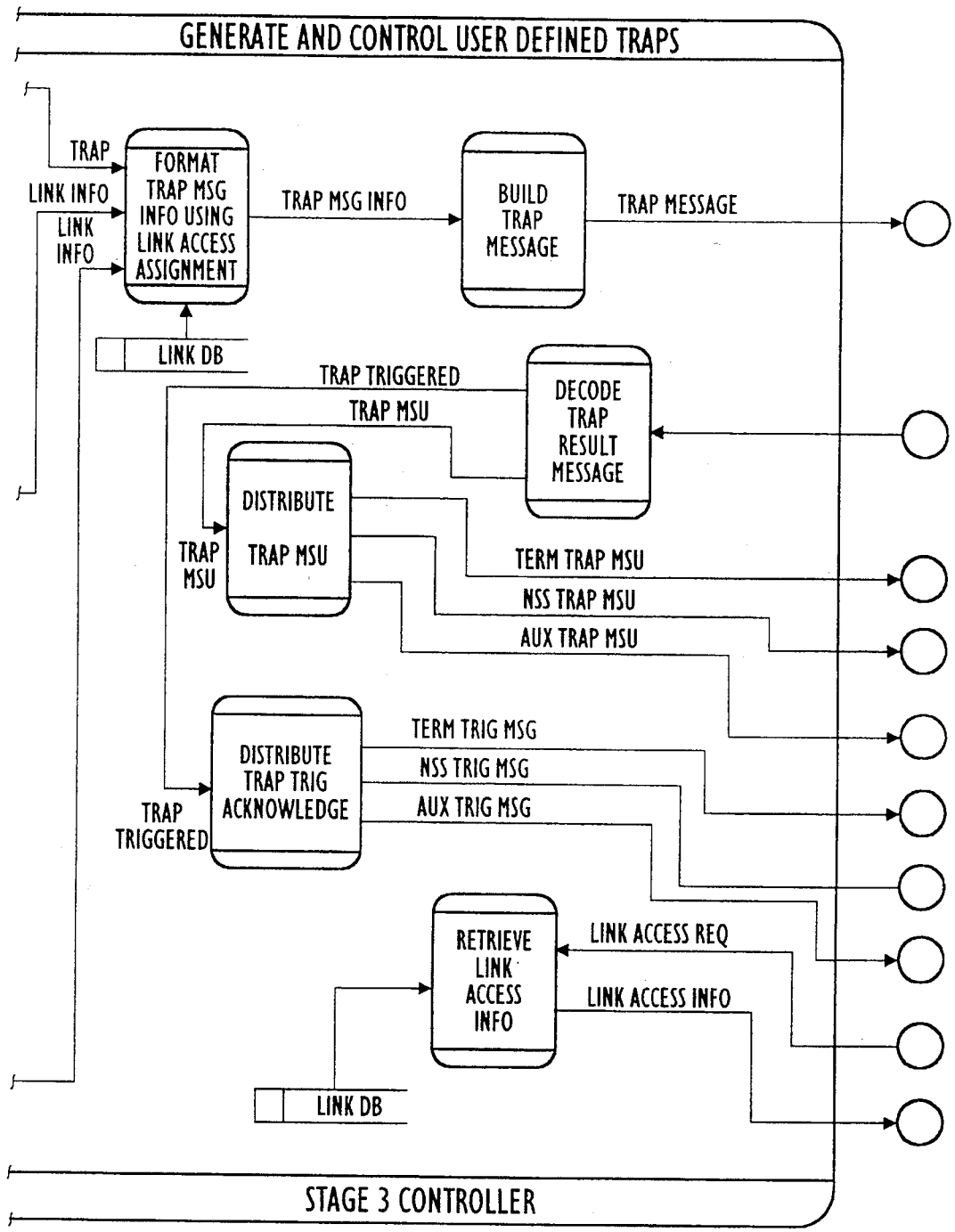
Figures 1, 40:
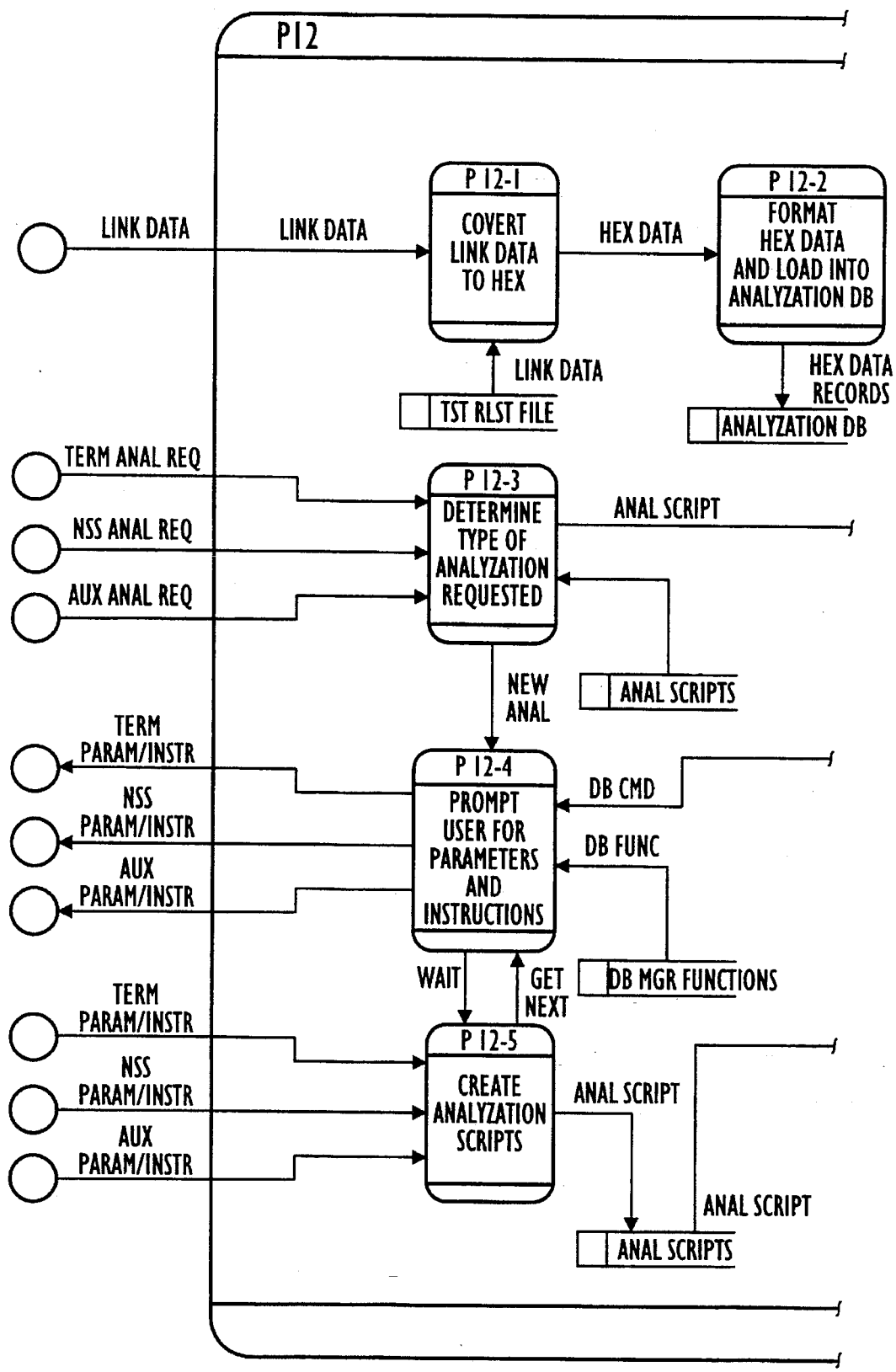
Figures 2, 40:
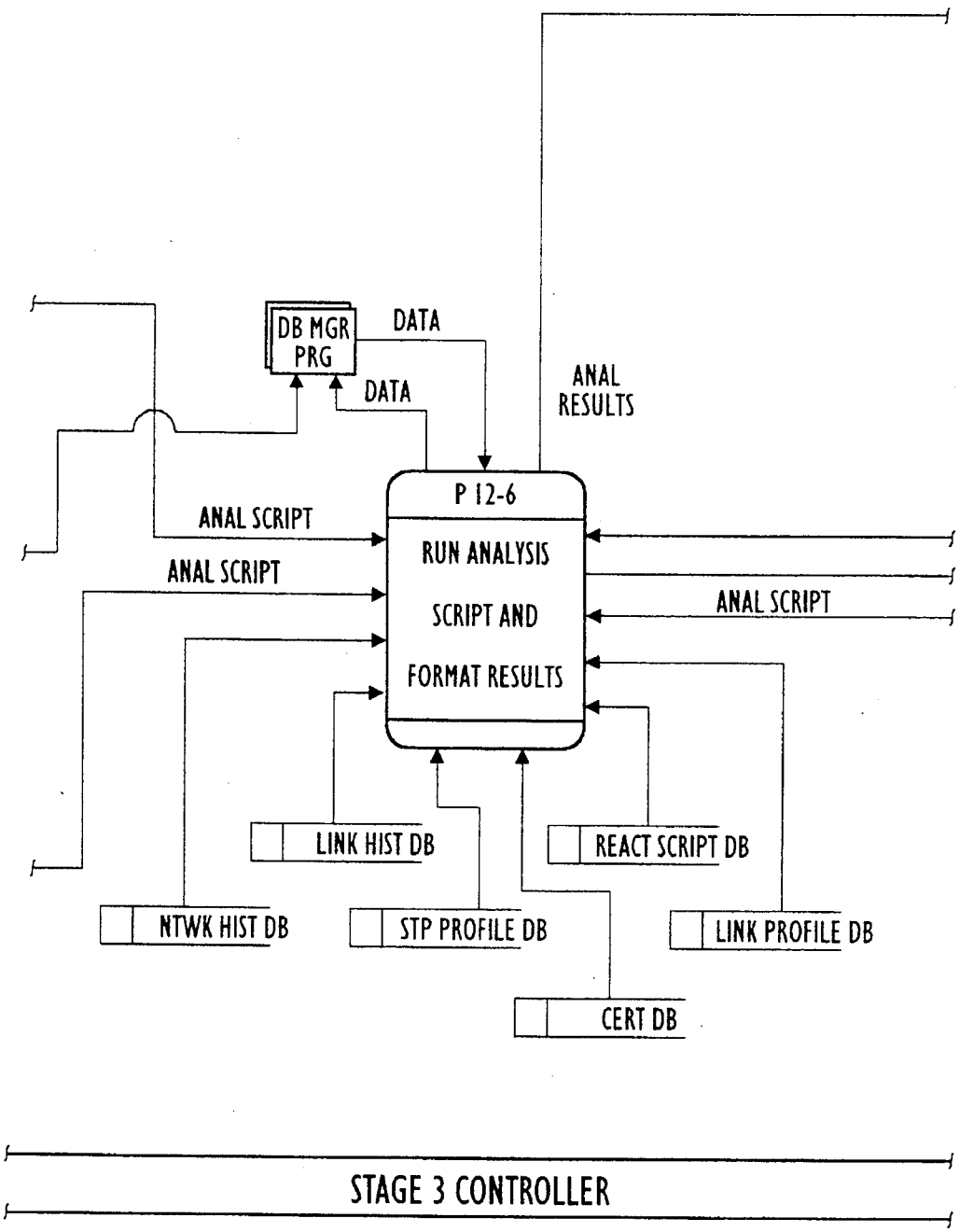
Figures 3, 40:
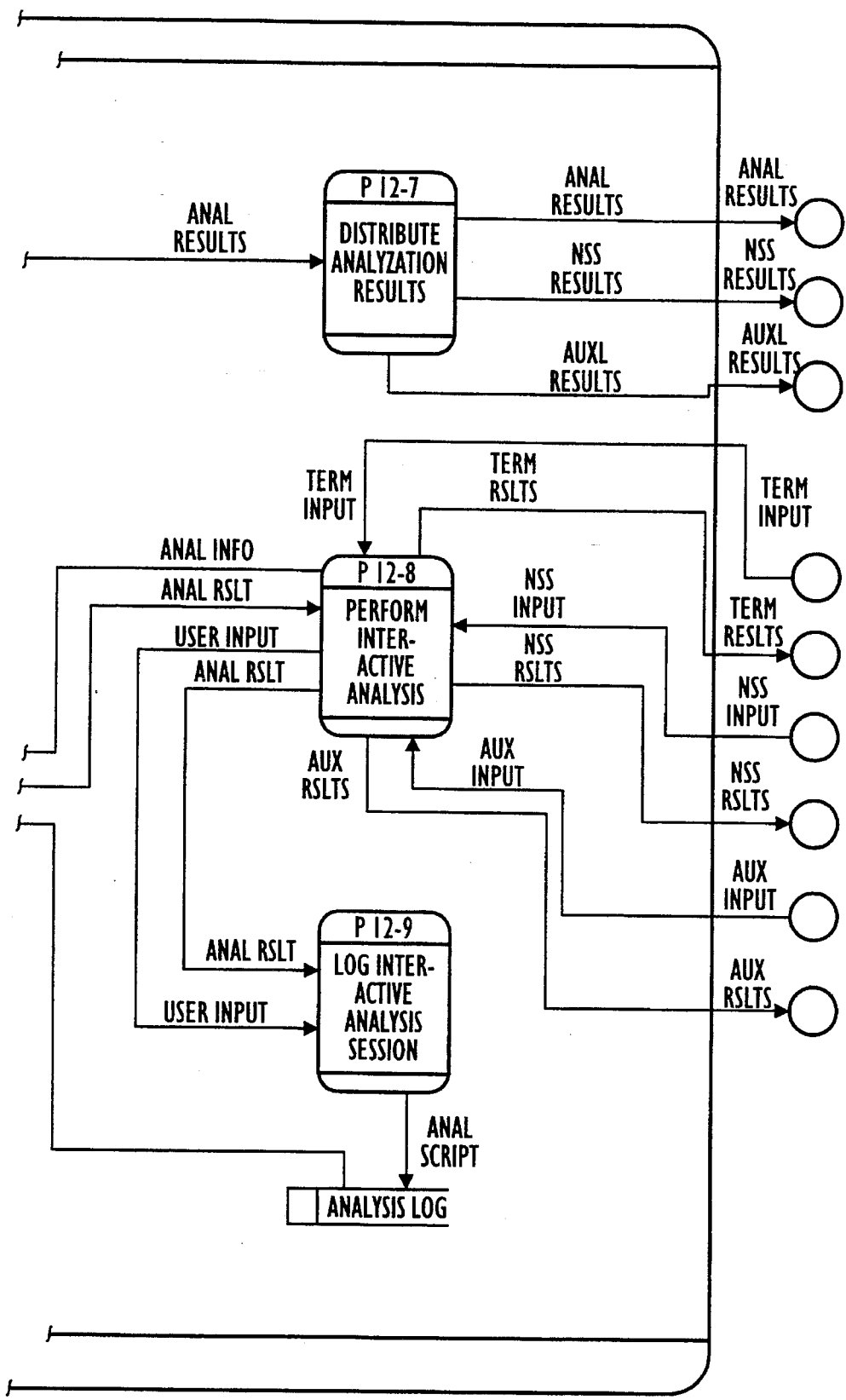
Figures 1, 41:
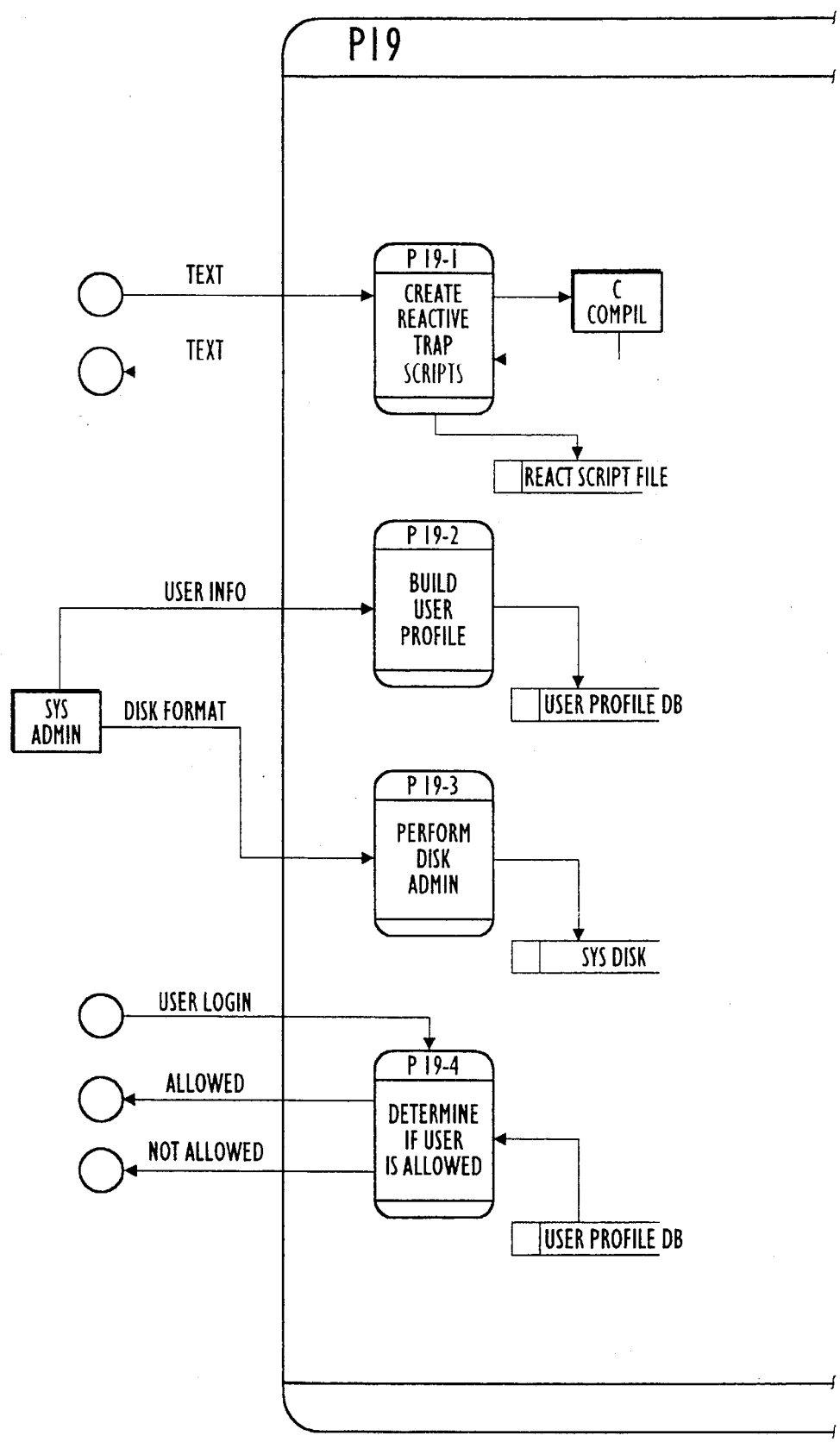
Figure 41:
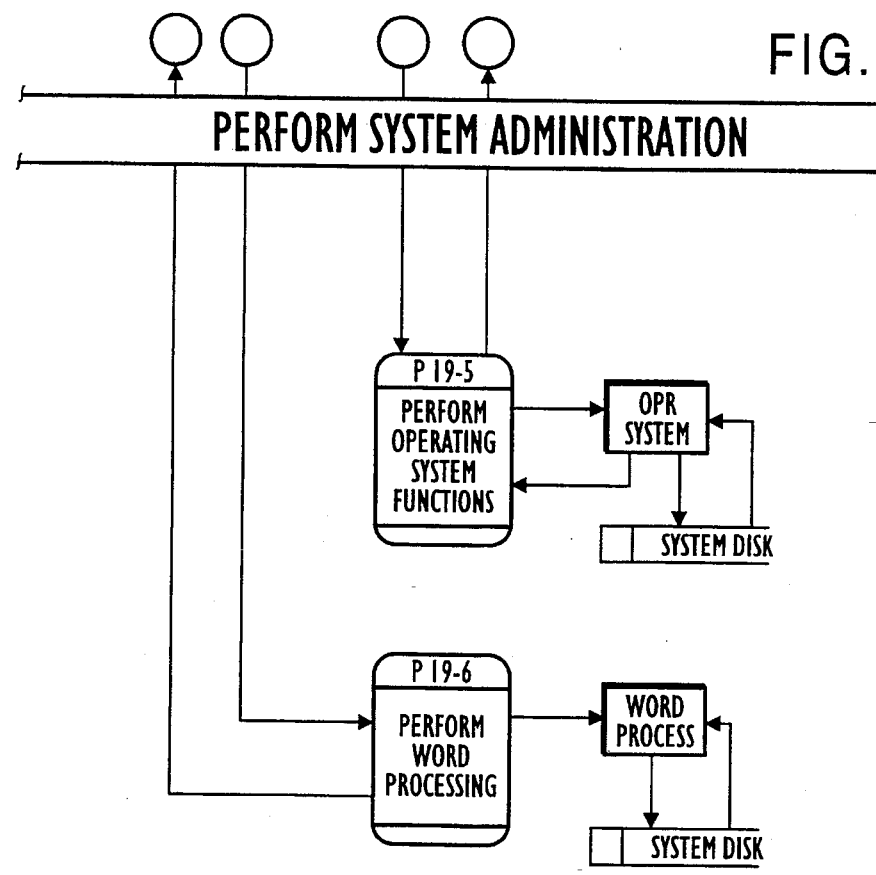
Figure 2:
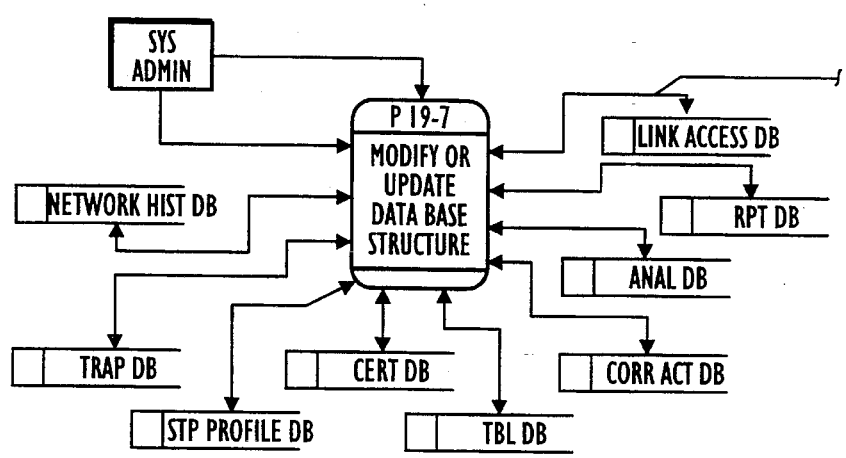
Figures 3, 41:
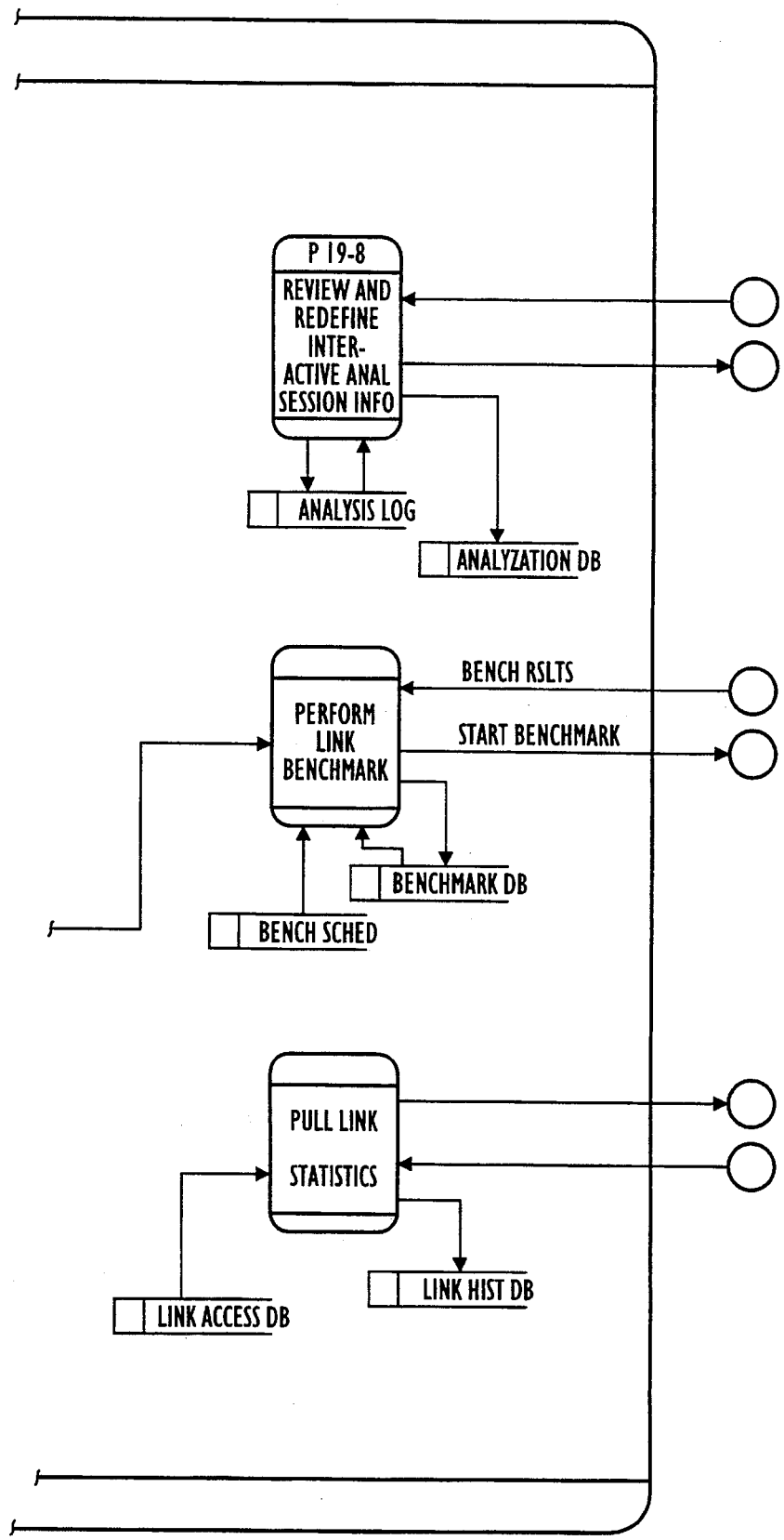
Figures 1, 42:
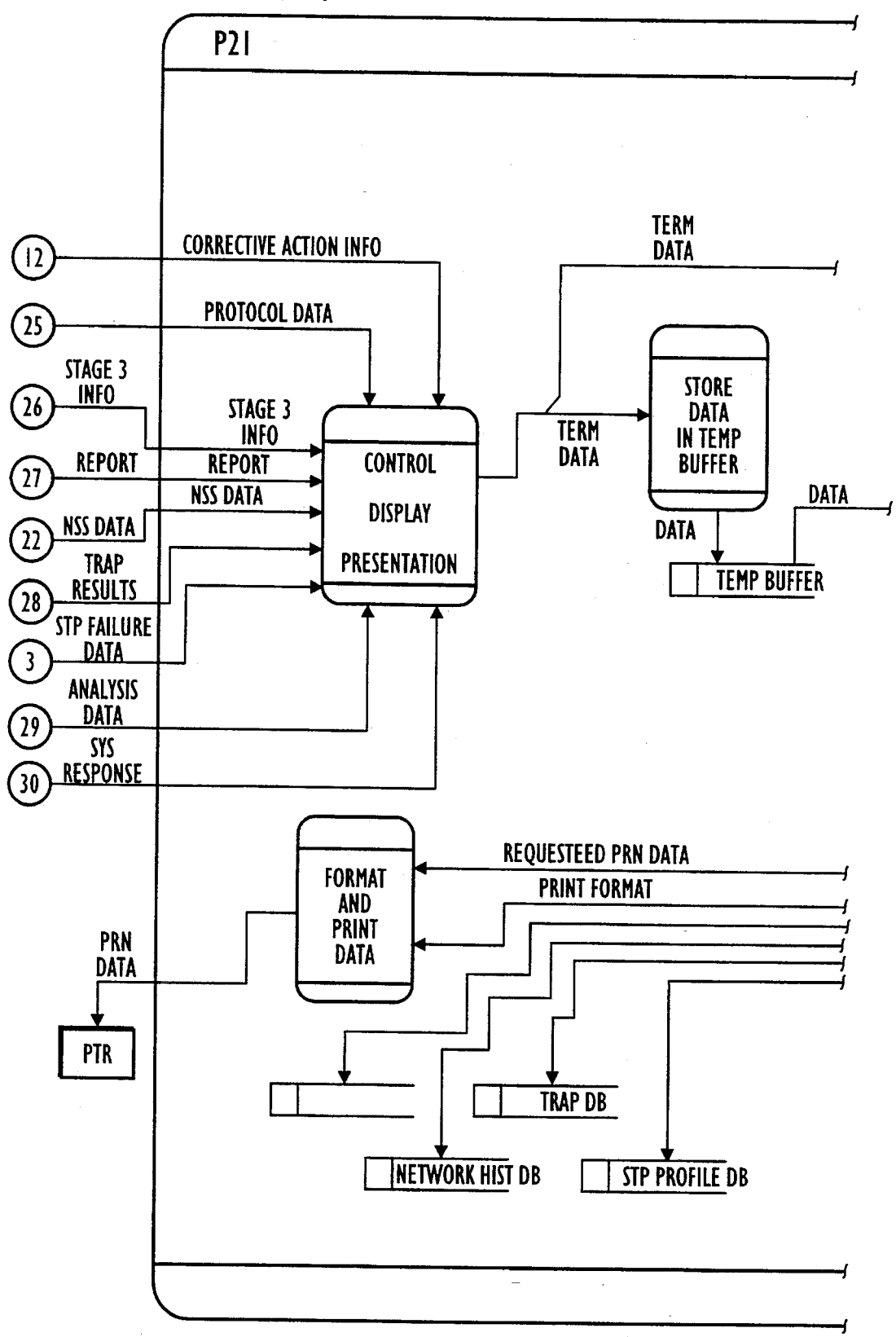
Figures 2, 42:
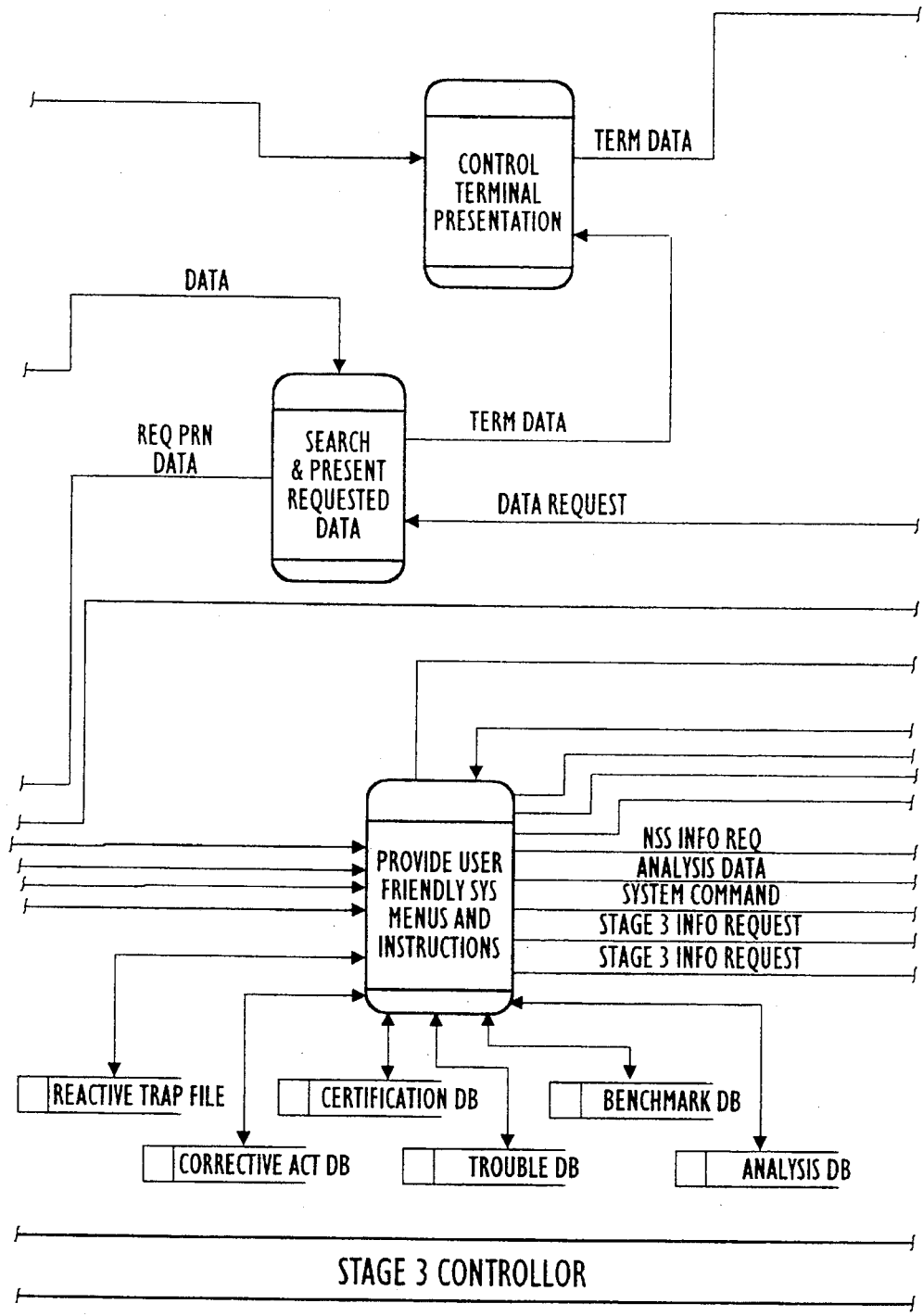
Figures 3, 42:
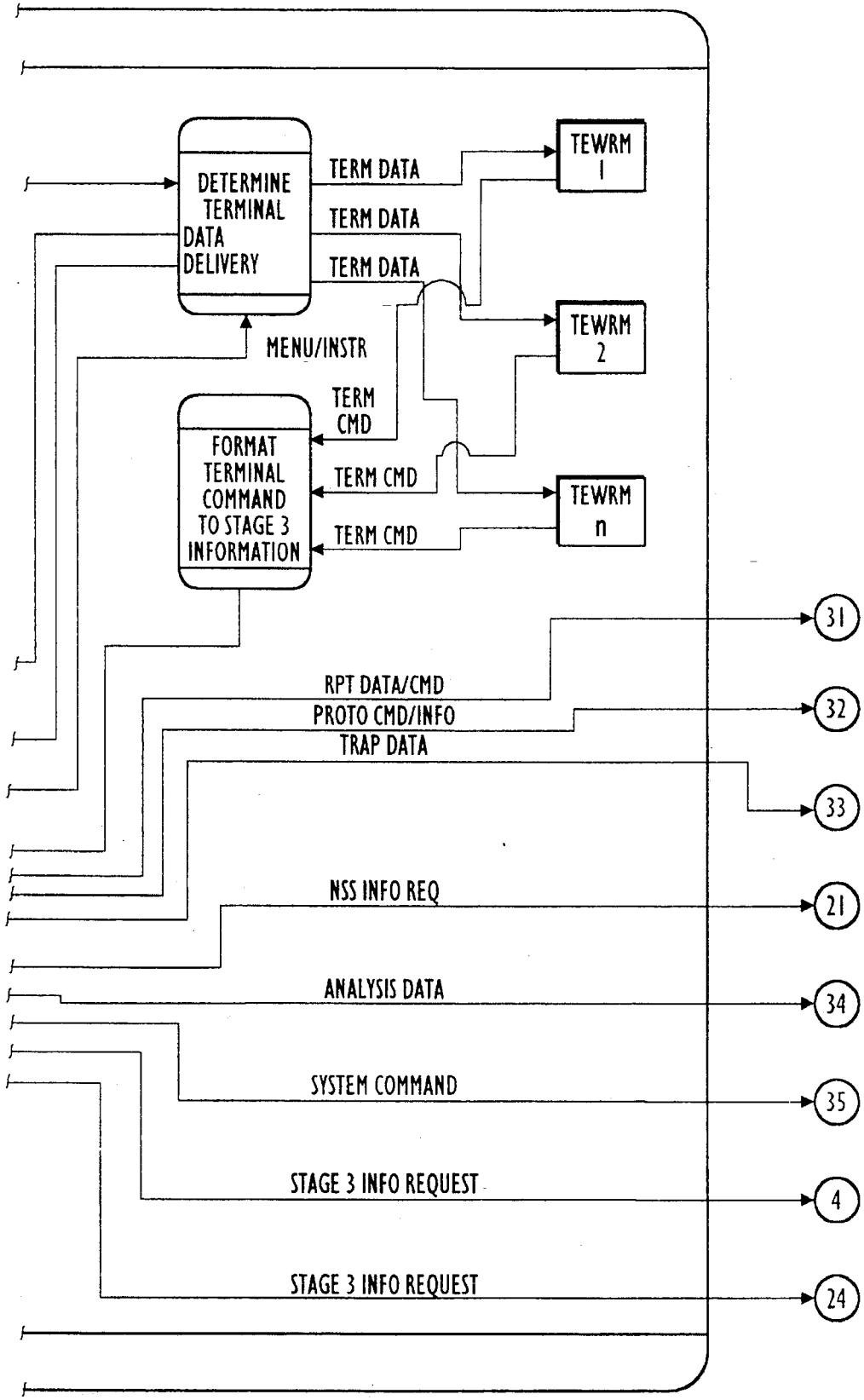

Manually Initiate Monitor, Stage 1 and Stage 2 System Tests P10 Process Information Reference is had to FIGS. 12A and 31.

"Major Event Alarm Message" contents include the following information:

Link ID - Numeric designation for the link monitor that is experiencing the trouble CTRL Unit - The Stage 1 Controller ID that the monitor is controlled from Severity # - A number representing the severity of the trouble Time - Time that the alarm was detected Priority - A number representing the interrupt priority of the message. Priority=0.

Origin - Indicates whether the trouble is on the link transmit or receive

User ID - A number or Alpha-numeric character string used to identify where to send information when the trap is triggered. Default value is the Stage 3 Controller.

"Major Event Information" contents include the following information:

Link ID - Numeric designation for the link monitor that is experiencing the trouble CTRL Unit - The Stage 1 Controller ID that the monitor is controlled from Severity # - A number representing the severity of the trouble Time - Time that the alarm was detected Priority - A number representing the interrupt priority of the message. Priority=0.

Origin - Indicates whether the trouble is on the link transmit or receive

User ID - A number or Alpha-numeric character string used to identify where to send information when the trap is triggered. Default value is the Stage 3 Controller.

"Stage 3 Major Event Alarm Message" contents include the following information:

Network - Number or alpha-numeric character string used to identify the network the Stage 2 process is controlling.

Link ID - Numeric designation for the link monitor that is experiencing the trouble CTRL Unit - The Stage 1 Controller ID that the monitor is controlled from Severity # - A number representing the severity of the trouble Time - Time that the alarm was detected Priority - A number representing the interrupt priority of the message. Priority=0.

Origin - Indicates whether the trouble is on the link transmit or receive

User ID - A number or Alpha-numeric character string used to identify where to send information when the trap is triggered. Default value is the Stage 3 Controller.

When either Stage 2 or Stage 3 determine that monitor functions are to be suspended, terminated or changed, "Stage 2 Control Information {B}" is generated (P5) or decoded from a "Stage 3 Control Message" (P10-8) sent from the Stage 3 process. This information is then formatted into a "Stage 1 Control Message" (P10-9) and sent to the appropriate Stage 1 process. The "Stage 3 Control Message" is received via the "Perform Stage 3 Communication and Control" (P10) process.

"Stage 3 Control Message" contents include the following information:

Network - Number or Alpha-numeric character string used to identify the network the Stage 2 process is controlling Link ID - Numeric designation for the link monitor that is experiencing the trouble.

CTRL Unit - The Stage 1 Controller ID that the monitor is controlled from

Priority - A number representing the interrupt priority of the message. Priority=0.

Command - Instructions that the Stage 1 Process can interpret describing the action to be taken User ID - A number or Alpha-numeric character string used to allow use of this function and to identify where to send response information "Stage 3 Control Information" contents include the following information:

Network - Number or Alpha-numeric character string used to identify the network the Stage 2 process is controlling.

Link ID - Numeric designation for the link monitor experiencing the trouble

CTRL Unit - The Stage 1 Controller ID that the monitor is controlled from

Priority - A number representing the interrupt priority of the message. Priority=0.

Command - Instructions that the Stage 1 Process can interpret describing the action to be taken User ID - A number or Alpha-numeric character string used to allow use of this function and to identify where to send response information "Stage 2 Control Information" contents include the following information:

Link ID - Numeric designation for the link monitor that is experiencing the trouble CTRL Unit - The Stage 1 Controller ID that the monitor is controlled from Priority - A number representing the interrupt priority of the message. Priority=0.

Command - Instructions that the Stage 1 Process can interpret describing the action to be taken User ID - A number or Alpha-numeric character string used to allow use of this function and to identify where to send response information "Stage 1 Control Message" contents include the following information:

Link ID - Numeric designation for the link monitor that is experiencing the trouble CTRL Unit - The Stage 1 Controller ID that the monitor is controlled from Priority - A number representing the interrupt priority of the message. Priority=0.

Command - Instructions that the Stage 1 Process can interpret describing the action to be taken User ID - A number or Alpha-numeric character string used to allow use of this function and to identify where to send response information to.

Stage 3 Process

The Stage 3 Process is located at the Company Network Control Center. Reference is had to FIGS. 32–41. Stage 3 Processes perform network level analysis from data supplied by the Stage 2 Processes. Stage 2 Processes are connected to the Stage 3 Process via 56 KB DDS lines and pass information concerning link and ICN network critical problems to the Stage 3 Process. It then determines if a local problem may affect other LATAs networks. It will poll the other Local Networks monitors or initiate Reactive Traps to the Local Networks monitors. It will also permit access to Local Network monitors for protocol analysis. Stage 3 Processes:

A. Analyze trouble data supplied by Stage 2 Processes and determine if further information is needed to identify a company network problem. It obtains information by, Polling other Local Network monitors for status on related ICN or company B/D link nodes.

Imitate new Reactive Traps in those monitors where a trouble may migrate to.

Use existing trend or Link History data to determine if this a repeating problem.

Use ICN certification parameters to determine if ICN network performance has changed and identify other LATAs where this trouble by also occur.

B. Inform maintenance personnel of a possible company network event and provide corrective action instructions.

C. Provide access to any monitor in any LATA and displays link data to the maintenance terminal.

D. Provide a company network map for visual display of network status.

E. Maintain various databases needed to access link monitors, generated traps, analyzed results and provide corrective action descriptions. These databases are:

Network History DB - Used to hold a running link history information.

Link Access DB - Used locate link monitors.

Network Profile DB - Used to hold information about link design and configuration.

Test Results DB - Used hold protocol analysis results for archiving or analysis.

STP Profile DB - Used to hold STP parameters.

Corrective Action DB - Used to hold corrective descriptions.

Trap DB - Used to hold predefined user traps.

Reactive Trap DB - Used to hold reactive trap script definitions.

Report DB - Used to hold predefined report definitions.

User Profile DB - Used to hold user log-ins, passwords and other user information.

Analysis DB - Used to hold test results or MSU information for analysis.

Certification DB - Used to hold Interconnect Certification benchmark parameters.

Trouble DB - Used to hold trouble reports.

Stage 4 Process

The Stage 4 process is located at the Regional CCSN Network Support Center(s). The function of this process is to monitor the regional CCSN network. It will receive trouble information form the Stage 3 Processes in each company. It will also have direct access to all monitors. The Stage 4 Process will:

A. Process Reactive Trap information supplied by the Stage 3 Processes and if needed, generate Reactive Traps for other company monitors.

B. Process any trouble information supplied from the Stage 3 Processes and determine if a similar situation is either beginning or is in progress in other company networks. It will then provide additional corrective action instructions to all company Stage 3 Process locations.

C. Facilitate Interconnect Testing to all Local Network monitors.

D. Request and analyze daily link and network history information from Stage 2 Processes.

E. Determine the certification status of all interconnected networks and report any deviations from standards to CCSN support staff.

F. Facilitate the development of Reactive Traps for all company networks.

G. Provide SS7 protocol analysis tools.

H. Maintain various databases needed to access link monitors, generated traps, analyzed results and provide corrective action descriptions. These databases are:

Regional Network History DB - Used to hold a running link history information.

Link Access DB - Used locate link monitors.

Link Profile DB - Used to hold information about link design and configuration.

Network Profile DB - Used to hold information about Network designed configuration.

Network Certification DB - Used to hold certification parameters for ICN networks.

Test Results DB - Used hold protocol analysis results for archiving or analysis.

STP Profile DB - Used to hold STP parameters.

Corrective Action DB - Used to hold corrective descriptions.

Trap DB - Used to hold predefined user traps.

Reactive Trap DB - Used to hold reactive trap script definitions. Report DB - Used to hold predefined report definitions.

User Profile DB - Used to hold user log-ins, passwords and other user information.

Test Results DB - Used to store SS7 test results.

SS7 LINK MONITOR DESCRIPTION (Receive Side of SS7 Monitor Circuit)

Reference is had to FIG. 17.

Receive SS7 56 Kb link data is synchronized (P1) to the monitor. A Signaling Unit (SU) frame (01111110) is identified indicating the beginning of an SU. Octets are checked for "0" insertion and corrected (P2). Frame indications are used to identify SU from the corrected link data (P3). SUs are temporarily stored in SU Buffer (D2)(P4). As SUs are being saved, an SU is taken from the SU Buffer (D5). The SU is decoded and the SU type determined by decoding the H0 and H1 Message Transport Part of the SU (P6). The following four SU types are identified:

1. Fill In Signaling Units (FISU)
2. BAD - An SU that could not be decoded
3. ABRTs - An SU that was decoded but contained errored data
4. Message Signaling Unit (MSU)

FISUs are identified by having a Length Indicator of 1. They are added to the count in the FISU Register (D12). The new count is then placed back into FISU register (P7). The configuration of the FISU Register is as follows:

Count - Contains the total FISU count. (32 bits)

The octet size of BAD and ABRT SUs are calculated and the result added to the value in the Error Register (D13). The new value is then placed back in Error register (P13). The configuration of the Error Register is as follows:

Octets - Contains the total octet count. (32 bits)

MSU type values are used to identify an MSU Register (D5). The contents of the register are retrieved and 1 is added to the count in the MSU Register. The new total is placed back in the MSU Register (P11). Each MSU type has its own register. MSU information consists of the following:

MSU - Complete MSU

Time - Time, (in milliseconds), the MSU was identified

MSU Type - The SS7 Protocol message type identified by the MTP H0 and H1 Octets

MSU ORG - Designates origin of the MSU. 1=transmit, 0=receive.

The MSU register has the following configuration:
FLAG - 4 bits that represent the following:
0001 Reactive MSU
0010 Response MSU
0011 Response Trap
0100 User Defined Trap
0101 Call Progress Trap Initiate
0110 Call Progress Trap Sequence
0111 Reserved for future use
1111

Count - 32 bits used to store MSU count totals

Both the MSU information and MSU register values are used to perform six processes.

Determine if MSU is a Reactive MSU (P12)

If the MSU register flag is 0001, the MSU is identified as a Reactive Trap MSU (P12). The MSU information is then formatted into Stage 1 Reactive MSU information (P13).

Determine if MSU is a Response MSU (P14)

If the MSU register flag is 0010, the MSU is identified as a Response Trap MSU (P14). The MSU information is then formatted into Stage 1 Response MSU information (P15).

Add 1 to Interval MSU Type Register (P16)

The MSU type information is used to select an Interval Register (D3). The contents of the register is retrieved and 1 is added to the count. The new total is then put back into the register (P16). The configuration of the Interval Register is as follows:

Count - Holds the count of MSU types. (8 bits)

Determine MSU Category and Add 1 to the Category Register (P21)

MSU types are identified as belonging to the following categories:

Link Status Signal Unit (LSSU)
Network Management MSUs (NM)
Integrated Services digital network User Part (ISUP)
Signaling Connection Control Part (SCCP)
Transaction Connection Application Part (TCAP)

Once the MSU has been categorized, the appropriate Category Register (D6) is accessed, the count in the register extracted and 1 added to the count. The new total is then put back into the register (P21). The configuration of the Category Register is as follows:

Count - Holds the count of MSUs for the category. (8 bits)

Calculate MSU Octet Length and Add Value to Link Load Register (P25)

The length of the MSU in octets is calculated. The contents of the Link Load Register is retrieved and the MSU octet value is added to the register's value. The new value is then placed back in the Link Load Register. The configuration of the Category Register is as follows:

The sixth process involves MSU trapping procedures and will be covered under SS7 Trap Detection and Link Data Storage section. MSU information is sent to Store MSU in Order of Receipt to Temporary Buffer (P60).

Periodically, the Interval MSU, Category and Link Load Registers are checked against thresholds to determine if a potential problem may exist. This polling is accomplished by the Determine Next Interval, Category and Link Load Cycle (P18) process.

The Receive Poll Array (D5) contains user defined interval parameters for all registers. Receive Poll parameters have a range of 100 to 86,400,000 (24 hours). These values represent milliseconds. Receive Poll Array elements are:

Cycle - 100 to 86,400,000

Last Cycle - The elapsed time from the pervious cycle that was performed

Start Time - Start time in hours (3,600,000 ms) that the Cycle parameter is valid End Time - End time in hours (3,600,000 ms) that the Cycle parameter is no longer valid Register # - Number of the register that this parameter applies to Example: If a Receive Poll Array elements were:
Cycle=1000
Start Time=21,600,000
End Time=28,800,000
Register #=3-1

The Interval Register for element 1 (IAM) will be polled and the Interval Threshold checked, between 6:00 AM (21,600,000 ms) and 8:00 AM (28,800,000 ms) every second (1000 ms).

Multiple entries are allowed for each register, provided the entries do not conflict with each other.

The Determine Next Interval, Category and Link Load Cycle (P18) process scans through the Receive Poll Array every 100 milliseconds. It checks the following:

1. Start Time - Determines if the current time is valid.
2. End Time - Determines if the current time is valid.
If 1 and 2 are valid, it adds 100 to the Last Cycle element.
If the Cycle and Last Cycle elements are equal
Send poll signal to Register #
Zero out Last Cycle element
If they are not equal
Go to the next Receive Poll Array Elements
3. If the Start and/or End Time elements are not valid, get the next Receive Poll Array Elements.

This process continues indefinitely or when stopped by a Stage 1 control signal. At a user defined time, the Last Cycle elements are all zeroed out, indicating the beginning of a new day, unless a trouble condition exists.

Determine if Interval Threshold is Exceeded (P17) is initiated when a poll signal is received from P18. The contents of Receive Interval Register (D3) identified by the signal are compared with the related threshold value in the MSU Interval Threshold Array (D4) element. The following will occur depending on the result of the comparison:

A. If the Threshold Type equals 1 (Maximum Threshold)
1. If the Receive Interval Register value is less than the threshold value, the Receive Interval Register is reset (P19).
2. If the Receive Interval Register value is greater than the threshold value, threshold exceeded indication is generated. This information is sent to Format MSU Interval Threshold Failure Information (P20) where it is converted to the appropriate High Speed Bus and Stage 1 format. This formatted data is sent to Generate Bus Interrupt and Put Data on High Speed Bus (P30) process. The data is then placed on the bus when permitted by the Stage 1 Controller. The Receive Interval Register is reset (P19).

B. If the Threshold Type equals 0 (Minimum Threshold)

1. If the Receive Interval Register value is greater than the threshold value, the Receive Interval Register is reset (P19).

2. If the Receive Interval Register value is less than the threshold value, threshold exceeded indication is generated. This information is sent to Format MSU Interval Threshold Failure Information (P20) where it is converted to the appropriate High Speed Bus and Stage 1 format. This formatted data is sent to Generate Bus Interrupt and Put Data on High Speed Bus (P30) process. The data is then placed on the bus when permitted by the Stage 1 Controller. The Receive Interval Register is reset (P19).

This is how Minimum and Maximum Threshold parameters can be verified.

The configuration of the MSU Interval Threshold Array is as follows:

Threshold - User defined numeric value of threshold. (8 bits)

Threshold Type - 0=Minimum value, 1=Maximum value.

Start Time - The time, (in milliseconds), the Threshold value is valid (32 bits)

End Time - The latest time, (in milliseconds), the Threshold value is valid (32 bits)

Determine if MSU Category Threshold is Exceeded (P22) is initiated when a poll signal is received from P18. The contents of Receive Category Register (D6) identified by the signal are compared with the related threshold value in the MSU Category Threshold Array (D7) element. The following will occur depending on the result of the comparison:

A. If the Threshold Type equals 1 (Maximum Threshold)

1. If the Receive Category Register value is less than the threshold value, the Receive Category Register is reset (P24).

2. If the Receive Category Register value is greater than the threshold value, threshold exceeded indication is generated. This information is sent to Format MSU Category Threshold Failure Information (P23) where it is converted to the appropriate High Speed Bus and Stage 1 format. This formatted data is sent to Generate Bus Interrupt and Put Data on High Speed Bus (P30) process. The data is then placed on the bus when permitted by the Stage 1 Controller. The Receive Category Register is reset (P24).

B. If the Threshold Type equals 0 (Minimum Threshold)

1. If the Receive Category Register value is greater than the threshold value, the Receive Category Register is reset (P24).

2. If the Receive Category Register value is less than the threshold value, threshold exceeded indication is generated. This information is sent to Format MSU Category Threshold Failure Information (P23) where it is converted to the appropriate High Speed Bus and Stage 1 format. This formatted data is sent to Generate Bus Interrupt and Put Data on High Speed Bus (P30) process. The data is then placed on the bus when permitted by the Stage 1 Controller. The Receive Category Register is reset (P24).

This is how Minimum and Maximum Threshold parameters can be verified.

The configuration of the MSU Category Threshold Array is as follows:

Threshold - User defined numeric value of threshold. (8 bits)

Threshold Type - 0=Minimum value, 1=Maximum value.

Start Time - The time, (in milliseconds), the Threshold value is valid (32 bits)

End Time - The latest time, (in milliseconds), the Threshold value is valid (32 bits)

Data from the Receive Link Load Register (D8) is retrieved and aggregate link load calculations performed (P26) when a poll signal is received from P18. The result of the calculation is compared with the threshold value in the Receive Link Load Threshold Array (D9). The following will occur depending on the result of the comparison:

A. If the Threshold Type equals 1 (Maximum Threshold)

1. If the calculated link load value is less than the threshold value, the Receive Link Load Register is reset (P28).

2. If the calculated link load value is greater than the threshold value, threshold exceeded indication is generated (P27). This information is sent to Format MSU Link Load Threshold Failure Information (P29) where it is converted to the appropriate High Speed Bus and Stage 1 format. This formatted data is sent to Generate Bus Interrupt and Put Data on High Speed Bus (P30) process. The data is then placed on the bus when permitted by the Stage 1 Controller. The Receive Link Load Register is reset (P28).

B. If the Threshold Type equals 0 (Minimum Threshold)

1. If the calculated link load value is greater than the threshold value, the Receive Link Load Register is reset (P28).

2. If the calculated link load value is less than the threshold value, threshold exceeded indication is generated. This information is sent to Format MSU Link Load Threshold Failure Information (P29) where it is converted to the appropriate High Speed Bus and Stage 1 format. This formatted data is sent to Generate Bus Interrupt and Put Data on High Speed Bus (P30) process. The data is then placed on the bus when permitted by the Stage 1 Controller. The Receive Link Load Register is reset (P28).

This is how Minimum and Maximum Threshold parameters can be verified.

The configuration of the Link Load Threshold Array is as follows:

Threshold - User defined numeric value of threshold. (32 bits)

Threshold Type - 0=Minimum value, 1=Maximum value.

Start Time - The time, (in milliseconds), the Threshold value is valid. (32 bits)

End Time - The latest time, (in milliseconds), the Threshold is valid. (32 bits)

When the Receive Link Load ReLink Load Register is being polled by P18, the Calculate Pseudo Bit Error Rate (BERT) Result (P9) process is activated. BERT results are calculated using a user defined BERT Algorithm (D11), Total Octet count from process P26, FISU count value (D12) and BAD/ABRT octet count (D13). The BERT result is compared to the BERT threshold in the BERT Threshold Array (D10). The following will occur depending on the result of the comparison:

1. If the calculated BERT value is less than the threshold value, the FISU and BAD/ABRT Registers are reset (P96).

2. If the calculated BERT is greater than the threshold value, threshold exceeded indication is generated. This information is sent to Format MSU Link BERT Threshold Failure Information (P97) where it is converted to the appropriate High Speed Bus and Stage 1 format. This formatted data is sent to Generate Bus Interrupt and Put Data on High Speed Bus (P30) process. The data is then placed on the bus when permitted by the Stage 1 Controller. The Receive FISU and BAD/ABRT Registers are reset (P96).

SUs decoded and identified in the Identify Signal Units (P3), are also routed to the Discard FISUs Unless FSN, BSN, FIB and BIB have changed (P5) process. The resulting SUs are time stamped (P94) and sent to Buffer Receive Link Data (P77) process.

SS7 LINK MONITOR DESCRIPTION (Transmit Side of SS7 Monitor Circuit)

Reference is had to FIG. 18.

Transmit SS7 56 Kb link data is synchronized (P31) to the monitor. A Signaling Unit (SU) frame (01111110) is identified indicating the beginning of an SU. Octets are checked for "0" insertion and corrected (P32). Frame indications are used to identify SU from the corrected link data (P33). SUs are temporarily stored in SU Buffer (D15)(P35). As SUs are being saved, an SU is taken from the SU Buffer. The SU is decoded and the SU type determined by decoding the H0 and H1 Message Transport Part of the SU (P37).

1. Fill In Signaling Units (FISU)
2. BAD - An SU that could not be decoded
3. ABRTs - An SU that was decoded but contained errored data
4. Message Signaling Unit (MSU)

FISUs are identified by a Length Indicator of 0. When they are received, they are discarded (P38). The octet length of BAD and ABRT SUs are calculated and the result added to the value in the Transmit BAD/ABRT Register (D22). The new value is then placed back in Transmit BAD/ABRT Register (P98). The configuration of the Error Register is as follows:

Octets - Contains the total octet count. (32 bits)

MSU type values are used to identify an Transmit MSU Register (D14). The contents of the register are retrieved and 1 is added to the count in the MSU Register. The new total is placed back in the MSU Register (P39). Each MSU type has its own register. MSU information consists of the following:

MSU - Complete MSU
Time - Time, (in milliseconds), the MSU was identified
MSU Type - The SS7 Protocol message type identified by the MTP H0 and H1 octets
MSU ORG - Designates origin of the MSU. 1=transmit, 0=receive.

The MSU register has the following configuration:
Flag - 4 bits that represent the following:
0001 Reactive MSU
0010 Response MSU
0011 Response Trap
0100 User Defined Trap
0101 Call Progress Trap Initiate
0110 Call Progress Trap Sequence
0111 Reserved for future use
1111
Count - 32 bits used to store MSU count totals Both the MSU information and MSU register values are used to perform six processes.

Determine if MSU is a Reactive MSU (P40)

If the MSU register flag is 0001, the MSU is identified as a Reactive Trap MSU (P40). The MSU information is then formatted into Stage 1 Reactive MSU information (P41).

Determine if MSU is a Response MSU (P42)

If the MSU register flag is 0010, the MSU is identified as a Response Trap MSU (P42). The MSU information is then formatted into Stage 1 Response MSU information (P43).

Add 1 to Interval MSU Type Register (P44)

The MSU type information is used to select an Interval Register (D16). The content of the register is retrieved and 1 is added to the count. The new total is then put back into the register (P44). The configuration of the Interval Register is as follows:

Count - Holds the count of MSU types. (8 bits)

Determine MSU Category and Add 1 to the Category Register (P49)

MSU types are identified as belonging to the following categories:

Link Status Signal Unit (LSSU)
Network Management MSUs (NM)
Integrated Services digital network User Part (ISUP)
Signaling Connection Control Part (SCCP)
Transaction Connection Application Part (TCAP)

Once the MSU has been categorized, the appropriate Category Register (D18) is accessed, the count in the register extracted and 1 added to the count. The new total is then put back into the register (P49). The configuration of the Category Register is as follows:

Count - Holds the count of MSUs for the category. (8 bits)

Calculate MSU Octet Length and Add Value to Link Load Register (P53)

The length of the MSU in octets is calculated. The contents of the Link Load Register are retrieved and the MSU octet value is added to the register's value. The new value is then placed back in the Link Load Register. The configuration of the Category Register is as follows:

Count - Holds the count of octets. (32 bits)

The sixth process involves MSU trapping procedures and will be covered under SS7 Trap Detection and Link Data Storage section. MSU information is sent to Store MSU in Order of Receipt to Temporary Buffer (P60).

Periodically, the Interval MSU, Category and Link Load Registers are checked against thresholds to determine if a potential problem may exist. This polling is accomplished by the Determine Next Interval, Category and Link Load Cycle (P46) process.

The Transmit Poll Array (D30) contains user defined interval parameters for all registers. Transmit Poll parameters have a range of 100 to 86,400,000 (24 hours). These values represent milliseconds. Transmit Poll Array elements are:

Cycle - 100 to 86,400,000
Last Cycle - The elapsed time from the pervious cycle that was performed
Start Time - Start time in hours (3,600,000 ms) that the Cycle parameter is valid
End Time - End time in hours (3,600,000 ms) that the Cycle parameter is no longer valid
Register # - Number of the register that this parameter applies to
Example: If Transmit Poll Array elements were:
Cycle=1000
Start Time=21,600,000
End Time=28,800,000
Register # =3-1

The Interval Register for element 1 (IAM) will be polled and the Interval Threshold checked between 6:00 AM (21, 600,000 ms) and 8:00 AM (28,800,000 ms) every second (1000 ms).

The Determine Next Interval, Category and Link Load Cycle (P46) process scans through the Transmit Poll Array every 100 milliseconds. It checks the following:

1. Start Time - Determines if the current time is valid.
2. End Time - Determines if the current time is valid.
If 1 and 2 are valid, it adds 100 to the Last Cycle element.
If the Cycle and Last Cycle elements are equal
   Send poll signal to Register #
   Zero out Last Cycle element
If they are not equal
   Go to the next Transmit Poll Array Elements
3. If the Start and/or End Time elements are not valid, get the next Transmit Poll Array Elements.

This process continues indefinitely or when stopped by a Stage 1 control signal. At a user defined time, the Last Cycle elements are all zeroed out, indicating the beginning of a new day, unless a trouble condition exists.

Determine if Interval Threshold is Exceeded (P45) is initiated when a poll signal is received from P46. The contents if Transmit Interval Register (D16) identified by the signal are compared with the related threshold value in the MSU Interval Threshold Array (D17) element. The following will occur depending on the result of the comparison:
A. If the Threshold Type equals 1 (Maximum Threshold)

1. If the Transmit Interval Register value is less than the threshold value, the Transmit Interval Register is reset (P48).

2. If the Transmit Interval Register value is greater than the threshold value, threshold exceeded indication is generated. This information is sent to Format MSU Interval Threshold Failure Information (P47) where it is converted to the appropriate High Speed Bus and Stage 1 format. This formatted data is sent to Generate Bus Interrupt and Put Data on High Speed Bus (P59) process. The data is then placed on the bus when permitted by the Stage 1 Controller. The Transmit Interval Register is reset (P48).

B. If the Threshold Type equals 0 (Minimum Threshold)

1. If the Transmit Interval Register value is greater than the threshold value, no action is taken.

2. If the Transmit Interval Register value is less than the threshold value, threshold exceeded indication is generated. This information is sent to Format MSU Interval Threshold Failure Information (P47) where it is converted to the appropriate High Speed Bus and Stage 1 format. This formatted data is sent to Generate Bus Interrupt and Put Data on High Speed Bus (P59) process. The data is then placed on the bus when permitted by the Stage 1 Controller.

This is how Minimum and Maximum Threshold parameters can be verified. The maximum threshold must proceed maximum array, or they will always fail.

The configuration of the "MSU Interval Threshold" Array is as follows:

Threshold - User defined numeric value of threshold. (8 bits)

Threshold Type - 0=Minimum value, 1=Maximum value.

Start Time - The time, (in milliseconds) the Threshold value is valid (32 bits)

End Time - The latest time (in milliseconds) the Threshold value is valid (32 bits)

Determine if MSU Category Threshold is Exceeded (P50) is initiated when a poll signal is received from P46. The contents if Transmit Category Register (D18) identified by the signal are compared with the related threshold value in the MSU Category Threshold Array (D19) element. The following will occur depending on the result of the comparison:
A. If the Threshold Type equals 1 (Maximum Threshold)

1. If the Transmit Category Register value is less than the threshold value, the Transmit Category Register is reset (P52).

2. If the Transmit Category Register value is greater than the threshold value, threshold exceeded indication is generated. This information is sent to Format MSU Category Threshold Failure Information (P51) where it is converted to the appropriate High Speed Bus and Stage 1 format. This formatted data is sent to Generate Bus Interrupt and Put Data on High Speed Bus (P59) process. The data is then placed on the bus when permitted by the Stage 1 Controller. The Transmit Category Register is reset (P52).

B. If the Threshold Type equals 0 (Maximum Threshold)

1. If the Transmit Category Register value is greater than the threshold value, the Transmit Category Register is reset (P52).

2. If the Transmit Category Register value is less than the threshold value, threshold exceeded indication is generated. This information is sent to Format MSU Category Threshold Failure Information (P51) where it is converted to the appropriate High Speed Bus and Stage 1 format. This formatted data is sent to Generate Bus Interrupt and Put Data on high Speed Bus (P59) process. The data is then placed on the bus when permitted by the Stage 1 Controller. The Transmit Category Register is reset (P52).

This is how Minimum and Maximum Threshold parameters can be verified.

The configuration of the MSU Category Threshold Array is as follows:

Threshold - User defined numeric value of threshold. (8 bits)

Threshold Type - 0=Minimum value, 1=Maximum value.

Start Time - The time (in milliseconds) the Threshold value is

End Time - The latest time (in milliseconds) the Threshold value is valid (32 bits)

Data from the Transmit Link Load Register (D20) is retrieved and aggregate link load calculations performed (P54) when a poll signal is received from P18. The result of the calculation is compared with the threshold value in the Transmit Link Load Threshold Array (D21). The following will occur depending on the result of the comparison:
A. If the Threshold Type equals 1 (Maximum Threshold)

1. If the calculated link load value is less than the threshold value, the Transmit Link Load Register is reset (P57).

2. If the calculated link load value is greater than the threshold value, threshold exceeded indication is generated. This information is sent to Format MSU Link Load Threshold Failure Information (P58) where it is converted to the appropriate High Speed Bus and Stage 1 format. This formatted data is sent to Generate Bus Interrupt and Put Data on High Speed Bus (P59) process. The data is then placed on the bus when permitted by the Stage 1 Controller. The Transmit Link Load Register is reset (P57).

B. If the Threshold Type equals 0 (Maximum Threshold)

1. If the calculated link load value is greater than the threshold value, the Transmit Link Load Register is reset (P57).

2. If the calculated link load value is less than the threshold value, threshold exceeded indication is generated. This information is sent to Format MSU Link Load Threshold Failure Information (P58) where it is converted to the appropriate High Speed Bus and Stage 1 format. This formatted data is sent to Generate Bus Interrupt and Put Data on High Speed Bus (P59) process. The data is then placed on the bus when permitted by the Stage 1 Controller. The Transmit Link Load Register is reset (P57).

This is how Minimum and Maximum Threshold parameters can be verified.

The configuration of the Link Load Threshold Array is as follows:

Threshold - User defined numeric value of threshold. (32 bits)

Threshold Type - 0=Minimum value, 1=Maximum value.

Start Time - The time (in milliseconds) the Threshold value is valid (32 bits)

End Time - The latest time (in milliseconds) the Threshold value is valid (32 bits)

SUs decoded and identified in the Identify Signal Units (P33) are also routed to the Discard FISUs Unless FSN, BSN, FIB and BIB has Changed (P36) process. The resulting SUs are time stamped (P94) and sent to Buffer Transmit Link Data (P78) process.

When the Link Load Poll is issued and the Calculate Aggregate Link Load Percentage (P54) has a result, Determine Error Rate (P99) determines the transmit error ratio. The following formula could be used:

Error Rate=BAD/(LL+BAD)

Where:

BAD equals the number of BAD and ABRT octets

LL equals the MSU Link Load Octet Count

The Error Rate is compared with the threshold value in the Transmit Link Error Rate Threshold Array (D23) (P99). The following will occur depending on the result of the comparison:

1. If the calculated Error Rate value is less than the threshold value, the Transmit Bad/ABRT Register is reset (P100).

2. If the calculated link load value is greater than the threshold value, threshold exceeded indication is generated. This information is sent to Format Link Error Rate Threshold Failure Information (P101) where it is converted to the appropriate High Speed Bus and Stage 1 format. This formatted data is sent to Generate Bus Interrupt and Put Data on High Speed Bus (P59) process. The data is then placed on the bus when permitted by the Stage 1 Controller. The Transmit BAD/ABRT Register (D22) is reset (P100).

SS7 LINK MONITOR DESCRIPTION (SS7 Trap Detection and Link Data Storage)

Reference is had to FIG. 19.

Traps Detection

Transmit (P37) and receive (P6) SS7 MSUs are presented to the Store MSU in Order of receipt to Temporary Buffer (P60). These MSUs are stored in Temp Buffer (D24) as they are received. The MSUs carry a Transmit or Receive flag indicating their origin. MSUs are taken from the Temp Buffer and compared to an MSU Mask in the Mask Array (D25)(P62). The Mask identifies those fields in the SS7 MSU that an MSU Trap is looking for. All other fields are ignored. If a match is made, the Match MSU Information is sent to determine the Type of Trap Triggered (P66) process. The Next mask is then retrieved from the Mask Array (P64) and the process is repeated. If a match is not made (P62), the next mask is taken from the Mask Array (P64). This mask is compared to the MSU and the process also continues until all masks have been checked. When the last mask has been compared (P63), the next MSU in the Temp Buffer is retrieved (P61).

Match MSU Information configuration is as follows:

MSU - the complete MSU that was matched

Trap #- Number assigned to trap when it was created and loaded into the monitor

Determine the Type of Trap Triggered (P66) process identifies the MSU based on the MSU flag. There are three types of traps.

Response Traps - Traps generated by a Reactive Trap Script from the Stage 2 Controller.

User Defined Traps - Traps created by the user generated from the Stage 2, 3 or 4 Controller.

Call Progress Traps - Traps created by the user to capture the MSUs involved in an ISUP call setup, SCCP SCP transaction or TCAP data transaction.

Determine Action to be Taken for Response MSU Trap (P67) uses instructions in the Trap Array (D26). The appropriate trap information is obtained by finding the Trap # in the Trap Array. The following elements are contained in the Trap Array:

User ID - A number or Alpha-numeric character string used to allow use of this function and to identify where to send information when the trap is triggered Trap Number - Number assigned to trap from the trap's owner Priority - Priority of trigger information Info Type - Identifies the type of information sent to the trap's owner. The following are the minimum types of information available:

a. Return the MSU that was triggered b. Return an indication that the trap was triggered Origin - Indicates whether the trap is from the link transmit or receive Script - A set of user defined instructions for trap handling. Trap instructions can perform the following tasks:

Hold variables

Perform arithmetic operations on variables

Make logical decision

Set or change the value of numeric variables

Set or change the contents of ASCII string variables

Terminate Trap

The trap script controls the operation of the trap once triggered. The script will terminate when all conditions defined in the script have been met. When terminated, the Response Trap Result Information is formatted into Stage 1 Response Trap Information (P68). This formatted data is sent to Generate Bus Interrupt and Put Data on High Speed Bus (P76) process. The data is then placed on the bus when permitted by the Stage 1 Controller. The following elements are contained in the Stage 1 Response Trap Information:

User ID - A number or Alpha-numeric character string used to allow use of this function and to identify where to send information when the trap is triggered Trap Number - Number assigned to trap from the trap's owner Priority - Priority of trigger information Info Type - Identifies the type of information sent to the trap's owner. The following are the minimum types of information available:

a. Return the MSU that was triggered b. Return an indication that the trap was triggered Origin - Indicates whether the trap is from the link transmit or receive Monitor ID - Number assigned to the monitor Once the trap is terminated by the Trap Script, the trap is removed from the Trap Array (P102) and the Mask is removed from the Mask Array (P103).

Determine Action to be Taken for User Defined Trap (P69) uses instructions in the Trap Array (D26). The appropriate trap information is obtained by finding the Trap # in the Trap Array. The following elements are contained in the Trap Array:

User ID - A number or Alpha-numeric character string used to allow use of this function and to identify where to send information when the trap is triggered Trap Number - Number assigned to trap from the trap's owner Priority - Priority of trigger information Info Type - Identifies the type of information sent to the trap's owner. The following are the minimum types of information available:

a. Return the MSU that was triggered b. Return an indication that the trap was triggered Origin - Indicates whether the trap is from the link transmit or receive.

Script - A set of user defined instructions for trap handling. Trap instructions can perform the following tasks:

Hold variables

Perform arithmetic operations on variables

Make logical decision
Set or change the value of numeric variables
Set or change the contents of ASCII string variables
Terminate trap The trap script controls the operation of trap once triggered. The script will terminate when all conditions defined in the script have been met. When terminated, the User Defined Trap Result Information is formatted into Stage 1 Response Trap Information (P70). This formatted data is sent to Generate Bus Interrupt and Put Data on High Speed Bus (P76) process. The data is then placed on the bus when permitted by the Stage 1 Controller. The following elements are contained in the Stage 1 User Defined Trap Information:

User ID - A number or Alpha-numeric character string used to allow use of this function and to identify where to send information when the trap is triggered Trap Number - Number assigned to trap from the trap's owner Priority - Priority of trigger information Info Type - Identifies the type of information sent to the trap's owner. The following are the minimum types of information available:

a. Return the MSU that was triggered b. Return an indication that the trap was triggered Origin - Indicates whether the trap is from the link transmit or receive.

Monitor ID - Number assigned to the monitor

Once the trap is terminated by the Trap Script, the trap is removed from the Trap Array (P104) and the Mask is removed from the Mask Array (P105).

Determine If MSU is an Initiate MSU (P72) checks to see if the MSU flag in the Transmit or Receive MSU Register is 0101 (Call Progress Initiate MSU) or 0110 (Call Progress Sequence MSU).

If the MSU flag equals 0101, the MSU information is decoded and MSU field values extracted (P73) based on instruction from the script in the Trap Array (D26). The resulting Call Progress Initiate Information is formatted into Stage 1 Call Progress Initiate Trap Information (P74). This formatted data is sent to Generate Bus Interrupt and Put Data on High Speed Bus (P76) process. The data is then placed on the bus when permitted by the Stage 1 Controller. The following elements are contained in the Stage 1 Call Progress Initiate Trap Information:

User ID - A number or Alpha-numeric character string used to allow use of this function and to identify where to send information when the trap is triggered Trap Number - Number assigned to trap from the trap's owner Priority - Priority of trigger information Info Type - Identifies the type of information sent to the trap's owner The following are the minimum types of information available:

a. Return required field values

Info - Field values

Origin - Indicates whether the trap is from the link transmit

Monitor ID - Number assigned to the monitor

Call Progress Traps can only be terminated by the user.

If the MSU field value equals 0110, the MSU Information is formatted into Stage 1 Call Progress Sequence Trap Information (P75). This formatted data is sent to Generate Bus Interrupt and Put Data on High Speed Bus (P76) process. The data is then placed on the bus when permitted by the Stage 1 Controller. The following elements are contained in the Stage 1 Call Progress Sequence Trap Information.

User ID - A number or Alpha-numeric character string used to allow use of this function and to identify where to send information when the trap is triggered.

Trap Number - Number assigned to trap from the trap's owner

Priority - Priority of trigger information

Info Type - Identifies the type of information sent to the trap's owner

The following are the minimum types of information available:

Return the MSU that was triggered

Info - MSU info

Origin - Indicates whether the trap is for link transmit or receive

Monitor ID - Number assigned to the monitor

Call Progress Traps can only be terminated by the user.

Link Data Storage

Transmit SUs are stored (P78) in a Transmit Buffer (D29). When enough SUs are stored to equal approximately 1028 bits, a Transmit Link Data Block Ready indication is sent to P79. Receive SUs are saved (P77) in a receive Buffer (D28) and a Receive Data Ready indication is sent to P79. When enough SUs are stored to equal approximately 1028 bits, a Receive Data Block Ready indication is sent to P79. Block data from the Transmit or Receive Buffers are retrieved and stored (P79) in a Transmission Buffer (D27). When an enable signal is received by the Format Data Blocks and Put on Auxiliary Data Bus (P80) process retrieves the block data from the Transmission Buffer and sends it to the Generate Bus Interrupt and Put Data on Aux Data Bus (P81) process. The data is then sent to the Stage 1 Controller for storage. This process continues until stopped by the user.

The Aux Data Bus is dedicated to link data transmission and storage.

SS7 LINK MONITOR DESCRIPTION (Monitor Threshold and Trap Data Control)

Reference is had to FIG. 20.

Stage 1 Information is received by the Decode Stage 1 Information (P82) process. The User ID information is checked to determine if the user is allowed to perform the operation. The following information types are available:

Change Poll Array Parameter
Change MSU Category Threshold Parameter
Change MSU Interval Threshold Parameter
Change Link Load Threshold Parameter
Change MSU Register Flag Parameter
Set System Clock
Load Response Trap Mask and Script
Load Call Progress Trap Mask and Script
Load User Defined Trap Mask and Script
Remove Mask from Trap Array
Remove Trap from Trap Array
Pull Monitor Register and Array information
Stop Polling Registers and Arrays
Suspend Data Capture Change Poll Array Parameter (P83) process permits the user to change the MSU Interval, Category Interval and Link Load interval parameters in the Transmit and Receive Poll Array. The following parameters can be changed:

Cycle
Start Time
End Time
Register #

Change MSU Category Threshold Array Parameter (P84) process permits the user to change the Transmit and Receive Category Threshold Array Parameters. The register number is used to select the array elements to be changed. The following parameters can be changed:
  Threshold
  Threshold Type
  Start Time
  End Time Change MSU Interval Threshold Array Parameter (P85) process permits the user to change the Transmit and Receive MSU Interval Threshold Array parameters. The register number is used to select the array elements to be changed. The following parameters can be changed:
  Threshold
  Threshold Type
  Start Time
  End Time Change Link Load Threshold Array Parameters (P86) process permits the user to change the Transmit and Receive Link Load Threshold Array parameters. The register number is used to select the array elements to be changed. The following parameters can be changed:
  Threshold
  Threshold Type
  Start Time
  End Time Change MSU Register Flag Parameter (P87) process permits the user to change the Transmit and Receive MSU Register Flag parameter. The following Parameters can be changed:
  Flag Set System Clock (P88) process allows time information to be loaded into the monitor's system clock.

Load Response Mask and Trap Scripts (P89) process allows the user and the Stage 2, 3 and 4 Controllers to change Transmit and Receive trap parameters or load a new trap. The following parameters can be changed:
  User ID
  Trap Number
  Priority
  Info Type
  Origin
  Script
  Mask
  Script Load Call Progress Mask and Trap Scripts (P90) process allows the user and the Stage 2, 3 and 4 Controllers to change Transmit and Receive trap parameters or load a new trap. The following parameters can be changed:
  User ID
  Trap Number
  Priority
  Info Type
  Origin
  Script
  Mask
  Script
  MSU Register Flag Load User Defined Mask and Trap Scripts (P91) pro Mask
  Script Load Call Progress Mask and Trap Scripts (P90) process allows the user and the Stage 2, 3 and 4 Controllers to change Transmit and Receive trap parameters or load a new trap. The following parameters can be changed:
  User ID
  Trap Number
  Priority
  Info Type
  Origin
  Script
  Mask
  Script
  MSU Register Flag Load User Defined Mask and Trap Scripts (P91) process allows the user and the Stage 2, 3 and 4 Controllers to change Transmit and Receive trap parameters or load a new trap. The following parameters can be changed:
  User ID
  Trap Number
  Priority
  Info Type
  Origin
  Script
  Mask
  Script Remove Mask from Mask Array (P106) process allows the user to remove a mask from the mask array. This process is used to stop Call Progress Traps.

Remove Trap from Trap Array (P107) process allows the user to remove a mask from the Trap Array. This process is used to stop Call Progress Traps.

Pull Link Register Information (P92) process allows the user and Stage 2, 3 and 4 Controllers to retrieve Monitor Register, Array and Trap Array information. This is accomplished by a Link Register Information Request from Decode Stage 1 Information (P82). The rested information is returned to the user via the Generate Bus Interrupt and Put Data on High Speed Bus (P92).

The system or user can stop threshold polling and suspend data capture by issuing an instruction to the monitor.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

I claim:

1. In a communication system comprising a switched network connected by program controlled switches (PCSs) controlled by a data switched common channel signaling network (CCSN) including signal transfer points (STPs) connected to said PCSs at signaling points (SPs) via links between said SPs and STPs, a monitoring system comprising:

a) monitor means including first processor means connected with said links to provide real time monitoring of the link signals and provide first output signals indicative of predetermined conditions therein;

b) second processor means receiving and analyzing said first output signals and providing second output signals responsive to said analysis;

c) third processor means receiving said second output signals from the second processor means and analyzing said signals, said third processor means being coupled with a mated pair of said STPs so as to provide control signals to control the monitor means connected to the links of said pair of STPs, said third processor means generating third output signals including alarm and corrective action signals responsive to conditions determined from the signals from said second processor means;

d) fourth processor means receiving and analyzing said third output signals and providing fourth output signals responsive to the results of said analysis of said third output signals; and e) input terminal means connected to at least one of said processing means for manually controlling said monitor means.

2. A monitoring system comprising a monitor located on communication links between switching points (SPs) and signal transfer points (STPs) for a common channel signaling network wherein the monitor comprises a link interface connecting said links and a first processor which provides real-time monitoring for the link signals, link signal load, load thresholding, trapping of predetermined link signals and output of the above signals to a second processor which receives and analyzes those output signals to provide a second set of output signals.

3. A monitoring system for a common channel signaling network including signal transfer points (STPs) and switching points (SPs) comprising a monitor located on communication links between said SPs and STPs wherein the monitor comprises a link interface connecting said links and a first processor which provides real-time monitoring for the link signals, link signal load, load thresholding, trapping of predetermined link signals and output of signals responsive to said monitoring to a second processor which receives and analyzes those output signals to provide a second set of output signals.

4. In a communication system comprising a switched network controlled by a common channel signaling network (CCSN) including signal transfer points (STPs) connected to said switched network at signaling points (SPs) via links between said SPs and STPs, a monitoring system comprising:

a) monitors coupled with said links providing real time monitoring of the link signals and capable of monitoring for link load and load thresholding and of trapping predetermined link signals, said monitor providing output signals indicative of monitored conditions in the links;

b) a first processor controlling said monitors and receiving monitor output signals and providing first output signals; and c) a second processor receiving said first output signals and providing control signals to control monitors coupled to the links of at least one STP, said second processor generating second output signals responsive to conditions determined from said first output signals.

* * * * *